US012496336B2

United States Patent
Crowe, Jr. et al.

(10) Patent No.: US 12,496,336 B2
(45) Date of Patent: Dec. 16, 2025

(54) PEPTIDE VACCINE BASED ON A NEW UNIVERSAL INFLUENZA A HEMAGGLUTININ HEAD DOMAIN EPITOPE AND HUMAN MONOCLONAL ANTIBODIES BINDING THERETO

(71) Applicants: VANDERBILT UNIVERSITY, Nashville, TN (US); THE SCRIPPS RESEARCH INSTITUTE, La Jolla, CA (US)

(72) Inventors: James E. Crowe, Jr., Nashville, TN (US); Xiaozhen Hu, San Diego, CA (US); William Schief, Encinitas, CA (US)

(73) Assignees: VANDERBILT UNIVERSITY, Nashville, TN (US); THE SCRIPPS RESEARCH INSTITUTE, La Jolla, CA (US)

( * ) Notice: Subject to any disclaimer, the term of this patent is extended or adjusted under 35 U.S.C. 154(b) by 1007 days.

(21) Appl. No.: 17/611,564

(22) PCT Filed: May 16, 2020

(86) PCT No.: PCT/US2020/033316
§ 371 (c)(1),
(2) Date: Nov. 15, 2021

(87) PCT Pub. No.: WO2020/232426
PCT Pub. Date: Nov. 19, 2020

(65) Prior Publication Data
US 2022/0387578 A1 Dec. 8, 2022

Related U.S. Application Data

(60) Provisional application No. 62/849,061, filed on May 16, 2019.

(51) Int. Cl.
*A61K 39/145* (2006.01)
*A61K 9/14* (2006.01)
*A61K 9/19* (2006.01)
*A61K 39/00* (2006.01)
*A61K 47/44* (2017.01)
*A61P 31/16* (2006.01)
*C12N 7/00* (2006.01)

(52) U.S. Cl.
CPC ............ *A61K 39/145* (2013.01); *A61K 9/148* (2013.01); *A61K 9/19* (2013.01); *A61K 47/44* (2013.01); *A61P 31/16* (2018.01); *C12N 7/00* (2013.01); *A61K 2039/505* (2013.01); *A61K 2039/5252* (2013.01); *A61K 2039/575* (2013.01)

(58) Field of Classification Search
CPC ........ A61K 39/145; A61K 9/148; A61K 9/19; A61K 47/44; A61K 2039/505; A61K 2039/575; A61P 31/16; C12N 7/00
See application file for complete search history.

(56) References Cited

U.S. PATENT DOCUMENTS

| 2005/0058649 A1 | 3/2005 | Landes |
| 2007/0286873 A1 | 12/2007 | Williams et al. |
| 2009/0028872 A1 | 1/2009 | Terret |
| 2013/0289246 A1 | 10/2013 | Crowe et al. |
| 2018/0311336 A1 * | 11/2018 | Ciaramella ............ A61P 43/00 |
| 2019/0314485 A1 | 10/2019 | Palese et al. |

FOREIGN PATENT DOCUMENTS

| WO | WO-2019067884 A1 * | 4/2019 | ............ A61K 39/12 |
| WO | WO 2020/04640 | 2/2020 | |

OTHER PUBLICATIONS

Bangaru et al., "A Site of Vulnerability on the Influenza Virus Hemagglutinin Head Domain Trimer Interface", *Cell*, 177(5):1136-1152, 2019.
Corti et al., "A neutralizing antibody selected from plasma cells that binds to group 1 and group 2 influenza A hemagglutinins", *Science*, 333: 850-856, 2011.
Corti et al., "Heterosubtypic neutralizing antibodies are produced by individuals immunized with a seasonal influenza vaccine", *J. Clin. Invest.*, 120: 1663-1673, 2010.
DiLillo et al., "Broadly neutralizing hemagglutinin stalk-specific antibodies require FcγR interactions for protection against influenza virus in vivo", *Nat. Med.*, 20: 143-151, 2014.
DiLillo et al., "Broadly neutralizing anti-influenza antibodies require Fc receptor engagement for in vivo protection", *J. Clin. Invest.*, 126:605-610, 2016.
Dreyfus et al., "Highly conserved protective epitopes on influenza B viruses", *Science*, 337: 1343-1348, 2012.
Dreyfus et al., "Structure of a classical broadly neutralizing stem antibody in complex with a pandemic H2 influenza virus hemagglutinin", *J. Virol.*, 87:7149-7154, 2013.
Ekiert et al., "Antibody recognition of a highly conserved influenza virus epitope", *Science*, 324: 246-251, 2009.
Ekiert et al., "A highly conserved neutralizing epitope on group 2 influenza A viruses", *Science*, 333: 843-850,2011.
Ekiert et al., "Cross-neutralization of influenza A viruses mediated by a single antibody loop", *Nature*, 489: 526-532, 2012.
Friesen et al., "A common solution to group 2 influenza virus neutralization", *Proc. Natl. Acad. Sci. U.S.A.* 111: 445-450, 2014.
He et al., "Broadly neutralizing anti-influenza virus antibodies: enhancement of neutralizing potency in polyclonal mixtures and IgA backbones", *J. Virol.*, 89:3610-3618, 2015.
Hong et al., "Antibody recognition of the pandemic H1N1 influenza virus hemagglutinin receptor binding site", *J. Virol.*, 87:12471-12480, 2013.

(Continued)

*Primary Examiner* — Nicole Kinsey White
*Assistant Examiner* — Ruixue Wang
(74) *Attorney, Agent, or Firm* — pH IP Law

(57) ABSTRACT

The present disclosure is directed to peptide antigens derived from a previously undefined epitope on influenza A virus hemagglutinin and methods for use thereof.

27 Claims, 54 Drawing Sheets
Specification includes a Sequence Listing.

(56) References Cited

OTHER PUBLICATIONS

Impagliazzo et al., "A stable trimeric influenza hemagglutinin stem as a broadly protective immunogen", *Science*, 349: 1301-1306, 2015.
Joyce et al., "Vaccine-induced antibodies that neutralize group 1 and group 2 influenza A viruses", *Cell*, 166: 609-623, 2016.
Julien et al., : Structural insights into key sites of vulnerability on HIV-1 Env and influenza HA *Immunol. Rev.*, 250: 180-198, 2012.
Kallewaard et al., "Structure and function analysis of an antibody recognizing all influenza A subtypes", *Cell*, 166: 596-608, 2016.
Kashyap et al., "Combinatorial antibody libraries from survivors of the Turkish H5N1 avian influenza outbreak reveal virus neutralization strategies", *Proc. Natl. Acad. Sci.*, 105:5986-5991, 2008.
Kashyap et al., "Protection from the 2009 H1N1 pandemic influenza by an antibody from combinatorial survivor-based libraries", *PLoS Pathog.* 6, e1000990, 2010.
Lang et al., "Antibody 27F3 broadly targets influenza A group 1 and 2 hemagglutinins through a further variation in VH1-69 antibody orientation on the HA stem", *Cell Rep.*, 20:2935-2943, 2017.
Laursen and Wilson, "Broadly neutralizing antibodies against influenza viruses", *Antiviral Res.*, 98: 476-483, 2013.
Lee et al., "Heterosubtypic antibody recognition of the influenza virus hemagglutinin receptor binding site enhanced by avidity", *Proc. Natl. Acad. Sci.*, 109: 17040-17045, 2012.
Lee et al., "Receptor mimicry by antibody F045-092 facilitates universal binding to the H3 subtype of influenza virus", *Nat. Commun.*, 5: 3614, 2014.
Lee et al., "Molecular-level analysis of the serum antibody repertoire in young adults before and after seasonal influenza vaccination", *Nat. Med.*, 22: 1456-1464, 2016.
Nachbagauer et al., "A chimeric haemagglutinin-based influenza split virion vaccine adjuvanted with AS03 induces protective stalk-reactive antibodies in mice", *NPJ Vaccines*, 1:16015, 2016.
Okuno et al., "A common neutralizing epitope conserved between the hemagglutinins of influenza-A virus H1 and H2 strains", *J. Virol.*, 67: 2552-2558, 1993.
PCT International Search Report and Written Opinion issued in International Application No. PCT/US2019/047606, mailed Jan. 6, 2020.
PCT International Search Report and Written Opinion issued in International Application No. PCT/US2020/033316, mailed Aug. 17, 2020.
Schmidt et al., "Viral receptor-binding site antibodies with diverse germline origins", *Cell*, 161: 1026-1034, 2015.
Smirnov et al., "An epitope shared by the hemagglutinins of H1, H2, H5, and H6 subtypes of influenza A virus", *Acta Virol.*, 43:237-244, 1999.
Thornburg et al., "H7N9 influenza virus neutralizing antibodies that possess few somatic mutations", *J. Clin. Invest.*, 126:1482-1494, 2016.
Valkenburg et al., "Stalking influenza by vaccination with pre-fusion headless HA mini-stem", *Sci. Rep.*, 6:22666, 2016.
Whittle et al., "Broadly neutralizing human antibody that recognizes the receptor-binding pocket of influenza virus hemagglutinin", *Proc. Natl. Acad. Sci.*, 108:14216-14221, 2011.
Xu et al., "A recurring motif for antibody recognition of the receptor-binding site of influenza hemagglutinin", *Nat. Struct. Mol. Biol.*, 20:363-370, 2013.
Yassine et al., "Hemagglutinin-stem nanoparticles generate heterosubtypic influenza protection", *Nat. Med.*, 21:1065-1070, 2015.
Yoshida et al., "Cross-protective potential of a novel monoclonal antibody directed against antigenic site B of the hemagglutinin of influenza A viruses", *PLoS Pathog.*, 5: e1000350, 2009.
Yusuf et al., "Structurally conserved binding sites of hemagglutinin as targets for influenza drug and vaccine development", *J. Chem. Inf. Model*, 53: 2423-2436, 2013.
Zhu et al. "A unique and conserved neutralization epitope in H5N1 influenza viruses identified by an antibody against the A/Goose/Guangdong/1/96 hemagglutinin", *J. Virol.*, 87:12619-12635, 2013.

* cited by examiner

FluA-20 Donor Vaccination History

H5N1 → ---- 22 Months ---- H5N1 Boost → H7N9 → TIV → D5 D6 D11 D14 (Identification of FluA-20 Clonal Lineages) D31 (Isolation of FluA-20 mAb)

FIG. 1A

Cluster C: S56T/T57S/L82M/A88G

Germline S30T/Y52F/V71I/K81R Inferred Ancestor

Cluster B: T23S/G27V/G32D/S33I/S35bT/S54N/S56N/I69M/Q77E/S82aR/91F

FluA-20

Cluster B: N60K/T68A/N76S

FIG. 1B

| Subtype | Group 1 | | | | | | | | | | | Group 2 | | | | | | |
|---|---|---|---|---|---|---|---|---|---|---|---|---|---|---|---|---|---|---|
| | H1 | | H2 | H5 | | H6 | | H9 | | H12 | H16 | H3 | | H4 | H7 | | H10 | H14 | H15 |
| HA From Indicated Strain | A/Fort Monmouth/1/1947 | A/Texas/36/1991 | A/Solomon Islands/03/2006 | A/California/04/2009 | A/Singapore/1/1957 | A/Vietnam/1203/2004 | A/Indonesia/05/2005 | A/Taiwan/2/2013 | A/Turkey/Wisconsin/1/1966 | A/Duck/Memphis/546/1974 | A/Duck/Alberta/60/1976 | A/Black-headedgull/Sweden/4/1999 | A/Hong Kong/1/1968 | A/California/07/2004 | A/Texas/50/2012 | A/Duck/Czechoslovakia/1956 | A/New York/107/2003 | A/Shanghai/2/3013 | A/Netherlands/219/2003 | A/Chicken/Germany/N/1949 | A/Mallard Duck/Astrakhan/263/1982 | A/Shearwater/Western Australia/2576/1979 |
| EC50 (ng/mL) FluA-20 | 7 | 9 | 8 | 10 | 9 | 142 | 16 | 61 | 22 | 7 | | 6 | > | 8 | 8 | 6 | 7 | > | 12 | 6 | 37 | 7 | 7 |
| rFluA-20 | 7 | 8 | 8 | 12 | 11 | 133 | 16 | 63 | 16 | 7 | | 6 | > | 9 | 9 | 7 | 7 | > | 13 | 5 | 41 | 7 | 7 |
| UCA | 17 | 15 | 10 | 51 | 28 | > | > | 342 | > | 52 | | > | > | 21 | > | > | 13 | > | > | 33 | > | > | > |

Control (MRSA-147)
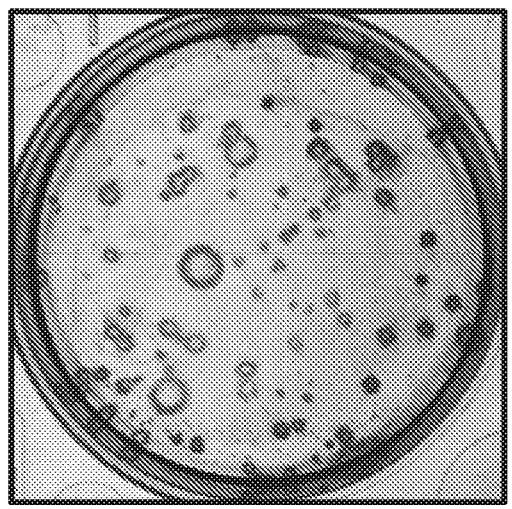
FluA-20
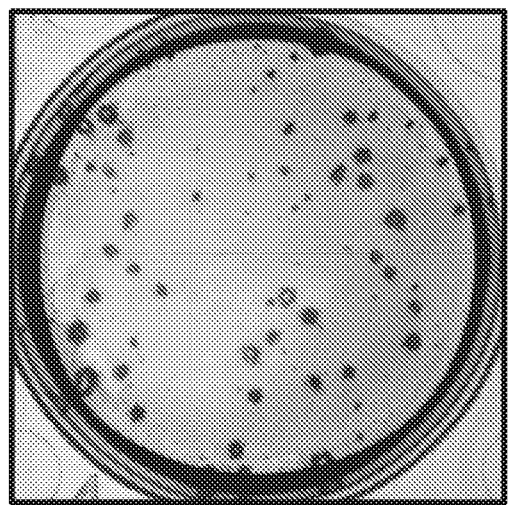
CR9114
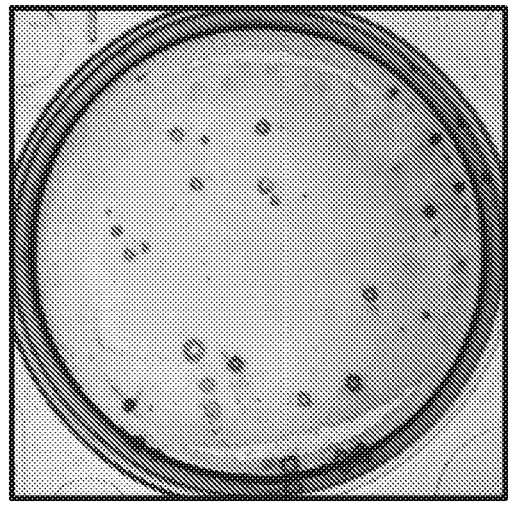
Zanamivir
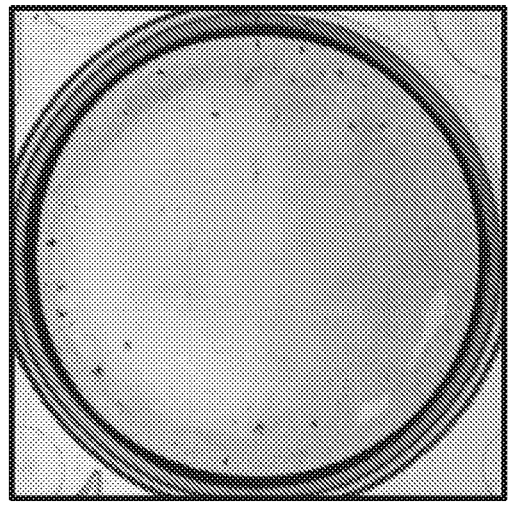
*FIG. 7A*

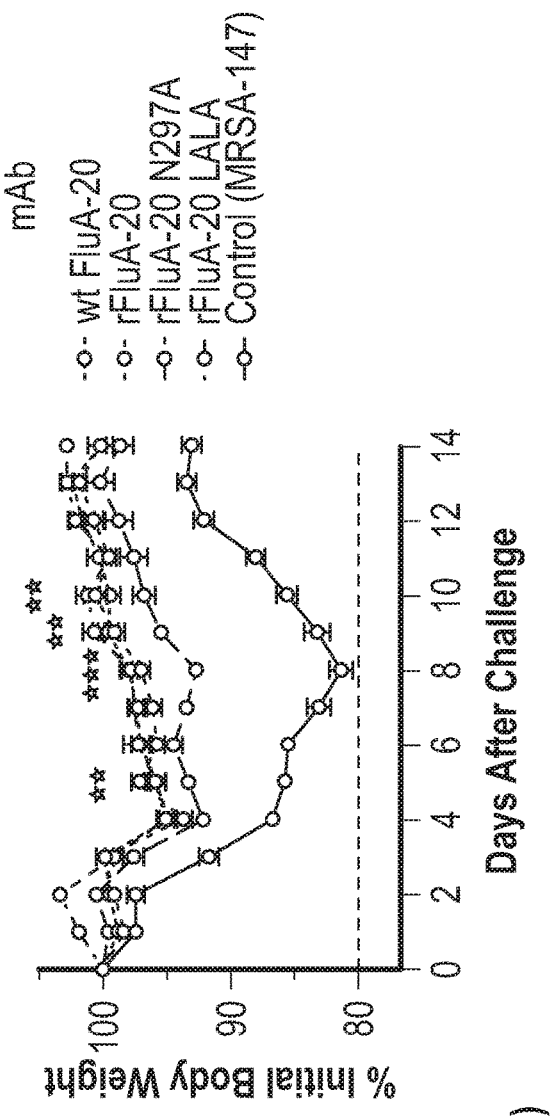
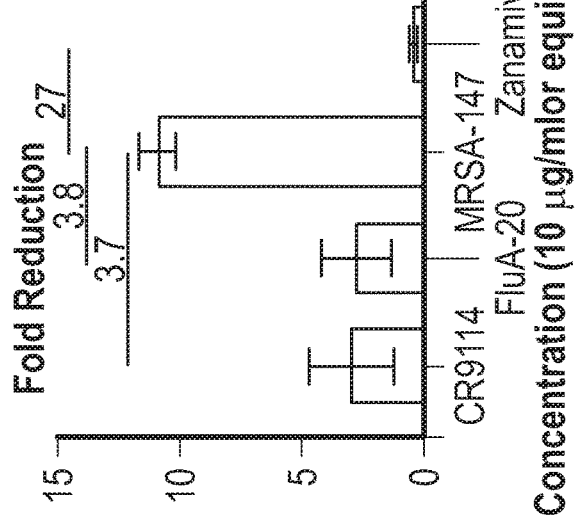
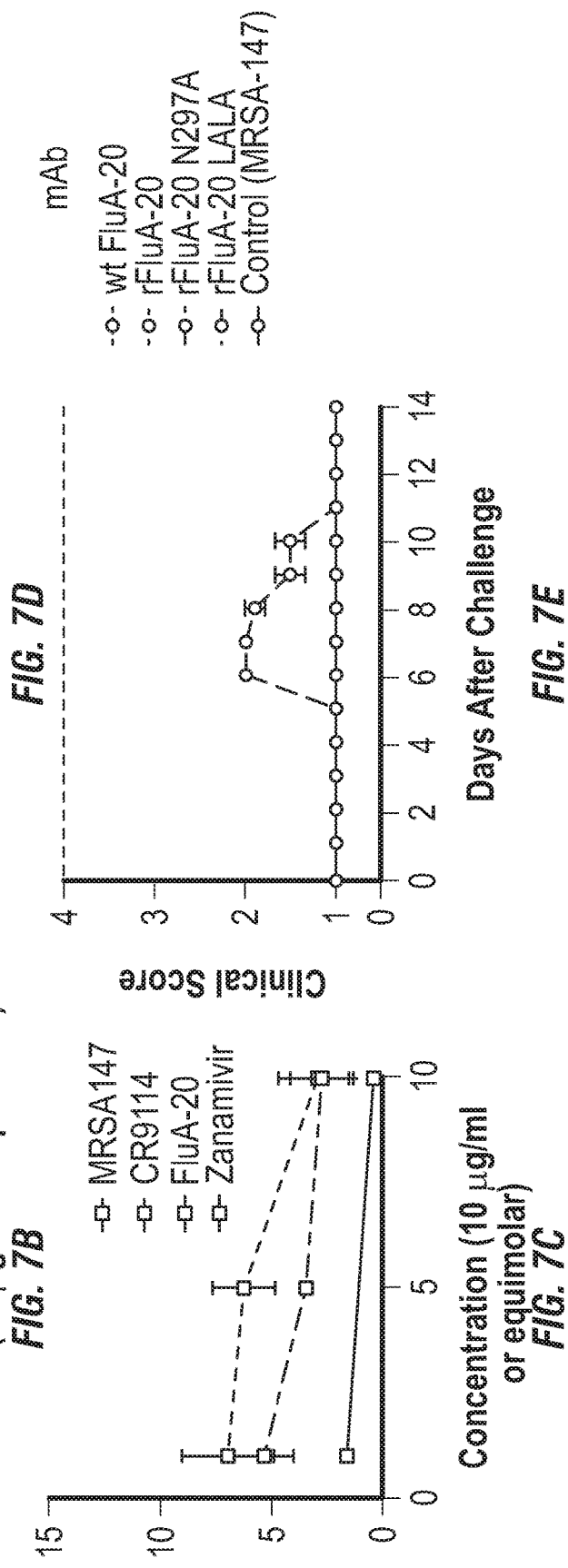
FIG. 7B
FIG. 7C
FIG. 7D
FIG. 7E

Intact HA trimer
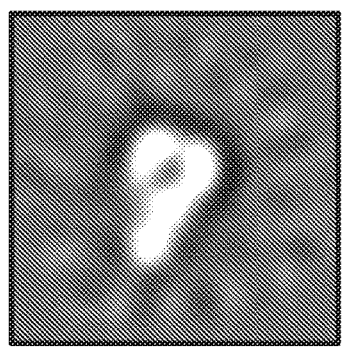
Fab-bound HA monomer
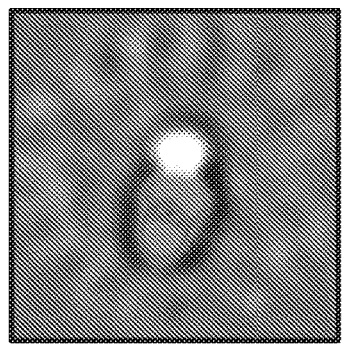 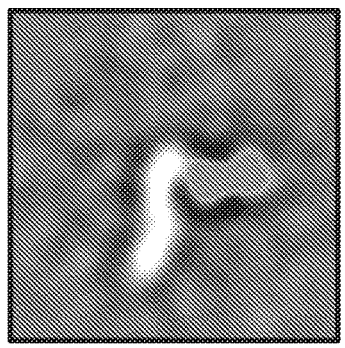 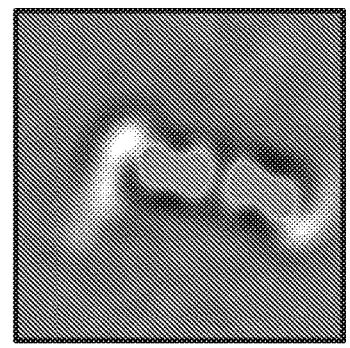
Top View  Side View  Side View
*FIG. 7F*
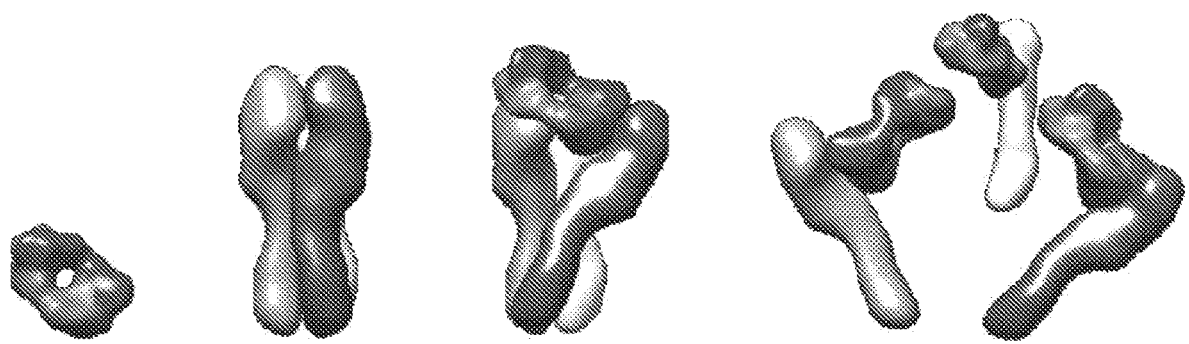
FluA-20 Fab | Intact HA trimer | Open HA trimer | Disrupted HA trimer
*FIG. 7G*

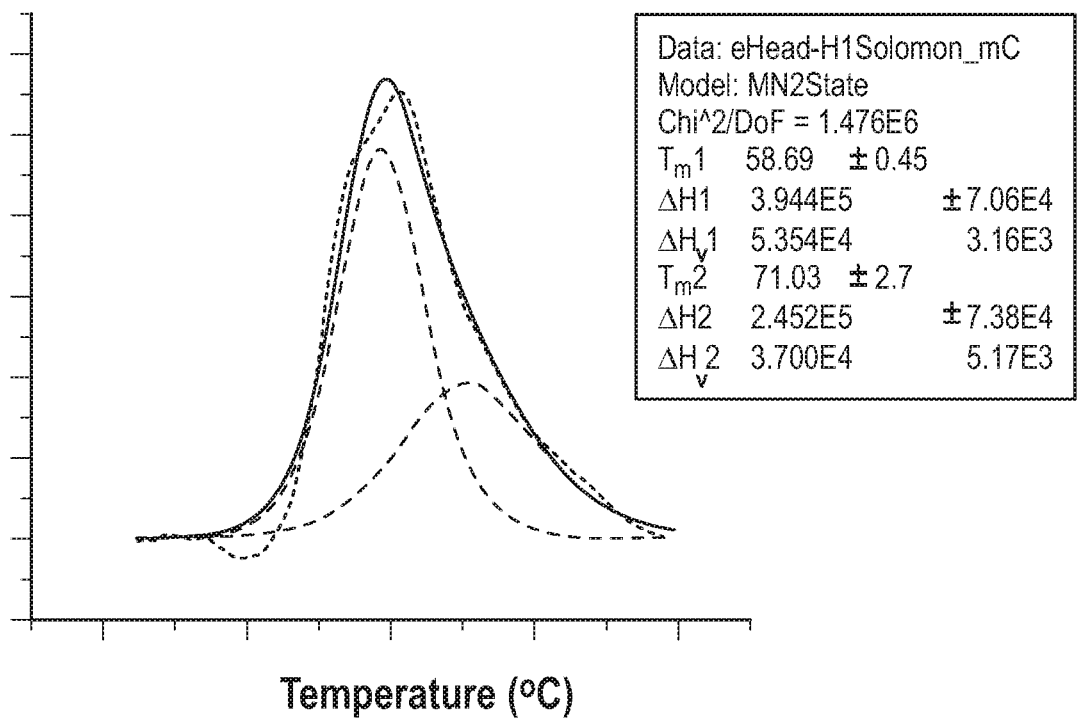
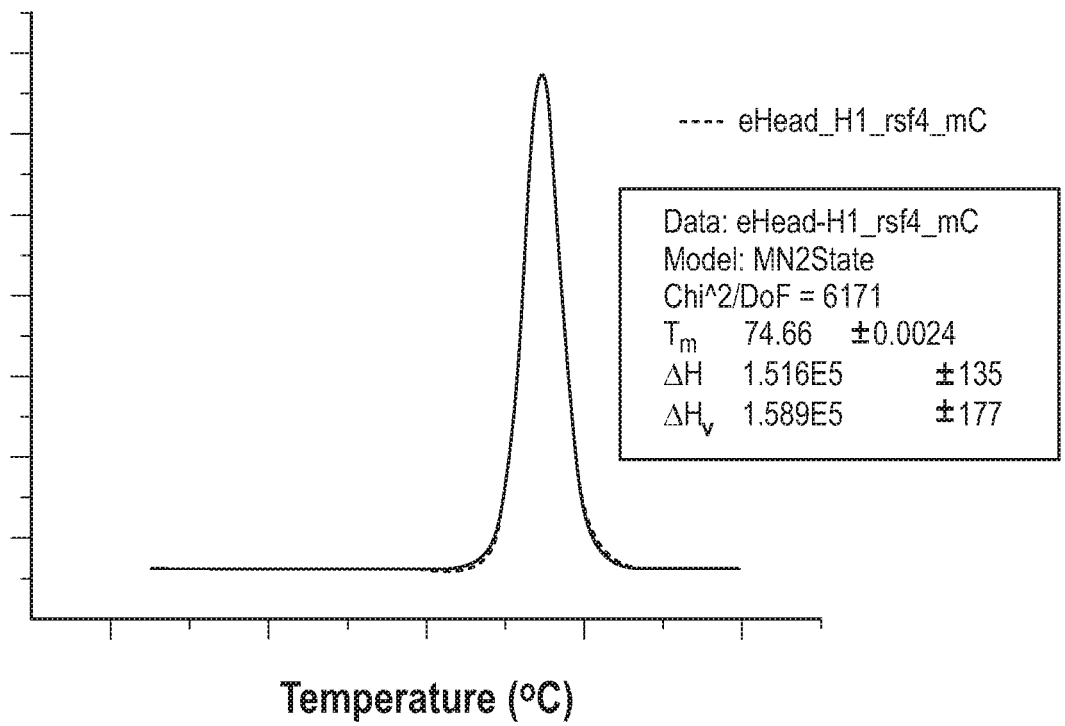
FIG. 9

```
eHead_H1Solomon_mC  APLQLGNCSVAGWILGNPECELLISRESWSYIVEKPNPENGTCYPGHFADYEELREQLSS  60
eHead_H1_v3.0_mC    EPLQLGNCSVAGWILGNPECEHLINSSESWSSIIEKPNPENGTCFPGHFADYENLTENLSS 60
eHead_H1_v3.1_mC    EPLQLGNCSVAGWILGNPECEHLISSESWSSIIEKPNPENGTCFPGHFADYENLTENLSS  60
                     *********************:*:.**::******.************** eHead_H1Solomon_mC  VSSFEREFIFPKESSWPNHTTTGVSASCSHNGESSFYKNLLMLTGKNGLYPNLSKSYANN  120
eHead_H1_v3.0_mC    VSSFEREIFPKNSTWPNHTTNGTSASCSHNGSSSFYKNLLMLTGKNGTYPNLSKNYTNN   120
eHead_H1_v3.1_mC    VSSFEREIFPKNSTWPNHTTNGTSASCSHNGSSSFYKNLLMLTGKNGTYPNLSKNYTNN   120
                    *******:***:*:******.*:********.

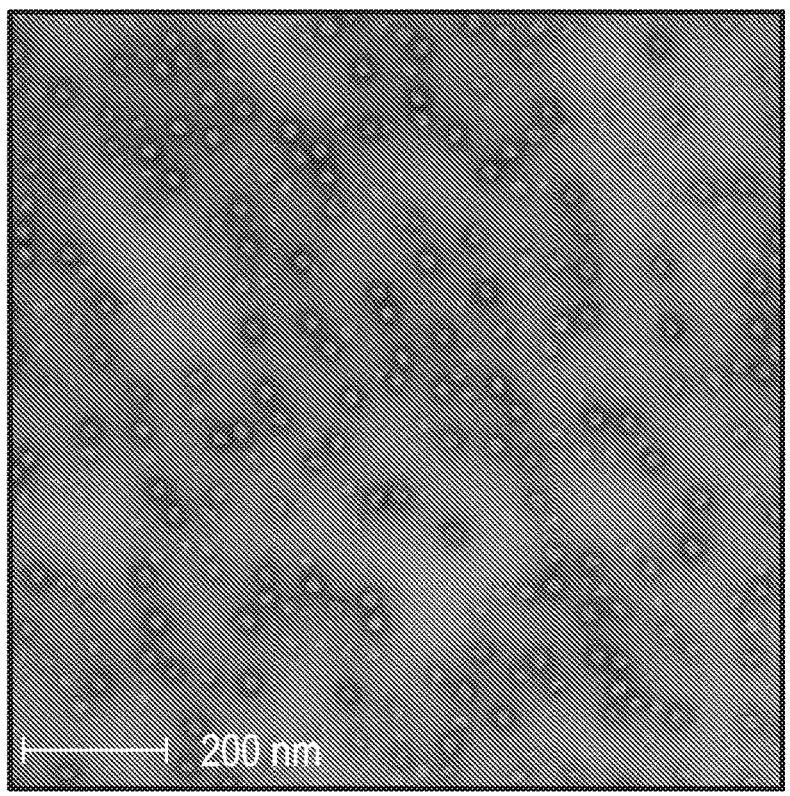
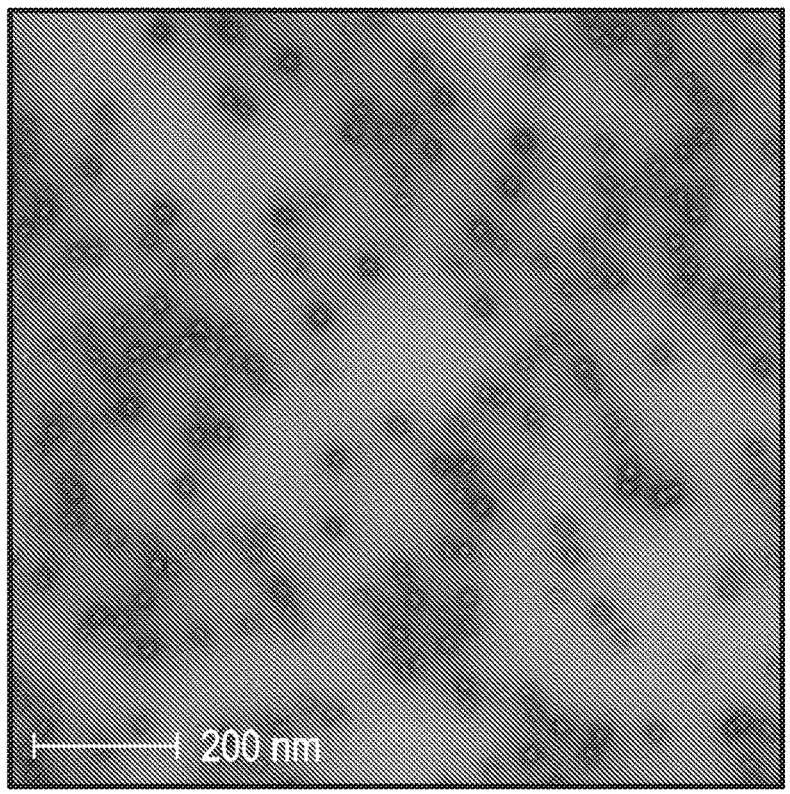
FIG. 14

Half-maximal effective concentration ($EC_{50}$; ng/mL) for binding to indicated recombinant HA

| | Group 1 HAs | | | | | | | | | Group 2 HAs | | | | | | |
|---|---|---|---|---|---|---|---|---|---|---|---|---|---|---|---|---|
| | H1 | | | H2 | H5 | | H6 | H8 | H12 | H3 | | | | H4 | H7 | |
| mAb | A/Puerto Rico/8/1934 | A/Texas/36/1991 | A/California/4/2009 | A/Singapore/1/1957 | A/Vietnam/1203/2004 | A/Indonesia/5/2005 | A/Taiwan/2/2013 | A/Turkey/Ontario/6118/1967 | A/Duck/Alberta/60/1976 | A/Hong Kong/1/1968 | A/Texas/50/2012 | A/Yokohama/110/2019 | A/Tennessee/3/2019 | A/Duck/Czechoslovakia/1956 | A/Hong Kong/125/2017 | A/New York/107/2003 |
| H5.28 | 10 | 22 | 26 | 14 | 182 | > | > | > | 269 | > | > | > | > | 21 | > | > |
| H5.31 | 4 | 6 | 5 | 4 | 6 | > | > | 4 | 2 | 9 | 936 | > | > | 6 | > | > |

>; indicates $EC_{50}$ greater than 2,500 ng/mL

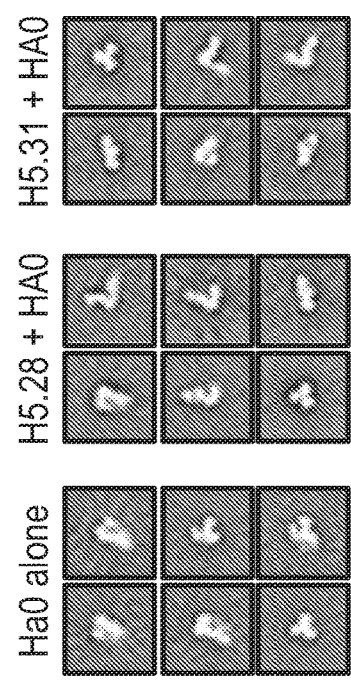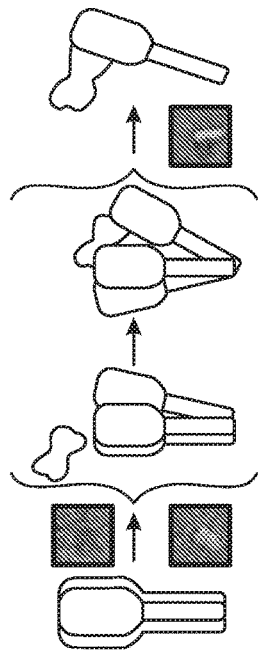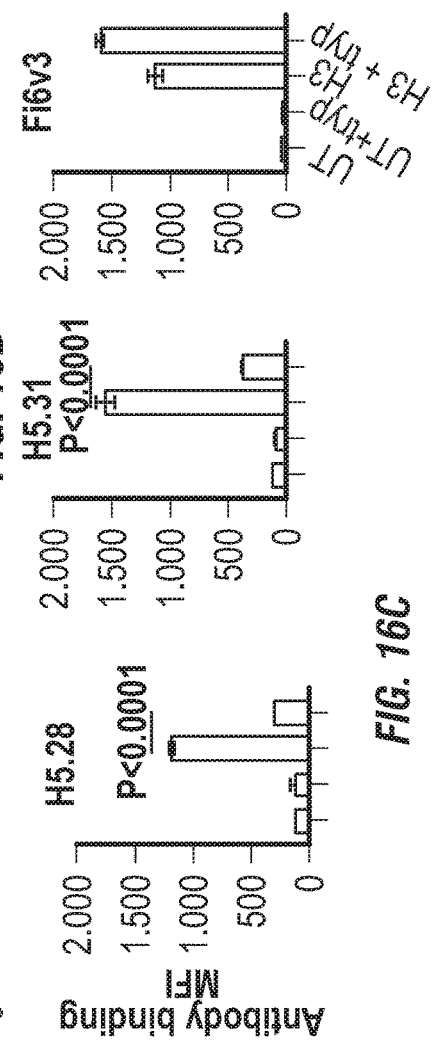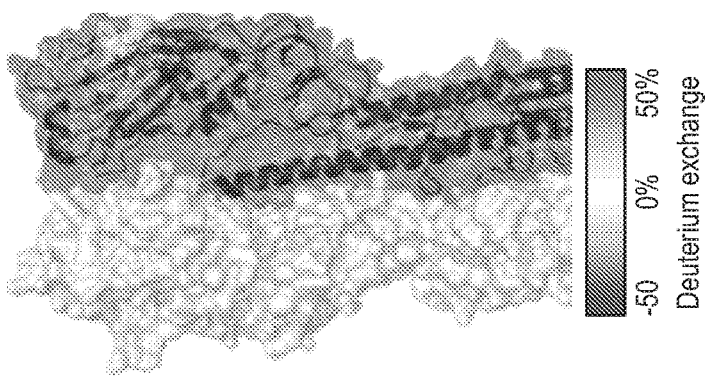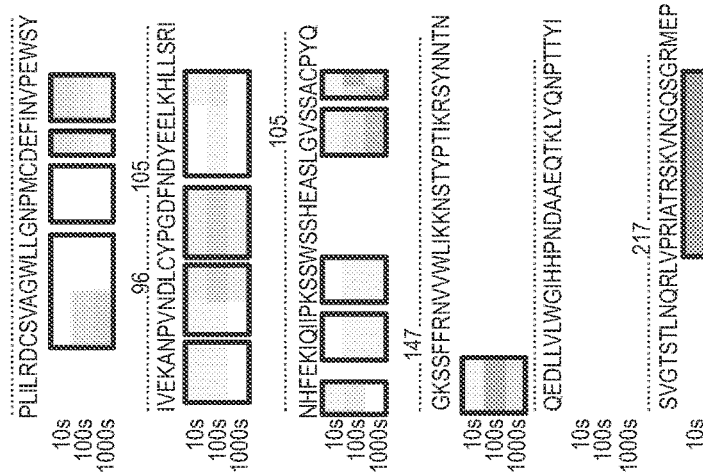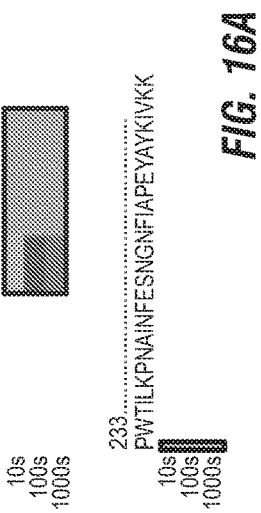
FIG. 16A
FIG. 16B
FIG. 16C

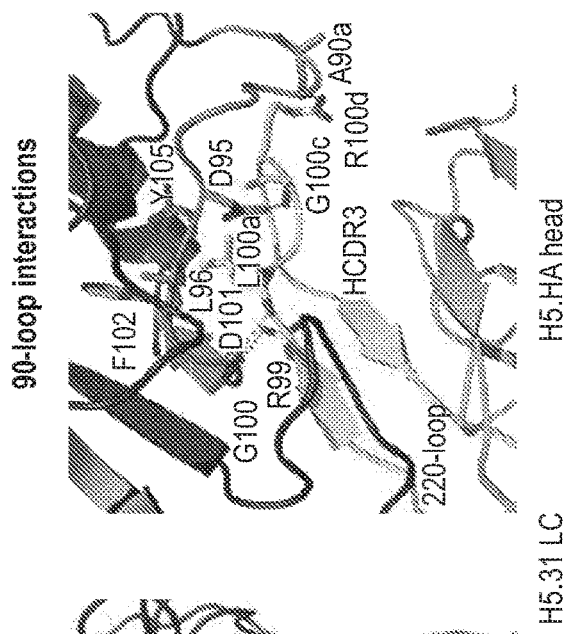
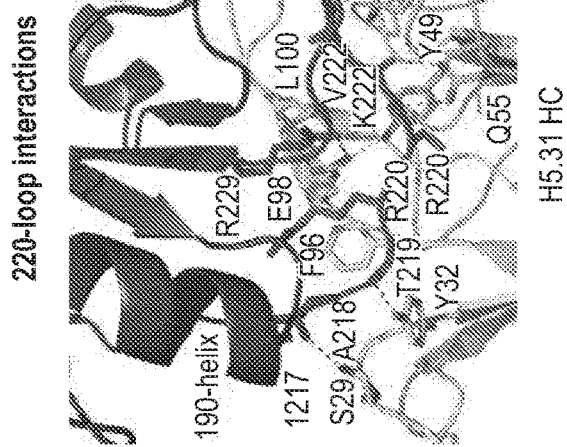
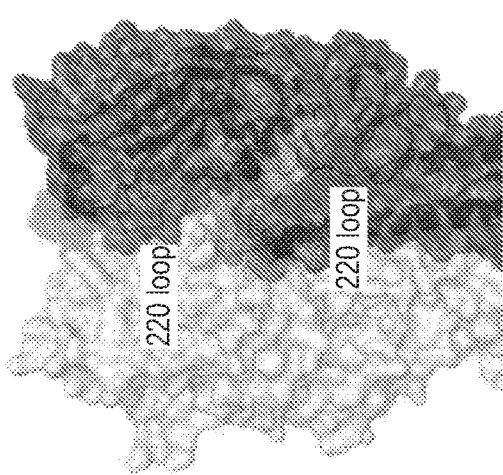
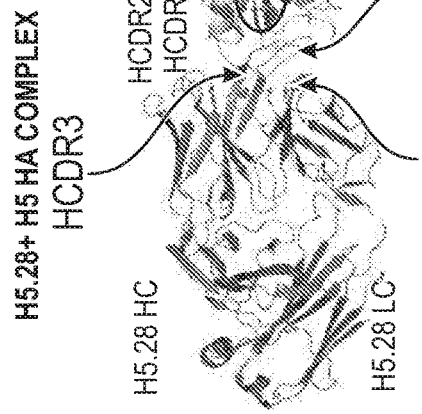
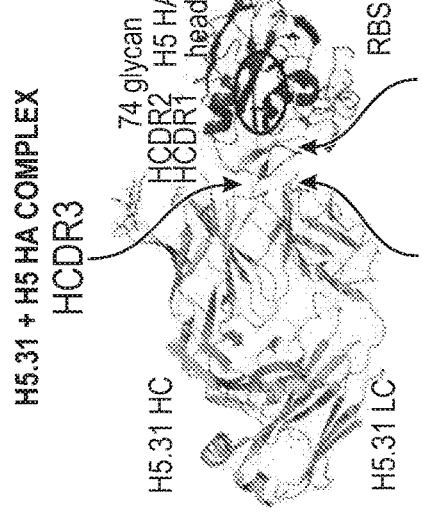
FIG. 16D, FIG. 16E, FIG. 16F, FIG. 16G, FIG. 16H, FIG. 16I Half-maximal effective concentration (EC$_{50}$; ng/mL)

| | Recombinant HA | New mAb Lineage FluA-151 | | | Controls | |
|---|---|---|---|---|---|---|
| | | FluA-151 UCA | FluA-151_Sb1 | FluA-151 | TI FluA-20 | Stem MEDI-8852 |
| Group 1 HAs | | | | | | |
| H1 | A/Puerto Rico/8/1934 | 74 | 11 | 4 | 5 | 13 |
| H1 | A/Texas/38/1991 | 1984 | 172 | 14 | 21 | 63 |
| H1 | A/California/4/2009 | 640 | 72 | 11 | 9 | 13 |
| H2 | A/Singapore/1/1957 | 154 | 13 | 5 | 7 | 23 |
| H5 | A/Vietnam/1203,2004 | > | > | 239 | 36 | 9 |
| H5 | A/Indonesia/5/2005 | > | > | 23 | 15 | 134 |
| H6 | A/Taiwan/2/2013 | > | > | 55 | 73 | 157 |
| H8 | A/Turkey/Ontario/6118/1967 | 151 | 13 | 6 | 4 | 81 |
| H12 | A/Duck/Alberta/60/1976 | 116 | 16 | 7 | 6 | 361 |
| Group 2 HAs | | | | | | |
| H3 | A/Hong Kong/1/1968 | 468 | 12 | 8 | 8 | 14 |
| H3 | A/Texas/50/2012 | 1164 | 17 | 8 | 8 | 24 |
| H3 | A/Yokohama/110/2019 | > | 18 | 8 | 9 | 43 |
| H3 | A/Tennessee/3/2019 | 1191 | 11 | 6 | 7 | 14 |
| H4 | A/Duck/Czechoslovakia/1958 | 312 | 60 | 7 | 6 | 18 |
| H7 | A/Hong Kong/125/2017 | 560 | 22 | 17 | 9 | 69 |
| H7 | A/New York/125/2017 | > | > | > | > | 117 |

> = EC$_{50}$ Greater Than 2,500 ng/mL

*FIG. 17C*

Antibody Variable Gene Sequences

| Donor | mAb | IGHV | HCDR3 | IGKV | LCDR2 | Reference |
|---|---|---|---|---|---|---|
| 269 | FluA-20 | IGHV4-61 | ARGTEDLGYCSSGSCPNH (SEQ ID NO:44) | IGKV1-39 | YAASNLQ (SEQ ID NO:56) | Bangaru et al., 2019 |
| | FluA-151 | IGHV3-30 | AKFIPDPNYGEFYFHH (SEQ ID NO:47) | IGKV1-39 | YAADNLQ (SEQ ID NO:57) | This Study |
| 42 | H5.28 | IGHV3-7 | ARGFLERLLLGRQGAYYYGMDV (SEQ ID NO:48) | IGKV1-39 | YAASNLQ (SEQ ID NO:58) | This Study |
| | H5.31 | IGHV3-7 | ARGFLERLLLGRQGAYYYGMDV (SEQ ID NO:48) | IGKV1-39 | YAASNLQ (SEQ ID NO:58) | |
| S5 | S5V2-29 | IGHV4-61 | ARGGVENLMLVAVIQEMWYFDL (SEQ ID NO:49) | IGKV1-39 | YAASNLQ (SEQ ID NO:58) | Watanabe et al., 2019 |
| | S5V2-52 | IGHV4-61 | ARGGIEDLFLGTSNQRIWYFDV (SEQ ID NO:50) | IGKV1-39 | YAASNLQ (SEQ ID NO:58) | |
| S1 | S1V2-37 | IGHV4-59 | ARGVLEQLAPDFDSSYYYGMNV (SEQ ID NO:51) | IGKV1-39 | YAASNLQ (SEQ ID NO:59) | |
| | S1V2-58 | IGHV4-59 | ARGVLEQFAPDFDSYYYAMGV (SEQ ID NO:52) | IGKV1-39 | YAASNLQ (SEQ ID NO:59) | |
| D1 | D1H1-3/H3-3 | IGHV4-61 | ARDFFEKLTGEDLNAFDV (SEQ ID NO:53) | IGKV1-39 | YAASNLQ (SEQ ID NO:60) | Lee et al., 2016 |
| | D1H1-17/H3-14 | IGHV4-61 | ARDFFEKLIADDLNAFDI (SEQ ID NO:54) | IGKV1-39 | YAASNLQ (SEQ ID NO:58) | |
| D2 | D2H1-1/H3-1 | IGHV3-7 | ARDFVELLGGRSKPYDALDV (SEQ ID NO:55) | IGKV1-39 | YAASNLQ (SEQ ID NO:58) | |

*FIG. 18D*

FluA-20_H Aligned With UCA_Ht 16 Mutations

FluA-20=QVQLQESGPGLVKPSETLSLTCSVGSVTSDIYYWTWIRQPPGKGLEWIGYIFYNGDTNYN
UCA=QVQLQESGPGLVKPSETLSLTCTVSGGSVSSGSYYWSWIRQPPGKGLEWIGYIYYSGSTNYN

FluA-20=PSLKSRVTMSIDTSKNEFSLRLTSVTAADTAVYFCARGTEDLGYCSSGSCPNHWGQGTLVTV (SEQ ID NO: 61)
UCA=PSLKSRVTISVDTSKNQFSLKLSSVTAADTAVYYCARGTEDLGYCSGGSCPNHWGQGTLVTV (SEQ ID NO: 62)

FluA-20_H Aligned With UCA_L: 11 Mutations

FluA-20=DIQMTQSPSSLSASIGDRVTITCRPSQNIRSFLNWFQHKPGKAPKLLYYAASNLQSGVPS
UCA-20=DIQMTQSPSSLSASVGDRVTITCRASQSISSYLNWYQQPGKAPKLYYAASSLQSGVPS

FluA-20=RFSGSGSGTEFTLTIRSLQPEDFATYYCQQSYNTPPTFGQGTKVEIK (SEQ ID NO: 38)
UCA=RFSGSGSGTDFTLTISSLQPEDFATYYCQQSYSTPPTFGQGTKVEIK (SEQ ID NO: 63)

——— CDR1 ——— CDR2 ——— CDR3

Second Antibody

| | FluA-20 | 5J8 | CR9114 | FI6v3 | 39-29 | H3v-86 | |
|---|---|---|---|---|---|---|---|
| FluA-20 | 0 | 100 | 83 | 100 | 100 | 96 | Novel Site |
| 5J8 | 100 | 0 | 85 | 100 | 100 | 94 | Head |
| CR9114 | 100 | 100 | 0 | 0 | 0 | 1 | |
| FI6v3 | 100 | 100 | 2 | 0 | 0 | 3 | Stem |
| 39-29 | 100 | 98 | 6 | 4 | 0 | 5 | |
| H3v-86 | 87 | 86 | 0 | 3 | 0 | 0 | |

First Antibody

▨ Compete for Binding    ☐ Not Compete for Binding

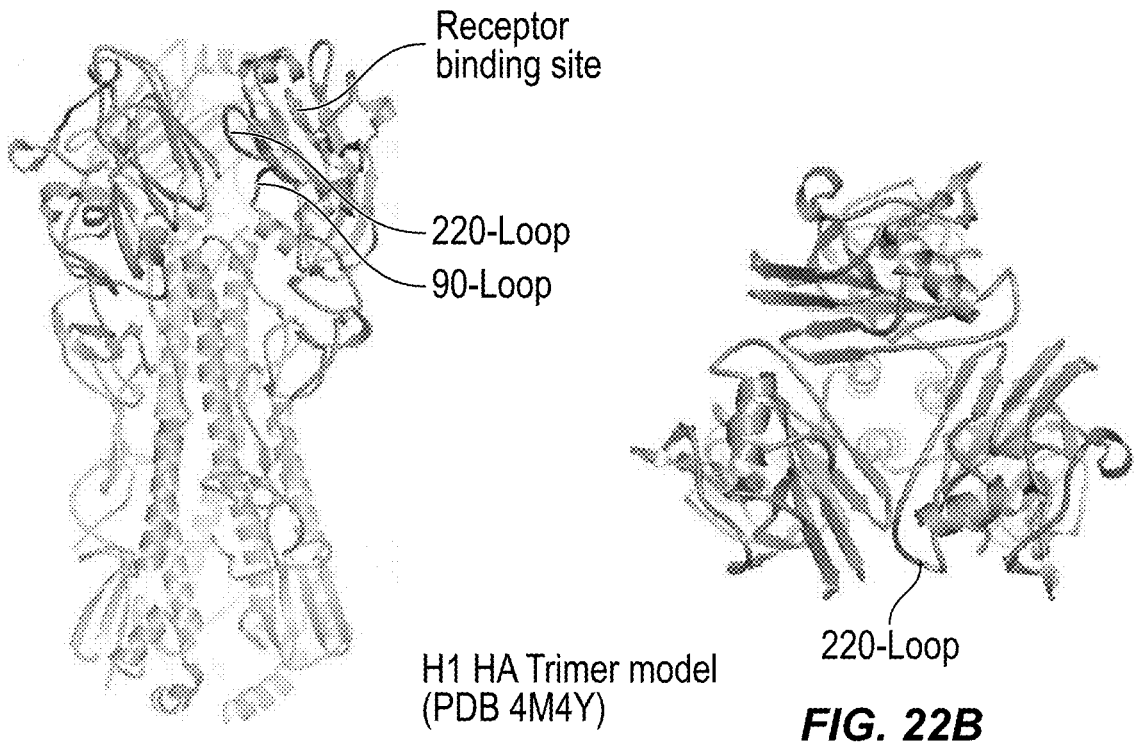
FIG. 22A
FIG. 22B
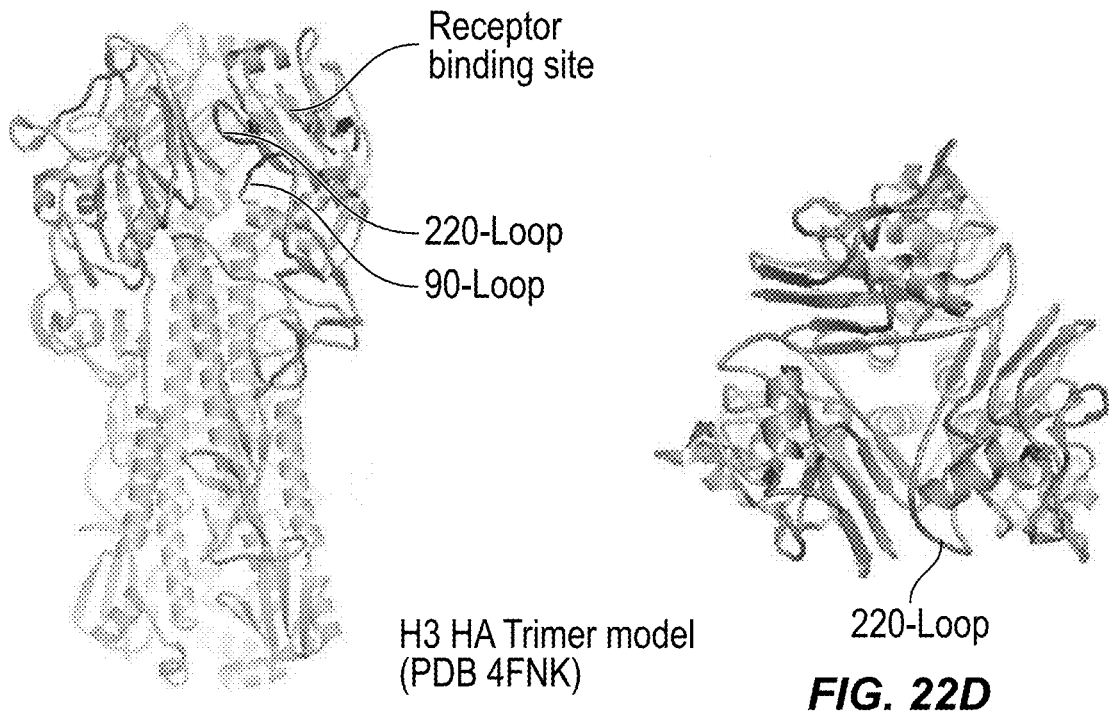
FIG. 22C
FIG. 22D

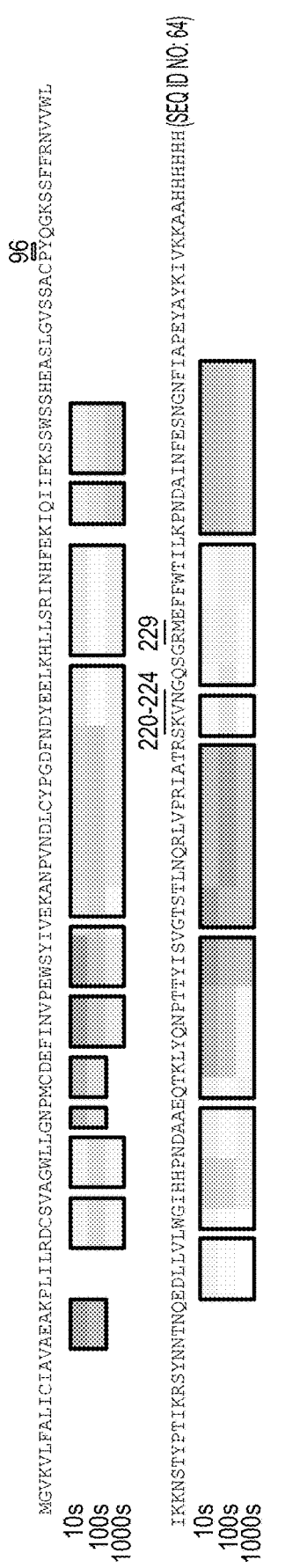
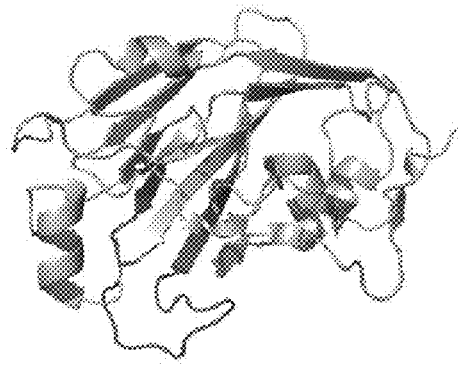
FIG. 23A
FIG. 23B

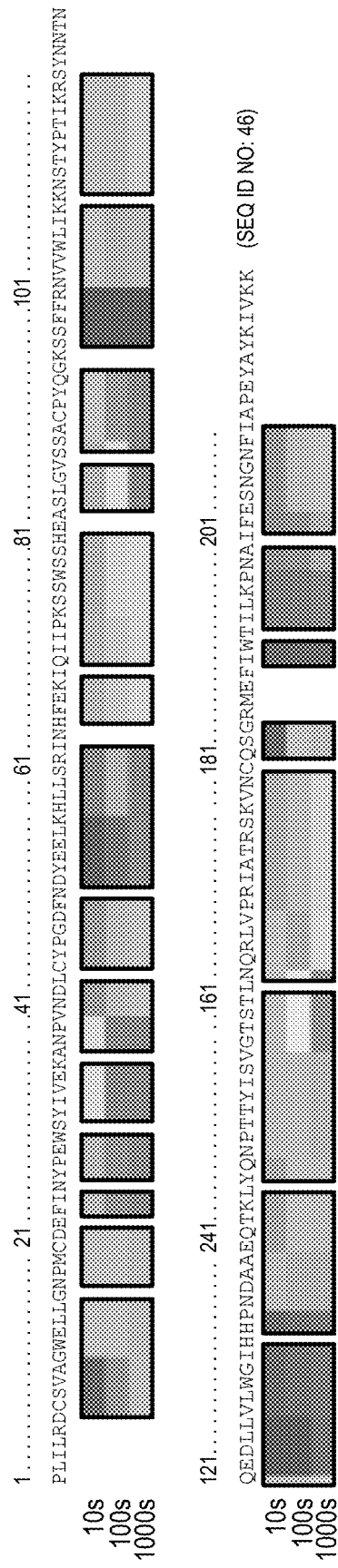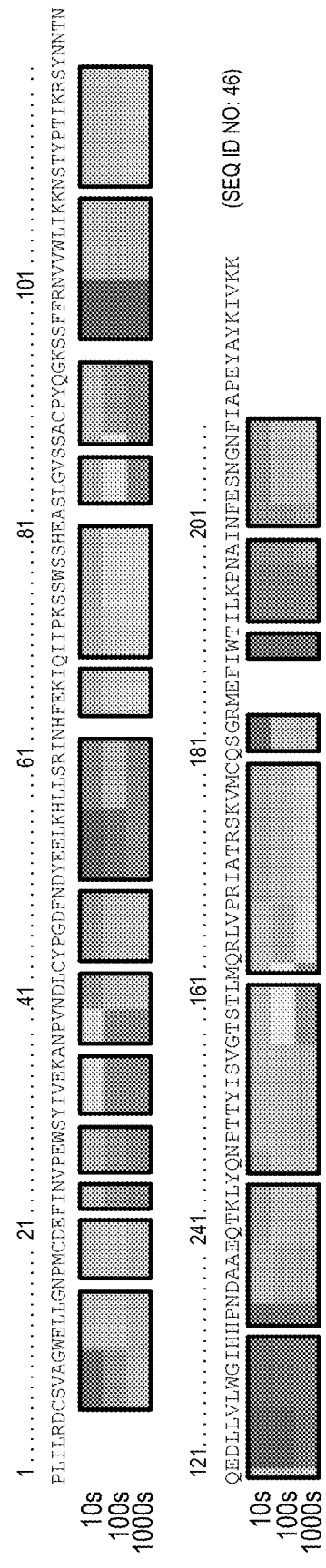
FIG. 28B

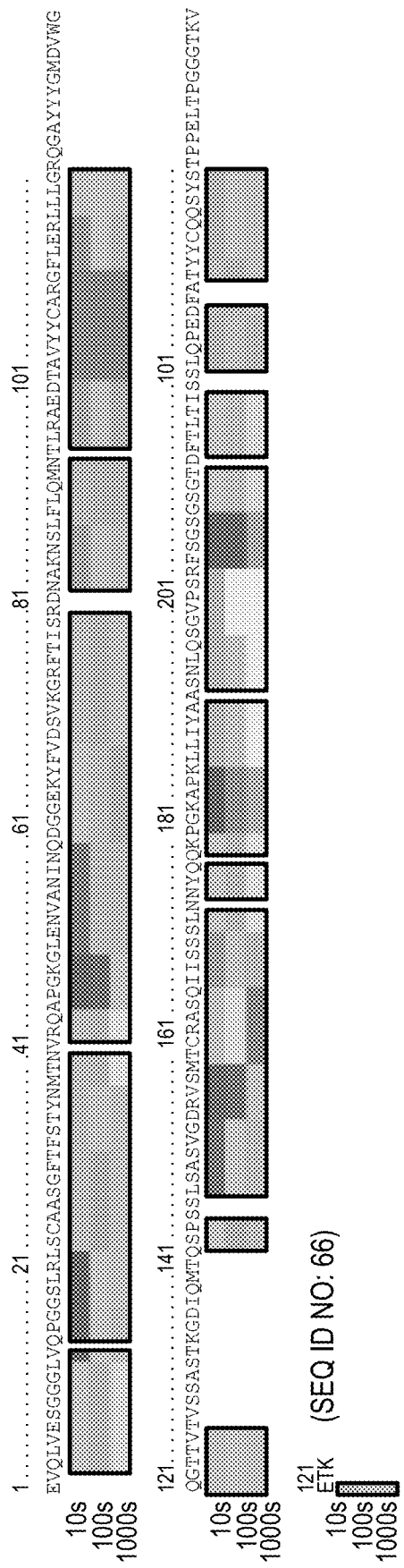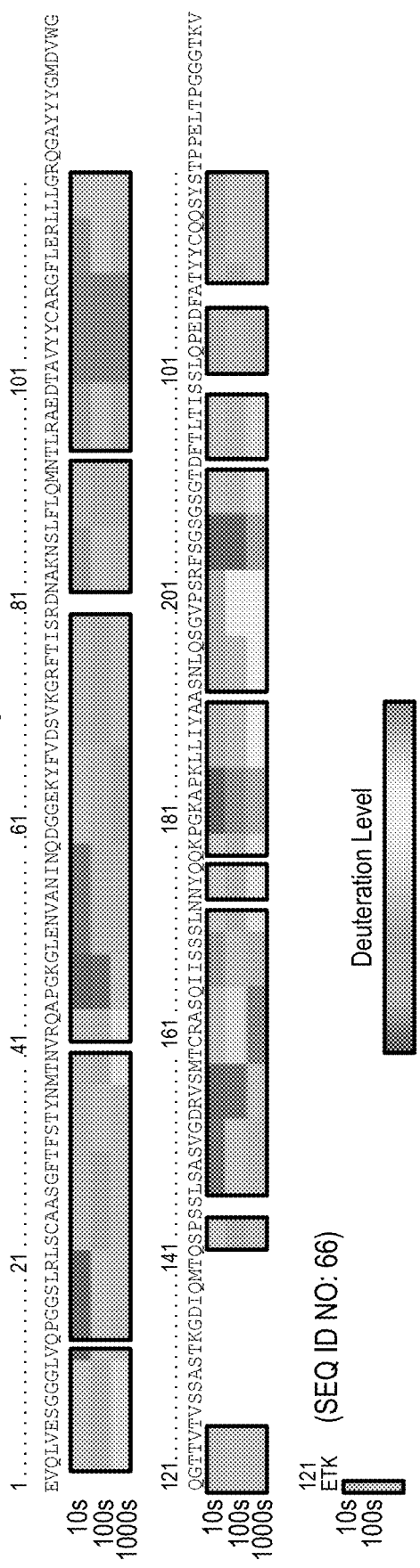
FIG. 28C

PEPTIDE VACCINE BASED ON A NEW UNIVERSAL INFLUENZA A HEMAGGLUTININ HEAD DOMAIN EPITOPE AND HUMAN MONOCLONAL ANTIBODIES BINDING THERETO

PRIORITY CLAIM

This application is a national phase application under 35 U.S.C. § 371 of International Application No. PCT/US2020/033316, filed May 16, 2020, which claims benefit of priority to U.S. Provisional Application Ser. No. 62/849,061, filed May 16, 2019, the entire contents of each of which are hereby incorporated by reference.

This invention was made with government support under grant number 5U19AI117905 and contract HHSN272201400024C awarded by the National Institutes of Health. The government has certain rights in the invention.

BACKGROUND

1. Field of the Disclosure

The present disclosure relates generally to the fields of medicine, infectious disease, and immunology. More particular, the disclosure relates to immunogens derived from a previously unrecognized epitope in the head domain of influenza A hemagglutinin, and methods of use therefor.

2. Background

The hypervariable influenza A virus (IAV) has been a primary cause of respiratory illnesses in the human population for centuries. Currently, IAV strains from subtypes H1N1 and H3N2, as well as influenza B viruses, are in human circulation and cause seasonal epidemics. Additionally, other zoonotic IAVs with H1, H3, H5, H6, H7, H9 and H10 HAs have caused sporadic outbreaks of human infections, some with exceedingly high morbidity and mortality rates (Freidl et al., 2014; Neumann and Kawaoka, 2015). Seasonal influenza vaccines are available, but due to the immense variability and continuous mutations in influenza viruses, current vaccines provide protection only against close isolates of the vaccine strains and, therefore, needs to be updated annually, according to predictions of which viruses will be next in circulation (Carrat and Flahault, 2007). Poor matches of the predicted vaccine strains with drifted seasonal viruses can lead to severe influenza seasons (Bridges et al., 2000; Carrat and Flahault, 2007; Nordin et al., 2001). More unpredictably, new influenza viruses emerging from genomic reassortment with drastically altered antigenicity can cause global pandemics. For instance, during the 2009 global pandemic influenza season, a new H1N1 lineage, from reassortment of a variety of avian, pig and human viruses, infected 10-21% of the world population and caused over half a million deaths (Dawood et al., 2012; Shrestha et al., 2011). Hence, investigation of how the immune response can counteract the ever-changing nature of influenza is of great importance for the development of new vaccines and therapeutics.

The hemagglutinin of influenza is one of the two main glycoproteins on the viral surface and a major target of neutralizing antibodies. Based on structure and antigenicity, there are eighteen defined subtypes (H1-H18) of IAV HAs belonging to two broad groups (Nobusawa et al., 1991; Russell et al., 2004; Tong et al., 2013). Influenza HA consists of an antigenically variable globular head domain containing the receptor-binding site (RBS) for viral attachment and a more conserved stem domain that mediates fusion of viral and cell membranes in the endosome (Carr and Kim, 1993; Weis et al., 1988; Wilson et al., 1981). The HA head domain is the immunodominant domain of the protein and is the target of most antibody responses induced by IAV vaccine or infection (Altman et al., 2015; Angeletti et al., 2017; Caton et al., 1982; Das et al., 2013; Gerhard et al., 1981). However, due to the high level of sequence and antigenic diversity occurring in the HA head domain and the incorporation of large number of glycans in this region to evade immune recognition, most head domain specific antibodies exhibit a very narrow breadth of protection.

Nonetheless, two classes of broadly neutralizing antibodies (bnAbs) against influenza HA have been discovered previously (Julien et al., 2012; Laursen and Wilson, 2013). The stem-targeted bnAbs, such as the murine monoclonal antibody (mAb) C179, human mAbs CR6261, F10 and A6, are the first class of antibodies found to have broad and heterosubtypic activities, some of which can target nearly all strains of HA across various subtypes and subgroups, e.g., CR9114, MEDI8852 (Corti et al., 2010; Corti et al., 2011; Dreyfus et al., 2013; Dreyfus et al., 2012; Ekiert et al., 2009; Ekiert et al., 2011; Friesen et al., 2014; Joyce et al., 2016; Kallewaard et al., 2016; Kashyap et al., 2008; Kashyap et al., 2010; Lang et al., 2017; Okuno et al., 1993; Smirnov et al., 1999). These bnAbs recognize the highly conserved stem region and block the viral fusion machinery. As a class, anti-stem antibodies tend to be less potent in virus neutralization assays in comparison to RBS-specific antibodies, but stem antibodies often also possess the ability to interact with FcγR on effector cells to mediate antibody-dependent cellular cytotoxicity (ADCC) and protection in vivo (Corti et al., 2011; DiLillo et al., 2016; DiLillo et al., 2014; He et al., 2015). These findings have led to the development of several stem-based immunogens for the purposes of "universal" influenza vaccination (Impagliazzo et al., 2015; Nachbagauer et al., 2016; Valkenburg et al., 2016; Yassine et al., 2015). However, inducing broad-spectrum stem antibodies through vaccination may be challenging due to reduced accessibility of this region on the viral surface and/or reduced immunogenicity.

A second class of bnAbs targeting the HA head domain also has been discovered (Ekiert et al., 2012; Hong et al., 2013; Joyce et al., 2016; Lee et al., 2014; Lee et al., 2012; Thornburg et al., 2016; Whittle et al., 2011; Xu et al., 2013; Yoshida et al., 2009; Zhu et al., 2013). Most of these head-targeted bnAbs recognize the relatively conserved RBS and block viral attachment and entry. Unlike stem-targeted bnAbs, which generally have heterosubtypic activities, the head-targeted bnAbs tend to have more restricted patterns of recognition within a subtype; for example, the H1-specific CH65, 5J8, and H2-specific 8M2 antibodies (Laursen and Wilson, 2013; Lee et al., 2014; Schmidt et al., 2015; Thornburg et al., 2016; Whittle et al., 2011; Xu et al., 2013). A few exceptions are C05, F045-92 and S139/1 that can react with the HA head domain from more than one HA subtype (Ekiert et al., 2012; Lee et al., 2014; Lee et al., 2012; Yoshida et al., 2009). However, their heterosubtypic activities are not extensive and they heavily rely on the avidity of bivalent IgG molecules to attain potent binding (~nM $K_D$).

SUMMARY

Treatment of influenza A virus (IAV) and the development of vaccines that broadly protect against highly diverse influenza virus serotypes are of clinical interest, but a significant challenge for vaccine development is defining conserved epitopes that are capable of eliciting cross-reactive protective antibodies in these diverse viruses. Induction of a broad-spectrum immune response to IAV using a rationally designed vaccine comprising identified critical epitopes is provided.

Thus, there is provided a method of inducing an immune response in a subject infected with influenza A virus or at risk of contracting influenza A virus, comprising delivering to said subject one or more immunogen(s), or one or more RNA(s) or expression vector(s) encoding said immunogen (s), wherein said immunogen comprises monomeric or multimerized influenza A hemagglutinin 220-loop domain(s) comprising residues Arg220, Pro221, Val223, Arg224 and Arg229, and monomeric or multimerized influenza A hemagglutinin 90-loop domain(s) comprising residue Pro96. The method may further comprise administering an adjuvant, such as a water-in-oil or water-in-oil-in-water formulation or a cytokine or other immune modulator to said subject.

The immunogen(s) may be fused to a non-influenza amino acid sequence, and/or may be formulated in a pharmaceutically acceptable buffer, diluent or excipient, or is lyophilized. The subject may be a human subject, such as a child from 6 mos age to 12 years of age, or an adult over the age of 60. The immune response may be a protective immune response or a therapeutic immune response. The immunogen(s) may comprise 2, 3, 4, 5, 6, 7, 8, 9, 10 or more different peptides selected from SEQ ID NOS: 1-32. The method may further comprise delivering said immunogen(s), RNA(s) or expression vector(s) to said subject at least a second time, and/or may further comprise measuring an immune response in said subject after delivery.

The immunogen(s) may be selected from SEQ ID NOS: 1-32, may have 95% identity to one or more of SEQ ID NOS: 1-32, may be a multimer of more than one of SEQ ID NOS: 1-32, or may be a multimer of multiple sequences each having 95% identity to SEQ ID NOS: 1-32. The immunogen(s) may be delivered in a lipid and/or nanoparticulate formulation. The immunogen(s) or RNA(s)/expression vector(s) coding for the same may exhibit (i) minimized size and stabilization as compared to native HA head domains; and/or (ii) glycan masking to dampen responses outside the epitope and to ensure minimal cross-reactivity to wild-type HA.

Also provided is a vaccine formulation comprising one or more peptide(s), or one ore more RNA(s) or expression vector(s) encoding said peptide(s), wherein said immunogen comprises monomeric or multimerized influenza A hemagglutinin 220-loop domain(s) comprising residues Arg220, Pro221, Val223, Arg224 and Arg229, and monomeric or multimerized influenza A hemagglutinin 90-loop domain(s) comprising residue Pro96. The method may further comprise administering an adjuvant, such as a water-in-oil or water-in-oil-in-water formulation or a cytokine or other immune modulator to said subject.

The immunogen(s) may be fused to a non-influenza amino acid sequence, and/or may be formulated in a pharmaceutically acceptable buffer, diluent or excipient, or is lyophilized. The immunogen(s) may comprise 2, 3, 4, 5, 6, 7, 8, 9, 10 or more different peptides selected from SEQ ID NOS: 1-32. The method may further comprise delivering said immunogen(s), RNA(s) or expression vector(s) to said subject at least a second time, and/or may further comprise measuring an immune response in said subject after delivery.

The immunogen(s) may be selected from SEQ ID NOS: 1-32, may have 95% identity to one or more of SEQ ID NOS: 1-32, may be a multimer of more than one of SEQ ID NOS: 1-32, or may be a multimer of multiple sequences each having 95% identity to SEQ ID NOS: 1-32. The immunogen(s) may be delivered in a lipid and/or nanoparticulate formulation. The immunogen(s) or RNA(s)/expression vector(s) coding for the same may exhibit (i) minimized size and stabilization as compared to native HA head domains; and/or (ii) glycan masking to dampen responses outside the epitope and to ensure minimal cross-reactivity to wild-type HA.

The use of the word "a" or "an" when used in conjunction with the term "comprising" in the claims and/or the specification may mean "one," but it is also consistent with the meaning of "one or more," "at least one," and "one or more than one." The word "about" means plus or minus 5% of the stated number.

It is contemplated that any method or composition described herein can be implemented with respect to any other method or composition described herein. Other objects, features and advantages of the present disclosure will become apparent from the following detailed description. It should be understood, however, that the detailed description and the specific examples, while indicating specific embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The following drawings form part of the present specification and are included to further demonstrate certain aspects of the present disclosure. The disclosure may be better understood by reference to one or more of these drawings in combination with the detailed description of specific embodiments presented herein.

FIGS. 1A-C. Network analysis of sequences clonally related to FluA-20 and FluA-20 reactivity to diverse HAs. (FIG. 1A) Timeline showing the vaccination history of FluA-20 donor and the time points from which FluA-20 (triangle) and its clonally related siblings (circles) were identified. (FIG. 1B) Nodes represent unique sequences observed in the inventors' database, with the size of the node correlating to the count of replicate sequences observed. The color of each node denotes the time point at which it was found; white for day 5, yellow for day 6, orange for day 11 and pink for day 14. The black node represents the $V_H4$-61/$J_H4$ germline sequence and the gray node represents an inferred common ancestor. The maroon, triangle-shaped node represents FluA-20. Edges drawn between nodes show that those sequences are more closely related to each other than to any other sequence. Edge distances are arbitrary and used only to visually clarify the graph. The somatic variants of FluA-20 that were expressed and tested are indicted. (FIG. 1C) ELISA binding $EC_{50}$ (ng/mL) values for FluA-20, recombinant FluA-20 (rFluA-20) and unmutated common ancestor of FluA-20 (FluA-20-UCA) to HAs derived from different strains representing group 1 (green) and group 2 (blue) IAVs. The table is displayed in purple-white color scale corresponding to strong-weak binding, respectively. The > symbol indicates that binding was not observed at concentrations <10 μg/mL.

FIGS. 7A-G. FluA-20 inhibits cell-cell spread, disrupts the uncleaved HA trimer protein, and does not require Fc-effector function for in vivo protection. (FIGS. 7A-C) demonstrate that FluA-20 diminishes cell-to-cell spread of influenza virus. (FIG. 7A) Representative images of 6-well plate wells with influenza virus A/Hong Kong/1/1968 foci developed on MDCK monolayers after 48 hours of incubation at presence of 10 µg/mL of irrelevant control mAb MRSA-147, FluA-20, CR9114, or equimolar concentration of zanamivir. Foci were immunostained with mouse anti-NP and anti-mouse HRP-conjugated detection antibodies and developed by TrueBlue substrate. Images were captured by CTL (Cellular Technology Ltd.). Images are representative of 3 replicates of 2 independent experiments (FIG. 7B) Quantitative determination of foci area reduction. Foci area calculated by ImageJ software and represented as percentage of total well area. Each value represents mean focus area SD. (FIG. 7C) Concentration-dependent effect of focus area reduction. Each value represents the mean focus area±SD. FIG. 7D and FIG. 7E corresponds to the in vivo protective efficacy of engineered Fc mutant variants of mAb FluA-20. Groups of BALB/c mice were inoculated i.p. with 10 mg/kg of indicated mAb on the day before respiratory challenge by the i.n. route with $1.24 \times 10^4$ focus forming units (FFU) of A/California/04/2009 virus and monitored for 14 days. The control group included mice treated with mAb MRSA-147 specific to an unrelated target. The protective efficacy of mAbs was assessed by weight change kinetics (FIG. 7D), and clinical score (FIG. 7E). The dotted line indicates the IACUC-stipulated endpoint for humane euthanasia. Data are cumulative of two independent experiments and represent the mean value±SEM, using 5-10 mice per group. Multiple group comparisons were performed using two-way ANOVA with Tukey's post-test for panel A. On the graph, the results of comparison between rFluA-20 IgG1-N297A-treated (grey) and rFluA-20 IgG1-treated (blue) groups are shown to demonstrate a significant difference in weight change between these two groups (denoted with * symbol), although the N297A Fc region mutation that abrogates FcR binding had a negligible impact of on overall protection by FluA-20. (FIG. 7F) Selected 2D class averages of H1 HA trimer (A/California/04/2009) after a 20-second incubation with FluA-20 Fab. All of the Fabs complexed HA were in monomeric form, while a few apo HA trimers were observed. All 2D class averages are shown in FIG. S7B. FluA-20 Fab is colored in blue and HA is in white. (FIG. 7G) Cartoon illustration showing that FluA-20 Fab (heavy chain in blue and light chain in green) results in dissociation of native HA trimer (grey), as assessed by negative-stain EM data shown in FIG. 7F and FIG. S7B.

Figure 8:
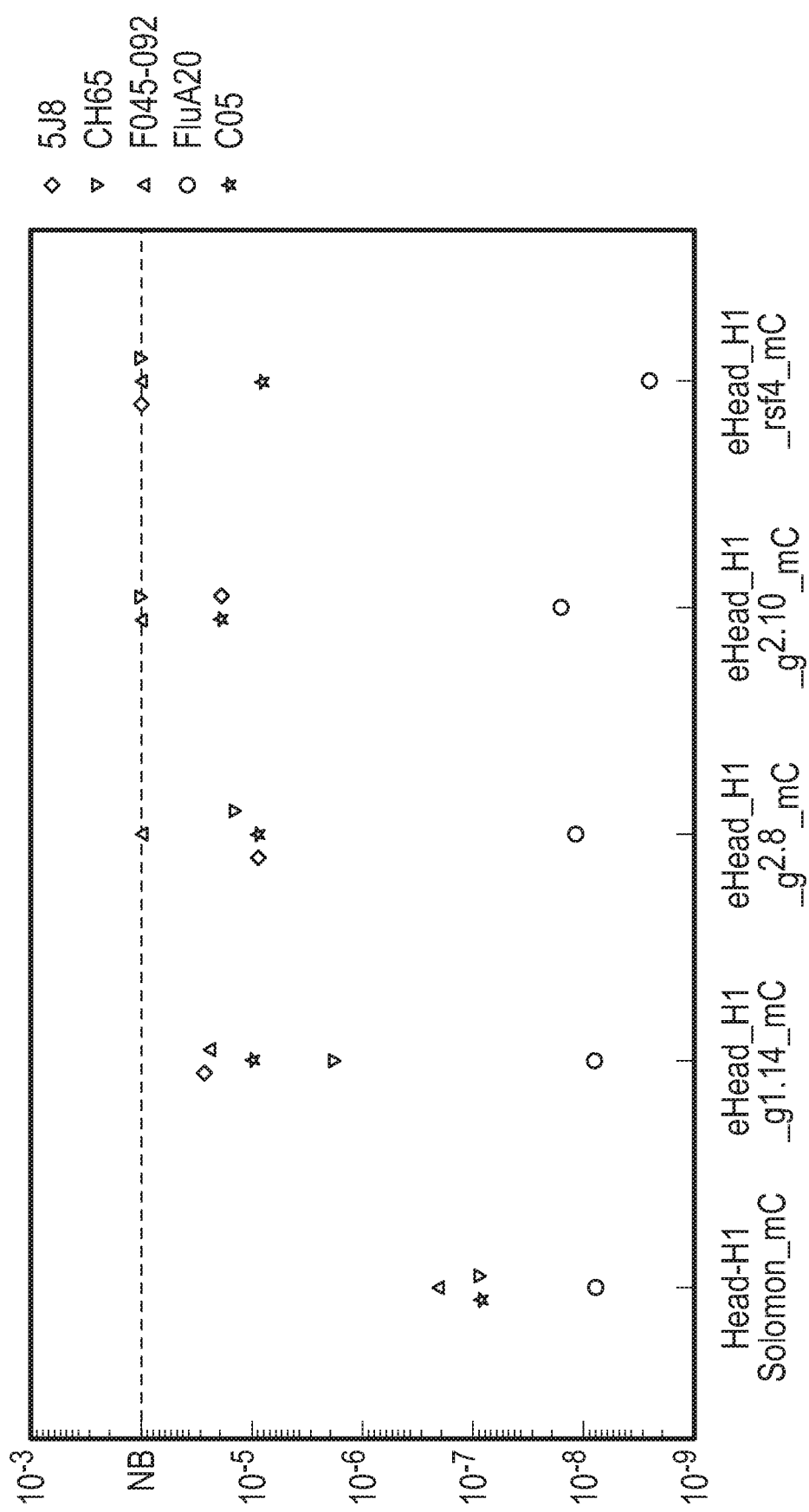

FIG. 8. SPR data for the glycan-masking eHead monomer variants.

FIG. 9. DSC trace for the wt (left) and eHead_H1_rsf4 (right).

FIG. 10. Sequence alignment between eHead_H1_v3 series and the wt.

Figure 11:
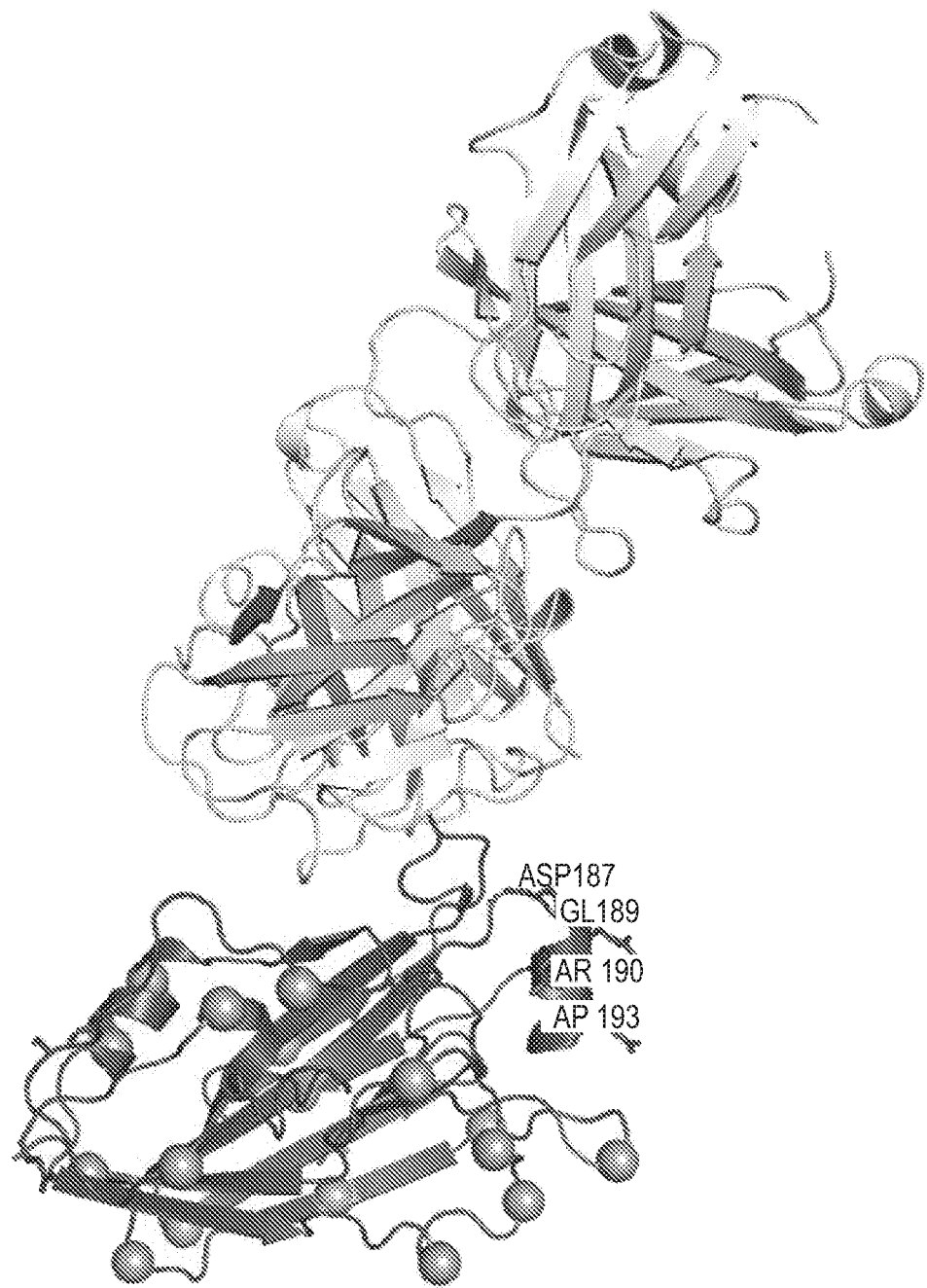

FIG. 11. Cartoon representation of eHead_H1_v3.1 bound to FluA20 Fab. The light g mapped protomer is colored dark grey, the 220-loop in purple, and the 90-loop in orange. The other two protomers are colored in light grey and blue respectively. (FIGS. 16H-I) Structural details of the H5.31/VN/04-HA complex. (FIG. 16H) Interactions of H5.31 with 220-loop of the HA head domain, with the HCDR3 E98/LCDR2 Y49 interaction shown with blue dashes. Relevant residues of the HA head domain are labeled in purple, those of the heavy chain in red, and those of the light chain in blue. (FIG. 16I), Interactions of H5.31 HCDR3 with 90-loop and its C-terminal β-strand. Relevant residues of the HA head domain are labeled in orange, those of the heavy chain in red, and those of the light chain in blue.

Figure 17A:
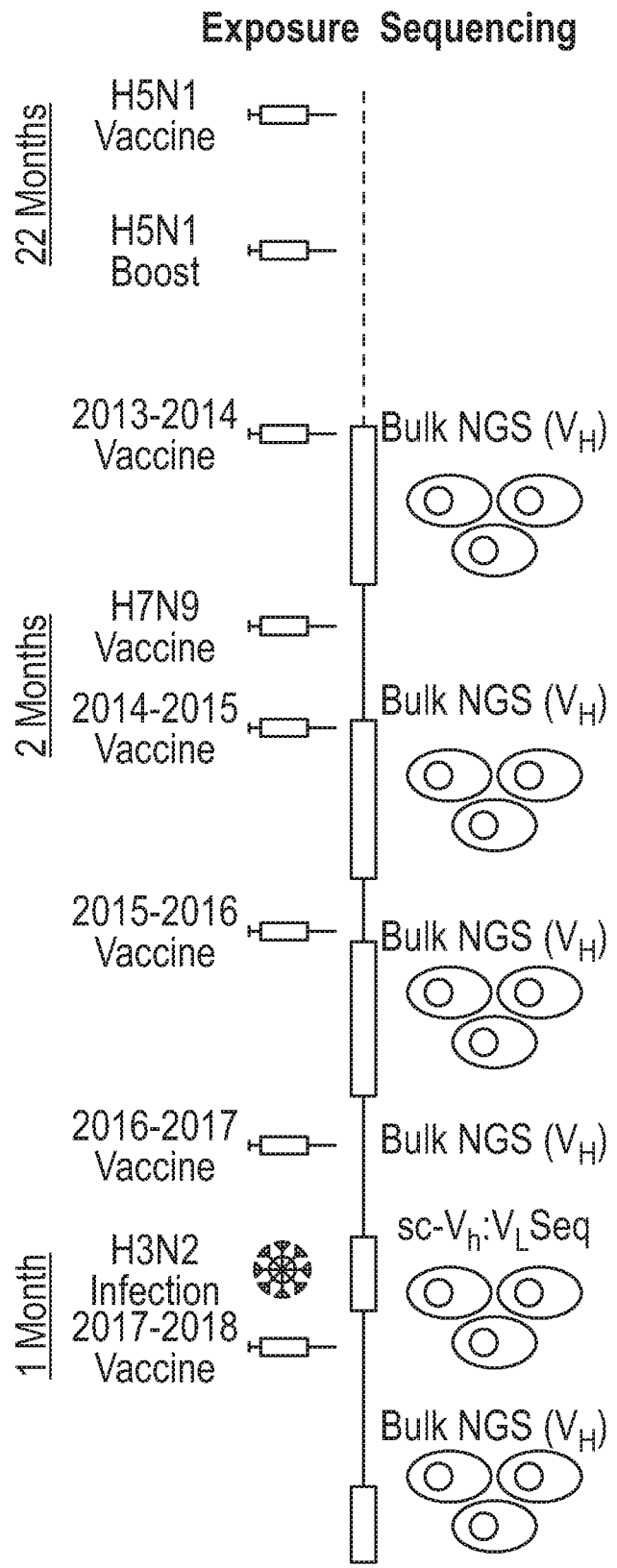
Figure 17B:
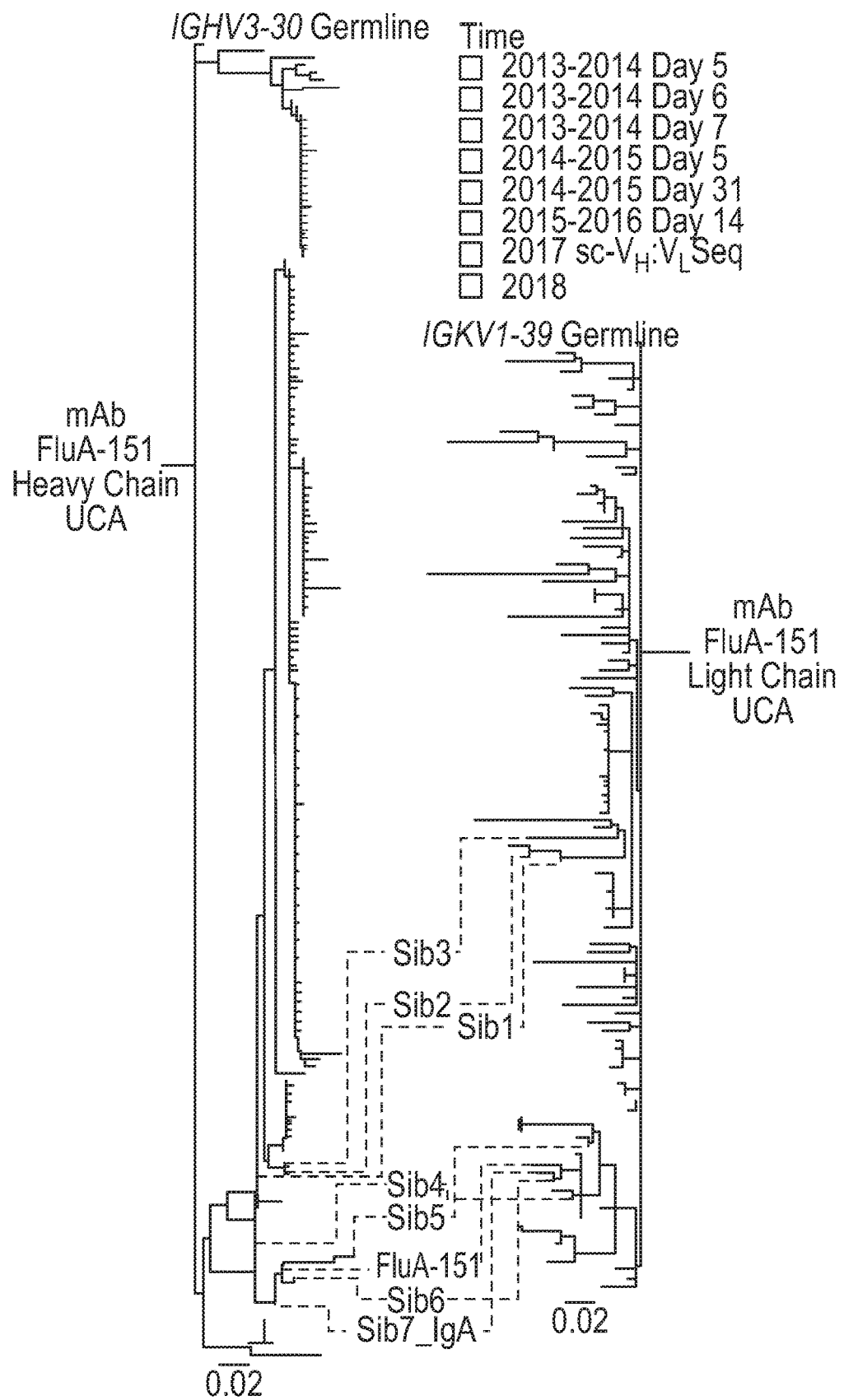
Figures 18A, 18B, 18C:
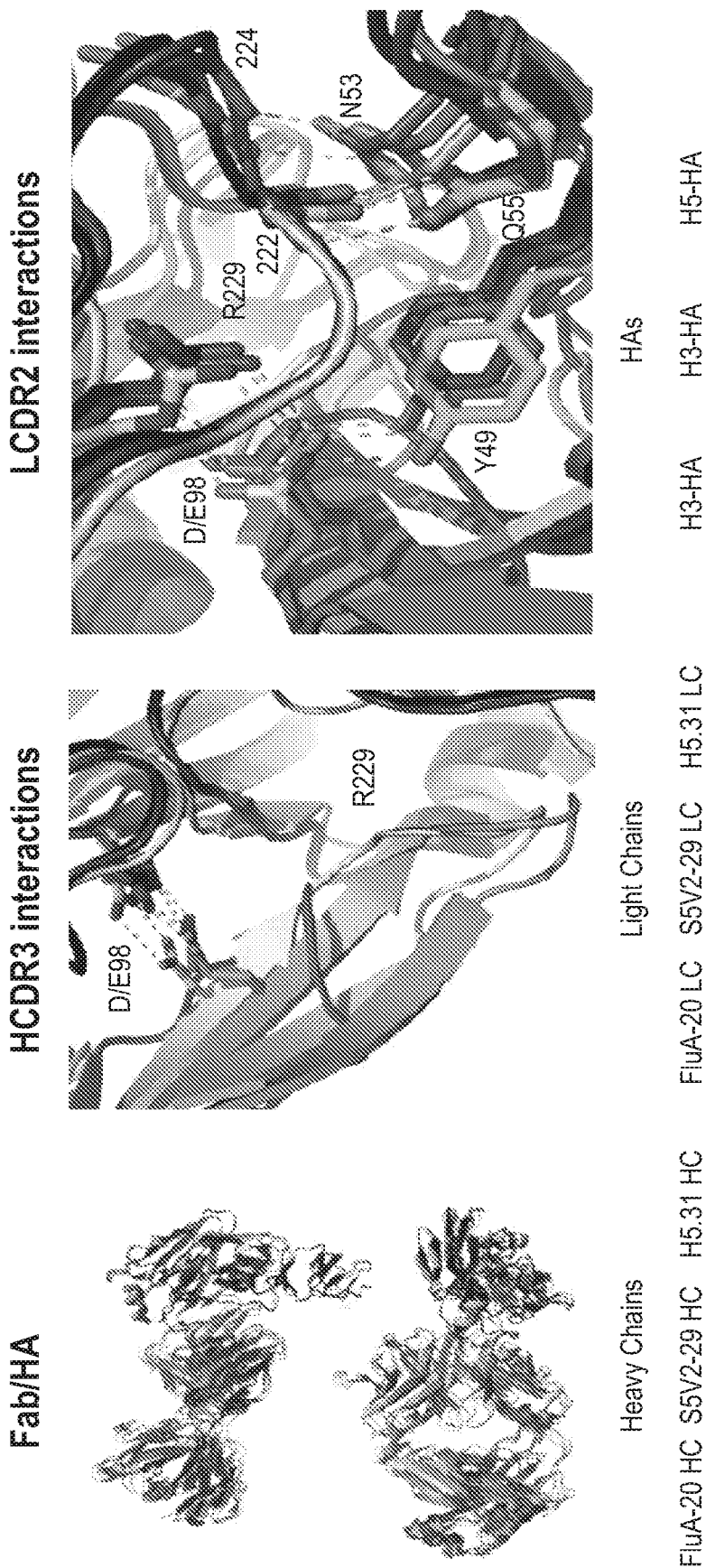
Figure 18E:
Figure 19A:
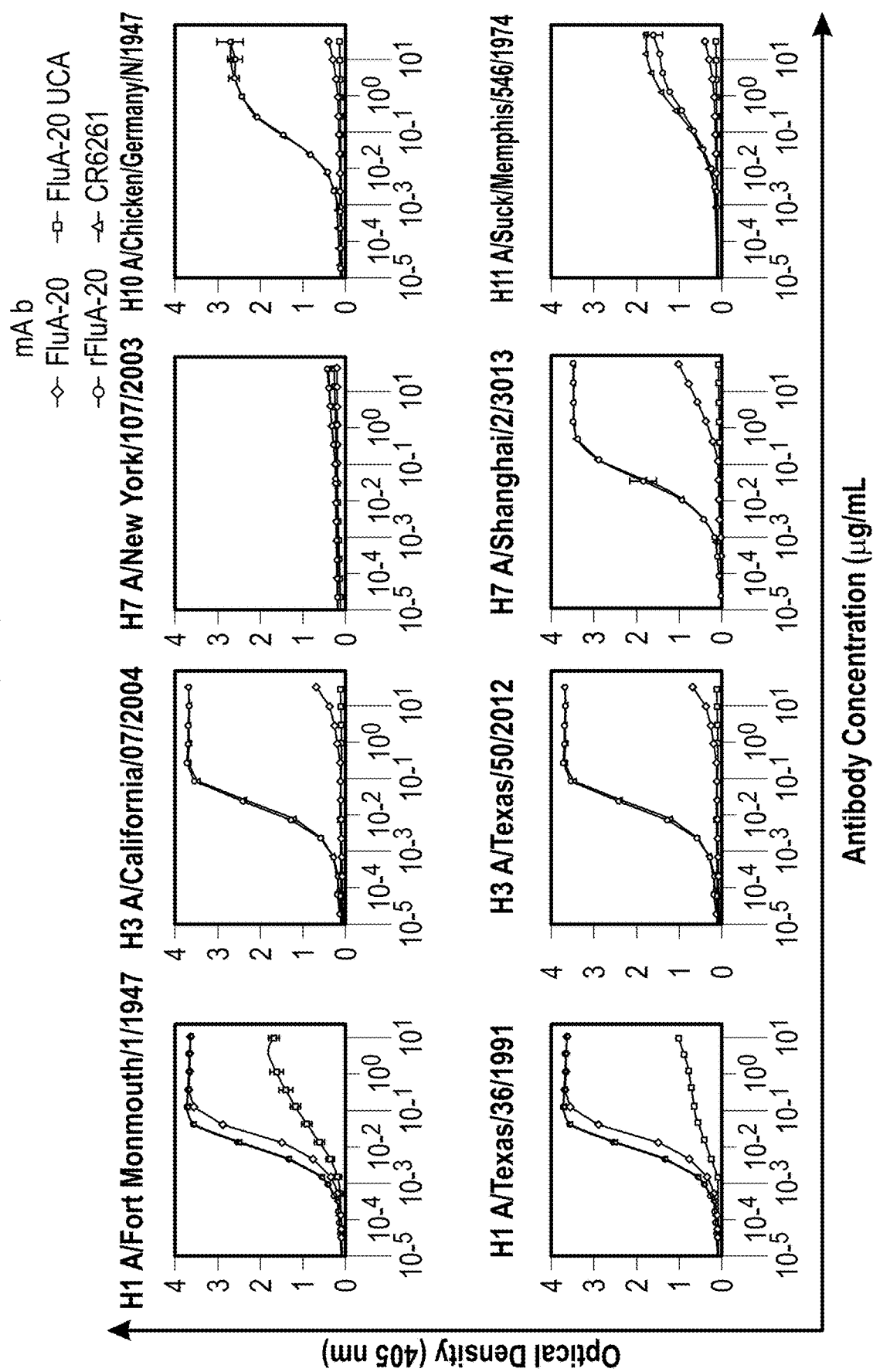
Figure 19B:
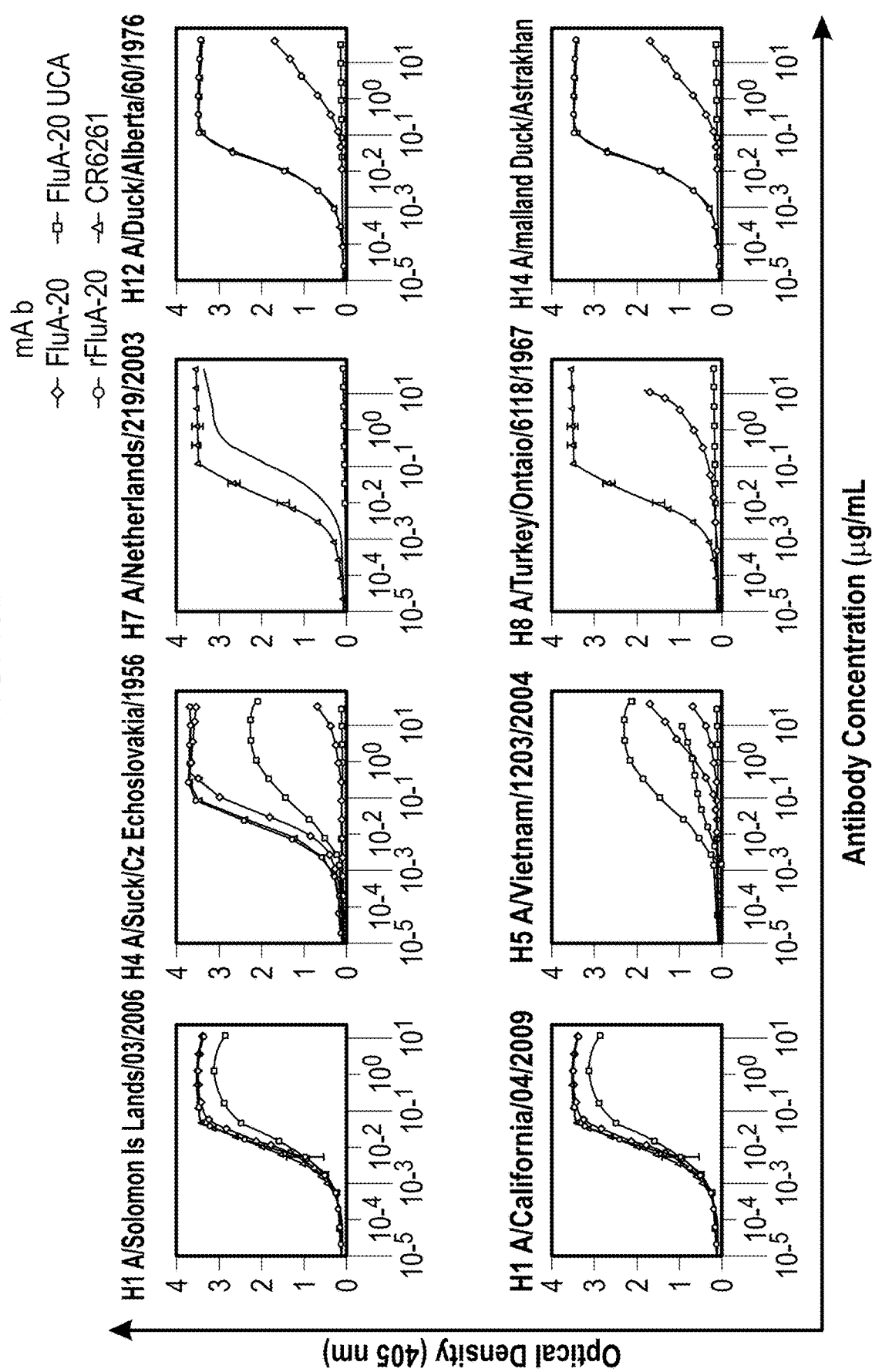
Figure 19C:
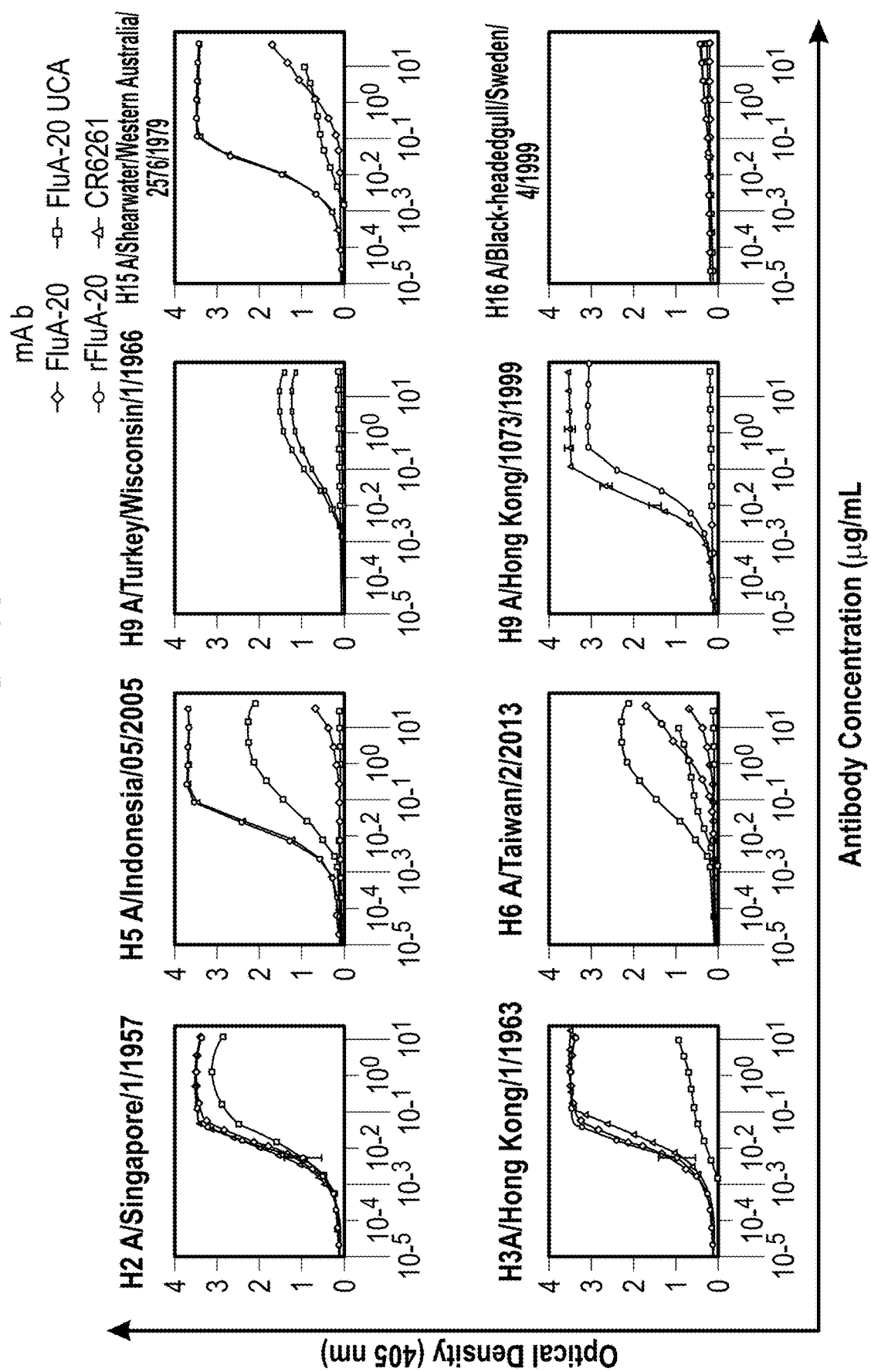
Figure 19D:
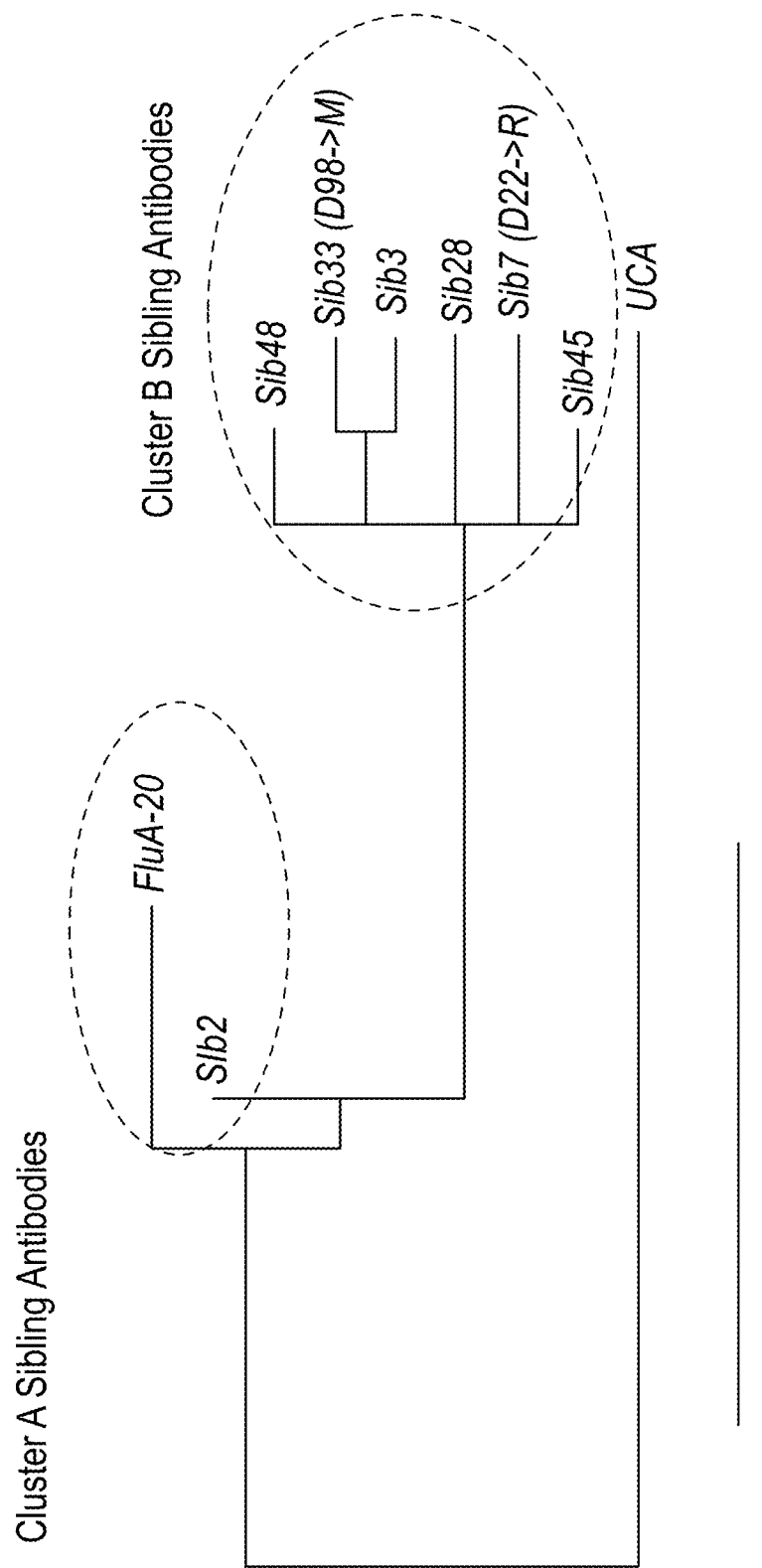

FIGS. 17A-C. Identification of a new TI mAb lineage recalled in the response to vaccination and natural infection. (FIG. 17A) Timeline showing the vaccination history of the research subject, with exposures and repertoire sequencing indicated. (FIG. 17B) Phylogenetic trees showing the FluA-151 lineage over four years of vaccination and infection, with branch colors corresponding to sequencing timepoint. At left, the heavy-chain phylogeny for FluA-151 is color-coded based on year of vaccination and days post-vaccination. At right, the light-chain phylogeny for FluA-151 is shown. Paired heavy-light sequences identified by single-cell sequencing are shown with dashes connecting the heavy-chain and light-chain trees. (FIG. 17C) Binding of TI mAb FluA-151, a clonally-related mAb (FluA-151_Sib1), and the inferred unmutated common ancestor of FluA-151 (FluA-151 UCA) to a panel of recombinant HAs. The previously described TI mAb FluA-20 and a recombinant version of the broadly-reactive stalk mAb MEDI-8852 are shown for comparison. FluA-20 and FluA-151 did not bind measurably to the A/New York/107/2003 HA, which has a 220-loop deletion.

FIGS. 18A-E. Structural and sequence alignments of TI mAbs reveal common features of epitope recognition. (FIGS. 18A-C) Structural alignment of the Fab:HA head domain complexes of FluA-20, S5V2-29, and H5.31, with the HA head domains aligned to one another. (FIG. 18A) View of the structural alignment from the side (upper image) and top (lower image). (FIG. 18B) Despite differences in HCDR3 length, FluA-20, S5V2-29, and H5.31 all contact HA R229 using a D or E at heavy chain position 98. (FIG. 18C) FluA-20, S5V2-29, and H5.31 germline-encoded light-chain residue Y49 makes hydrophobic contacts, while germline-encoded Q55 makes hydrogen bond contacts with the main-chain amide and carbonyl groups of HA residue 222. The shared somatic mutation S53N introduces an additional hydrogen bond with the main-chain amide of HA residue 224. (FIG. 18D) Sequence alignment of previously reported and newly reported TI mAbs identifies common recognition motifs, including a shared acidic residue at position 98 in the HCDR3, a common light chain (IGKV1-39), germline-encoded light chain contact residues shared by all mAbs, as well as a common light-chain S53N somatic mutation. The interaction between HCDR3 E98 and LCDR2 Y49 is shown with blue dashes. (FIG. 18E) Biolayer interferometry-based competition data demonstrates that previously reported TI mAbs strongly compete with one another for binding to A/California/04/2009 HA trimer, but do not compete with the RBS-binding mAb 5J8.

FIGS. 19A-E, related to FIGS. 1A-C, Table S1. Binding of FluA-20 antibody to HA. (FIGS. 19A-C) Binding curves for mAbs FluA-20, rFluA-20, FluA-20-UCA or an irrelevant control IgG (anti-MRSA) against HAs derived from indicated strain and subtype, as determined by Enzyme Linked Immunosorbent Assay (ELISA). (FIG. 19D) Phylogenetic tree of representative sibling antibodies of FluA-20 that were tested for binding. (FIG. 19E) Amino acid sequence of FluA-20 and the unmutated common ancestor (UCA) of FluA-20 are aligned. Mutated residues are colored as red and a unique disulfide bond in CDR H3 is highlighted in yellow. The key residues Asp98 (H), Tyr100a (H), Tyr48 (L), and Gln55 (L) that were later identified as critical for the interaction with HA are present in the UCA sequence (indicated by red dashed circles).

Figures 20A, 20B:
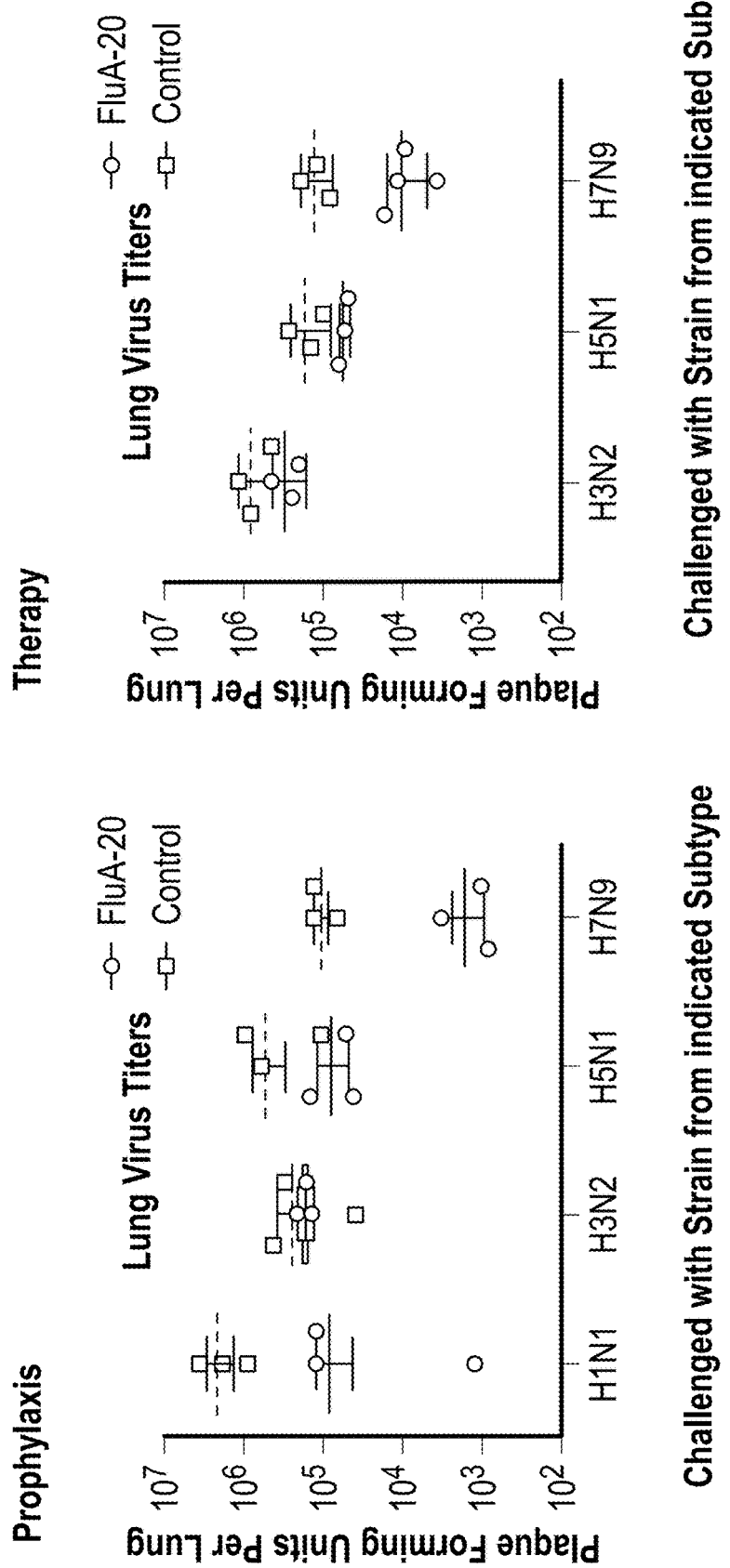

FIGS. 20A-B, related to FIGS. 2A-E. Lung titers of mice treated with FluA-20 in prophylactic or therapeutic settings. (FIG. 20A) Groups of mice (n=3) were treated prophylactically with 10 mg/mL of either FluA-20 or a similarly prepared control antibody to an unrelated target (MRSA) and challenged 24 h later with a sublethal dose of 0.1 $LD_{50}$ with either H1N1 A/Netherlands/602/2009 or H3N2 A/X-31 (6:2 PR8 backbone) or H5N1 A/barn swallow/Hong Kong/D10-1161/2010 (7:1 PR8 backbone) or H7N9 A/Shanghai/1/2013 (6:2 PR8 backbone). Lung samples were collected from mice for each antibody treated group at 6 days post-inoculation. The graph shows pulmonary virus titers in FluA-20 and control treated mice. (FIG. 20B) Groups of mice (n=3) were lethally challenged with 1.2 $LD_{50}$ of H3N2 A/X-31 or H5N1 A/barn swallow/Hong Kong/D10-1161/2010 or H7N9 A/Shanghai/1/2013 on PR8 backbone and were treated therapeutically with 10 mg/kg of FluA-20 or an irrelevant antibody (MRSA) via the intraperitoneal route on days 1, 2 and 4 post-challenge. Lungs were collected for virus titration at 5 days post-inoculation.

Figures 21A, 21B:
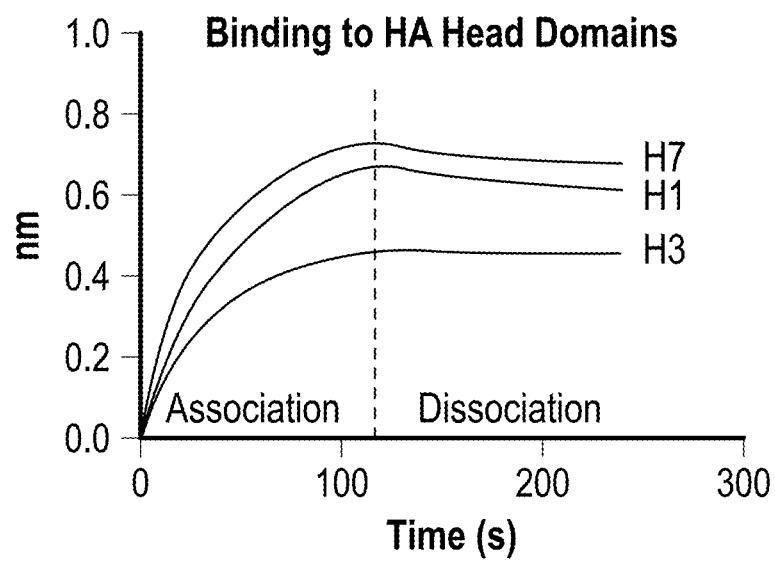

FIGS. 21A-B, related to FIGS. 3A-D. Binding of FluA-20 antibody to a unique site on the HA head domain. (FIG. 21A) Competition-binding assays were performed using bio-layer interferometry. The His-tagged A/California/07/2009 H1 HA was loaded onto Ni-NTA tips, and binding of two successively applied antibodies (IgG) was tested. MAb FluA-20 was competed against mAb 5J8, a receptor binding site mAb, or each of four stem-binding antibodies: CR9114, FI6v3, 39.29 or H3v-86. FluA-20 did not compete with either the RBS- or the stem-specific antibodies indicated. (FIG. 21B) FluA-20 IgG was immobilized on anti-human Fab CH1 biosensors. Strong binding to the head domains (0.5 μM concentration) of H1 (A/Solomon Islands/3/2006), H3 (A/Victoria/361/2011) and H7 (A/Shanghai/02/2013) HAs was observed for immobilized FluA-20 in a BLI assay.

FIGS. 22A-D, related to FIGS. 3A-D and 4A-B. FluA-20 binds to the 220-loop and 90-loop of H1 and H3 HA. (FIG. 22A, FIG. 22B) H1 HA trimer of A/California/04/2009 is shown in a secondary structure representation. Residues identified to be in the H1 epitope (Pro96, Ile219, Arg220, Pro221, Lys222, Val223, and Arg229) that are contacted by FluA-20 are colored in red. These residues interact with the adjacent protomer in the unliganded HA trimer crystal structure. (FIG. 22C, FIG. 22D) H3 HA trimer of A/Hong Kong/1/1968 is shown in a secondary structure representation. The key interacting residues in the H3 epitope (Pro96, Ser219, Arg220, Pro221, Trp222, Val223, and Arg229) that are contacted by FluA-20 are colored in red. Many of these residues interact with the adjacent protomer in the unliganded HA trimer crystal structure.

Figure 23C:
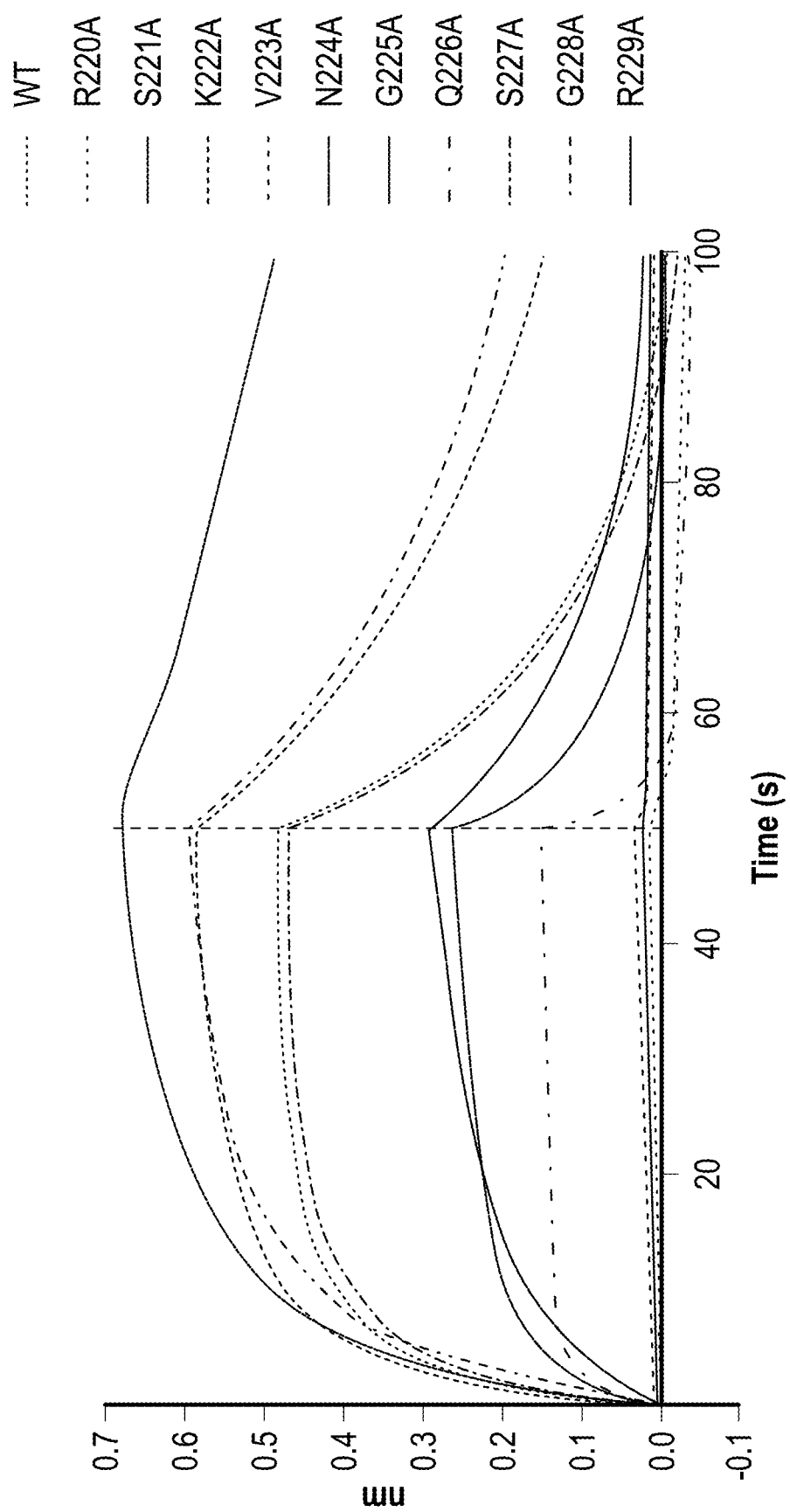

FIGS. 23A-C, related to FIGS. 5A-H. H5 epitope mapping with FluA-20 by HDX-MS and mutagenesis. (FIG. 23A) Difference map from deuterium exchange of the H5 head domain from A/Vietnam/1203/2004 (H5N1) with or without FluA-20 binding. Residues with slower deuterium exchange in the presence of FluA-20 are colored in blue and residues with faster exchange are colored in red; white regions indicate peptides for which there was no coverage.

(FIG. 23B) Regions of HA with slower deuterium exchange after binding FluA-20 are mapped in red onto the surface of H5 A/Vietnam/1203/2004 head domain (purple). (FIG. 23C) Mutations of the 220-loop residues substantially influence binding of FluA-20 IgG (as measured by BLI assays, using 25 µg of IgG). The R220A, V223A, or R229A mutations in H5 HA completely eliminated FluA-20 binding, whereas N224A, G225A, or Q226A mutants decreased FluA-20 binding. Mutations S221A, K222A, and G228A each appeared to enhance FluA-20 binding slightly.

Figure 6A:
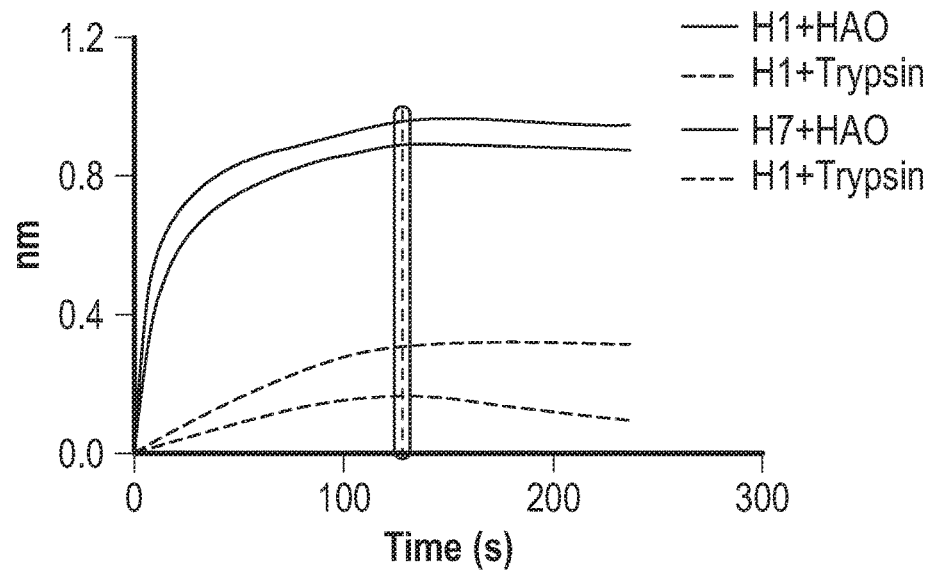
Figure 6B:
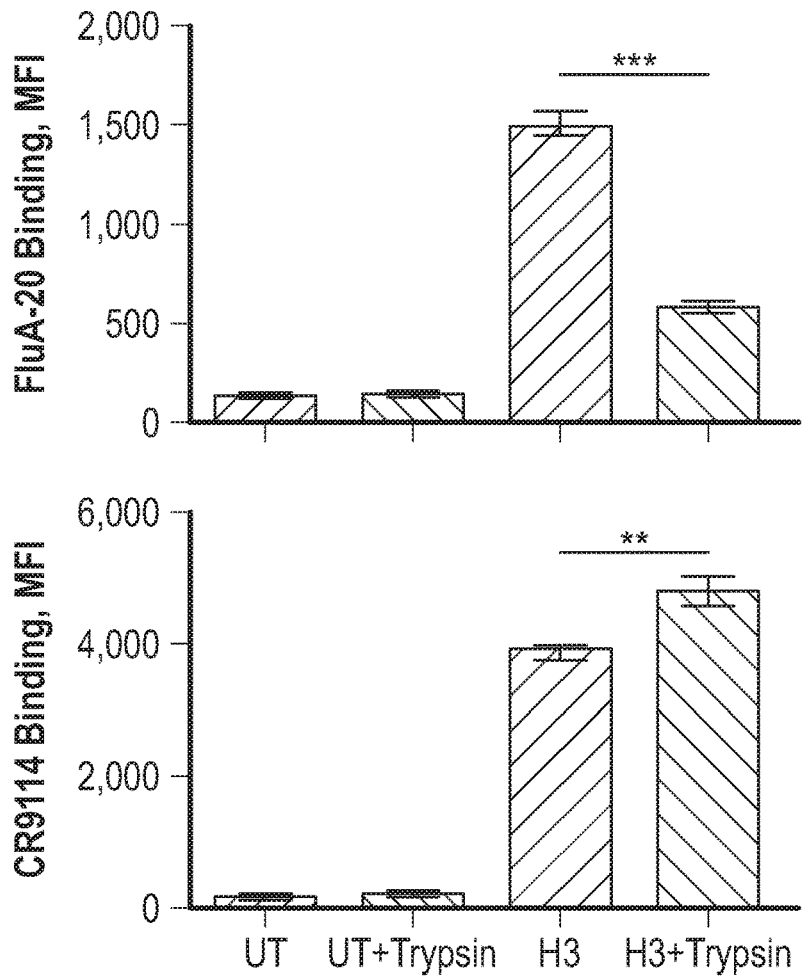
Figure 6C:
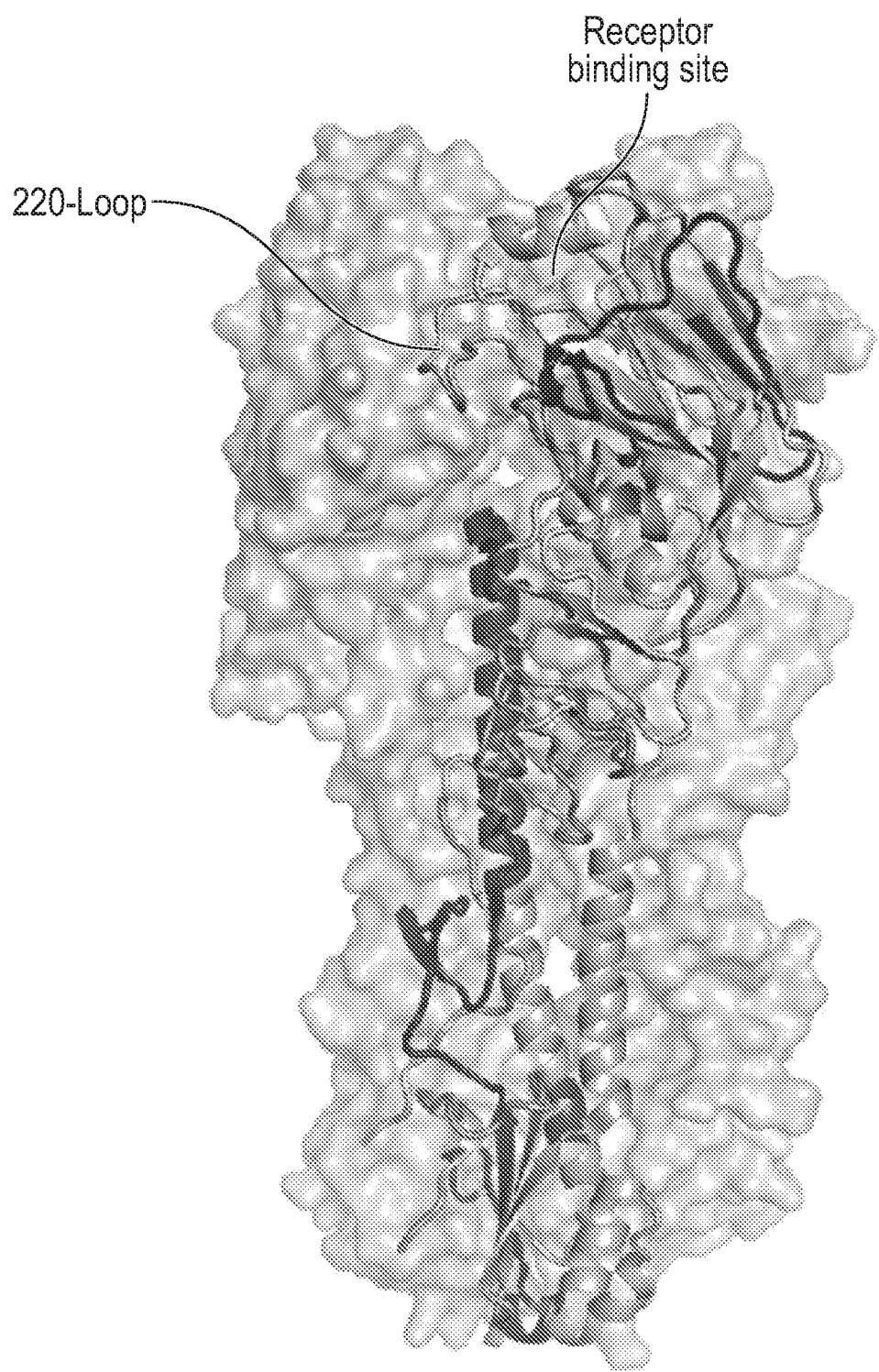
Figure 24A:
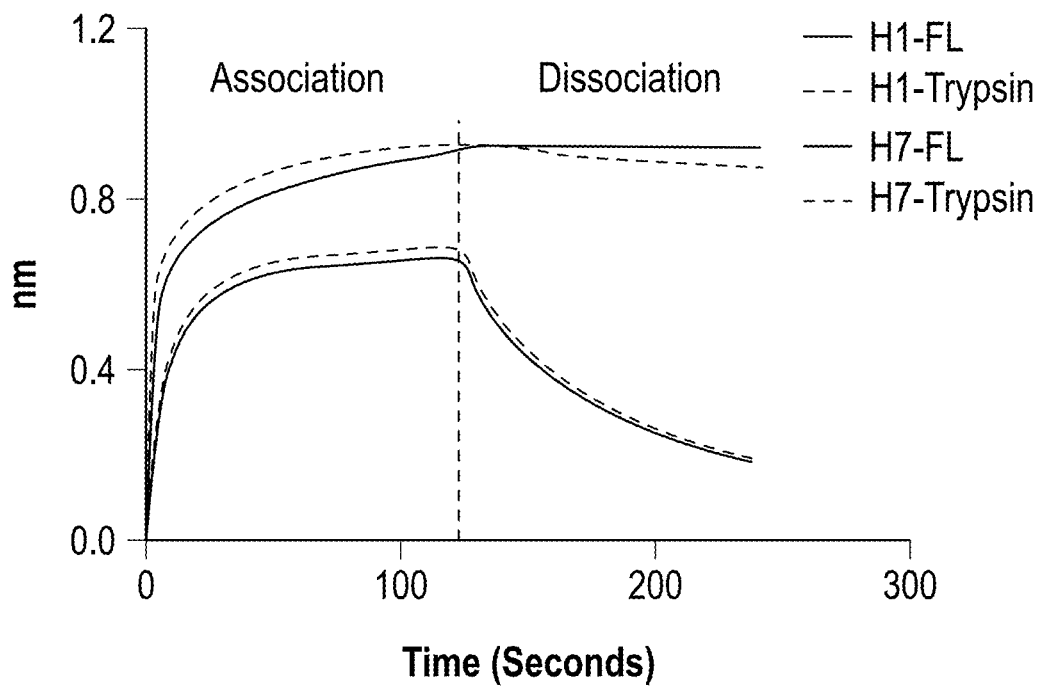
Figure 24B:
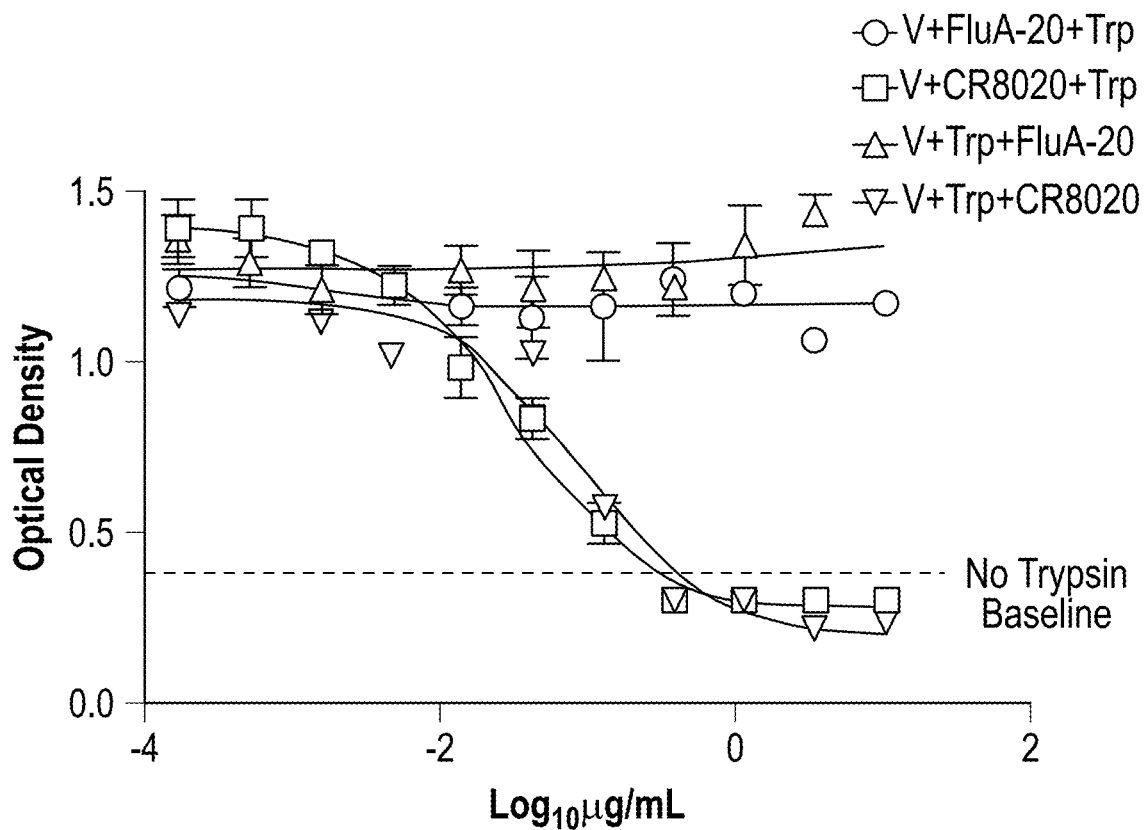
Figure 24C:
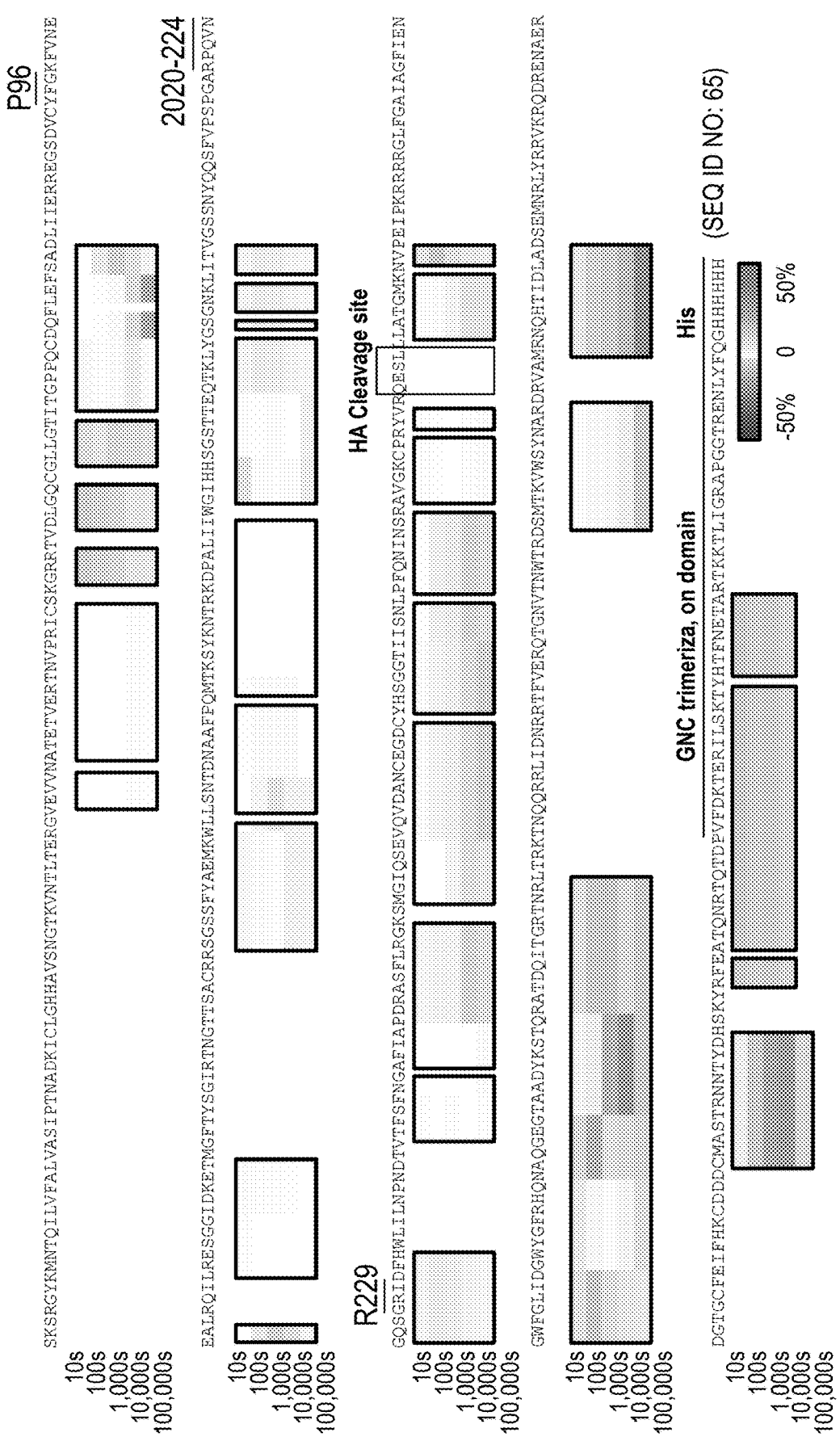

FIGS. 24A-C, related to FIGS. 6A-C. Comparison of antibody binding to HA0 versus cleaved HA trimers. (FIG. 24A) Binding traces of HA0 trimer or cleaved HA trimer (HA1/HA2) to receptor-binding site antibodies. The antibody used for binding to H1 HA (A/California/04/2009) was 5J8 and for H7 HA (A/Shanghai/02/2013) was H7.137. (FIG. 24B) HA0 [from A/Hong Kong/1/1968 (H3N2)] virus (V) produced in the absence of trypsin was incubated with serial dilutions of mAbs (FluA-20 or CR8020) either before or after treatment with 1 µg/mL of trypsin (Trp) at 37° C. for 45 minutes. The samples were trypsin-inactivated with 10% FBS before adding to MDCK cell monolayers. As a control, HA0 virus untreated with trypsin (and therefore inactive) was also added to MDCK cell monolayers. Following incubation, the cells were fixed and the presence of influenza nucleoprotein in the cells was determined by ELISA using a mouse anti-NP antibody. The dotted line indicates the baseline signal from the noninfectious HA0 virus (untreated). (FIG. 24C) Difference map from deuterium exchange of cleaved HA trimer compared to HA0 trimer from A/Netherlands/219/2003(H7N7) by HDX-MS.

Figure 25A:
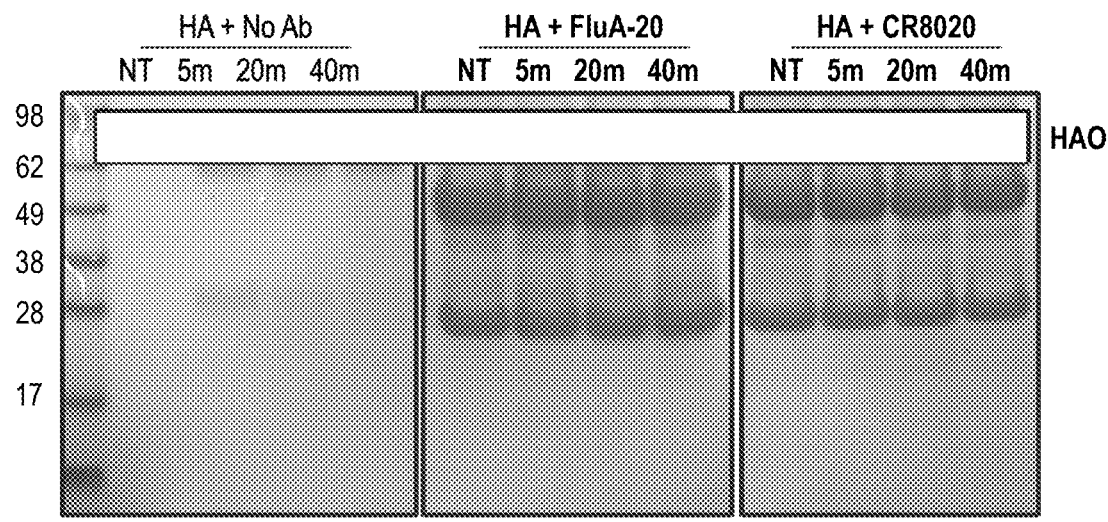
Figure 25B:
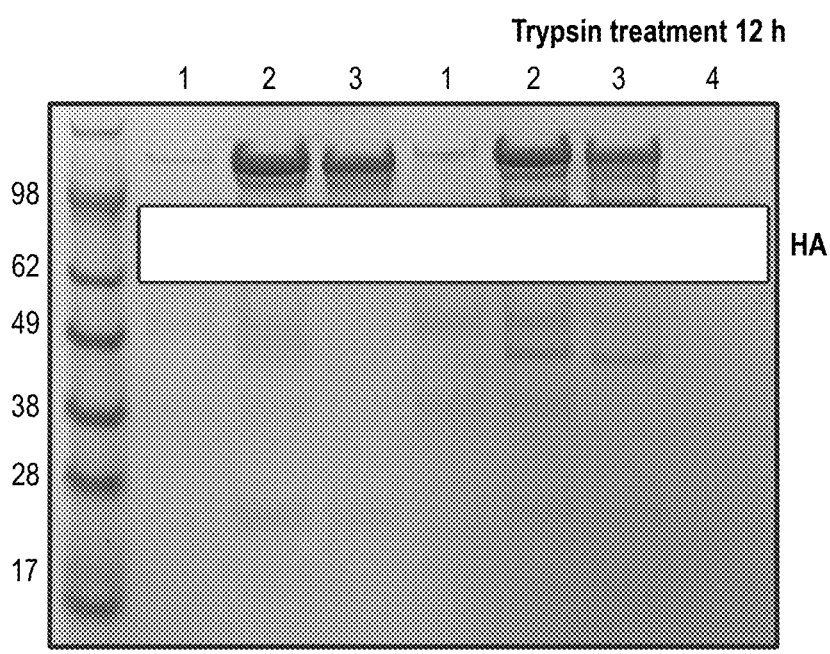
Figure 25D:
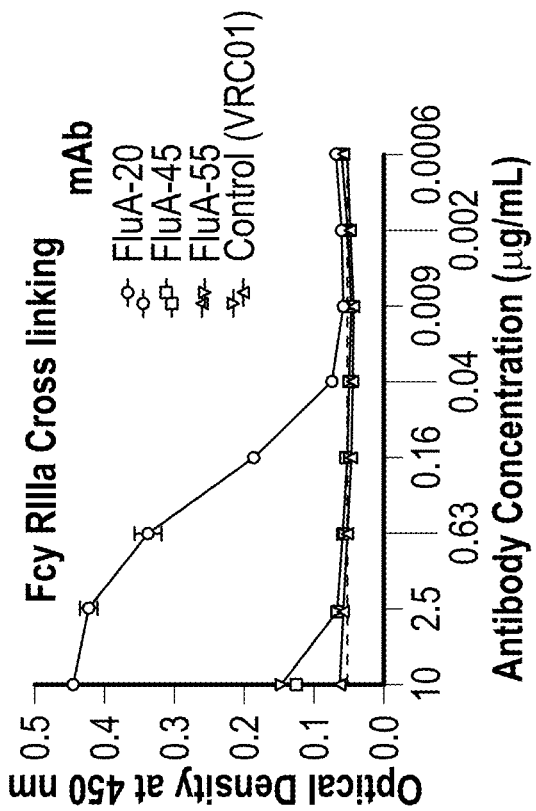
Figure 25F:
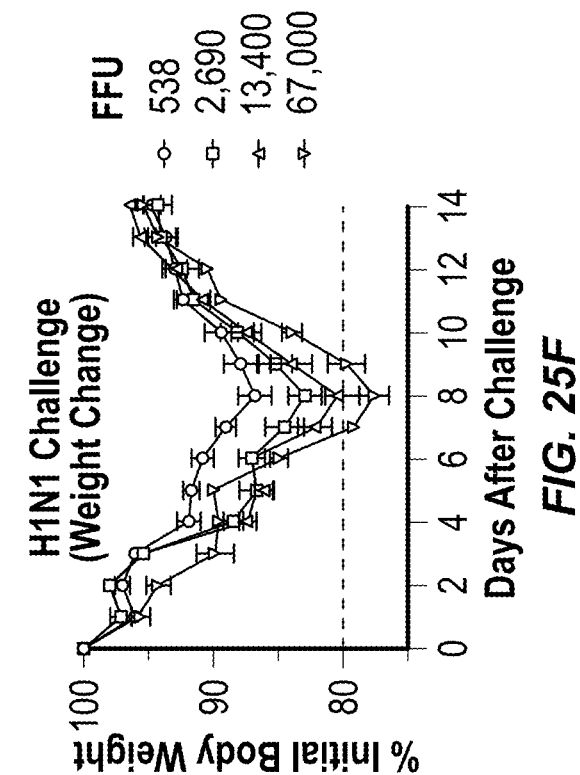
Figure 25C:
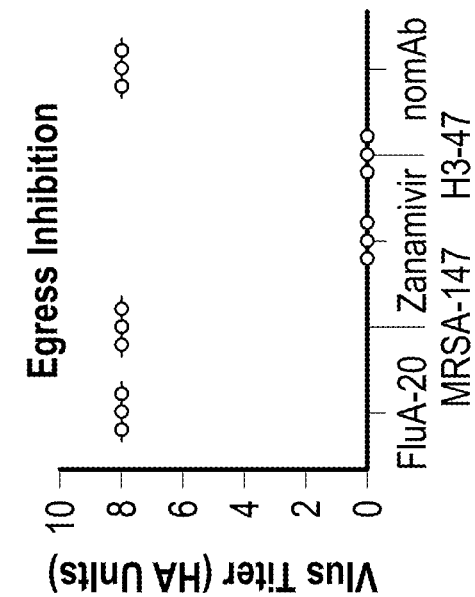
Figure 25E:
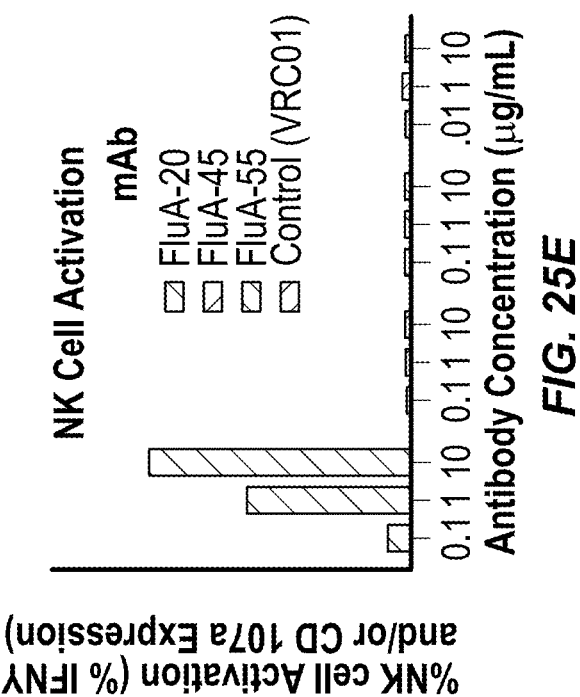

FIGS. 25A-F, related to FIGS. 7A-G. Functional characterization of FluA-20 IgG. FluA-20 was tested for (FIG. 25A) HA cleavage inhibition, (FIG. 25B) pH-induced HA conformational change inhibition, and (FIG. 25C) egress inhibition. (FIG. 25A) SDS-PAGE of 4 µg of recombinant HA0 protein (from A/Perth/16/2009 (H3N2)) that was pre-mixed with either PBS or 40 µg of mAb FluA-20 or mAb CR8020 was either not treated (NT) or treated with TPCK-trypsin for 5, 20 or 40 minutes at 37° C. (FIG. 25B). Non-reducing SDS-PAGE of recombinant HA (H3 Perth) pre-incubated with either (1) PBS or (2) mAb FluA-20 or (3) mAb CR8020 for 1 h at pH 5.0 were neutralized to pH 8.4 and further treated with PBS or TPCK-trypsin for 12 hours. HA was also incubated with (4) PBS at pH 8.0 and treated with trypsin at pH 8.4 as a control. (FIG. 25C) Egress inhibition of FluA-20 was tested using H3 Texas virus. Hemagglutination titer value was used to confirm virus egress from cell surface to supernatant. Data represent one of two independent experiments, each dot represents value per repeat, and lines represent the mean and standard deviation of assay triplicate. (FIG. 25D) Cross-linking of FcγRIIIa. Binding curves were obtained by performing ELISA with serial dilutions of each antibody (FluA-20 and control mAbs FluA-45, FluA-55 or HIV-specific mAb VRC01) onto HA-coated plates and assessing the ability of HA-bound mAbs to engage both Fc-binding sites on the soluble FcγRIIIa dimer. The dotted line indicates the limit of detection. (FIG. 25E) FluA-20 or control mAbs were each added independently on 96-well plates coated with purified A/California/07/2009 H1 HA. The percentage of NK cell activation was calculated from the number of NK cells incubated with HA-bound antibody that expressed CD107a and/or IFNγ. (FIG. 25F) Sub-lethal respiratory challenge mouse model for influenza A H1N1 infection. Groups of BALB/c mice were inoculated i.n. with indicated dose of A/California/04/2009 virus and monitored for 14 days for weight change kinetics. Data represent the mean value±SEM, using five mice per group. The dotted line indicates the endpoint for humane euthanasia.

Figure 26A:
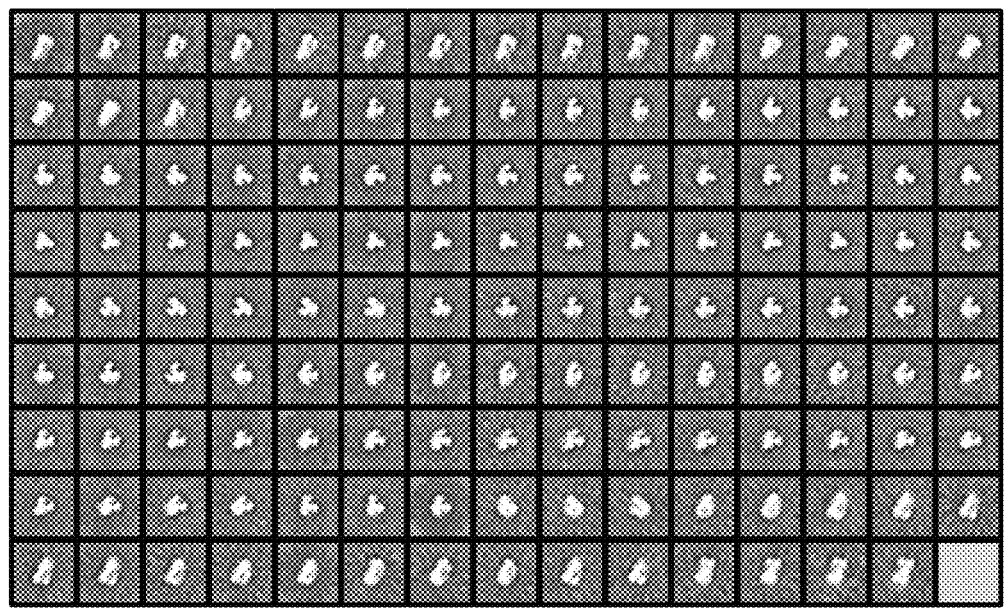
Figure 26B:
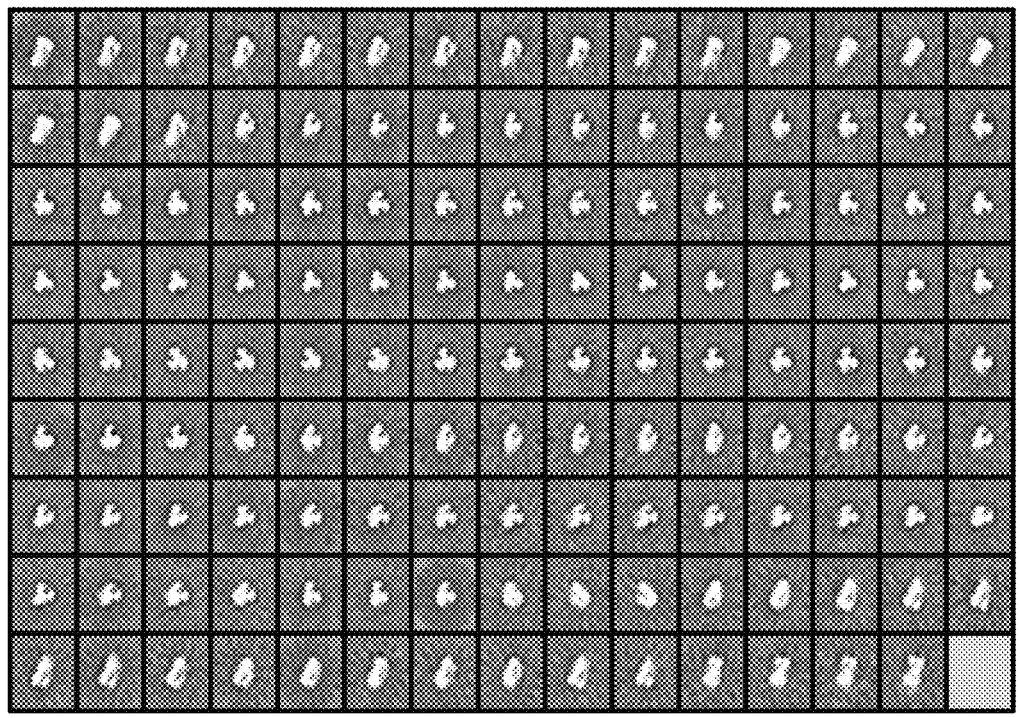

FIGS. 26A-B, related to FIGS. 7A-G. Exposure of HA trimer to FluA-20 Fab results in immediate disruption of native HA trimer, as assessed by negative-stain EM (nsEM). (FIG. 26A) Images of H1 HA0 trimer (A/California/04/2009) show intact trimer conformation without exposure of FluA-20 Fab. (FIG. 26B) 2D class average of H1 (A/California/04/2009) HA bound by FluA-20 Fab after 20-second incubation; only the monomeric form of the complex was observed. A few apo HA trimers also were observed, as denoted by the red box.

Figure 27:
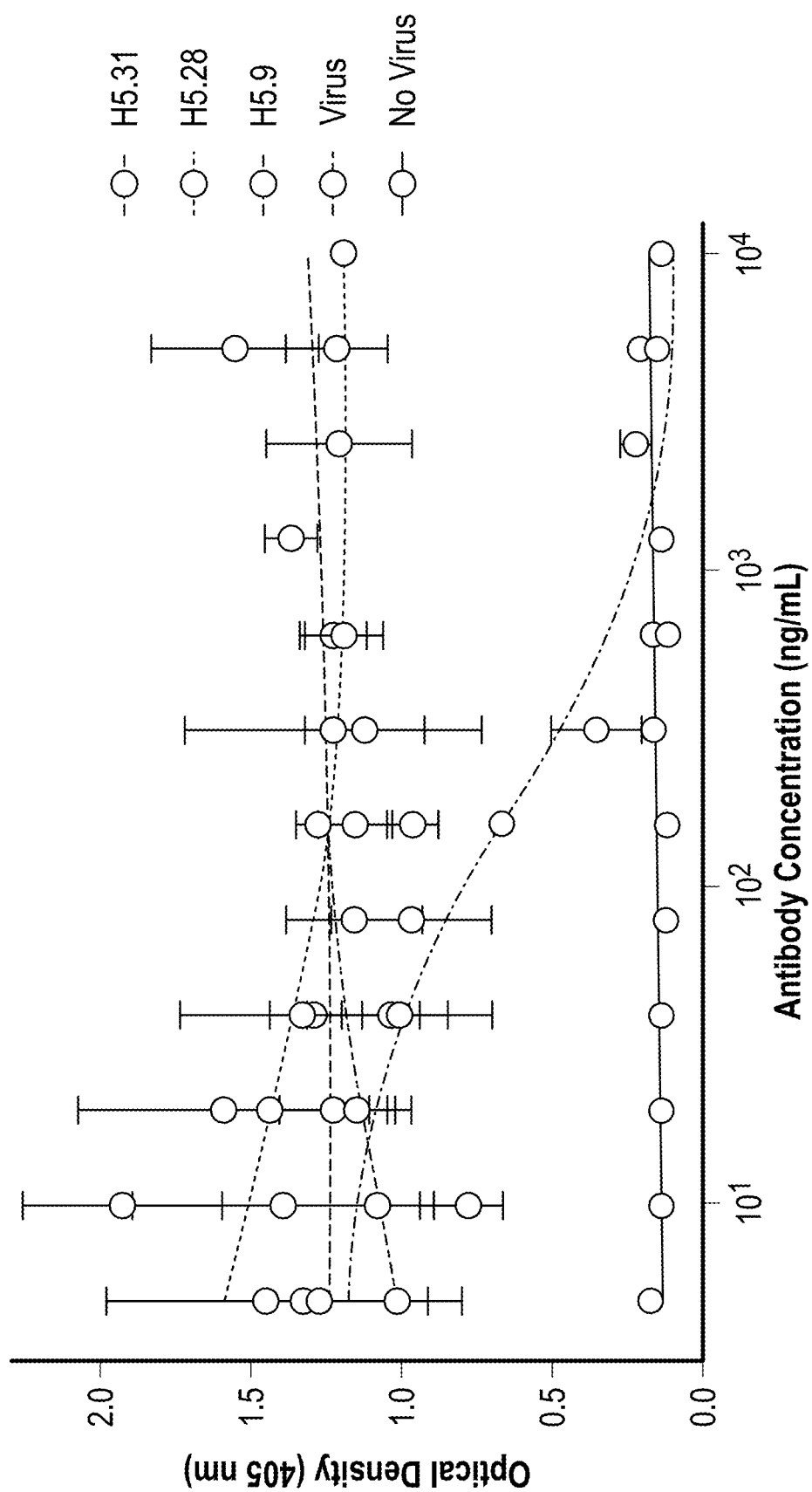

FIG. 27. H5.31 and H5.28 do not neutralize influenza virus. The neutralization activities of H5.31 and H5.28 mAbs were tested against rgA/Vietnam/1203/2004 by a microneutralization assay on MDCK cells. Human mAb H5.9 used as positive control. Data represent the mean and SD values of triplicates.

Figure 28A:
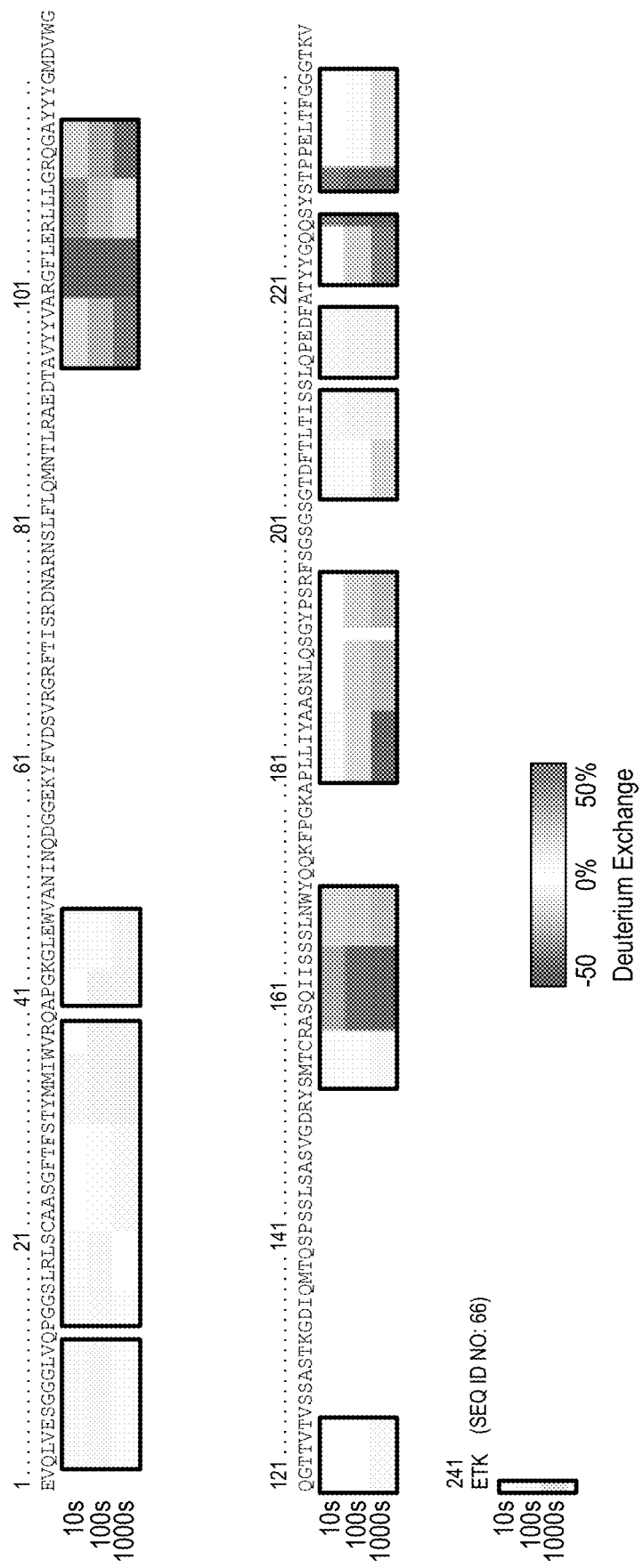

FIGS. 28A-C. HDX data for H5.28 Fab and H5 HA monomer. (FIG. 28A) The amino acid sequence of the H5.28 Fab is shown with a ribbon diagram indicating differences in deuterium uptake between the Fab alone and the Fab complexed with H5 HA monomeric head domain. Blue colors indicating slower deuterium exchange in the presence of binding to H5 HA, while red colors indicate faster deuterium exchange in the presence of H5 HA. Data are shown for 10s, 100s, and 1000s of deuterium labeling. (FIGS. 28B-C). Ribbon diagrams of deuteration level for H5.28 alone, H5 HA monomeric head domain alone, and the H5.28:H5 HA head complex. HA residues are numbered from the start of the monomeric H5 HA head construct.

Figure 29A:
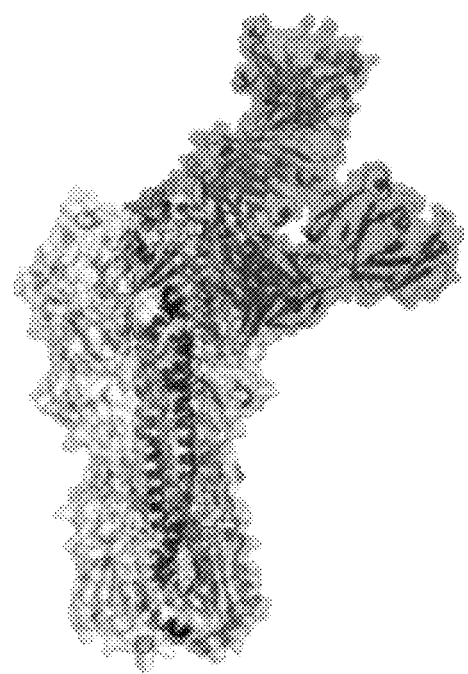
Figure 29B:
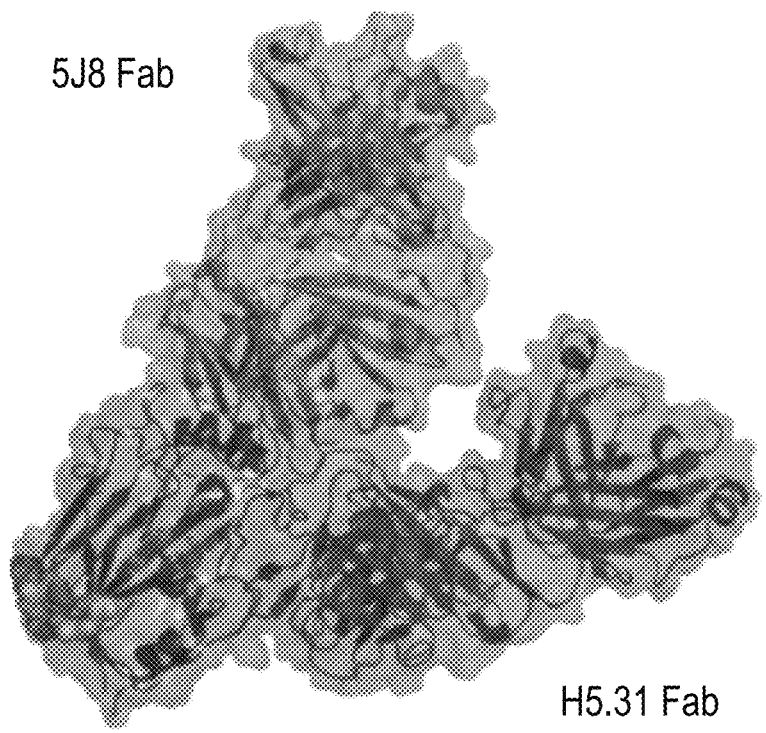
Figure 29C:
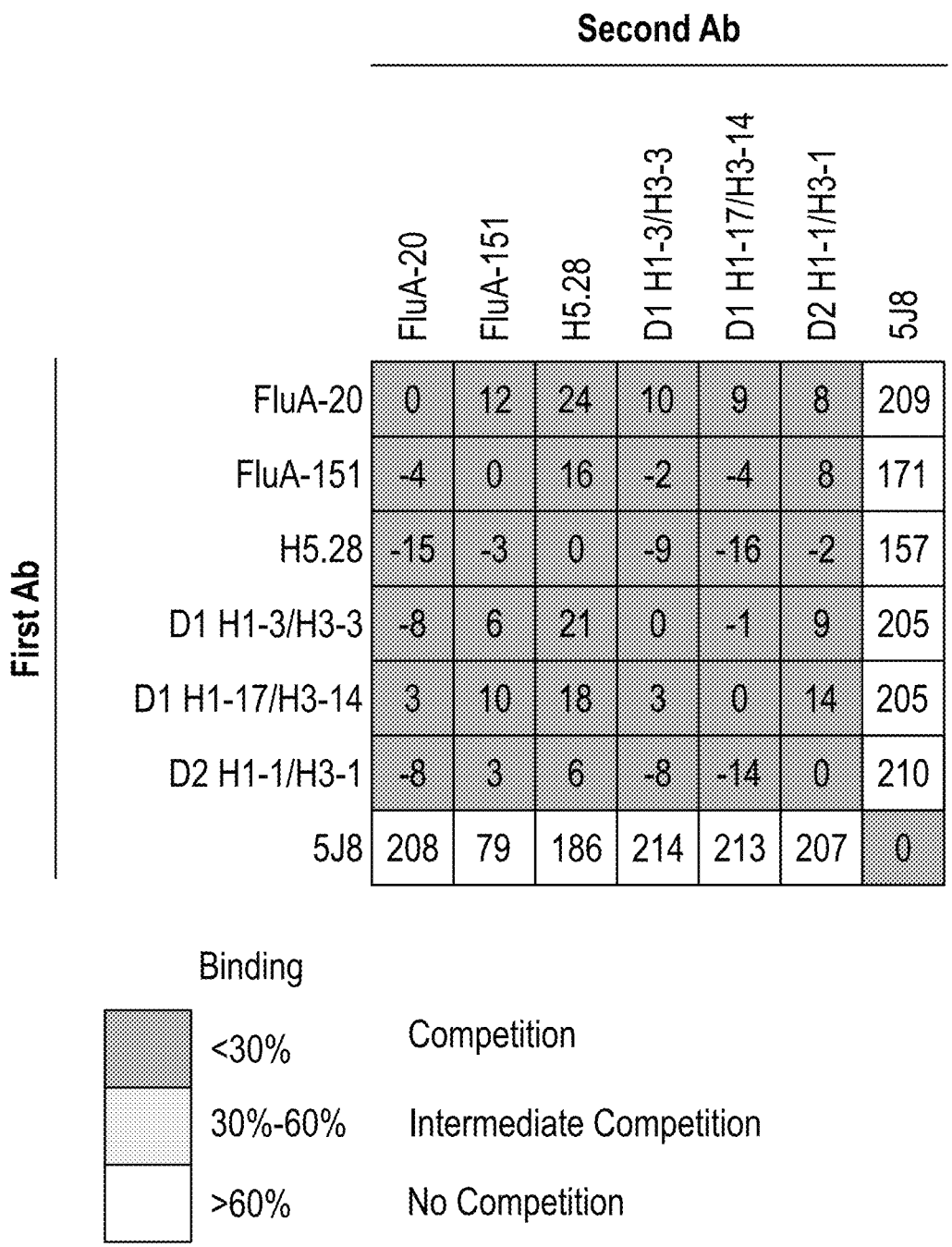

FIGS. 29A-C. Mapping of previously reported mAbs to the same trimer-interface epitope. (FIG. 29A) Structural alignment showing the H5.31:H5 HA head structure (PDB 6P3R) and the 5J8:H1 HA head structure (4M5Z) aligned with the A/California/04/2009 trimer (PDB 3UBN). The TI-specific H5.31 Fab is colored blue, while the receptor binding site (RBS) specific 5J8 Fab is colored red, and the individual protomers of the HA trimer are colored in shades of grey. (FIG. 29B) Structural alignment of H5.31 and 5J8 structures with monomeric H1 head domain. Residues colored in orange illustrate the previously suggested epitope of mAbs D1 H1-3/H3-3, D1 H1-17/H3-14, and D2 H1-1/H3-1 (from Lee et al, 2016). (FIG. 29C) biolayer interferometry-based competition assay with A/California/07/2009 H1 monomeric head domain as the antigen. TI mAbs strongly competed with one another and with D1 H1-3/H3-3, D1 H1-17/H3-14, or D2 H1-1/H3-1 for binding to H1 monomeric head domain, but did not compete with mAb 5J8, which binds the HA RBS.

DESCRIPTION OF ILLUSTRATIVE EMBODIMENTS

Here, the inventors report a broadly protective, naturally occurring human antibody, designated FluA-20, which was isolated from a donor with an extensive previous influenza vaccination history. FluA-20 targets IAVs with exceptional breadth and affinity. The antibody recognizes the HA head domain from nearly all subtypes of influenza A viruses, with $K_D$ values extending to low nanomolar, even in their monomeric Fab form. The mAb protects mice from sub-lethal and lethal challenges of various pathogenic IAV strains for humans (H1N1, H5N1, H3N2, and H7N9). Structural studies of FluA-20 with the HA head domain revealed a novel epitope on the non-RBS side of the 220-loop and the adjacent 90-loop. Despite the variability of the nearby sequences, the key residues recognized by FluA-20 remain exceedingly conserved across diverse subtypes, enabling FluA-20 to exhibit very broad activity. Surprisingly, this epitope is largely buried in the peripheral interface of the native HA trimer. Although the antibody recognizes the head domain, it does not mediate conventional neutralizing activity in vitro, but rather it exhibits a new phenotype of activity comprising the capacity to disrupt HA trimers and inhibit cell-to-cell spread of virus. This finding suggest that the HA trimer interface (TI) can be exposed, perhaps transiently or partially. This work directs one to target these 'hidden' surfaces for development of broad anti-influenza treatments and vaccines.

These and other aspects of the disclosure are described in detail below.

I. INFLUENZA A VIRUS

Influenza A virus causes influenza in birds and some mammals and is the only species of influenza virus A genus of the Orthomyxoviridae family of viruses. Strains of all subtypes of influenza A virus have been isolated from wild birds, although disease is uncommon. Some isolates of influenza A virus cause severe disease both in domestic poultry and, rarely, in humans. Occasionally, viruses are transmitted from wild aquatic birds to domestic poultry, and this may cause an outbreak or give rise to human influenza pandemics.

Influenza A viruses are negative-sense, single-stranded, segmented RNA viruses. The several subtypes are labeled according to an H number (for the type of hemagglutinin) and an N number (for the type of neuraminidase). There are 18 different known H antigens (H1 to H18) and 11 different known N antigens (N1 to N11). H17 was isolated from fruit bats in 2012. H18N11 was discovered in a Peruvian bat in 2013.

Each virus subtype has mutated into a variety of strains with differing pathogenic profiles; some are pathogenic to one species but not others, some are pathogenic to multiple species.

A filtered and purified influenza A vaccine for humans has been developed, and many countries have stockpiled it to allow a quick administration to the population in the event of an avian influenza pandemic. Avian influenza is sometimes called avian flu, and colloquially, bird flu. In 2011, researchers reported the discovery of an antibody effective against all types of the influenza A virus.

A. General

The influenza virus is an RNA virus of the family Orthomyxoviridae which comprises five genera: Influenzavirus A, Influenzavirus B, Influenzavirus C, Isavirus and Thogotovirus. The Influenzavirus A genus has one species, influenza A virus. Wild aquatic birds are the natural hosts for a large variety of influenza A. Occasionally, viruses are transmitted to other species and may then cause devastating outbreaks in domestic poultry or give rise to human influenza pandemics. The type A viruses are the most virulent human pathogens among the three influenza types and cause the most severe disease. The influenza A virus can be subdivided into different subtypes based on the antibody response to these viruses. The subtypes that have been confirmed in humans, ordered by the number of known human pandemic deaths, are:

H1N1, which caused Spanish flu in 1918 and has been identified as the subtype of the 2009 outbreak of swine flu originating from Mexico H2N2, which caused Asian Flu in 1957
H3N2, which caused Hong Kong Flu in 1968
H5N1, a pandemic threat in the 2007-08 flu season
H7N7, which has unusual zoonotic potential
H1N2, endemic in humans and pigs
H9N2
H7N2
H7N3
H10N7

Influenzaviruses A, B and C are very similar in structure. The virus particle is 80-120 nanometres in diameter and usually roughly spherical, although filamentous forms can occur. This particle is made of a viral envelope containing two main types of glycoproteins, wrapped around a central core. The central core contains the viral RNA genome and other viral proteins that package and protect this RNA. Unusually for a virus, its genome is not a single piece of nucleic acid; instead, it contains seven or eight pieces of segmented negative-sense RNA. The Influenza A genome encodes 11 proteins: hemagglutinin (HA), neuraminidase (NA), nucleoprotein (NP), M1, M2, NS1, NS2(NEP), PA, PB1, PB1-F2 and PB2.

Hemagglutinin (HA) and neuraminidase (NA) are the two large glycoproteins on the outside of the viral particles. HA is a lectin that mediates binding of the virus to target cells and entry of the viral genome into the target cell, while NA is involved in the release of progeny virus from infected cells, by cleaving sugars that bind the mature viral particles. Thus, these proteins are targets for antiviral drugs. Furthermore, they are antigens to which antibodies can be raised. Influenza A viruses are classified into subtypes based on antibody responses to HA and NA. These different types of HA and NA form the basis of the H and N distinctions in, for example, H5N1.

Influenza viruses bind through hemagglutinin onto sialic acid sugars on the surfaces of epithelial cells typically in the nose, throat and lungs of mammals and intestines of birds. The cell imports the virus by endocytosis. In the acidic endosome, part of the hemagglutinin protein fuses the viral envelope with the vacuole's membrane, releasing the viral RNA (vRNA) molecules, accessory proteins and RNA-dependent RNA polymerase into the cytoplasm. These proteins and vRNA form a complex that is transported into the cell nucleus, where the RNA-dependent RNA polymerase begins transcribing complementary positive-sense vRNA. The vRNA is either exported into the cytoplasm and translated or remains in the nucleus. Newly-synthesised viral proteins are either secreted through the Golgi apparatus onto the cell surface or transported back into the nucleus to bind vRNA and form new viral genome particles. Other viral proteins have multiple actions in the host cell, including degrading cellular mRNA and using the released nucleotides for vRNA synthesis and also inhibiting translation of host-cell mRNAs.

Negative-sense vRNAs that form the genomes of future viruses, RNA-dependent RNA polymerase, and other viral proteins are assembled into a virion. Hemagglutinin and neuraminidase molecules cluster into a bulge in the cell membrane. The vRNA and viral core proteins leave the nucleus and enter this membrane protrusion. The mature virus buds off from the cell in a sphere of host phospholipid membrane, acquiring hemagglutinin and neuraminidase with this membrane coat. As before, the viruses adhere to the cell through hemagglutinin; the mature viruses detach once their neuraminidase has cleaved sialic acid residues from the host cell. After the release of new influenza viruses, the host cell dies.

Because of the absence of RNA proofreading enzymes, the RNA-dependent RNA polymerase makes a single nucleotide insertion error roughly every 10 thousand nucleotides, which is the approximate length of the influenza vRNA. Hence, the majority of newly-manufactured influenza viruses are mutants, causing "antigenic drift." The separation of the genome into eight separate segments of vRNA allows mixing or reassortment of vRNAs if more than one viral line has infected a single cell. The resulting rapid change in viral genetics produces antigenic shifts and allows the virus to infect new host species and quickly overcome protective immunity.

B. Historical Pandemic Influenza A Outbreaks

The 1918 flu pandemic, commonly referred to as the Spanish Flu, was an influenza pandemic that spread to nearly every part of the world. It was caused by an unusually virulent and deadly Influenza A virus strain of subtype H1N1. Historical and epidemiological data are inadequate to identify the geographic origin of the virus. Most of its victims were healthy young adults, in contrast to most influenza outbreaks which predominantly affect juvenile, elderly, or otherwise weakened patients. The pandemic lasted from March 1918 to June 1920, spreading even to the Arctic and remote Pacific islands. It is estimated that anywhere from 20 to 100 million people were killed worldwide, or the approximate equivalent of one third of the population of Europe, more than double the number killed in World War I. This extraordinary toll resulted from the extremely high illness rate of up to 50% and the extreme severity of the symptoms, suspected to be caused by cytokine "storms." The pandemic is estimated to have affected up to one billion people—half the world's population at the time.

Scientists have used tissue samples from frozen victims to reproduce the virus for study. Among the conclusions of this research is that the virus kills via a cytokine storm, an overreaction of the body's immune system, which explains its unusually severe nature and the concentrated age profile of its victims. The strong immune systems of young adults ravaged the body, whereas the weaker immune systems of children and middle-aged adults caused fewer deaths.

The global mortality rate from the 1918/1919 pandemic is not known but is estimated at 2.5 to 5% of those who were infected died. Note this does not mean that 2.5-5% of the human population died; with 20% or more of the world population suffering from the disease to some extent, a case-fatality ratio this high would mean that about 0.5-1% (~50 million) of the whole population died. Influenza may have killed as many as 25 million in its first 25 weeks. Older estimates say it killed 40-50 million people while current estimates say 50 million to 100 million people worldwide were killed. This pandemic has been described as "the greatest medical holocaust in history" and may have killed more people than the Black Death.

An effort to recreate the 1918 flu strain (a subtype of avian strain H1N1) was a collaboration among the Armed Forces Institute of Pathology, Southeast Poultry Research Laboratory and Mount Sinai School of Medicine in New York; the effort resulted in the announcement (on Oct. 5, 2005) that the group had successfully determined the virus' genetic sequence, using historic tissue samples recovered by pathologist Johan Hultin from a female flu victim buried in the Alaskan permafrost and samples preserved from American soldiers.

Kobasa et al. (2007) reported that monkeys (*Macaca fascicularis*) infected with the recreated strain exhibited classic symptoms of the 1918 pandemic and died from a cytokine storm—an overreaction of the immune system. This may explain why the 1918 flu had its surprising effect on younger, healthier people, as a person with a stronger immune system would potentially have a stronger overreaction. In December 2008 research by Yoshihiro Kawaoka of University of Wisconsin linked the presence of three specific genes (termed PA, PB1, and PB2) and a nucleoprotein derived from 1918 flu samples to the ability of the flu virus to invade the lungs and cause pneumonia. The combination triggered similar symptoms in animal testing.

The 2009 flu pandemic was a global outbreak of a new strain of H1N1 influenza virus, often referred to as "swine flu." The virus was first detected in April 2009 and contains a combination of genes from swine, avian (bird), and human influenza viruses. The outbreak began in the state of Veracruz, Mexico, with evidence that there had been an ongoing epidemic for months before it was officially recognized as such. The Mexican government closed most of Mexico City's public and private facilities in an attempt to contain the spread of the virus. However the virus continued to spread globally, clinics in some areas were overwhelmed by people infected, and the World Health Organization (WHO) and US Centers for Disease Control (CDC) stopped counting cases and in June declared the outbreak to be a pandemic.

While only mild symptoms are experienced by the majority of people, some have more severe symptoms. Mild symptoms may include fever, sore throat, cough, headache, muscle or joint pains, and nausea, vomiting, or diarrhea. Those at risk of a more severe infection include: asthmatics, diabetics, those with obesity, heart disease, the immunocompromised, children with neurodevelopmental conditions, and pregnant women. In addition, even for persons previously very healthy, a small percentage of patients will develop viral pneumonia or acute respiratory distress syndrome. This syndrome manifests itself as increased breathing difficulty and typically occurs 3-6 days after initial onset of flu symptoms.

Similar to other influenza viruses, pandemic H1N1 is typically contracted by person to person transmission through respiratory droplets. Symptoms usually last 4-6 days. Those with more severe symptoms or those in an at-risk group may benefit from antivirals (oseltamivir or zanamivir). The CDC estimates that, in the United States alone, as of Nov. 14, 2009, there had been 9,820 deaths (range 7,070-13,930) caused by swine flu. Currently, there are almost 15,000 confirmed deaths worldwide.

C. Diagnosis and Treatments

Symptoms of influenza can start quite suddenly one to two days after infection. Usually the first symptoms are chills or a chilly sensation, but fever is also common early in the infection, with body temperatures ranging from 38-39° C. (approximately 100-103° F.). Many people are so ill that they are confined to bed for several days, with aches and pains throughout their bodies, which are worse in their backs and legs. Symptoms of influenza may include:

Body aches, especially joints and throat
   Extreme coldness and fever
   Fatigue
   Headache
   Irritated watering eyes
   Reddened eyes, skin (especially face), mouth, throat and nose
   Abdominal pain (in children with influenza B)

It can be difficult to distinguish between the common cold and influenza in the early stages of these infections, but a flu can be identified by a high fever with a sudden onset and extreme fatigue. Diarrhea is not normally a symptom of influenza in adults, although it has been seen in some human cases of the H5N1 "bird flu" and can be a symptom in children.

Since antiviral drugs are effective in treating influenza if given early, it can be important to identify cases early. Of the symptoms listed above, the combinations of fever with cough, sore throat and/or nasal conjestion can improve diagnostic accuracy. Two decision analysis studies suggest that during local outbreaks of influenza, the prevalence will be over 70%, and thus patients with any of these combinations of symptoms may be treated with neuraminidase inhibitors without testing. Even in the absence of a local outbreak, treatment may be justified in the elderly during the influenza season as long as the prevalence is over 15%.

The available laboratory tests for influenza continue to improve. The United States Centers for Disease Control and Prevention (CDC) maintains an up-to-date summary of available laboratory tests. According to the CDC, rapid diagnostic tests have a sensitivity of 70-75% and specificity of 90-95% when compared with viral culture. These tests may be especially useful during the influenza season (prevalence=25%) but in the absence of a local outbreak, or peri-influenza season (prevalence=10%).

Influenza's effects are generally much more severe and last longer than those of the common cold. Most people will recover in about one to two weeks, but others will develop life-threatening complications (such as pneumonia). Influenza, however, can be deadly, especially for the weak, old or chronically ill. The flu can worsen chronic health problems. People with emphysema, chronic bronchitis or asthma may experience shortness of breath while they have the flu, and influenza may cause worsening of coronary heart disease or congestive heart failure. Smoking is another risk factor associated with more serious disease and increased mortality from influenza.

According to the World Health Organization, "Every winter, tens of millions of people get the flu. Most are only ill and out of work for a week, yet the elderly are at a higher risk of death from the illness. It is known that the worldwide death toll exceeds a few hundred thousand people a year, but even in developed countries the numbers are uncertain, because medical authorities don't usually verify who actually died of influenza and who died of a flu-like illness." Even healthy people can be affected, and serious problems from influenza can happen at any age. People over 50 years old, very young children and people of any age with chronic medical conditions are more likely to get complications from influenza, such as pneumonia, bronchitis, sinus, and ear infections.

Common symptoms of the flu such as fever, headaches, and fatigue come from the huge amounts of proinflammatory cytokines and chemokines (such as interferon or tumor necrosis factor) produced from influenza-infected cells. In contrast to the rhinovirus that causes the common cold, influenza does cause tissue damage, so symptoms are not entirely due to the inflammatory response. This massive immune response can produce a life-threatening cytokine storm. This effect has been proposed to be the cause of the unusual lethality of both the H5N1 avian influenza, and the 1918 pandemic strain (see above).

In some cases, an autoimmune response to an influenza infection may contribute to the development of Guillain-Barré syndrome. However, as many other infections can increase the risk of this disease, influenza may only be an important cause during epidemics. This syndrome can also be a rare side-effect of influenza vaccines, with an incidence of about one case per million vaccinations.

People with the flu are advised to get plenty of rest, drink plenty of liquids, avoid using alcohol and tobacco and, if necessary, take medications such as paracetamol (acetaminophen) to relieve the fever and muscle aches associated with the flu. Children and teenagers with flu symptoms (particularly fever) should avoid taking aspirin during an influenza infection (especially influenza type B), because doing so can lead to Reye's syndrome, a rare but potentially fatal disease of the liver. Since influenza is caused by a virus, antibiotics have no effect on the infection; unless prescribed for secondary infections such as bacterial pneumonia, they may lead to resistant bacteria. Antiviral medication can be effective (see below), but some strains of influenza can show resistance to the standard antiviral drugs.

D. Influenza Virus Immunogens

Influenza hemagglutinin (HA) is an antigenic glycoprotein responsible for binding the virus to the cell that is being infected. There are 16 defined HA antigens. These subtypes are named H1 through H16. The last, H16, was discovered only recently on influenza A viruses isolated from black-headed gulls from Sweden and Norway. The first three hemagglutinins, H1, H2, and H3, are found in human influenza viruses.

HA has two functions. Firstly, it allows the recognition of target vertebrate cells, accomplished through the binding of these cells' sialic acid-containing receptors. Secondly, once bound it facilitates the entry of the viral genome into the target cells by causing the fusion of host endosomal membrane with the viral membrane. HA binds to the monosaccharide sialic acid which is present on the surface of its target cells, which causes the viral particles to stick to the cell's surface. The cell membrane then engulfs the virus and the portion of the membrane that encloses it pinches off to form a new membrane-bound compartment within the cell called an endosome, which contains the engulfed virus. The cell then attempts to begin digesting the contents of the endosome by acidifying its interior and transforming it into a lysosome. However, as soon as the pH within the endosome drops to about 6.0, the original folded structure of the HA molecule becomes unstable, causing it to partially unfold, and releasing a very hydrophobic portion of its peptide chain that was previously hidden within the protein. This so-called "fusion peptide" inserts itself into the endosomal membrane. Then, when the rest of the HA molecule refolds into a new structure (which is more stable at the lower pH), it pulls the endosomal membrane next to the virus particle's own membrane, causing the two to fuse together. Once this has happened, the contents of the virus, including its RNA genome, are free to pour out into the cell's cytoplasm.

HA is a homotrimeric integral membrane glycoprotein. It is shaped like a cylinder and is approximately 13.5 nanometers long. The three identical monomers that constitute HA are constructed into a central α helix coil; three spherical heads contain the sialic acid binding sites. HA monomers are synthesized as precursors that are then glycosylated and cleaved into two smaller polypeptides: the HA1 and HA2 subunits. Each HA monomer consists of a long, helical chain anchored in the membrane by HA2 and topped by a large HA1 globule.

II. IMMUNIZATION AND TREATMENT/PREVENTION OF INFLUENZA A VIRUS INFECTION

A. Formulation and Administration

The present disclosure provides pharmaceutical compositions comprising antigens for generating the same. Such compositions comprise a prophylactically or therapeutically effective amount of an immunogen, and a pharmaceutically acceptable carrier. In a specific embodiment, the term "pharmaceutically acceptable" means approved by a regulatory agency of the Federal or a state government or listed in the U.S. Pharmacopeia or other generally recognized pharmacopeia for use in animals, and more particularly in humans. The term "carrier" refers to a diluent, excipient, or vehicle with which the therapeutic is administered. Such pharmaceutical carriers can be sterile liquids, such as water and oils, including those of petroleum, animal, vegetable or synthetic origin, such as peanut oil, soybean oil, mineral oil, sesame oil and the like. Water is a particular carrier when the pharmaceutical composition is administered intravenously. Saline solutions and aqueous dextrose and glycerol solutions can also be employed as liquid carriers, particularly for injectable solutions. Other suitable pharmaceutical excipients include starch, glucose, lactose, sucrose, gelatin, malt, rice, flour, chalk, silica gel, sodium stearate, glycerol monostearate, talc, sodium chloride, dried skim milk, glycerol, propylene, glycol, water, ethanol and the like.

The composition, if desired, can also contain minor amounts of wetting or emulsifying agents, or pH buffering agents. These compositions can take the form of solutions, suspensions, emulsion, tablets, pills, capsules, powders, sustained-release formulations and the like. Oral formulations can include standard carriers such as pharmaceutical grades of mannitol, lactose, starch, magnesium stearate, sodium saccharine, cellulose, magnesium carbonate, etc. Examples of suitable pharmaceutical agents are described in "Remington's Pharmaceutical Sciences." Such compositions will contain a prophylactically or therapeutically effective amount of the antibody or fragment thereof, preferably in purified form, together with a suitable amount of carrier so as to provide the form for proper administration to the patient. The formulation should suit the mode of administration, which can be oral, intravenous, intraarterial, intrabuccal, intranasal, nebulized, bronchial inhalation, intrarectal, vaginal, topical or delivered by mechanical ventilation.

Active vaccines are also envisioned where antibodies are produced in vivo in a subject at risk of influenza A virus infection. Such vaccines can be formulated for parenteral administration, e.g., formulated for injection via the intradermal, intravenous, intramuscular, subcutaneous, or even intraperitoneal routes. Administration by intradermal and intramuscular routes are contemplated. The vaccine could alternatively be administered by a topical route directly to the mucosa, for example by nasal drops, inhalation, by nebulizer, or via intrarectal or vaginal delivery. Pharmaceutically acceptable salts, include the acid salts and those which are formed with inorganic acids such as, for example, hydrochloric or phosphoric acids, or such organic acids as acetic, oxalic, tartaric, mandelic, and the like. Salts formed with the free carboxyl groups may also be derived from inorganic bases such as, for example, sodium, potassium, ammonium, calcium, or ferric hydroxides, and such organic bases as isopropylamine, trimethylamine, 2-ethylamino ethanol, histidine, procaine, and the like.

Generally, the ingredients of compositions of the disclosure are supplied either separately or mixed together in unit dosage form, for example, as a dry lyophilized powder or water-free concentrate in a hermetically sealed container such as an ampoule or sachette indicating the quantity of active agent. Where the composition is to be administered by infusion, it can be dispensed with an infusion bottle containing sterile pharmaceutical grade water or saline. Where the composition is administered by injection, an ampoule of sterile water for injection or saline can be provided so that the ingredients may be mixed prior to administration.

The compositions of the disclosure can be formulated as neutral or salt forms. Pharmaceutically acceptable salts include those formed with anions such as those derived from hydrochloric, phosphoric, acetic, oxalic, tartaric acids, etc., and those formed with cations such as those derived from sodium, potassium, ammonium, calcium, ferric hydroxides, isopropylamine, triethylamine, 2-ethylamino ethanol, histidine, procaine, etc.

B. ADCC

Antibody-dependent cell-mediated cytotoxicity (ADCC) is an immune mechanism leading to the lysis of antibody-coated target cells by immune effector cells. The target cells are cells to which antibodies or fragments thereof comprising an Fc region specifically bind, generally via the protein part that is N-terminal to the Fc region. By "antibody having increased/reduced antibody dependent cell-mediated cytotoxicity (ADCC)" is meant an antibody having increased/reduced ADCC as determined by any suitable method known to those of ordinary skill in the art.

As used herein, the term "increased/reduced ADCC" is defined as either an increase/reduction in the number of target cells that are lysed in a given time, at a given concentration of antibody in the medium surrounding the target cells, by the mechanism of ADCC defined above, and/or a reduction/increase in the concentration of antibody, in the medium surrounding the target cells, required to achieve the lysis of a given number of target cells in a given time, by the mechanism of ADCC. The increase/reduction in ADCC is relative to the ADCC mediated by the same antibody produced by the same type of host cells, using the same standard production, purification, formulation and storage methods (which are known to those skilled in the art), but that has not been engineered. For example the increase in ADCC mediated by an antibody produced by host cells engineered to have an altered pattern of glycosylation (e.g., to express the glycosyltransferase, GnTIII, or other glycosyltransferases) by the methods described herein, is relative to the ADCC mediated by the same antibody produced by the same type of non-engineered host cells.

C. CDC

Complement-dependent cytotoxicity (CDC) is a function of the complement system. It is the processes in the immune system that kill pathogens by damaging their membranes without the involvement of antibodies or cells of the immune system. There are three main processes. All three insert one or more membrane attack complexes (MAC) into the pathogen which cause lethal colloid-osmotic swelling, i.e., CDC. It is one of the mechanisms by which antibodies or antibody fragments have an anti-viral effect.

D. Peptide Vaccines

As used herein, an "antigenic composition" comprises a influenza virus peptide antigen, such as those described in the examples and figures. Of particular interest here are peptides/immunogens from the HA head mini-domains, and conserved epitopes therein. An immunogen according to the present disclosure will contain both the 90-loop domain and the 220-loop domain of HA and can recapitulate the structure of the epitope defined by Flu-A20 antibody. The 220-loop of the receptor-binding domain (residues 217-224, and residue 229, H3 structure numbering) exhibits 6 hydrogen bonds (H-bond) or salt bridges between the 220-loop and the HCDRs. This regions is highly conserved with residue R229 forming a salt bridge, hydrogen bond contacts with the main-chain amide and carbonyl groups of HA residue 222 (K for H1 and H5, W for H3), hydrogen bond with the main-chain amide of HA residue 224, a hydrophobic interaction between mAb H5.31 residue L100 and the 220-loop residue V223, and cation-n interaction between 220-loop R220. The 90-loop epitope is defined by antibodies contacting a hydrophobic pocket formed by HA residues L96, F102, and Y105, and its main chain nitrogen forms a H-bond with the HA G100 mainchain oxygen a polar interaction between the HA D95 residue sidechain and the HCDR3 and salt bridge between D101 (HA) and antibody.

In particular embodiments, the antigenic composition comprises or encodes one or more peptides comprising one or more sequences shown in SEQ ID NO:1, SEQ ID NO:2, SEQ ID NO:3, SEQ ID NO:4, SEQ ID NO:5, SEQ ID NO:6, SEQ ID NO:7, SEQ ID NO:8, SEQ ID NO:9, SEQ ID NO:10, SEQ ID NO:11, SEQ ID NO:12, SEQ ID NO:13, SEQ ID NO:14, SEQ ID NO:15, SEQ ID NO:16, SEQ ID NO:17, SEQ ID NO:18, SEQ ID NO:19, SEQ ID NO:20, SEQ ID NO:21, SEQ ID NO:22, SEQ ID NO:23, SEQ ID NO:24, SEQ ID NO:25, SEQ ID NO:26, SEQ ID NO:27, SEQ ID NO:28, SEQ ID NO:29, SEQ ID NO:30, SEQ ID NO:31 and SEQ ID NO:32 or an immunologically functional equivalent thereof.

As used herein, an "amino acid" or "amino acid residue" refers to any naturally-occurring amino acid, any amino acid derivative or any amino acid mimic known in the art, including modified or unusual amino acids. In certain embodiments, the natural residues of the peptide are sequential, without any non-amino acid interrupting the sequence of natural amino acid residues. In other embodiments, the sequence may comprise one or more non-natural amino acid moieties.

The term "peptide" is used interchangeably with "oligopeptide" in the present specification to designate a series of residues, typically L-amino acids, connected one to the other, typically by peptide bonds between the α-amino and carboxyl groups of adjacent amino acids. Particular oligopeptides of the disclosure are 15 residues or less in length and usually consist of between about 8 and about 13 residues, particularly 9 to 11 residues. Specific lengths of 9, 10, 11, 12, 13, 14 and 15 residues are contemplated.

As used herein, the term "biocompatible" refers to a substance which produces no significant untoward effects when applied to, or administered to, a given organism according to the methods and amounts described herein. Such untoward or undesirable effects are those such as significant toxicity or adverse immunological reactions. In particular embodiments, biocompatible protein, polypeptide or peptide containing compositions will generally be mammalian proteins or peptides or synthetic proteins or peptides each essentially free from toxins, pathogens and harmful immunogens.

1. Variants

The present disclosure also contemplates modification of the peptides shown in Table 1. Such peptide "variants" may include additional residues, such as additional N- or C-terminal amino acids, or altered/substituted/modified amino acids, and yet still comprise one of the sequences disclosed herein, so long as the sequence meets the criteria set forth above, including the maintenance of biological activity.

The following is a discussion based upon changing the amino acids of a peptide to create a variant peptide. In making such changes, the hydropathic index of amino acids may be considered. The importance of the hydropathic amino acid index in conferring interactive biologic function on a protein is generally understood in the art (Kyte & Doolittle, 1982). It is accepted that the relative hydropathic character of the amino acid contributes to the secondary structure of the resultant protein, which in turn defines the interaction of the protein with other molecules, for example, enzymes, substrates, receptors, DNA, antibodies, antigens, and the like.

It also is understood in the art that the substitution of like amino acids can be made effectively on the basis of hydrophilicity. U.S. Pat. No. 4,554,101, incorporated herein by reference, states that the greatest local average hydrophilicity of a protein, as governed by the hydrophilicity of its adjacent amino acids, correlates with a biological property of the protein. As detailed in U.S. Pat. No. 4,554,101, the following hydrophilicity values have been assigned to amino acid residues: basic amino acids: arginine (+3.0), lysine (+3.0), and histidine (−0.5); acidic amino acids: aspartate (+3.0±1), glutamate (+3.0±1), asparagine (+0.2), and glutamine (+0.2); hydrophilic, nonionic amino acids: serine (+0.3), asparagine (+0.2), glutamine (+0.2), and threonine (−0.4), sulfur containing amino acids: cysteine (−1.0) and methionine (−1.3); hydrophobic, nonaromatic amino acids: valine (−1.5), leucine (−1.8), isoleucine (−1.8), proline (−0.5±1), alanine (−0.5), and glycine (0); hydrophobic, aromatic amino acids: tryptophan (−3.4), phenylalanine (−2.5), and tyrosine (−2.3).

It is understood that an amino acid can be substituted for another having a similar hydrophilicity and produce a biologically or immunologically modified protein. In such changes, the substitution of amino acids whose hydrophilicity values are within ±2 is preferred, those that are within ±1 are particularly preferred, and those within ±0.5 are even more particularly preferred.

As outlined above, amino acid substitutions generally are based on the relative similarity of the amino acid side-chain substituents, for example, their hydrophobicity, hydrophilicity, charge, size, and the like. Exemplary substitutions that take into consideration the various foregoing characteristics are well known to those of skill in the art and include: arginine and lysine; glutamate and aspartate; serine and threonine; glutamine and asparagine; and valine, leucine and isoleucine.

A specialized kind of insertional variant is the fusion protein. This molecule generally has all or a substantial portion of the native molecule, linked at the N- or C-terminus, to all or a portion of a second peptide or polypeptide. In particular, embodiments where multiple peptides of the present disclosure (SEQ ID NOS:1-30) are linked in a "head-to-tail" fashion to create a polytope molecule, i.e., an epitope multimer. The peptides may be linked to each directly though peptide bonds, or they may be separated by peptide "spacers," or they may be attached using non-peptide or peptoid "linker," which are well known in the art. In addition, inclusion of a cleavage site at or near the fusion junction or linker will facilitate removal or release of other peptide sequences. Other useful fusions include linking of functional domains, such as active sites from enzymes such as a hydrolase, glycosylation domains, cellular targeting signals or transmembrane regions.

2. Peptide Synthesis and Purification

The peptides of the present disclosure can be synthesized in solution or on a solid support in accordance with conventional techniques. Various automatic synthesizers are commercially available and can be used in accordance with known protocols. See, for example, Stewart & Young (1984); Tam et al. (1983); Merrifield (1986); and Barany & Merrifield (1979), Houghten et al. (1985). In some embodiments, peptide synthesis is contemplated by using automated peptide synthesis machines, such as those available from Applied Biosystems (Foster City, CA). The peptides of the present disclosure may be isolated and extensively dialyzed to remove undesired small molecular weight molecules and/or lyophilized for more ready formulation into a desired vehicle.

In certain embodiments the peptides of the present disclosure may be purified. The term "purified peptide" as used herein, is intended to refer to a composition, isolatable from other components, wherein the protein or peptide is purified to any degree relative to its naturally-obtainable state. A purified protein or peptide therefore also refers to a protein or peptide, free from the environment in which it may naturally occur.

Generally, "purified" will refer to a peptide composition that has been subjected to fractionation to remove various other components, and which composition substantially retains its expressed biological activity. Where the term "substantially purified" is used, this designation will refer to a composition in which the protein or peptide forms the major component of the composition, such as constituting about 50%, about 60%, about 70%, about 80%, about 90%, about 95% or more of the proteins in the composition.

Protein/peptide purification techniques are well known to those of skill in the art. These techniques involve, at one level, the crude fractionation of the cellular milieu to polypeptide and non-polypeptide fractions. Having separated the polypeptide from other proteins, the polypeptide of interest may be further purified using chromatographic and electrophoretic techniques to achieve partial or complete purification (or purification to homogeneity). Analytical methods particularly suited to the preparation of a pure peptide are ion-exchange chromatography, exclusion chromatography; polyacrylamide gel electrophoresis; isoelectric focusing. Other methods for protein purification include, precipitation with ammonium sulfate, PEG, antibodies and the like or by heat denaturation, followed by centrifugation; gel filtration, reverse phase, hydroxylapatite and affinity chromatography; and combinations of such and other techniques.

In purifying an HLA-restricted peptide of the present disclosure, it may be desirable to express the polypeptide in a prokaryotic or eukaryotic expression system and extract the protein using denaturing conditions. The polypeptide may be purified from other cellular components using an affinity column, which binds to a tagged portion of the polypeptide. Although this preparation will be purified in an inactive form, the denatured material will still be capable of transducing cells. Once inside of the target cell or tissue, it is generally accepted that the polypeptide will regain full biological activity.

As is generally known in the art, it is believed that the order of conducting the various purification steps may be changed, or that certain steps may be omitted, and still result in a suitable method for the preparation of a substantially purified protein or peptide.

Various methods for quantifying the degree of purification of the protein or peptide will be known to those of skill in the art in light of the present disclosure. These include, for example, determining the specific activity of an active fraction, or assessing the amount of polypeptides within a fraction by SDS/PAGE analysis. Another method for assessing the purity of a fraction is to calculate the specific activity of the fraction, to compare it to the specific activity of the initial extract, and to thus calculate the degree of purity, herein assessed by a "-fold purification number." The actual units used to represent the amount of activity will, of course, be dependent upon the particular assay technique chosen to follow the purification and whether or not the expressed protein or peptide exhibits a detectable activity.

It is known that the migration of a polypeptide can vary, sometimes significantly, with different conditions of SDS/PAGE (Capaldi et al., 1977). It will therefore be appreciated that under differing electrophoresis conditions, the apparent molecular weights of purified or partially purified expression products may vary.

E. Kits

In still further embodiments, the present disclosure concerns kits for use in the administration of a vaccine against influenza A virus where influenza A virus antigens or fragments thereof may be included in the kit.

The kits may further comprise a suitably aliquoted composition of the influenza A virus antigens or fragments thereof. These may optionally be labeled or unlabeled, as may be used to prepare a standard curve for a detection assay. The kits may comprise vaccines, such as in lyophilized form with appropriate diluents or excipients with which the vaccine may be mixed prior to administration. The components of the kits may be packaged either in aqueous media or in lyophilized form.

The container means of the kits will generally include at least one vial, test tube, flask, bottle, syringe or other container means, into which the immunogen may be placed, or preferably, suitably aliquoted. The kits of the present disclosure will also typically include a means for containing the immunogen and any other reagent containers in close confinement for commercial sale. Such containers may include injection or blow-molded plastic containers into which the desired vials are retained.

III. EXAMPLES

The following examples are included to demonstrate preferred embodiments. It should be appreciated by those of skill in the art that the techniques disclosed in the examples that follow represent techniques discovered by the inventor to function well in the practice of embodiments, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the disclosure.

Example 1—Materials and Methods (for Examples 1 and 2)

Expression of soluble HA proteins. Sequences encoding the HA genes of interest were optimized for mammalian cell expression, and cDNAs were synthesized (Genscript) as soluble trimeric constructs as described previously (Bangaru et al., 2016). HA protein was expressed by transient transfection of 293F cells with polyethylenimine (PEI) transfection reagent and grown in expression medium (Freestyle 293 Expression Medium; Invitrogen, 12338). Cell supernatants were harvested after 7 days, filtered sterilized with a 0.4 μm filter and recombinant protein purified with HisTrap TALON FF crude columns (GE Healthcare Life Sciences).

PBMC isolation and hybridoma generation. The study was approved by the Vanderbilt University Medical Center Institutional Review Board. Peripheral blood was collected from a healthy donor with prior history of many seasonal influenza vaccinations experimental H5N1 subunit vaccinations after written informed consent. PBMCs from the donor were isolated by density gradient separation on Ficoll, cryopreserved and stored in the vapor phase of liquid nitrogen until use. Generation of human hybridoma cell lines secreting human mAbs was performed as described previously (Smith et al., 2012). Briefly, human B cells in the PBMC suspension were immortalized by transformation with EBV in the presence of CpG10103, cyclosporin A, and a Chk2 inhibitor and plated in 384-well culture plates. On day 8, the supernatants from transformed B cells were used to screen for the presence of heterosubtypic antibodies that bound broadly to HA antigens from H1, H3, H7 or H9 subtypes using a capture ELISA. The recombinant HA antigens used for screening were based on the sequence of HAs from the following influenza strains: H1 A/California/04/2009, H1 A/Texas/36/1991, H3 A/Hong Kong/1/1968, H3 A/Victoria/3/1975, H7 A/Shanghai/2/2013, H7 A/Netherlands/219/2003 or H9 A/Hong Kong/1073/99. Cells from the wells containing B cells secreting heterosubtypic HA-reactive antibodies were fused with HMMA2.5 myeloma cells using a BTX ECM 2001 electro cell manipulator. After fusion, human hybridomas were selected in medium with HAT solution containing ouabain. The hybridomas were cloned by flow cytometric sorting of single cells into 384-well plates and then expanded in culture. Particular clones for downstream studies were selected by choosing the clone for each independently derived hybridoma line that exhibited the highest level of IgG secretion.

Production of IgG for mAb FluA-20 from hybridoma cells. The selected cloned cell line secreting mAb FluA-20 was grown initially in hybridoma growth medium (Clona-Cell-HY medium E from STEMCELL Technologies, 03805) and then switched to serum-free medium (GIBCO Hybridoma-SFM, Invitrogen, 12045084) for antibody expression and purification. IgG from the hybridoma cell line supernatants was purified by affinity chromatography using protein G columns (GE Life Sciences, Protein G HP Columns). Purified FluA-20 IgG generated from hybridomas was used for all $EC_{50}$ and $IC_{50}$ studies, competition-binding studies, HDX-MS studies, and ADCC assays and mouse studies.

Next-generation DNA sequence analysis of expressed antibody variable genes. Total RNA was extracted from 10 million PBMCs. A one-step RT-PCR was performed for 25 cycles using heavy-chain BIOMED-2 variable antibody gene-specific primers as previously described (Bangaru et al., 2016; Thornburg et al., 2016) (Van Dongen et al., 2003) and the OneStep SuperScript III with Platinum® Taq High Fidelity kit (Invitrogen, 11304011). The Illumina-specific adapters were added using the Illumina TruSeq Library Preparation Kit (Illumina, FC-121-3001) according to the manufacturer's recommendations. The final amplicon libraries were sequenced on an Illumina MiSeq instrument using the MiSeq PE-300 v3 reagent kit (Illumina, MS-102-3001). Sequence analysis was performed using IG-BLAST v1.4, and results were parsed to MongoDB for further study.

Identifying clonally related sequences. From a database of annotated antibody sequences obtained from this donor, the inventors queried HCDR3s in sequences encoded by both of the inferred germline genes for FluA-20 ($V_H$4-61 and $J_H$4). These HCDR3 sequences were pairwise aligned to the HCDR3 of FluA-20 using a PAM30 matrix, with penalties for gap opening and gap extension of −14 and −3, respectively. HCDR3 sequences with a Hamming distance of ≤3 to FluA-20 were selected as siblings and the 'full length' nucleotide and amino acid sequence was queried from the inventors' database for further analysis.

Visualizing clonally related sequences. A network graph was built from the aligned, full-length sequences queried as described above. Identical sequences were clustered into single nodes, and edges were drawn between two nodes if their Hamming distance was the lowest compared to all other nodes. Nodes denoting the inferred common ancestor and the germline $V_H$4-61/$J_H$4 sequence were added manually. This network was visualized using Cytoscape and manually adjusted for visual clarity (to prevent nodes from overlapping edges to which they are not connected, and to shorten distances between nodes that are closely related).

Characterization of antibody isotype, subclass, and variable genes. The isotype and subclass of secreted antibodies were determined by ELISA. Antibody heavy and light chain variable region genes were sequenced from antigen-specific hybridoma lines that had been cloned biologically using flow cytometric single cell sorting. Briefly, total RNA was extracted using the RNeasy Mini kit (Qiagen, 74106) and reverse-transcriptase PCR (RT-PCR) amplification of the antibody gene cDNAs was performed using the PrimeScript One Step RT-PCR kit (Clontech, RR055A) according to the manufacturer's protocols with gene-specific primers as previously described (Thornburg et al., 2016). PCR products were purified using Agencourt AMPure XP magnetic beads (Beckman Coulter) and sequenced directly using an ABI3700 automated DNA sequencer without cloning. The identities of gene segments and mutations from germlines were determined by alignment using ImMunoGeneTics database (Brochet et al., 2008; Giudicelli and Lefranc, 2011).

Determination of half maximal effective concentration ($EC_{50}$) for binding. To determine $EC_{50}$ concentrations for binding, the inventors performed ELISA using 384-well plates that were coated overnight at 2 μg/mL with the recombinant HA protein of interest. The plates then were blocked with 50 μL of 5% non-fat dry milk, 2% goat serum and 0.1% Tween-20 in PBS for 1 h at RT. The plates were washed and three-fold dilutions of the mAb starting from 10 μg/mL were added to the wells and incubated for an hour. The plates were washed and 25 μL of 1:4,000 dilution of anti-human IgG alkaline phosphatase conjugate (Meridian Life Science, W99008A) was added. After a final wash, 25 μL of phosphatase substrate solution (1 mg/mL p-nitrophenol phosphate in 1 M Tris aminomethane) was added to the plates, incubated for 20 minutes and the optical density values were measured at 405 nm wavelength on a BioTek plate reader. The plates were washed 3 times between each step with PBS containing 0.1% Tween-20. Each dilution was performed in quadruplicate, and the $EC_{50}$ values were calculated in Prism software (GraphPad) using non-linear regression analysis. The experiment was conducted twice independently.

Prophylaxis studies with sub-lethal challenge and therapeutic studies with lethal challenge in mice. Female BALB/c mice aged 6-8 weeks were obtained from Charles River Laboratories, Wilmington, MA, and housed under specified pathogen-free conditions with food and water ad libitum. For the prophylaxis studies, experimental groups of 8 mice were given i.p. with 10 mg/kg of either FluA-20 or a similarly prepared control human antibody to an unrelated target (a mAb to methicillin-resistant *Staphylococcus aureus*; MRSA). They were challenged 24 hours later with a sublethal dose (0.1 $LD_{50}$) of either H1N1 A/Netherlands/602/2009 or H3N2 A/X-31 (6:2 PR8 backbone) or H5N1 A/barn swallow/Hong Kong/D10-1161/2010 (7:1 PR8 backbone) or H7N9 A/Shanghai/1/2013 (6:2 PR8 backbone). Challenge under mild ketamine/xylazine anesthesia was by intranasal administration of 50 µl virus preparation diluted in PBS. Body weight change after virus challenge was used to assess protection. Mice (n=5) were weighed every day for 14 days post-challenge. The significance in weight loss between FluA-20 and the control group was calculated for each day using 2-way ANOVA with Tukey's multiple comparisons test and displayed on the graph as *($P<0.05$), ($P<0.01$) and *($P<0.001$)

For the treatment studies, experimental groups of five mice were challenged with 1.2 $LD_{50}$ of H3N2, H5N1 or H7N9 viruses on PR8 backbone—a dose that resulted in 40 to 100% lethality in mock-treated animals. Mice were given 10 mg/kg of FluA20 or irrelevant antibody (MRSA) via the intraperitoneal route on days 1, 2 and 4 post-inoculation. Mice were monitored daily for body weight change and survival for 14 days after challenge. Mice that had lost >25% of their initial body weight were humanely euthanized. Survival curves were estimated using the Kaplan Meier method and curves compared using the two-sided log rank test with subjects right censored, if they survived until the end of the study. *—$p<0.05$; $p<0.01$; ***=$p<0.001$; ns—non-significant. Statistical analyses were performed using Prism v7.2 (GraphPad).

All infections were conducted under BSL-2⁺ containment and were authorized by the Institutional Ethics Committee on Experimental Animals at Icahn School of Medicine at Mount Sinai. For pulmonary titers, mice from each group (n=3) were killed at 6 days (prophylaxis) or 5 days (therapy) post-inoculation and lungs were removed aseptically, snap frozen on dry ice and stored at $-80°$ C. until titration. Lungs were homogenized in 1 ml PBS using a Fastprep 24 homogenizer (MP Biomedicals). The homogenates were centrifuged (5 min, 16,100×g, 4° C.) to remove cellular debris and used for virus titration by plaque assay. Then, 200 µL of ten-fold dilutions of homogenized lungs in PBS were used for infecting confluent monolayers of MDCK cells. Virus was allowed to attach to MDCK cells for 1 h at 37° C. Cells were washed once with warm PBS and overlaid with oxoid agar (Oxoid Ltd., Basingstoke, Hampshire) prepared using $NaHCO_3$-buffered serum-free 2×MEM/BA containing DEAE Dextran and supplemented with TPCK-treated trypsin (1 µg/mL). Endpoint virus titers were determined by visualizing virus plaques 2 days after infection by staining with H1N1 post challenge serum (1/1,000 dilution), horseradish peroxidase-conjugated sheep-derived anti-mouse serum (GE Healthcare UK, NA-931) and TrueBlue substrate (KPL-Seracare, 5510-0031).

Prophylaxis studies with lethal challenge and therapeutic with sublethal challenge mouse model for influenza A H1N1 infection. For prophylaxis studies against lethal H1N1 challenge, groups of ten 6-8 months old DBA/2J mice (The Jackson Laboratory) were treated with 10 mg/kg of either rFluA-20 IgG or positive control (CR6261) IgG or unrelated target control (MRSA-147) IgG 24-hours prior to being intra-nasally challenged with a lethal dose of 1,076 focus forming units (FFU) of H1N1 A/California/07/2009. Mice were monitored for survival for 20 days after challenge. Moribund mice (little mobility), or mice that had lost >30% of their initial body weight (IACUC stipulated humane endpoint) were euthanized. Survival curves were estimated using the Kaplan Meier method and curves compared using the two-sided log rank test with subjects right censored, if they survived until the end of the study.

For therapeutic studies against sub-lethal H1N1 challenge, groups of ten BALB/c mice were challenged with a sublethal dose of $6.4 \times 10^4$ FFU and were given 10 mg/kg of FluA20 IgG or CR6261 IgG or MRSA-147 IgG via the intraperitoneal route on day 1 post-inoculation. Mice were monitored for 14 days for weight change kinetics. Weight change curves were compared using 2-way Anova with Tukey's multiple comparisons test.

FluA-20 prophylaxis dose-optimization against mouse-adapted influenza A H1N1 lethal challenge. Experimental groups of 10 female BALB/c mice obtained from Charles River Laboratories (Wilmington, MA) were administered either 1, 3 or 10 mg/kg of FluA-20 IgG or 10 mg/kg of unrelated target control (mAb 2D22 specific for dengue virus envelope protein) IgG or 0.1 mL PBS by IP injection. At 24 h after mAb treatment, the mice were anesthetized by IP injection of ketamine/xylazine (50/5 mg/kg) followed by intranasal exposure to a 90 µL suspension of approximately 2,200 50% cell culture infectious dose ($CCID_{50}$/mL) of mouse-adapted influenza H1N1 A/California/04/2009 virus that was kindly provided by Dr. Elena Govorkova (St. Jude Children's Research Hospital, Memphis, TN). Mice in a control group of 10 animals were treated with osteltamivir that was given by IP twice daily (bid) for 5 days, starting at 1 h post-infection. The animals were observed for 21 days and survival was based on body weight-loss cutoffs of <30% of initial weight. Survival curves were compared by the Mantel-Cox log-rank test. Mean day of death (MDD) comparisons were made by one-way ANOVA with Dunnett's multiple comparisons test. Differences in the number of survivors between mAb-treated and placebo groups were analyzed by the Fisher's exact (two-tailed) test. Calculations were made using Prism 8.0 (GraphPad Software, San Diego, CA). This study was conducted in the AAALAC-accredited laboratory animal research center of Utah State University in accordance with the approval of the institutional animal care and use committee of Utah State University.

Competition-binding groups. Biolayer interferometry on an Octet Red instrument (FortéBio) was used to perform competition-binding assays as described. Briefly, the inventors loaded the HA from H1 A/California/04/2009 onto Ni-NTA tips at a concentration of 20 µg/mL, and then tested binding of two successively applied mAbs at 50 µg/mL. All antigen and antibody dilutions were made in 1× kinetic buffer (FortéBio, 18-5032). The antibodies were defined as competing antibodies if the first antibody reduced binding of the second antibody by more than 70 percent. The antibodies were defined as non-competing antibodies if the first antibody reduced binding of the second antibody by less than 30 percent.

Fab and IgG cloning, expression and purification for binding kinetic assay and X-ray crystal structure determination. FluA-20 Fab and IgG were expressed in 293F mammalian cells for determination of the binding kinetics and structures as previously described (Garces et al., 2015; Irimia et al., 2016). The heavy and light chains of the Fab were cloned independently into the phCMV3 vector and fused with the N-terminal IgK secretion signal peptide. A His6 tag was added to the C-terminus of the Fab heavy chain. Recombinant DNAs for both heavy and light chains were purified separately and co-transfected into 293F cells. The cells were cultured for 6-7 days at 37° C., while shaking at 125 r.p.m. Secreted Fabs were purified Ni-NTA Superflow (Qiagen), monoS chromatography (GE Healthcare).

To generate IgG for a given antibody, the DNA fragment of the $V_H$ domain was fused with the DNA fragment of heavy chain Fc domain of human IgG1 via PCR. The full-length gene was cloned into the phCMV3 vector with the N-terminal IgK secretion signal peptide. IgG was expressed in 293F cells, as above, and purified by Protein G and monoS chromatography (GE Healthcare) and gel filtration.

Preparation of HA head domains. In brief, DNA fragments for the head domains (residues 52-263 of H1 HA (A/Solomon Islands/3/2006) and residue 43-306 of H3 HA (A/Hong Kong/1/1968)) were amplified separately with PCR reaction. The head domain DNA fragments were individually cloned into the pFastBac vector with an N-terminal gp67 secretion signal peptide and a C-terminal $His_6$ tag. Recombinant bacmid DNA was generated via the Bac-to-Bac system (Invitrogen) and baculoviruses were generated by transfecting purified bacmid DNA in to Sf9 cells. HA head domains were expressed by infecting the High Five cells with the recombinant virus, shaking at 110 r.p.m. for 72 h at 28° C. The secreted head domain protein was purified from the supernatant via Ni-NTA Superflow (Qiagen) and gel filtration on a Superdex75 column (GE Healthcare) in 20 mM Tris-HCl pH 8.0, 150 mM NaCl.

$K_D$ determination by bio-layer interferometry. An Octet RED instrument (FortéBio, Inc.) was used to determine $K_D$ of the antibody-antigen interactions by bio-layer interferometry. The association and dissociation curves were processed using the Prism GraphPad. To examine the binding of FluA-20 or the UCA Fab to different HAs, biotinylated HA molecules were diluted to 10-50 µg/mL in PBS pH 7.4, 0.01% BSA and 0.002% Tween 20. HAs were immobilized onto streptavidin-coated biosensors (FortéBio, Inc.) and incubated with FluA-20 or the UCA Fabs at highest concentration of 1 µM and with 2-fold dilution. The signals for each binding events were measured in real-time and $K_d$ values determined by fitting to a 1:1 binding model.

Structure determination of FluA-20 Fab and complexes of FluA-20 with HA head domains. All complex samples were concentrated to 8-10 mg/mL for crystallization screening on a high-throughput robotic Rigaku CrystalMation system at TSRI using sitting-drop vapor diffusion. The conditions of crystals for x-ray data collection are as follows: Apo FluA-20 Fab (20° C.; 0.2 M tri-sodium citrate, 20% (w/v) PEG3350, cryo-protected by addition of 15% glycerol); FluA-20_H1 head domain (20° C.; 0.1 M phosphate-citrate, pH 4.2, 40% (v/v) PEG300; No additional cryo-protection); FluA-20_H3 head domain (4° C.; 0.1 M Tris-HCl pH 8.5, 0.2 M lithium sulfate, 40% (v/v) PEG400; no additional cryo-protection). X-ray diffraction data were collected at multiple beamlines (Tables S3-4). The diffraction data were processed with HKL2000 and the structure was determined by molecular replacement in Phaser (McCoy et al., 2007). The initial models for FluA-20 were adapted from PDB 4KMT for the light chain and PDB 5BV7 for the heavy chain. The structures for H1 and H3 head domains were adapted from PDB models 4YJZ and 4FP8. Refinement was carried out in Refmac (Skubak et al., 2004), Phenix (Adams et al., 2010), model rebuilding was performed manually in Coot (Emsley and Cowtan, 2004), and the model was validated by MolProbity (Chen et al., 2010).

Structural analysis. Interaction and interface analysis is carried out on online server PDBePISA at www.ebi.ac.uk/pdbe/pisa/. Structure figures were generated by MacPyMol (DeLano Scientific LLC).

Peptide fragmentation and deuterium exchange mass spectrometry. To maximize peptide probe coverage, the optimized quench condition was determined prior to deuteration studies (Hsu et al., 2009; Li et al., 2011). In short, the HA head domain was diluted with buffer of 8.3 mM Tris, 150 mM NaCl, in $H_2O$, pH 7.15) at 0° C. and then quenched with 0.8% formic acid (v/v) containing various concentration of GuHCl (0.8-6.4 M) and Tris(2-carboxyethyl)phosphine (TCEP) (0.1 or 1.0 M). After incubating on ice for 5 min, the quenched samples were diluted 4-fold with 0.8% formic acid (v/v) containing 16.6% (v/v) glycerol and then were frozen at −80° C. until they were transferred to the cryogenic autosampler. Using the quench buffer of 6.4 M GuHCl, 1.0 M TCEP in 0.8% formic acid gave an optimal peptide coverage map.

The samples later were thawed automatically on ice and then immediately passed over an AL-20-pepsin column (16 µL bed volume, 30 mg/mL porcine pepsin (Sigma)). The resulting peptides were collected on a C18 trap and separated using a C18 reversed phase column (Vydac) running a linear gradient of 0.046% (v/v) trifluoroacetic acid, 6.4% (v/v) acetonitrile to 0.03% (v/v) trifluoroacetic acid, 38.4% (v/v) acetonitrile over 30 min with column effluent directed into an Orbitrap Elite mass spectrometer (Thermo-Fisher Scientific). Data were acquired in both data-dependent MS:MS mode and MS1 profile mode. Proteome Discoverer software (Thermo Finnigan Inc.) was used to identify the sequence of the peptide ions. DXMS Explorer (Sierra Analytics Inc., Modesto, CA) was used for the analysis of the mass spectra as described previously (Hamuro et al., 2004). FluA-20 mAb bound HAs were prepared by mixing FluA-20 mAb with monomeric H5 A/Vietnam/03/2204 HA head domain at a 1:1.1 stoichiometric ratio. The mixtures were incubated at 25° C. for 30 min. All functionally deuterated samples, with the exception of the equilibrium-deuterated control, and buffers were pre-chilled on ice and prepared in the cold room.

Functional deuterium-hydrogen exchange reaction was initiated by diluting free HA or antibody-bound HA stock solution with $D_2O$ buffer (8.3 mM Tris, 150 mM NaCl, in $D_2O$, pDREAD 7.15) at a 1:2 vol/vol ratio. At 10 sec, 100 sec and 1,000 sec, the quench solution was added to the respective samples, and then samples were frozen at −80° C. In addition, nondeuterated samples, equilibrium-deuterated back-exchange control samples were prepared as previously described (Hsu et al., 2009; Li et al., 2011; Lu et al., 2012). The centroids of the isotopic envelopes of nondeuterated, functionally deuterated, and fully deuterated peptides were measured using DXMS Explorer, and then converted to corresponding deuteration levels with corrections for back-exchange (Zhang and Smith, 1993).

Conservation analysis of the FluA-20 binding epitope. Libraries for full-length and non-redundant human influenza H1 and H3 sequences were downloaded in January, 2017 from the Influenza Virus Resource at the NCBI database (Bao et al., 2008). The H1 library includes 11,267 sequences and the H3 library includes 12,584 sequences. The HA sequence alignment was performed by MUSCLE (Edgar, 2004) and analyzed using EMBOSS program (Rice et al., 2000) and custom shell scripts based on SEQCONV+ (Roth Lab, UC Davis).

Conservation analysis of the overall HA surface. A library of HA sequences that were recently isolated from human hosts since 2015 was used for surface conservation analysis, including 701 H1 sequences, 1,739 H3 sequences, and 17 other sequences of H5, H7 and H9 subtypes. The sequences were aligned with MUSCLE (Edgar, 2004) software and the conservation scores for each residue were analysis with ConSurf server (Ashkenazy et al., 2016; Celniker et al., 2013) and displayed on an H3 HA model (PDB 4O5N).

Comparison of FluA-20 binding to HA0 and cleaved HA trimer by Biolayer interferometry (BLI). Baculovirus-expressed HA0 was prepared for the binding studies by cloning the HA ectodomain genes into the pFastBac vector with an N-terminal gp67 secretion signal peptide and a C-terminal BirA biotinylation site, thrombin cleavage site, foldon trimerization domain, and $His_6$ tag. HA0 was expressed in High five cells and the secreted HA0 purified from the supernatant via Ni-NTA Superflow (Qiagen) and gel filtration. The HA0 trimer fractions were concentrated for BLI assays. To prepare cleaved HA trimer, the HA0 trimer was incubated with trypsin at 4° C. overnight (mass ratio of trypsin:HA0≈1:1,000). The HA cleavage was determined by SDS-PAGE electrophoresis with reducing agent. The cleaved HA was purified by gel filtration and the HA trimer concentrated for BLI assay. To evaluate antibody binding, Fabs of FluA-20 and RBS-antibodies 5J8 for H1 binding (Hong et al., 2013) and H7.137 for H7 binding (Thornburg et al., 2016) were firstly immobilized onto anti-human CH1 biosensors (FortéBio, Inc.) in the BLI buffer of PBS pH 7.4, 0.01% BSA and 0.002% Tween 20. The Fab-coated sensors were then incubated with corresponding HA0 and cleaved HA at 1 µM concentration for 120 s to evaluate the association, and then incubated with BLI buffer for 120 s to evaluate the dissociation.

Site-directed mutagenesis of genes encoding HA or antibody proteins. Primers for site-directed mutagenesis were designed using the Agilent QuikChange Primer Design program (Agilent Technologies). The Quickchange Lightning Multi-Site Mutagenesis kit (Agilent, 210515-5) was used to introduce mutations into cDNAs encoding the antibody heavy chain genes or HA genes. The plasmids encoding mutants of FluA-20 heavy or light chains were transfected with the corresponding unmutated FluA-20 light or heavy chains, respectively. Antibodies encoded by cDNA with engineered mutations were purified and tested for binding to HA in ELISA, and the $EC_{50}$ values for binding were determined using Prism software (GraphPad).

Influenza viruses. The virus stocks were made from the supernatant of virus-infected MDCK cell culture monolayers in plain Dulbecco's Modified Eagle Medium (Gibco DMEM, Invitrogen, 11965) with 2 µg/mL of TPCK-trypsin. To obtain virus with uncleaved HA0 on the surface, the stocks were made by inoculating MDCK cells with virus for 1 hr. The cells were washed thoroughly and replenished with plain DMEM without TPCK-trypsin. The supernatant containing the virus was harvested at 48 hours post inoculation.

Hemagglutinin inhibition (HAI) and microneutralization assays. Neutralization potential of FluA-20 was determined by microneutralization and HAI assays, as previously described (Bangaru et al., 2016).

HA cleavage inhibition assay. To assess the ability of FluA-20 to block HA cleavage, 4 µg of recombinant HA0 protein from H3 A/Perth/16/2009 was incubated with either PBS or 40 µg of mAb FluA-20 or mAb CR8020 for 1 h at 37° C. Following incubation, the antibody-HA mixture was either untreated or treated with 2.5 µg/mL of TPCK-treated trypsin and further incubated for 5, 20 and 40 minutes at 37° C. Samples were analyzed by SDS-PAGE.

pH-dependent conformational change assay. To determine the ability of FluA-20 to inhibit the low pH dependent conformational change in HA, 2.5 µg of pre-cleaved HA protein from H3 A/Perth/16/2009 was incubated with 5 µg of mAb FluA-20 or mAb CR8020. Reaction mixtures were incubated at 37° C. for 1 h at pH 5.0. Separate reactions containing no antibody were incubated at pH 5.0 or pH 8.0 to be used as controls. Following incubation, all the mixtures were neutralized with pH 8.4 Tris buffer and were then either untreated or treated with TPCK-trypsin at 20:1 (wt:wt) ratio of HA to trypsin. Samples were incubated for 12 h at 37° C. and then analyzed by non-reducing SDS-PAGE Egress assay. Cell culture monolayers of MDCK cells in 96-well plates were washed three times with PBS and inoculated with an MOI 1 of A/Texas/50/2012 H3N2 in Virus Growth Media with TPCK-treated trypsin (VGM) for 3 hour at 37° C., 5% C02. The inoculum was removed from cells, and cells were washed three times with PBS. 10 µg/mL of mAbs in VGM: FluA-20, irrelevant control mAb MRSA-147 or known egress inhibitor IgG mAb H3v-47, or an equinmolar concentration (66.7 nM) of the neuraminidase inhibitor drug zanamivir (GlaxoSmithKline) were added to cells in triplicate. Cells were incubated for 21 hours at 37 C, 5% $CO_2$. Supernatants were collected, clarified at 300×g for 15 min to remove cell debris. Serial two-fold dilutions of supernatants in PBS were added to an equal volume of 0.5% turkey red blood cells in v-bottom plates to determine the virus titer by hemagglutination assay. Hemagglutination titers were determined as endpoint titer values.

Molecular engineering of antibody variable gene domains and generation of Fc mutants. For the expression of recombinant forms of antibody clones, nucleotide sequences of antibody variable domains were optimized for mammalian expression and synthesized on the BioXP 3200 System (SGI-DNA). These inserts were then joined with a 6.8-kb EcoRI/HindIII digested backbone of pML-huCG1 for expression of γ1 or BglII/NotI digested backbone of pML-huCk or pML-huCL vectors for κ or λ chains, respectively, using the NEBuilder HiFi DNA Assembly master mix (NEB, E2621). For the generation of Fc mutants, 4 nucleotide sequences of antibody constant domains with single mutations (K332A, D265A, and N297A) and a double mutant (L234A, L235A) in the constant heavy chain region (CH2) were optimized for mammalian expression and synthesized on the BioXP 3200 (SGI-DNA). These inserts were then joined with a 6.0-kb HindIII/XbaI digested backbone of pML-huCG1 (McLean et al., 2000) for construction of 4 separate 71 mutant chains using the NEBuilder HiFi DNA Assembly master mix (NEB).

Dimeric recombinant soluble FcγRIIIa (CD16a) binding ELISA. A dimeric recombinant soluble FcγRIIIa (rsFcγRIIIa) ELISA was used to model the need for ADCC-inducing Abs to cross link FcγRIIIa (Wines et al., 2016). A 96-well ELISA plate was coated with 50 ng of purified influenza HA protein from H1N1 A/California/07/2009 (Sino Biological Inc., 11085-V08B) protein overnight at 4° C. in PBS. The plates were treated as described (Wines et al., 2016). Briefly, the plates were blocked with PBS 1 mM EDTA, 1% BSA (PBSE/BSA) for 1 h and 50 µL of antibodies (FluA-20, FluA-45, FluA-55 or an unrelated negative control antibody [a recombinant form of HIV-specific mAb VRC01]) at various concentrations (40 g/mL to 2.4 ng/mL) were added to the plates. The plates were washed with PBST (PBS with 0.1% Tween-20) and 50 µL of 0.1 µg/mL rsFcγRIIIa (V176) dimer was added to the wells and incubated for 1 h at 37° C. Pierce High Sensitivity Streptavidin-HRP (ThermoFisher Scientific, 21130) was diluted 1:10,000 in PBSE/BSA and added to wells. The plates were developed with TMB substrate solution and the reaction was stopped with 1 M HCl. The plates were read at an absorbance of 450 nm.

NK cell activation assay. 96-well ELISA plates were coated with 600 ng of purified influenza HA protein from H1N1 A/California/07/2009 (Sino Biological Inc., 11085-V08B) overnight at 4° C. in PBS. The plates were washed and incubated with 10 µg/mL, 1 µg/mL or 0.1 µg/mL of antibodies (FluA-20, FluA-45, FluA-55 or VRC01) diluted in PBS for 2 h at 37° C. Plates were washed and 5×10$^5$ purified NK cells were added to each well. NK cells were purified from freshly isolated PBMCs using the EasySep human NK cell enrichment kit (STEMCELL Technologies, 19055). Mouse anti-human CD107a allophycocyanin-H7 antibody (clone H4A3; BD Biosciences, 561343), 5 µg/mL brefeldin A (Sigma-Aldrich, B6542) and 5 g/mL monensin (BD GolgiStop; BD Biosciences, 554724) were added to the cells and incubated for 5 h. Purified NK cells then were incubated with anti-human CD3 PerCP (clone SP34-2; BD Biosciences, 552851) and anti-human CD56 allophycocyanin (clone B159; BD Biosciences, 555518) for 30 min at RT. Cells were fixed and permeabilized for 10 min and then incubated with anti-human IFNγ AF700 (clone B27; BD Biosciences, 561024) in the dark. Finally, cells again were fixed with 1% formaldehyde, and data were acquired for 20,000-50,000 events using an LSRFortessa flow cytometer (BD Biosciences).

In vivo efficacy of FluA-20 Fc mutants. To determine the contribution of FluA-20 Fc-mediated activity to overall protection observed in vivo, groups of BALB/cJ mice were prophylactically treated with 10 mg/kg of either FluA-20 IgG1 or rFluA-20 IgG1 or rFluA-20-N297A IgG1 or rFluA-20-LALA IgG1 or MRSA-147 IgG 24-hours prior to being intra-nasally challenged with 1.2×10$^4$ focus forming units (FFU) of H1N1 A/California/07/2009. Mice were monitored for 14 days for weight change and disease (clinical score).

Sub-lethal respiratory challenge mouse model for influenza A H1N1 infection. Groups of BALB/c mice were inoculated intranasally with different doses (538, 2,690, 13,400 or 67,000 FFU) of A/California/04/2009 virus and were monitored for 14 days for weight change kinetics and the disease. Weight loss of more than 20% total weight was the IACUC stipulated endpoint for humane euthanasia. Based on the results obtained from this study, a dose of 1.2×10$^4$ FFU was deemed appropriate for the challenge studies with FluA-20 Fc mutants.

Focus size reduction assay. To examine the ability of mAb FluA-20 to reduce focus size, a predetermined amount of H3N2 A/Hong Kong/1/1968 virus was incubated with dilutions (10, 5 or 1 µg/mL) of mAb FluA-20 or irrelevant control mAb MRSA-147 or mAb CR9114 or molar equivalents of zanamivir in the presence of TPCK-treated trypsin for 1 h at 37° C. The mixture then was used to inoculate a monolayer of MDCK cells in 6-well plates, followed by incubation at 37° C. for 1 h with intermittent rocking. The Avicel overlay (1.2% Avicel in DMEM) supplemented with the corresponding mAb dilutions and 1 μg/mL of TPCK-treated trypsin then was added to each well. The plates were incubated for 48 h at 37° C. Following incubation, the plates were washed and fixed with 1 mL of 80% methanol/20% PBS. The presence of influenza nucleoprotein in the fixed cells was determined using a 1:6,000 dilution of mouse anti-NP antibody (BEI Resources, NR 4282) as the primary antibody and 1:500 of peroxidase-labeled goat anti-mouse antibodies (SeraCare) as the secondary antibody. The foci were visualized subsequently using TrueBlue peroxidase substrate (KPL, Inc.). Images were captured by an CTL Immunospot S5 Analyzer. Foci area as percentage of total area was calculated by ImageJ software (NIH).

Flow cytometric analysis of antibody binding to cell-surface expressed HA. HEK293F cells grown in expression medium (Freestyle 293 Expression Medium; Invitrogen, 12338) were transfected transiently with cDNA encoding H3 A/Hong Kong/1/1968 HA protein and incubated at 37° C. for 36 h. Untransfected (UT) or transfected cells were washed and treated with either DMEM containing TPCK trypsin (2 μg/mL) or plain DMEM for 15 min at 37° C. Cells were washed with PBS containing 2% of heat inactivated FBS and 2 mM EDTA (FACS buffer) and incubated with either mAb CR9114 or mAb FluA-20 (10 μg/mL) for 30 min at RT and for 5 min at 37° C. The cells were washed with FACS buffer and incubated with secondary goat anti-human IgG PE antibody (Southern Biotech, 2040-09) for 1 hour at 4° C., fixed with 4% formaldehyde in PBS, and analyzed by flow cytometry using an LSR-2 cytometer (BD Biosciences). Data for a total of up to 20,000 of cell events were acquired and analyzed with FlowJo software (Tree Star).

HDX-MS to comparison the dynamic change of H7 HA0 trimer and cleaved HA trimer. H7 HA (A/Netherlands/219/2003) was expressed in HEK293F cells (Bangaru et al., 2016). In brief, sequences encoding the HA genes were optimized for expression, and cDNAs were synthesized (Genscript) as soluble trimeric constructs by replacing the transmembrane and cytoplasmic domain sequences with cDNAs encoding the GCN4 trimerization domain and a His-tag at the C-terminus. Synthesized genes were sub-cloned into the pcDNA3.1(+) mammalian expression vector (Invitrogen). HA protein was expressed by transient transfection of 293F cells with polyethylenimine transfection reagent and grown in expression medium (Freestyle 293 Expression Medium; Invitrogen, 12338). The HA0 protein was harvested after 7 days with HisTrap TALON FF crude columns and the HA0 trimer purified via gel filtration. To obtained cleaved HA trimer, the HA0 protein was treated with trypsin at 37° C. for 30 mins and the cleaved HA trimer further purified by gel filtration.

Prior to conducting comparative hydrogen-deuterium exchange experiments with H7 HA0 or with cleaved H7HA, the quench condition for best sequence coverage of HA was 6.4 M GuHCl, 1 M TCEP and 0.8% formic acid, as previously described (Aiyegbo et al., 2014; Li et al., 2011; Marsh et al., 2013). To initiate hydrogen-deuterium exchange reactions, 2 μL of pre-chilled protein stock solution (free uncleaved H7 HA0, 1.8 mg/mL; cleaved H7 HA, 1.6 mg/mL) was diluted into 4 μL $D_2O$ buffer (8.3 mM Tris, 150 mM NaCl, in $D_2O$, pDREAD 7.2) at 0° C. At indicated times of 10 sec, 100 sec, 1,000 sec, 10,000 sec and 100,000 sec, the exchange reaction was quenched by the addition of 9 μL of optimized quench solution at 0° C. After incubating on ice for 5 min, the quenched sample was diluted 5-fold with 0.8% formic acid containing 16.6% glycerol, immediately frozen on dry ice and stored at −80° C. In addition, un-deuterated samples and equilibrium-deuterated control samples were also prepared. All samples were then loaded onto an in-house LC instrument for online digestion and separation (Aiyegbo et al., 2014). The resulting peptides were directed into an OrbiTrap Elite Mass Spectrometer (Thermo Fisher Scientific, San Jose, CA) for DXMS analysis. Instrument settings have been optimized for HDX analysis. The data acquisition was carried out in a data-dependent mode and the five or ten most abundant ions were selected for MS/MS analysis. Proteome Discoverer software was used for peptide identification. The centroids of each peptide was calculated with HDExaminer, and then converted to corresponding deuteration levels with corrections for back-exchange (Zhang and Smith, 1993).

Negative stain electron microscopy. FluA-20 Fab was incubated with uncleaved H1 HA trimer for 20 seconds at 5 times molar excess of Fab. The complex was added to carbon-coated 400 mesh cooper grids and stained with 2% uranyl formate. Micrographs were collected on a 120kv Tecnai Spirit microscope with a 4k×4k TemCam F416 camera using Leginon (Potter et al., 1999). Images then were processed with Appion (Lander et al., 2009). Particles were selected with DoGpicker (Voss et al., 2009), and 2D classes were generated with MSA/MRA (Ogura et al., 2003). Particles were false colored in Photoshop.

Example 2—Results

Isolation of broadly reactive human mAb FluA-20. The inventors identified a donor who had received annual licensed inactivated seasonal vaccines for over two decades. The donor also had participated previously in clinical trials of experimental H5N1 and H7N9 subunit vaccines in the Vanderbilt NIH Vaccine Treatment and Evaluation Unit (FIG. 1A). The first H5 vaccine was a monovalent inactivated subvirion vaccine that incorporate the HA from A/Vietnam/1203/2004 (VN/1203) H5N1 clade 1 influenza virus (batch 04-067), and each dose consisted of 90 μg of hemagglutinin (NIH Division of Microbiology and Infectious Diseases [DMID] study 04-062). After 22 months, the individual was boosted with a monovalent inactivated surface antigen influenza A (H5N1) vaccine made from the modified HA and NA of A/Anhui/01/2005(H5N1) (DMID study 07-0022). The volunteer subsequently received an H7 subunit vaccine [in DMID 13-0033; a phase II human clinical trial with monovalent inactivated influenza A/Shanghai/02/2013 H7N9]). For the current study, the donor was vaccinated with a 2014-15 seasonal trivalent inactivated influenza vaccine (TIV) on day 0. Peripheral blood samples were obtained on days 0, 3, 4, 5, 6, 7, 10, 11, 14 and 31 following immunization.

Cryopreserved PBMC samples from day 31 after seasonal vaccination were immortalized by EBV transformation and the supernatants were screened for the presence of antibodies that displayed heterosubtypic binding breath to recombinant HA proteins derived from H1 (A/California/04/2009, A/Texas/36/1991), H3 (A/Hong Kong/1/1968, A/Victoria/3/1975), H7 (A/Shanghai/2/2013, A/Netherlands/219/2003) and H9 (A/Hong Kong/1073/99) subtypes by ELISA. The hybridoma cell line secreting the FluA-20 mAb was isolated from a B cell line that exhibited heterosubtypic breadth during the initial screen. Two additional broadly reactive non-neutralizing heterosubtypic mAbs also were isolated and used in these studies for comparative purposes, designated FluA-45 and FluA-55. These mAbs were isolated from individuals previously vaccinated with an experimental H7 vaccine (in the NIH Vaccine Treatment and Evaluation Unit [DMID 13-0033; a phase II human clinical trial with monovalent inactivated influenza A/Shanghai/02/2013 H7N9]).

The inventors performed deep sequence analysis of antibody variable gene sequences in circulating PBMCs in the donor and discovered sequences that appeared clonally related to FluA-20 (i.e., "siblings"), defining two sequences as clonally related if they shared use of the same $V_H$ and $J_H$ gene and differed by three or fewer amino acids in the HCDR3 region. They identified siblings to FluA-20 in blood samples from four time points: days 5, 6, 11 and 14 post-vaccination with TIV. They inferred that the majority of these siblings arose from one common ancestor, and clustered into three major groups (designated Cluster A, B and C) that differ by point mutations across the $V_H$ gene region (FIG. 1B). Network analysis of these sequences suggested that FluA-20 arose from cells present at day 6 that also were observed at day 14 (FIG. 1B).

Binding profile of FluA-20 and sibling antibodies with various subtypes of influenza type A HA molecules. To investigate the breadth of the isolated mAb FluA-20, the inventors tested purified IgG for binding activity to HA from different IAV subtypes; all HA proteins used were recombinant trimers. FluA-20 exhibited extraordinary binding breadth and affinity to recombinant HAs belonging to group 1 (H1, H2, H5, H6, H8, H9, H11 and H12) and group 2 (H3, H4, H7, H10, H14 and H15) viruses, with $EC_{50}$ values for binding ranging from 5 ng/mL to 142 ng/mL (FIG. 1C and FIG. S1A). Genes of the wild-type FluA-20 variable domain were synthesized and a recombinant form of FluA-20 IgG protein was expressed; hybridoma-generated antibody (designated FluA-20) was used for the assays unless the recombinant form is specified (designated as rFluA-20). As expected, rFluA-20 IgG showed a similar binding spectrum to the hybridoma-produced FluA-20 IgG protein (FIGS. 1C and S1A). Additionally, the inventors recombinantly expressed FluA-20 as an Fab fragment and assessed its kinetics of binding to representative HA subtypes that are pathogenic for humans using a bio-layer interferometry assay (Table S1). Remarkably, even in this monovalent form, rFluA-20 Fab interacted with most HA molecules from H1, H2, H3, H5, and H7 subtypes with $K_D$ values less than 100 nM (with several less than 1 nM, Table S1).

The inventors also recombinantly expressed and tested several somatic variant ("sibling") antibodies related to FluA-20 from cluster A and cluster B (FIG. S1B). Three sibling antibodies, Sib 2, Sib 3, and Sib 45, appeared to have very similar activity and breadth as rFluA-20 (Table S2). Also, they found that two sibling antibodies, Sib 28 and Sib 48 in a phylogenetic cluster that was more mutated than FluA-20, lost binding to some H3, H5 and H14 HAs, and Sib 7 and Sib 33 completely lost activity to any HA tested, likely due to the introduction of additional somatic mutations (Table S2). These findings suggested that FluA-20 clonotype is represented by multiple variations with diverse reactivity breadth in the immune repertoire.

Unmutated common ancestor-origin interactions drive the activity of the FluA-20 lineage. FluA-20 belongs to the IgG1 subclass and is encoded by the $V_H4$-61/D2-15/$J_H4$ and $V_K1$-39/$J_K1$ antibody variable gene segments, which represents a genetic configuration not previously reported for broadly reactive human influenza antibodies. The analysis of the FluA-20 cDNA sequence revealed that FluA-20 shares 93% identity with both the $V_H4$-61*01 and $V_K1$-39*01 germline genes. Compared to the inferred unmutated common ancestor sequence (FluA-20-UCA), FluA-20 harbored 16 somatic mutations in the heavy chain variable gene amino-acid sequence and 11 in the light chain variable gene sequence (FIG. S1C). Remarkably, recombinantly expressed UCA antibodies (expressed as either IgG or Fab forms) of FluA-20 appeared to retain the substantial binding breadth of rFluA-20 (FIGS. 1C and S1A, Table S1). Nonetheless, compared to the UCA antibody, rFluA-20 displayed not only an increase in binding potency, but also greater breadth with additional recognition of many H3 and H5 HAs.

Figure 2A:
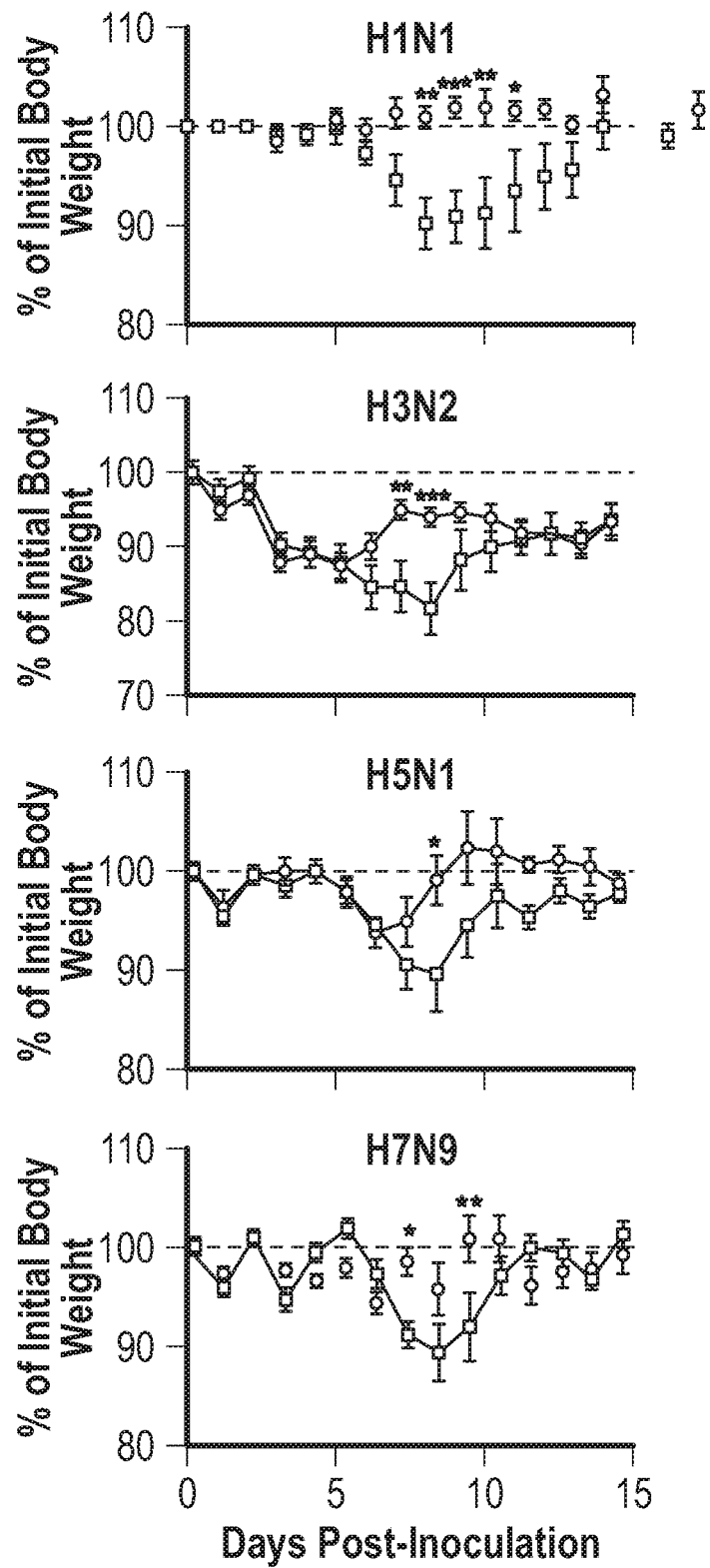
FIGS. 2A-E. mAb FluA-20 exhibits protection in vivo against diverse IAV subtypes (FIG. 2A) Body weight change kinetics in mice that received FluA-20 prophylactically prior to sub-lethal challenge with IAV strains from H1N1, H3N2, H5N1 and H7N9 backbone trace. Peptides with slower deuterium exchange in cleaved HA are colored in blue, and peptides with faster deuterium exchange in cleaved HA are colored in red. Peptides in grey represent no difference in deuterium exchange rate and peptides in black indicate peptides that were not covered in the MS data.
Figure 2B:
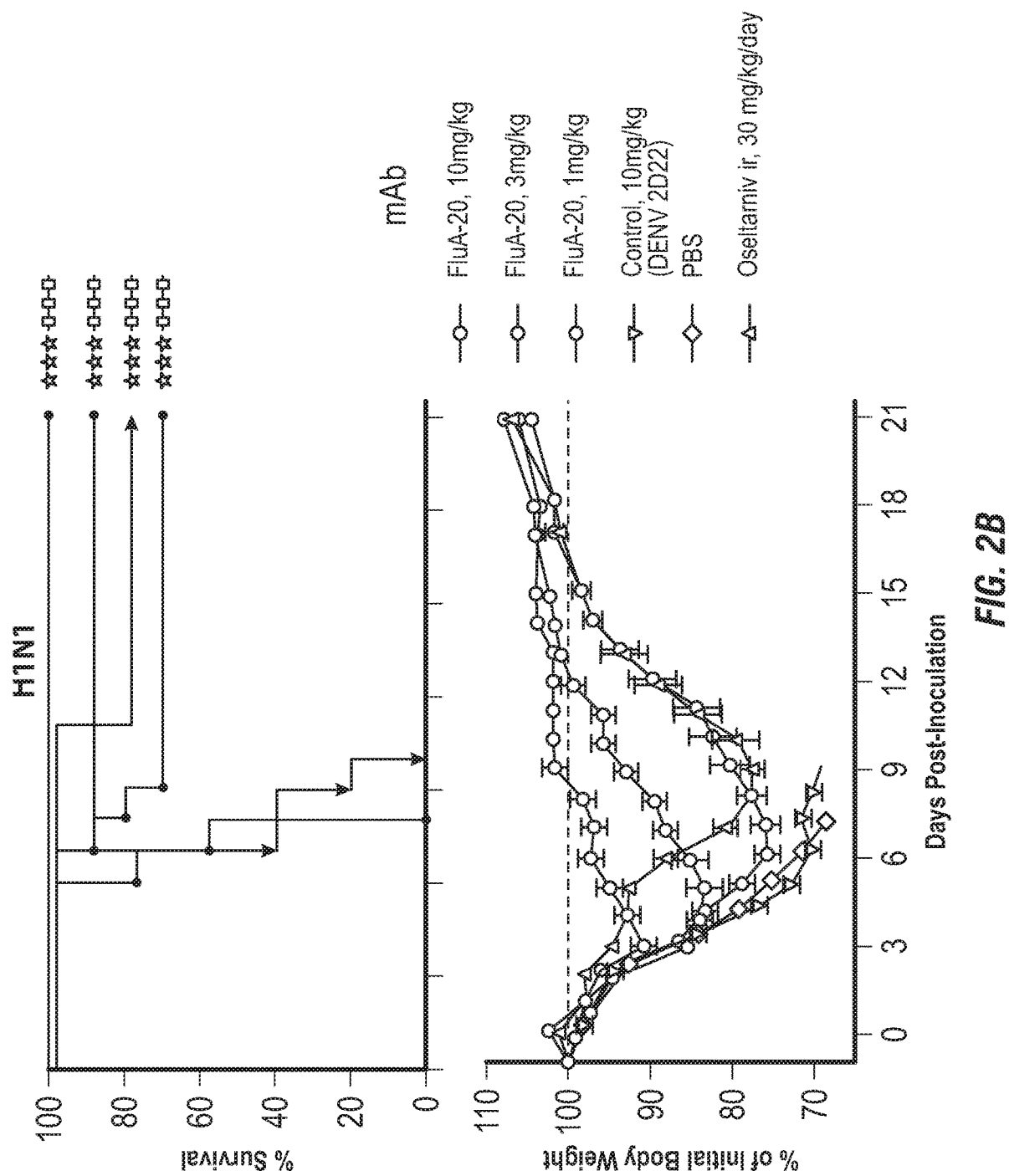
Figure 2C:
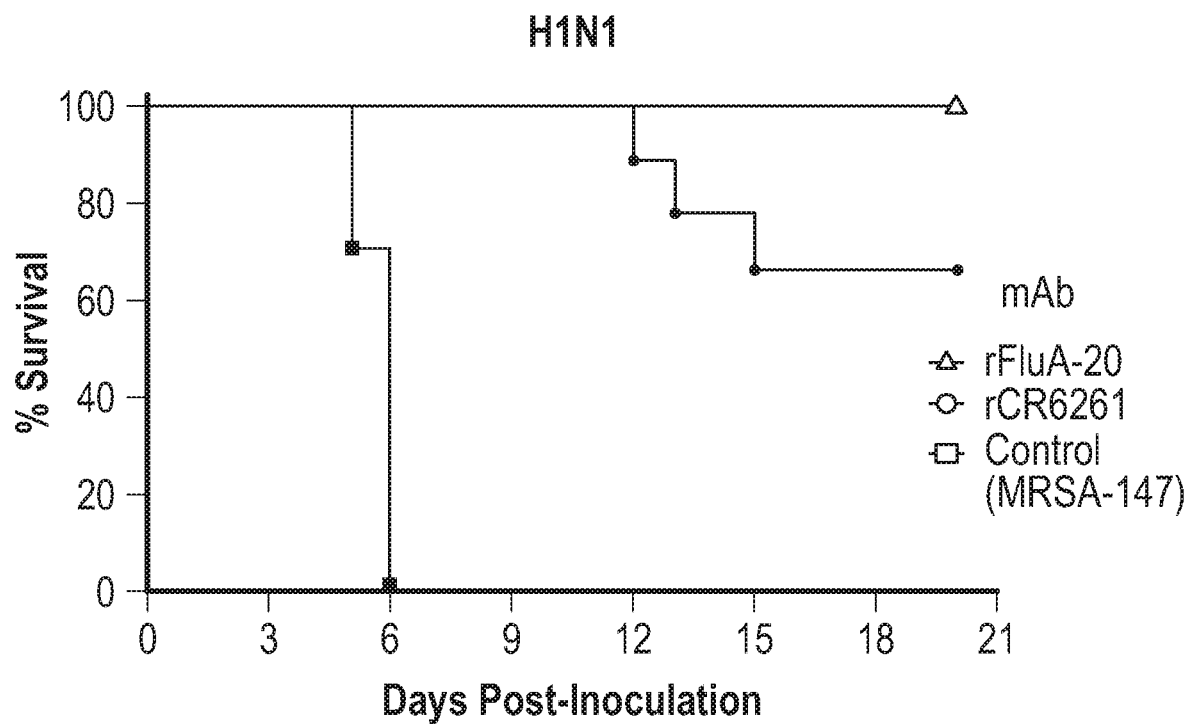
Figure 2D:
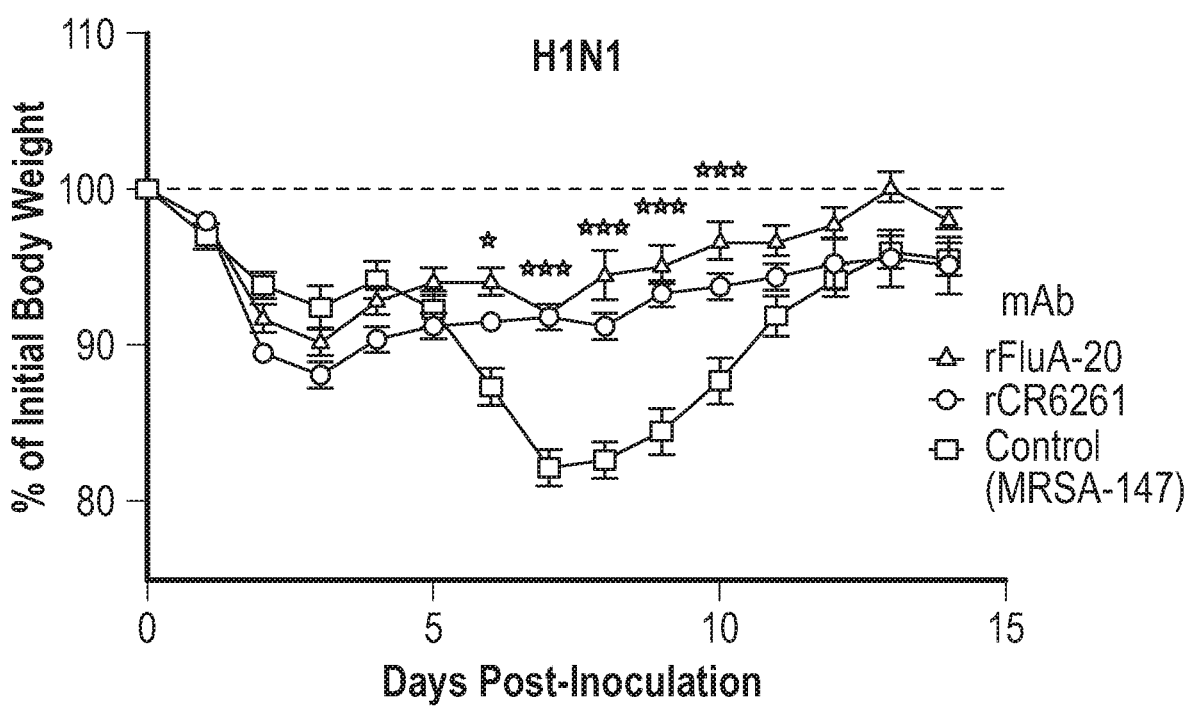
Figure 2E:
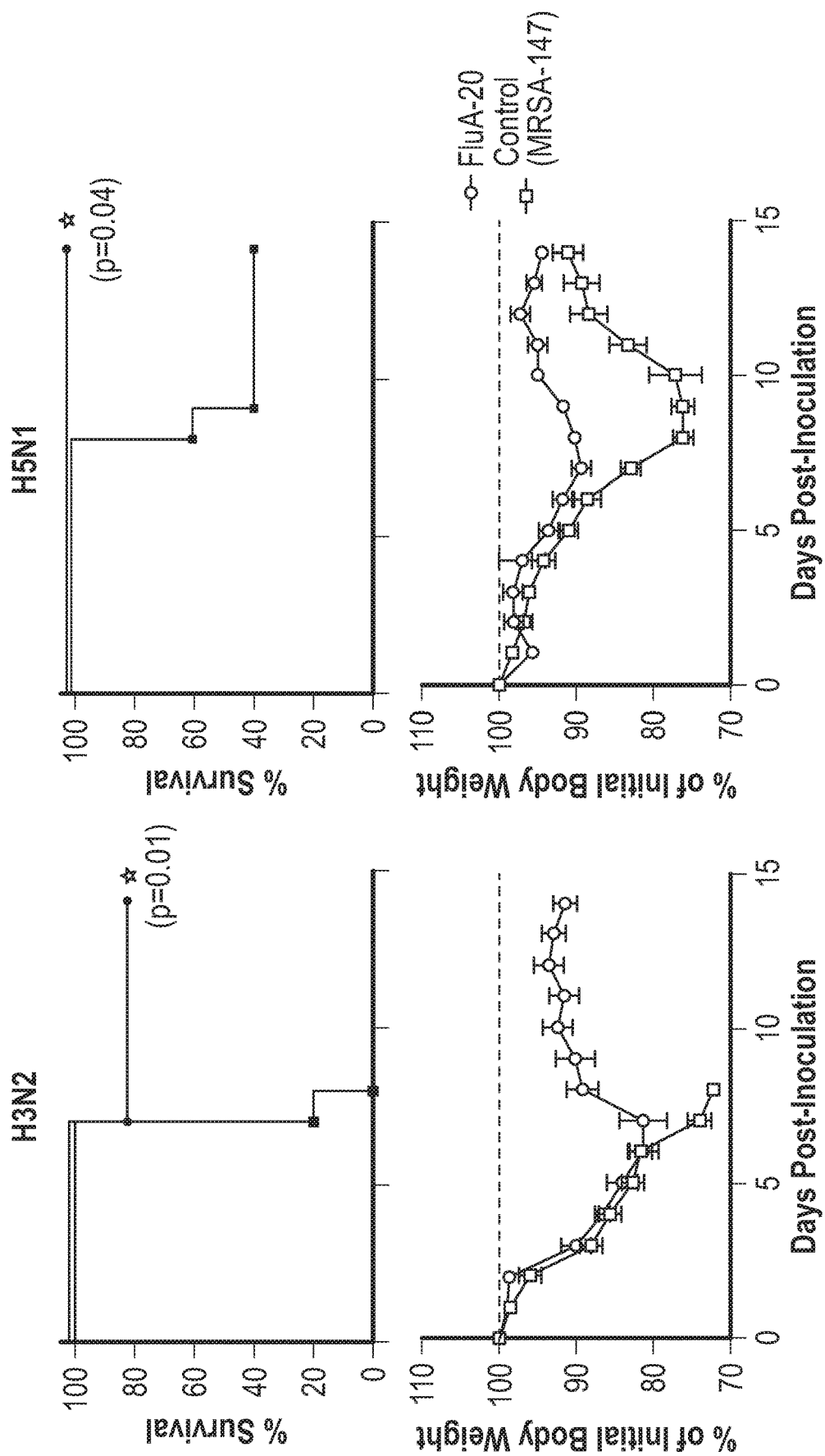

FluA-20 exhibits prophylactic and therapeutic efficacy in vivo against viruses of diverse IAV subtypes. 1) Sublethal influenza mouse model of antibody prophylaxis. To examine if mAb FluA-20 could mediate protective activity in vivo, the inventors chose A/Netherlands/602/2009 (H1N1), A/X-31 (H3N2), A/barn swallow/Hong Kong/D10-1161/2010 (H5N1) and A/Shanghai/1/2013 virus strains (H7N9), representative of group 1 and group 2 IAVs, for prophylactic studies. BALB/c mice (n=8 per group) were administered 10 mg/kg of FluA-20 IgG or a similarly prepared control antibody by the intraperitoneal route, and then challenged 24 hours later intranasally with a sub-lethal dose of virus. Mice treated with FluA-20 (n=5) showed complete protection from weight loss after H1N1 challenge (FIG. 2A), whereas mice challenged with H3N2, H5N1 or H7N9 strains showed significantly faster recovery from weight loss compared to control animals (FIG. 2A). Additionally, FluA-20 treatment reduced pulmonary lung titers (day 6 post-inoculation) following H1N1 and H7N9 challenge (FIG. S2A). 2) Lethal influenza BALB/c mouse model of antibody prophylaxis using mouse-adapted H1N1 virus. To further evaluate the optimal dose of FluA-20 for prophylactic efficacy, the inventors chose to test 3 different doses of FluA-20 against lethal challenge with mouse-adapted H1N1 A/California/04/2009 virus. BALB/c (n=10 per group) mice were IP injected with either 1 or 3 or 10 mg/kg of FluA-20 or 10 mg/kg of a control antibody or PBS 14 hours prior to intranasal challenge with H1N1 virus. As a control, one experimental group was treated with the commercially available IAV drug oseltamivir twice daily for 5 days, starting at 1 h post-inoculation. Remarkably, FluA-20 provided significant protection against mortality and protection against severe weight loss at all three tested doses, with groups that received 3 or 10 mg/kg showing better efficacy than groups with oseltamivir (FIG. 2B). 3) Lethal influenza DBA/2J mouse model of antibody prophylaxis using human H1N1 virus. The inventors also evaluated mAb FluA-20 for prophylactic efficacy against lethal challenge with non-mouse adapted H1N1 A/California/04/2009 virus in DBA/2J mice and observed significant protection in FluA-20-treated mice (10 mg/kg) compared to mice that were given mock control IgG (FIG. 2C). 4) Sublethal influenza BALB/c mouse model of antibody therapy using human H1N1 virus. To determine the therapeutic potential of FluA-20, the inventors measured protection against weight loss after sublethal challenge of mice with human H1N1 virus. Mice treated with mAb FluA-20, similarly to mice that treated with a positive control mAb CR6261, showed significant protection against severe weight loss and faster recovery (day 6-10 post-challenge) when compared to mock-treated mice (FIG. 2D). 4) Lethal influenza BALB/c mouse model of antibody therapy using H3 and H5 viruses. The inventors also tested efficacy of mAb FluA-20 treatment in a lethal model by measuring survival, weight loss and lung virus titers in BALB/c mice (n=5 per group) that were lethally challenged with H3N2 or H5N1 viruses on PR8 backbone and treated IP next day with mAb FluA-20 or control mAb MRSA-147 (FIGS. 2E and S2B). Treatment with mAb FluA-20 showed a significant protection from mortality (FIG. 2E). Collectively, these results indicate the ability of mAb FluA-20 to protect prophylactically and therapeutically in vivo against sublethal or lethal virus challenge against influenza A virus strains of diverse subtypes.

FluA-20 IgG does not compete for binding to HA with other RBS- or stem-specific antibodies. To determine whether FluA-20 binds to previously known sites of vulnerability on HA, the inventors used bio-layer interferometry to measure if FluA-20 competed for HA binding against other known bnAbs. Surprisingly, FluA-20 did not compete for binding to HA with RBS-mAbs (mAb 5J8) or stem-specific mAbs (mAbs CR9114, FI6v3, 39.29 or H3v-86) (FIG. S3A). Additionally, they observed that FluA-20 interacted well with truncated HA head domains lacking the stem region, derived from multiple HA subtypes (FIG. S3B). These data indicated that FluA-20 recognizes a distinct protective epitope on the HA head domain that is conserved across most influenza A viruses.

Structural characterization of FluA-20 in complex with the HA head from H1 A/Solomon Islands/3/2006 revealed a novel epitope at the trimer interface. To identify this novel site of vulnerability on the HA head, crystal structures of the apo form of rFluA-20 Fab and its complex with the HA head domain from A/Solomon Islands/3/2006 (H1N1) were determined at 1.73 Å and 2.85 Å resolution, respectively (Tables S3-4). Two HA head domains, each bound by one Fab, were present in the crystal asymmetric unit.

Figure 3A:
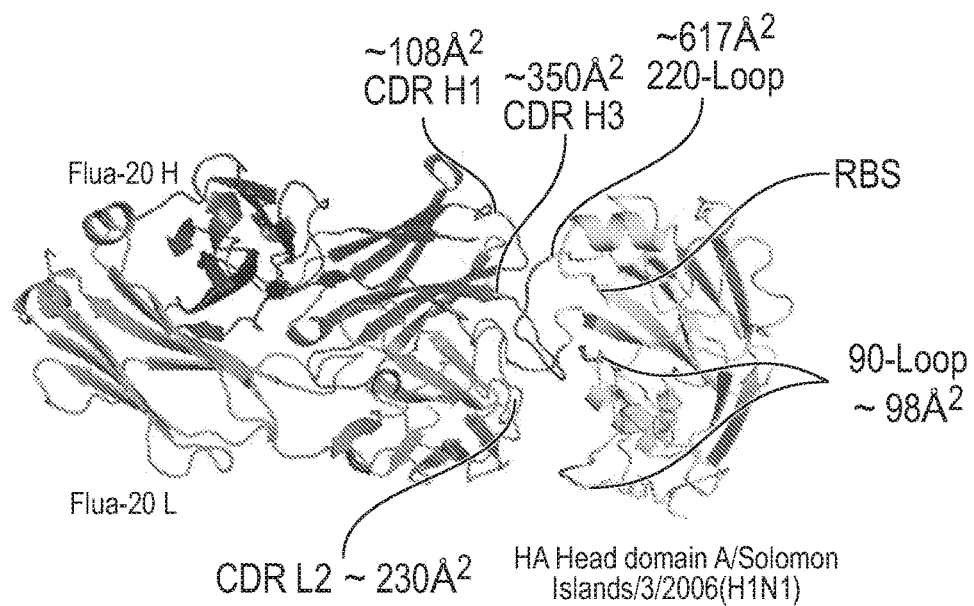
Figure 3B:
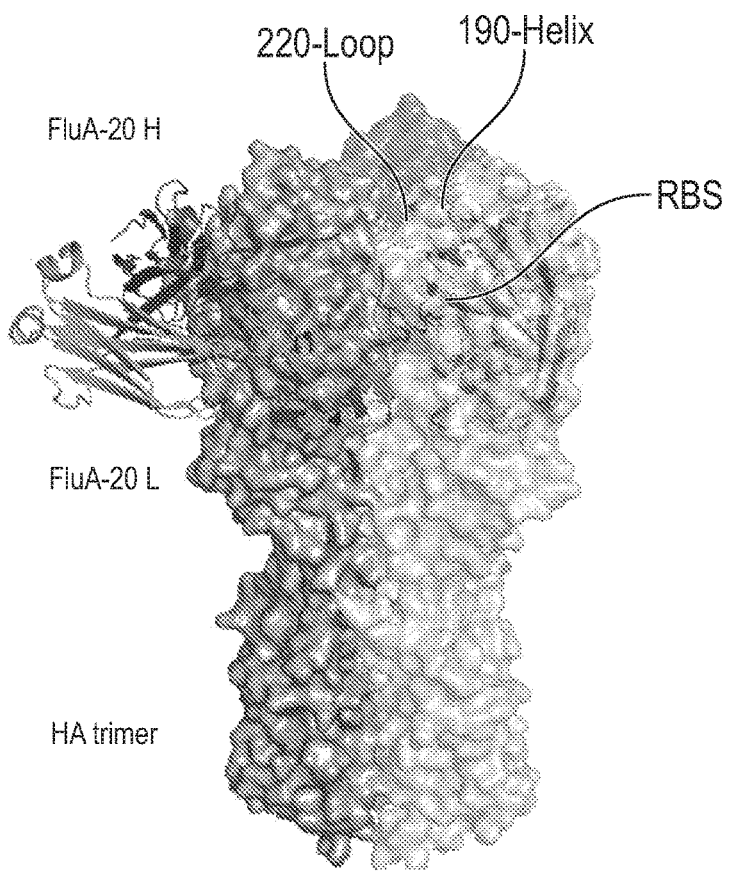

The complex structure revealed that FluA-20 recognizes an epitope that is parallel to, but does not overlap with, the receptor-binding site (RBS) (FIG. 3A). The antibody interacts primarily with the 220-loop and has some contact with the 90-loop, creating buried surface areas of 617 Å$^2$ and 98 Å$^2$ on each loop. After superimposing the HA head domain in the Fab complex with an H1 HA trimer structure (PDB 4M4Y), the FluA-20 epitope was found to be hidden in the HA trimer interface and not accessible for antibody binding (FIG. 3B). In fact, the non-RBS side of 220-loop is an important surface for interaction of the HA with its adjacent protomer in the native trimer (FIG. S4A, B). The variable domain of FluA-20 on the monomeric head domain overlaps with the head domain from an adjacent protomer in the HA trimer structure (FIG. 3B). These results suggested that FluA-20 recognizes HA in a form different from the canonical closed trimer structure.

Figure 3C:
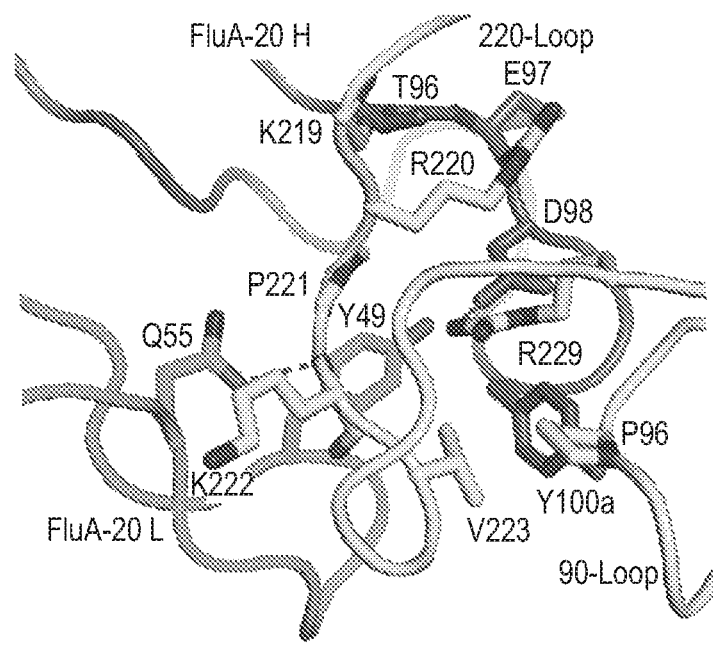
Figure 3D:
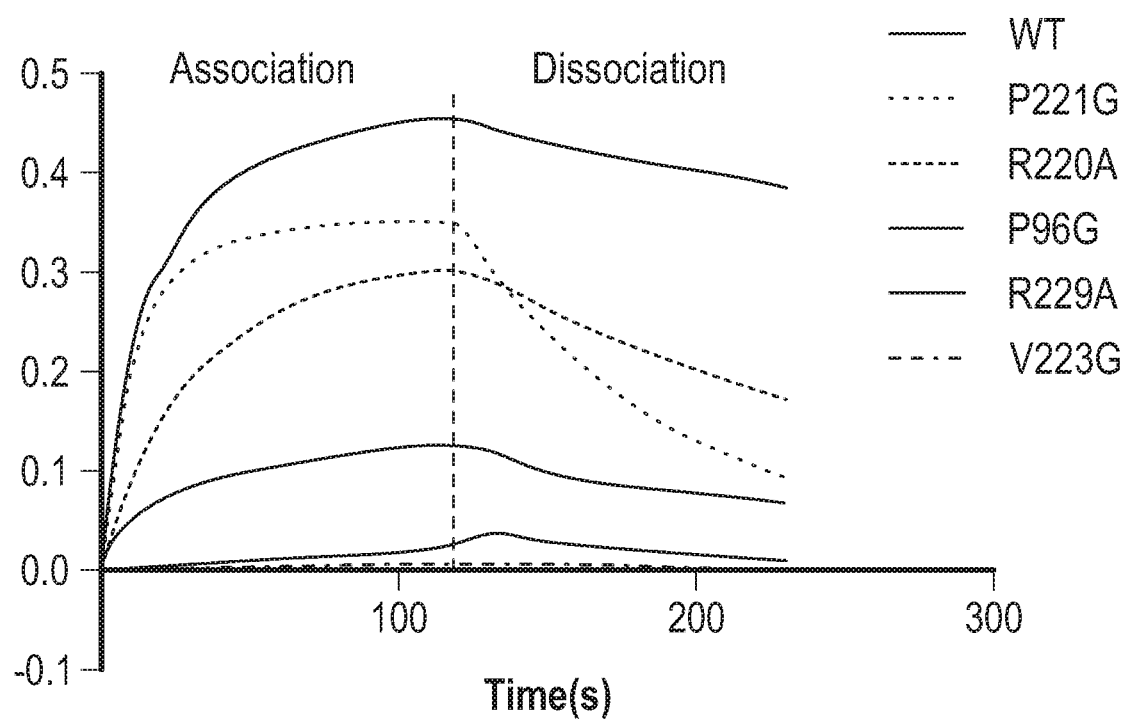

The interaction of FluA-20 with the HA head domain is mediated mainly by a groove between CDR H3 and L2, with some contacts from CDR H1 to the edge of its epitope (FIG. 3A). Many contacts of FluA-20 with HA are centered on Arg229 (FIG. 3C). First, Asp98 (H) of FluA-20 makes a salt bridge with Arg229 (FIG. 3C). Surrounding this salt bridge is an enclosed hydrophobic pocket formed by both HA and FluA-20 residues, including Pro221, Val223, and Pro96 of HA and Tyr49 (L) and Tyr100a (H) of FluA-20 (FIG. 3C). The aromatic ring of Tyr100a (H) of FluA-20 is positioned approximately 4 Å away from the basic amine of Arg229 in HA and likely forms cation-π interactions that would strengthen the binding. Alanine mutation of Arg229 completely abolished binding of FluA-20 to the HA (FIG. 3D). Glycine mutation of Val223 or Pro96 in the HA epitope also substantially decreased HA binding by FluA-20, indicating that these hydrophobic contacts between the non-polar residues in HA to Tyr49 (L) and Tyr100a (H) of FluA-20 are important for its activity (FIG. 3D). Reciprocally, D98A (H) or Y49A (L) mutants of FluA-20 disrupted binding to all targeted HAs, and an alanine mutation of Tyr100a (H) in FluA-20 also eliminated binding to most HA subtypes (Table S5).

Other than the intricate binding core, several hydrogen bonds are involved in the binding of FluA-20 to HA. The side-chain amine of HA Arg220 hydrogen bonds to the main-chain carbonyl of Glu97 (H) from the antibody (FIG. 3C). Additionally, the Gln55 (L) side-chain carbonyl interacts with the main-chain amide of Lys222 on the HA (FIG. 3C). As a result, mutation of either HA Arg220 or Gln55 (L) of FluA-20 decreases the binding interaction (FIG. 3D, Table S5).

Figure 4A:
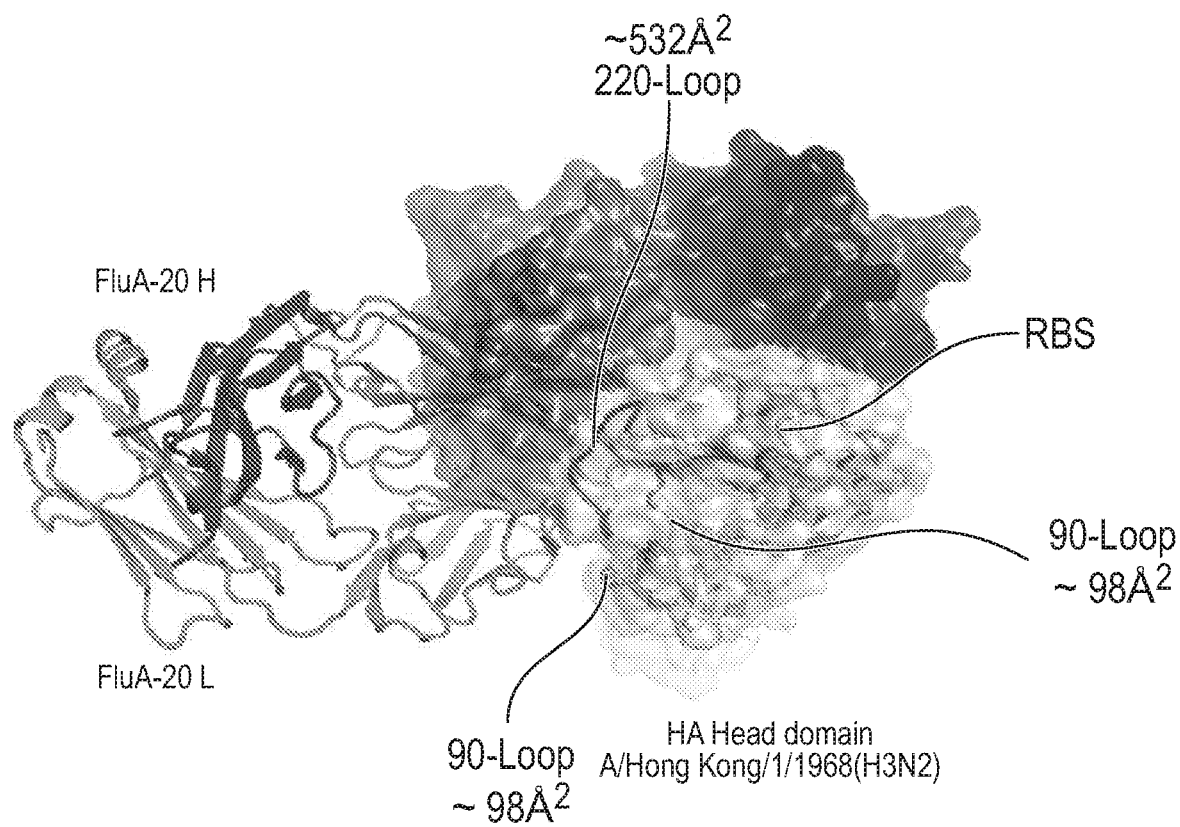

Structural characterization of FluA-20 in complex with HA head of H3 A/Hong Kong/1/1968. The inventors also determined the crystal structure of rFluA-20 Fab in complex with the HA head domain of A/Hong Kong/1/1968 (H3N2), at 2.10 Å resolution (Table S4). Each asymmetric unit includes one FluA-20 in complex with one H3 head domain. FluA-20 interacts with a similar epitope on the H3 head domain as with H1, with similar interactions (FIGS. 4A, S4C, D). The structural alignment of H3 head domain bound by FluA-20 with the H3 trimer model (PDB 4FNK) again indicated that the antibody interacts with HA in a form other than the canonical trimer (FIG. 4A).

Figure 4B:
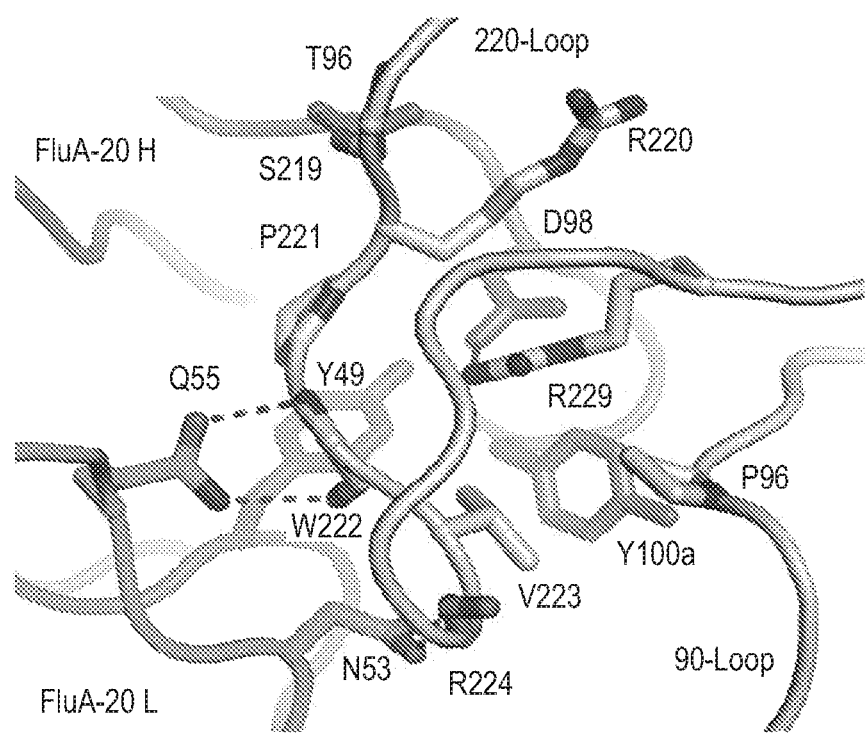

Additional hydrogen bonds are made between the side-chain amine of Gln55 (L) of FluA-20 to the main-chain carbonyl of Trp222 in HA and the Asn53 (L) side-chain carbonyl to the Arg224 main-chain amide (FIGS. 4B, S4B). Gln55 (L) appears to be important for FluA-20 binding to many other HA strains, although not for H3 (A/Hong Kong/1/1968) and a few other strains (FIG. 4B, Table S5). The interaction by Asn53 (L) is not required for antibody binding to most HAs (Table S5).

Hydrogen deuterium exchange mass spectrometry (HDX-MS) experiments confirms interaction of the FluA-20 with the H5 HA trimer interface. To confirm that FluA-20 interacts with the equivalent epitope on H5 HA, the inventors conducted HDX-MS experiments with a monomeric head domain of H5 (A/Vietnam/1203/2004) to identify peptides on the surface of HA that are occluded following binding of FluA-20. H5 HA head domain protein was labeled with deuterated water in the presence or absence of the FluA-20 IgG. The head domain protein was digested with pepsin, and deuterium labeling of resulting peptides was measured by mass spectrometry. The inventors found that FluA-20 blocked labeling of peptides comprising of residues 210-223 (FIG. S5A, B), consistent with the location of the epitope in the co-crystal structures with the subtype H1 or H3 HAs. Mutations of the 220-loop in H5 (A/Vietnam/1203/2004) showed substantial influence on FluA-20 binding. Single mutants of R220A, V223A, or R229A in H5 HA completely abolished FluA-20 binding, confirming that the antibody uses a similar binding mechanism for H5 as those observed for H1 and H3 (FIG. S5C).

The FluA-20 epitope is highly conserved across different subtypes of IAV HA. FluA-20 engages a highly conserved binding core in its recognition of H1 and H3 HAs. The five HA residues with which FluA-20 primarily interacts, namely Pro96, Arg220, Pro221, Val223, and Arg229, are highly conserved among all human H1N1 viruses (95% conservation for Pro96, and over 98% conservation for the other four residues) (FIG. 5A). In human H3N2 viruses, conservation of key residues in the epitope is generally above 97%, except for residue 223. Approximately 22% of H3 strains encode Val223, including A/Hong Kong/1/1968 (H3N2) (FIG. 5B), but 70% of H3 HAs possess Ile223. Two strains of H3 with the Ile223 variant were tested in the activity profiling, (A/Texas/50/2012) and (A/Switzerland/9715293/2013), and both bind to FluA-20 with high affinity. Thus, FluA-20 can effectively accommodate either Val or Ile at HA1 position 223.

Figure 5D:
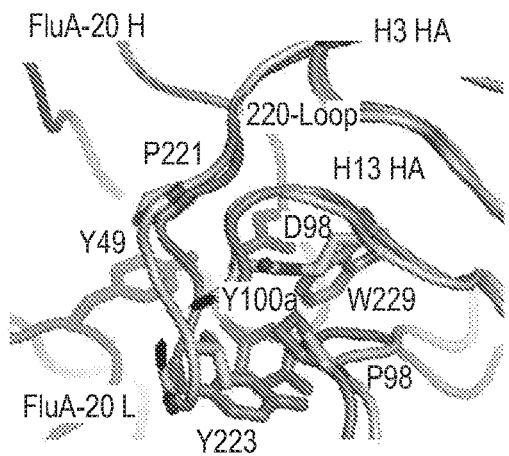

The sequences of the major epitope residues recognized by FluA-20 in other HA subtypes are summarized in Table 1. Remarkably, the five major epitope residues (P96, R220, P221, V/I223 and R229) that directly interact with FluA-20 remain highly conserved across different strains and subtypes, which explains the extraordinary breadth of FluA-20. Some mutations or deletions in these five key residues in the epitope of a few HAs may inhibit binding to FluA-20. For instance, Arg229 is essential for electrostatic interactions with FluA-20 (Table 1, FIGS. 5A, B). An Ile229 substitution in H3 A/Minnesota/11/10 likely renders it the only H3 strain that FluA-20 fails to recognize among those tested, whereas a Trp229 residue in H13 (A/gull/Maryland/704/1977) can be tolerated. Comparison of the H13 structure (PDB 4KPQ) with the H1 or H3 complexes with FluA-20 shows that H13 possesses a unique pair of mutations, Tyr223 and Trp229 (FIG. 5D). Possible aromatic stacking of these two residues with Tyr100a (H) of FluA-20 may compensate for the loss of the Arg229 contacts.

Figure 5E:
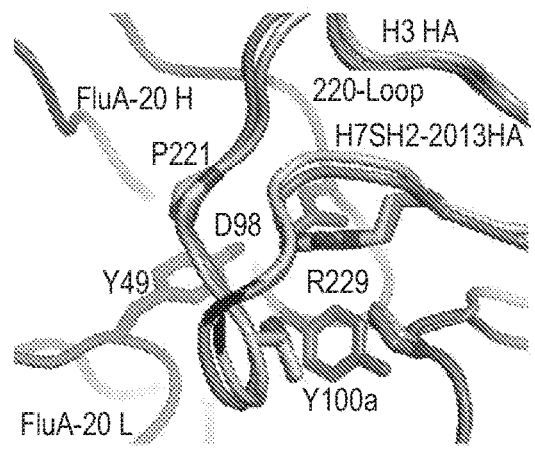
Figure 5F:
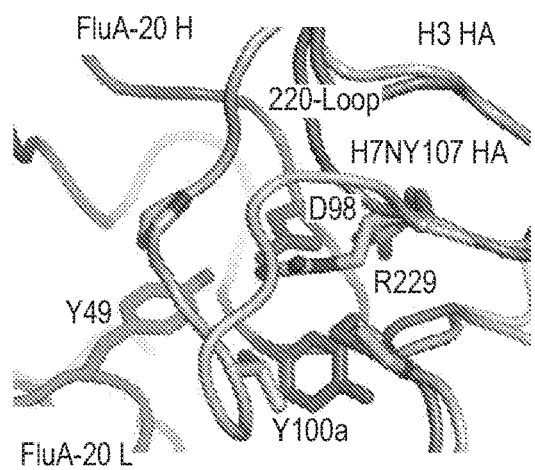
Figure 5G:
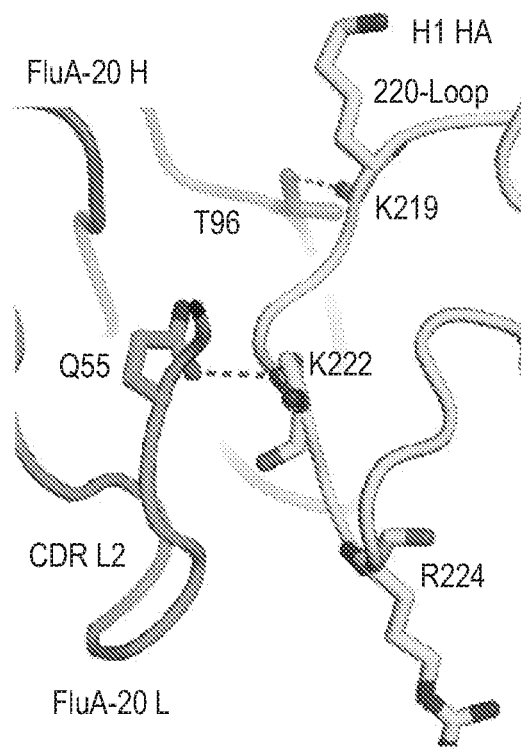
Figure 5H:
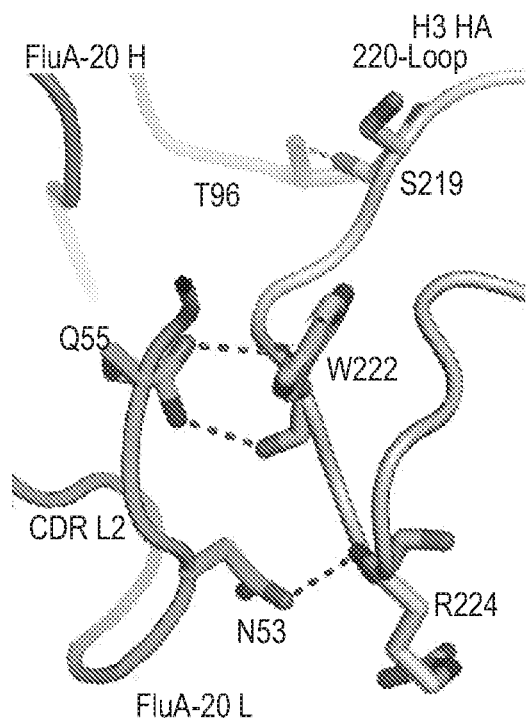

Compared to H1 and H3, two H5 strains with Ser221 (a common substitution in the H5 subtype) exhibited weaker binding of FluA-20 (FIG. 5C). Ser221 does not appear to change the 220-loop conformation (FIG. 5C); however, the decrease of side-chain hydrophobicity or difference in the rigidity of 220-loop may have affected FluA-20 binding. In fact, a Pro221 mutation in H5 (A/Vietnam/1203/2004) substantially rescued the affinity to FluA-20 to a level similar to that of H1 or H3 (FIG. 5C). Of the two H7 strains tested, the H7 HA of A/New York/107/2003 has a truncated 220-loop (missing residues), but still retains the critical Arg229. As a result, this H7 HA shows decreased binding by FluA-20, compared to H7 from A/Shanghai/2/2013 (FIG. 1C, 5E, F). Considerable variation nevertheless exists at some residues in the FluA-20 epitope, particularly for 219, 222, and 224 that are located very close to the epitope binding core. However, the interactions of FluA-20 with these variable residues are only to their main chain, and the approach angle of FluA-20 enables the antibody to successfully accommodate these variable side chains (FIG. 5G, H).

Mutation experiments confirm the critical contact residues in the FluA-20 IgG paratope. To determine the paratope residues that are critical for FluA-20 binding, the inventors mutated Tyr34, Thr96, Glu97, Aps98, Tyr100a or Cys101 on the heavy chain (H) and Tyr49, Asn53 or Gln55 on the light chain (L) to alanine and recombinantly expressed each variant to determined relative binding to HAs from different subtypes compared to rFluA-20. Two mutants D98A (H) and Y49A (L) showed complete loss of binding to all tested HAs, validating the importance of the electrostatic interaction between Asp98 (H) of FluA-20 and Arg229 on HA and the hydrophobic interaction between Tyr49 (L) to HA residues (Table S5, FIGS. 5A, B). Furthermore, Q55A (L) mutant showed >10-fold or complete loss of binding $EC_{50}$ to all HAs except H1 A/Texas/36/1991, H3 A/Hong Kong/1/1968 and H7 A/Netherlands/219/2003, while the Y100aA (H) mutant also showed >10-fold loss of binding $EC_{50}$ to all HAs except H3 A/Hong Kong/1/1968 (Table S5). Additionally, C101A (H) or N53A (L) also disrupted binding to H5 A/Indonesia/5/2005 H A. Collectively, these findings indicate that, while the binding core of the FluA-20 interaction with different HAs is highly conserved, some variations can occur with different HAs. These findings are also consistent with the inventors' observation that the FluA-20-UCA, which carries the key HA-contacting residues Asp98 (H), Y100a (H), Y49 (L), and Gln55 (L), retains much of the binding breadth compared to FluA-20 (FIGS. 1C and S1C).

Binding of FluA-20 to HA is inhibited by HA cleavage, likely through dynamic changes in the HA trimer. During viral replication, HA is synthesized initially as a single polypeptide precursor protein, HA0. As the protein folds, HA assembles into a trimer in the endoplasmic reticulum (ER), before its transportation to the cellular surface (Copeland et al., 1986; Gething et al., 1986). HA0 can be cleaved post-translationally at an arginine (or rarely a lysine) around residue 329 into two subunits, HA1 and HA2, the mature form of HA. HA cleavage is a prerequisite for viral infectivity (Chen et al., 1998; Steinhauer, 1999). Previous studies indicated that the HA cleavage process is promiscuous as to when and where the HA is cleaved in vivo (Klenk and Garten, 1994; Klenk and Rott, 1988; Webster and Rott, 1987), while cleavage can generally be achieved by trypsin treatment in vitro.

The inventors observed that trypsin cleavage of HA substantially decreased binding of FluA-20 to soluble H1 or H7 HA (FIG. 6A), while differences in binding of the RBS-binding antibodies were not observed after cleavage (FIG. S8A). Since the FluA-20 binding epitope is buried in the HA trimer interface, the biased inhibition of FluA-20 binding, but not the 'outer' surface binding antibodies, suggests a potential decrease of dynamics in HA trimer after trypsin treatment, so that the FluA-20 epitope in the trimer interface may be less frequently or less proportionally exposed after the HA cleavage. The inventors also assessed FluA-20 binding to cellular surface HA and tested whether the surface HA recognition is affected by trypsin treatment. They performed flow cytometric analysis to measure binding of two antibodies, CR9114 or FluA-20, to H3 A/Hong Kong/1/1968 HA expressed on HEK293F cells, either untreated or treated with trypsin. Consistent with the inventors' observations with soluble, recombinant HA protein, FluA-20 displayed substantially lower binding to HA on trypsin-treated cells compared to untreated cells (2.6-fold), while a decrease of the stem antibody CR9114 binding was not observed after trypsin treatment (FIG. 6B).

To examine if this specificity of FluA-20 for uncleaved HA is due to better epitope accessibility in the uncleaved form, the inventors performed an HDX-MS experiment with either HA0 or trypsin-treated HA trimers to compare their trimer dynamics. Indeed, the inventors observed an overall reduction of deuterium exchange in the cleaved HA molecules compared to HA0 proteins at the three time points tested, except for some loops near the vestigial esterase subdomain of HA head (FIGS. 6C, S6C). In summary, these data suggest that HA cleavage into its functional form reduces HA trimer dynamics, which may inhibit exposure of the FluA-20 epitope in the matured, functional form of HA on virions.

FluA-20 inhibits cell-to-cell spread, potentially by disrupting native HA trimers. The inventors next examined the molecular basis for in vivo protection mediated by mAb FluA-20. They observed that FluA-20 did not exhibit neutralizing activity when tested by hemagglutinin inhibition assay (HAI) or microneutralization assays against H1N1 A/California/04/2009, H3N2 A/Texas/50/2012 or H7N9 A/Shanghai/2/2013 (6:2 PR8 backbone) viruses. The inventors also performed microneutralization assays with uncleaved HA0 virus (H3N2 A/Hong Kong/1/1968) to test the effect of HA cleavage on susceptibility to neutralization by FluA-20. Although FluA-20 binds HA0 to a higher extent than its cleaved form, it did not neutralize HA0 virus (virus produced in the absence of trypsin) (FIG. S6B). Consistent with the absence of neutralizing activity, FluA-20 did not block trypsin-mediated cleavage of HA (FIG. S7A) or inhibit the pH-dependent conformational change of HA (FIG. S7B). However, when tested for neutralization activity in plaque assay with H3N2 A/Hong Kong/1/1968 virus, FluA-20 showed a 3.8-fold reduction in the plaque size compared to the control antibody (MRSA-147), as measured by the % foci area per well (FIGS. 7A and 7B). FluA-20 showed a dose-dependent inhibition of cell-to-cell spread of the virus with inhibitory activity comparable to that of broadly neutralizing antibody CR9114 (FIGS. 7A, 7B and 7C). Zanamivir, a neuraminidase inhibitor that functions by blocking viral egress, displayed efficient inhibition of cell-to-cell virus spread and was used as a positive control. To examine if FluA-20 reduced spread by inhibiting viral egress, the inventors performed an egress inhibition assay with H3N2 A/Texas/50/2012 H3N2. The inventors observed that FluA-20 did not inhibit egress, while mAb H3v-47 (which has been previously shown to have egress inhibition activity comparable to that of zanamivir (Bangaru et al., 2018)) showed potent egress inhibition (FIG. S7C). Collectively, these results indicate that FluA-20 inhibits IAV in a novel mechanism by binding of mAb FluA-20 to the HA trimer interface and blocking cell-to-cell spread.

In addition to neutralizing activity, Fc-mediated ADCC activity has emerged as a major mechanism by which broadly reactive influenza antibodies confer in vivo protection (DiLillo et al., 2016; DiLillo et al., 2014). To examine if FluA-20 also could mediate ADCC activity, the inventors performed an ELISA-based screen using recombinant soluble (rs), dimeric, low-affinity ectodomains (rsFcγR) of FcγRIIIa (Wines et al., 2016). These rsFcγR low-affinity dimers require simultaneous engagement of both receptors by HA-bound IgGs to achieve stable binding in ELISA. Four similarly prepared antibodies, FluA-20, FluA-45, FluA-55 or VRC01 (an HIV-reactive negative control mAb) were added to plates coated with H1 A/California/04/2009 HA to test for their ability to engage both binding sites on rsFcγR simultaneously (Kristensen et al., 2016). The FluA-20 IgG strongly engaged the rsFcγR dimers, while neither the HA-reactive mAbs FluA-45 and FluA-55 nor the HIV-specific control mAb VRC-01 engaged these FcγR molecules (FIG. S7D). To test whether this FcγR binding activity was associated with functional ADCC activity, the inventors examined the ability of these antibodies to activate primary CD3⁻ CD56⁺ NK cells following incubation with HA from A/California/04/2009 in vitro (Jegaskanda et al., 2013). NK cell activation was measured as the percentage of NK cells expressing intracellular IFN-γ and/or CD107a (markers for degranulation) (Al-Hubeshy et al., 2011; Alter et al., 2004). A robust concentration-dependent increase of NK cell activation was observed for FluA-20 (1.3, 9.2% or 14.6% NK cell activation at 0.1, 1 or 10 µg/mL FluA-20 respectively), while FluA-45, FluA-55 and VRC01 did not exhibit any NK cell activation (FIG. S7E). To further investigate if this activity contributes to protection in vivo, the inventors engineered two separate Fc mutant variants, N297A and L234A/L235A (LALA), in the FluA-20 IgG1 sequence. Introduction of these mutations in IgG Fc have been shown to reduce or abrogate binding of Fc to both human and mouse FcγRs (Arduin et al., 2015; Chao et al., 2009; Hezareh et al., 2001; Morgan et al., 1995). The inventors compared the protective efficacy of FluA-20 Fc variants with recombinant and hybridoma-derived FluA-20 by measuring weight loss and clinical score in BALB/c mice that were injected prophylactically with 10 mg/kg of mAb 24 hours prior to challenge with $1.2 \times 10^4$ FFU of H1N1 A/California/04/2009 virus. The virus titer optimal for challenge studies was determined initially by challenging animals with different titers of virus (FIG. S7F). Surprisingly, both Fc variants exhibited significant protection against the H1N1 challenge compared to the control antibody (FIG. 7D). Although mice treated with the N297A Fc variant antibody demonstrated significant differences in weight loss compared to rFluA-20, the inventors did not observe a significant impact on the overall protection (FIG. 7D, E). Taken together, these results indicate that although FluA-20 has the ability to robustly activate NK cells in vitro, the Fc-mediated ADCC activity is dispensable for its protective role in vivo.

From the structural studies, it is apparent that FluA-20 binding to the HA trimer should destabilize the trimeric interface of native HA. To directly examine the effect of FluA-20 binding to trimer, the inventors performed negative-stain electron microscopy (nsEM) of FluA-20 Fab-HA (uncleaved H1 A/California/04/2009) complexes incubated at various time points. Native H1 HA0 trimer remained in its trimeric conformation during nsEM sample preparation (FIG. S8A). In contrast, they observed that upon exposure to FluA-20 even for 20 seconds (the shortest time point that could be tested), the HA0 trimers quickly transformed to Fab-bound monomeric HA, with only a small fraction of Fab-free HA remaining in a trimeric conformation (FIGS. 7G and S8B). Despite extensive trials, the intermediate stage of this structural change could not be obtained, apparently due to the rapid transformation of the HA0 from trimeric to monomeric states induced by antibody binding. These results strongly suggest that FluA-20 is indeed capable of binding the uncleaved HA0 trimer, exaggerating the trimer dynamics to almost fully dissociate the trimer in vitro (FIG. 7F, G). The ability to selectively disrupt HA0 trimers on the surface of infected cells and the ability to inhibit cell-cell spread suggested that FluA-20 represents a distinct class of potent bnAbs.

TABLE 1

Conservation analysis of FluA-20 epitope residues on HA across different IAV strains

| HA Subtype | Strain | Affinity $EC_{50}$ (ng/mL) | 90-Loop 86 | 96 | 98 | 220-Loop 216 | 219 | 220 | 221 | 222 | 223 | 224 | 229 |
|---|---|---|---|---|---|---|---|---|---|---|---|---|---|
| H1 | A/Solomon Islands/03/2006 | 5 | N | P | H | E | K | R | P | K | V | R | R |
|  | A/California/04/2009 | 8 | S | P | D | E | I | R | P | K | V | R | R |
|  | A/Texas/36/1991 | 4 | N | P | Y | E | K | R | P | K | V | R | R |
| H2 | A/Singapore/1/1957 | 7 | N | P | S | D | T | R | P | K | V | N | R |
| H3 | A/Hong Kong/1/1968 | 6 | S | P | D | N | S | R | P | W | V | R | R |
|  | A/Texas/50/2012 | 4 | S | P | D | N | S | R | P | R | I | R | R |
|  | A/Switzerland/9715293/2013 | 19 | S | P | D | N | S | R | P | R | I | R | R |
|  | A/Minnesota/11/10 | > | S | P | D | N | S | R | P | W | V | R | I |
| H5 | A/Vietnam/1203/2004 | 283 | N | P | D | R | T | R | S | K | V | N | R |
|  | A/Indonesia/05/2005 | 85 | N | P | N | K | T | R | S | K | V | N | R |
| H7 | A/New York/107/2003[a] | 808 | R | P | M | R | N | A | R | — | — | — | — | R |
|  | A/Shanghai/2/2013 | 66 | R | P | K | S | A | R | P | Q | V | N | R |
| H9 | A/Hong Kong/1073/99 | 9 | S | P | N | V | P | R | P | L | V | N | R |
| H13 | A/gull/Maryland/704/1977 | 70 | A | P | E | E | V | R | P | G | Y | N | W |
| H14 | A/mallard duck/Astrakhan/263/1982 | 13 | P | P | D | N | S | R | P | R | V | R | R |
| H16 | A/black-headed gull/Sweden/4/1999 | > | N | P | E | E | T | R | I | G | — | D | W |

> indicates no FluA-20 binding to corresponding HAs at concentrations tested, up to 10 μg/mL The major epitope contact residues are in bold and highlighted on a grey background

TABLE S1

Affinity of FluA-20 Fab and its UCA Fab to diverse HA molecules, as determined by bio-layer interferometry.

| | HA strain | $K_D$(nM) FluA-20 Fab | FluA-20 UCA Fab |
|---|---|---|---|
| Group 1 | A/Solomon Islands/03/2006 (H1N1) | 2 | 325 |
|  | A/South Carolina/1/1918 (H1N1) | 46 | 937 |
|  | A/California/04/2009 (H1N1) | 48 | 1430 |
|  | A/Texas/36/1991 (H1N1) | <1 | 348 |
|  | A/Adachi/2/1957 (H2N2) | <1 | 201 |
|  | A/Indonesia/05/2005 (H5N1) | 88 | — |
|  | A/Vietnam/1203/2004 (H5N1) | 122 | — |
| Group 2 | A/Hong Kong/1/1968(H3N2) | <1 | 486 |
|  | A/Victoria/3/1975 (H3N2) | 3460 | — |
|  | A/Victoria/361/2011 (H3N2) | 15 | — |
|  | A/Perth/16/2009 (H3N2) | <1 | — |
|  | A/Netherlands/219/2003 (H7N7) | <1 | 1020 |
|  | A/Shanghai/02/2013 (H7N9) | <1 | 745 |

— indicates binding was not observed for the Fab at 2 μM.

TABLE S2

Binding of FluA-20 somatic variants ("siblings") to diverse HA molecules from indicated strains

| | | Binding EC$_{50}$ (µg/mL) for mutant for indicated chain | | | | | | | |
|---|---|---|---|---|---|---|---|---|---|
| Subtype | Strain | rFluA-20 | Sib 2 | Sib 3 | Sib 7 | Sib 28 | Sib 33 | Sib 45 | Sib 48 |
| H1 | A/Solomon Islands/03/2006 | 0.008 | 0.07 | 0.04 | NB | 0.09 | NB | 0.04 | 0.08 |
| | A/Texas/36/1991 | 0.008 | 0.09 | 0.05 | NB | 0.08 | NB | 0.04 | 0.06 |
| H2 | A/Singapore/1/1957 | 0.011 | 0.14 | 0.07 | NB | 0.29 | NB | 0.08 | 0.42 |
| H3 | A/Hong Kong/1/1968 | 0.009 | 0.08 | 0.06 | NB | 0.07 | NB | 0.04 | 0.07 |
| | A/Texas/50/2012 | 0.007 | 0.09 | 0.05 | NB | > | NB | 0.07 | NB |
| H5 | A/Indonesia/5/2005 | 0.016 | 0.43 | 1.21 | NB | NB | NB | 0.46 | NB |
| H7 | A/Netherlands/219/2003 | 0.005 | 0.11 | 0.07 | NB | 0.09 | NB | 0.05 | 0.11 |
| | A/Shanghai/2/2013 | 0.013 | 0.10 | 0.10 | NB | 0.49 | NB | 0.12 | 0.57 |
| H9 | A/Hong Kong/1073/99 | 0.007 | 0.22 | 0.09 | NB | 0.33 | NB | 0.12 | > |
| H12 | A/duck/Alberta/60/1976 | 0.006 | 0.07 | 0.04 | NB | 0.08 | NB | 0.04 | 0.12 |
| H14 | A/mallard duck/Astrakhan/263/1982 | 0.007 | 0.35 | 0.19 | NB | > | NB | 0.26 | NB |
| H15 | A/shearwater/Western Australia/2576/1979 | 0.007 | 0.16 | 0.10 | NB | 0.38 | NB | 0.10 | > |

> indicates EC$_{50}$ values 100 fold higher than FluA-20
NB indicates no binding was observed at antibody concentrations below 10 µg/mL

TABLE S5

Binding of FluA-20 paratope mutants to diverse HA molecules from indicated strains

| | | Wild-type | Heavy chain | | | | | | Light chain | | |
|---|---|---|---|---|---|---|---|---|---|---|---|
| Subtype | Strain | rFluA-20 | Y34A | T96A | E97A | D98A | Y100$_a$A | C101A | Y49A | N53A | Q55A |
| H1 | A/Solomon Islands/03/2006 | 0.008 | 0.04 | 0.03 | 0.07 | NB | > | 0.20 | NB | 0.05 | > |
| | A/Texas/36/1991 | 0.008 | 0.05 | 0.04 | 0.05 | NB | > | 0.15 | NB | 0.04 | 0.23 |
| H2 | A/Singapore/1/1957 | 0.011 | 0.11 | 0.07 | 0.13 | NB | > | 0.44 | NB | 0.16 | NB |
| H3 | A/Hong Kong/1/1968 | 0.009 | 0.07 | 0.10 | 0.07 | NB | 0.07 | 0.13 | NB | 0.06 | 0.08 |
| | A/Texas/50/2012 | 0.007 | 0.16 | 0.07 | 0.18 | NB | > | 0.39 | NB | 0.09 | NB |
| H5 | A/Indonesia/5/2005 | 0.016 | > | 0.11 | > | NB | > | > | NB | > | NB |
| H7 | A/Netherlands/219/2003 | 0.005 | 0.07 | 0.04 | 0.08 | > | > | 0.17 | > | 0.05 | 0.17 |
| | A/Shanghai/2/2013 | 0.013 | 0.44 | 0.37 | 1.00 | NB | > | > | NB | 0.87 | NB |
| H9 | A/Hong Kong/1073/99 | 0.007 | 0.21 | 0.10 | 0.36 | NB | > | > | NB | 0.17 | NB |
| H12 | A/duck/Alberta/60/1976 | 0.006 | 0.05 | 0.04 | 0.06 | NB | > | 0.09 | NB | 0.03 | > |
| H14 | A/mallard duck/Astrakhan/263/1982 | 0.007 | 0.54 | 0.23 | 0.64 | NB | > | > | NB | > | NB |
| H15 | A/shearwater/Western Australia/2576/1979 | 0.007 | 0.10 | 0.07 | 0.12 | NB | > | 0.11 | NB | 0.06 | > |

Binding EC$_{50}$ (µg/mL) for mutant for indicated chain

> indicates EC$_{50}$ values 100 fold higher than wild type rFluA-20
NB indicates no binding was observed at antibody concentrations below 10 µg/mL

TABLE S3

X-ray data collection and refinement statistics for FluA-20 Fab

| Data collection | FluA-20 Fab |
|---|---|
| Beamline | APS 23 ID-D |
| Wavelength (Å) | 1.03319 |
| Space group | P2$_1$ |
| Unit cell parameters (Å; °) | a = 83.6 b = 52.6, c = 104.8; β = 93.8 |
| Resolution (Å) | 50.00 – 1.73 (1.76 – 1.73) |
| Observations | 318,735 |
| Unique reflections | 92,959 (4,414) |
| Redundancy | 3.5 (3.2) |
| Completeness (%) | 97.8 (93.6) |
| <I/σ$_I$> | 11.8 (2.4) |
| R$_{sym}$$^a$ | 0.10 (0.39) |
| R$_{pim}$$^b$ | 0.05 (0.21) |
| CC$_{1/2}$$^c$ | 1.00 (0.84) |
| Refinement statistics | |
| Resolution (Å) | 45.68 – 1.73 (1.74 – 1.73) |
| Refs used in refinement | 92,945 (1,671) |
| R$_{work}$ (%)$^d$ | 20.2 |
| R$_{free}$ (%)$^e$ | 23.8 |
| Protein atoms | 6,612 |
| Waters | 1,044 |
| Other | 0 |
| B-value (Å$^2$) | |
| Average B-value | 20 |
| Protein | 18 |
| Water | 30 |
| Wilson B-value | 16 |
| RMSD | |
| Bond length (Å) | 0.007 |
| Bond angles (°) | 0.93 |

TABLE S3-continued

X-ray data collection and refinement statistics for FluA-20 Fab

| Data collection | FluA-20 Fab |
|---|---|
| Ramachandran plots (%)[f] | |
| Favored | 98.1 |
| Outliers | 0.0 |
| PDB | 5WN7 |

Values in parentheses are for the highest-resolution shell.
[a]$R_{sym} = \Sigma_{hkl} \Sigma_i | I_{hkl, i} - \langle I_{hkl} \rangle | / \Sigma_{hkl} \Sigma_i I_{hkl, I}$ and
[b]$R_{pim} = \Sigma_{hkl} (1/(n-1))^{1/2} \Sigma_i | I_{hkl, i} - \langle I_{hkl} \rangle | / \Sigma_{hkl} \Sigma_i I_{hkl, i}$, where $I_{hkl, i}$ is the scaled intensity of the $i^{th}$ measurement of reflection h, k, l, $\langle I_{hkl} \rangle$ is the average intensity for that reflection, and n is the redundancy (Weiss, M. S., and Hilgenfeld, R., 1997)
[c]$CC_{1/2}$ = Pearson Correlation Coefficient between two random half datasets.
[d]$R_{work} = \Sigma_{hkl} | F_o - F_c | / \Sigma_{hkl} | F_o | \times 100$.
[e]$R_{free}$ was calculated as for $R_{work}$, but on a test set comprising 5% of the data excluded from refinement.
[f]Calculated using MolProbity (Chen et al., 2010).

TABLE S4

X-ray data collection and refinement statistics for FluA-20 in complex with the head domain of H1 (A/Solomon Islands/3/2006) or H3 (A/Hong Kong/1/1968) HA

| Data collection | FluA-20_H1 head | FluA-20_H3 head |
|---|---|---|
| Beamline | APS 23 ID-D | SSRL12-2 |
| Wavelength (Å) | 1.03315 | 0.97946 |
| Space group | $P2_12_12_1$ | $P4_12_12$ |
| Unit cell parameters (Å) | a = 100.5 b = 109.8, c = 146.4; | a = b = 84.6, c = 271.7 |
| Resolution (Å) | 50.00 – 2.85 (2.90 – 2.85) | 50.00 – 2.10 (2.14 – 2.10) |
| Observations | 248,941 | 391,682 |
| Unique reflections | 36,921 (1,436) | 59,236 (2,895) |
| Redundancy | 6.8 (5.2) | 6.6 (5.6) |
| Completeness (%) | 95.7 (74.6) | 99.6 (99.6) |
| $\langle I/\sigma_I \rangle$ | 20.6 (2.0) | 18.4 (1.8) |
| $R_{sym}$[a] | 0.13 (0.78) | 0.11 (0.83) |
| $R_{pim}$[b] | 0.05 (0.31) | 0.04 (0.33) |
| $CC_{1/2}$[c] | 1.00 (0.91) | 1.00 (0.70) |
| Refinement statistics | | |
| Resolution (Å) | 48.17 – 2.85 (2.93 – 2.85) | 37.82 – 2.10 (2.12 – 2.10) |
| Refs used in refinement | 36,821 (2,125) | 59,094 (2,525) |
| $R_{work}$ (%)[d] | 23.7 | 20.2 |
| $R_{free}$ (%)[e] | 25.7 | 23.9 |
| Protein atoms | 10,008 | 5,387 |
| Waters | — | 346 |
| Glycan atoms | 84 | 14 |
| B-value (Å$^2$) | | |
| Average B-value | 74 | 47 |
| Protein | 74 | 47 |
| Glycan | 108 | 66 |
| Water | — | 47 |
| Wilson B-value | 65 | 33 |
| RMSD | | |
| Bond length (Å) | 0.011 | 0.014 |
| Bond angles (°) | 1.60 | 1.62 |
| Ramachandran plots (%)[f] | | |
| Favored | 96.6 | 98.1 |
| Outliers | 0.3 | 0.1 |
| PDB | 5WNC | 5WND |

Values in parentheses are for the highest-resolution shell.
[a]$R_{sym} = \Sigma_{hkl} \Sigma_i | I_{hkl, i} - \langle I_{hkl} \rangle | / \Sigma_{hkl} \Sigma_i I_{hkl, I}$ and
[b]$R_{pim} = \Sigma_{hkl} (1/(n-1))^{1/2} \Sigma_i | I_{hkl, i} - \langle I_{hkl} \rangle | / \Sigma_{hkl} \Sigma_i I_{hkl, i}$, where $I_{hkl, i}$ is the scaled intensity of the $i^{th}$ measurement of reflection h, k, l, $\langle I_{hkl} \rangle$ is the average intensity for that reflection, and n is the redundancy (Weiss and Hilgenfeld, 1997).
[c]$CC_{1/2}$ = Pearson Correlation Coefficient between two random half datasets.
[d]$R_{work} = \Sigma_{hkl} | F_o - F_c | / \Sigma_{hkl} | F_o | \times 100$.
[e]$R_{free}$ was calculated as for $R_{work}$, but on a test set comprising 5% of the data excluded from refinement.
[f]Calculated using MolProbity (Chen et al., 2010).

Example 3—Discussion

Isolation of naturally occurring broad-spectrum human mAbs to IAV holds great promise for discovery of new candidate therapeutics, as well as identifying critical epitopes for rational design of structure-based broadly protective influenza vaccines. Nearly all of the broadly neutralizing antibodies with extensive heterosubtypic activities discovered to date recognize the conserved HA stem region, while most broadly neutralizing antibodies (bnAbs) to the head domain have more restricted activity often within a given subtype, due to the extensive hypervariability in the head region (Hong et al., 2013; Joyce et al., 2016; Julien et al., 2012; Lee et al., 2014; Thornburg et al., 2016; Whittle et al., 2011; Wu and Wilson, 2017; Xu et al., 2013; Zhu et al., 2013). Although some bnAbs that target the head domain have been isolated in the recent years (Ekiert et al., 2012;

Lee et al., 2012), none of them display extensive heterosubtypic breadth comparable to that of the best HA stem antibodies.

In this work, the inventors report the isolation and characterization of the broadly protective antibody FluA-20 that recognizes the HA head domain from nearly all IAV HA subtypes with excellent binding affinity. The discovery of the FluA-20 epitope unexpectedly revealed a highly conserved site of vulnerability that is hidden in the HA trimer interface. Although FluA-20 does not neutralize representative viruses from H1N1 and H3N2 subtypes in microneutralization assays, this antibody exhibits some unique properties in that it rapidly disrupts HA trimers and inhibits the cell-to-cell spread of virus. The antibody also mediates ADCC activity in vitro, although this activity was not essential to the in vivo protective effects. FluA-20 conferred in vivo protection in mice against strains representing several major influenza A subtypes that are pathogenic for humans. When administered prophylactically or therapeutically, FluA-20 protected mice against challenge with diverse IAV strains. Therefore, FluA-20 is a candidate for a broad-spectrum antiviral therapeutic against various IAV infections.

It is a striking observation that FluA-20, which recognizes an epitope obscured in the HA trimer interface, is able to mediate in vivo protection against the viruses. Previous studies have demonstrated that the assembly of HA trimer occurs in the endoplasmic reticulum (ER), prior to its transport to the cellular surface. Non-oligomerized HA monomers are not transported to the Golgi complex (Copeland et al., 1986; Copeland et al., 1988; Gething et al., 1986). Therefore, the HA molecules on the cellular or viral surface generally have been considered to be stable trimers, with the trimer interface regarded as inaccessible and thus not targetable by the immune response or therapeutics. The ability of FluA-20 to confer in vivo protection strongly suggests that HA molecules are dynamic and more heterogeneous in their conformations than the inventors have observed previously, and that the trimer interface is partially or transiently accessible. Similar phenomenon, previously described as 'breathing', has been observed for the envelope glycoproteins from other viruses, such as West Nile virus (Dowd et al., 2011), dengue virus (Dowd and Pierson, 2018; Rey and Lok, 2018; Rey et al., 2018), and HIV (Munro et al., 2014; Munro and Mothes, 2015). Previous computational predictions also have led to speculations that mutations distant to the RBS could affect HA trimer dynamics and allosterically modify functional properties, such as receptor binding, of the HA trimer (Yoon et al., 2015). The studies here provide the first high-resolution characterization of an interface epitope, demonstrating that the HA trimer could indeed feature similar 'breathing' motions. The inventors found that the dynamics of the HA trimer is more pronounced in the uncleaved HA0 form than in the cleaved HA, as assessed by HDX-MS studies. A study from Yewdell et al. reported the characterization of murine mAb Y8-10C2, the epitope of which was indicated to be present between adjacent protomers in the globular head domain by mutagenesis study (Yewdell et al., 1993). The study also implied that changes made near the fusion loop could indirectly affect the flexibility of the globular head domain and lead to resistance against Y8-10C2. The effect of trypsin-mediated cleavage on the conformational dynamics of the globular head domain in HA trimer conformation is poorly understood. HA dynamic changes also were found in the pH-activated fusion step, with the HA head interface region becoming more stabilized and the fusion peptide and surrounding HA stem residues becoming more dynamic at an intermediate pH prior to the pH of fusion (Garcia et al., 2015).

A recent study by Lee et al. reported the identification of three non-neutralizing but protective human antibodies to H1 and H3 that bound to monomeric but not trimeric forms of HA (Lee et al., 2016). The 22A negative-stain EM models of the Fab complexes with the HA protomer indicated that these antibodies bind to a region on the HA head (entirely different from the FluA-20 epitope) that is not fully accessible in the intact HA trimer. The discovery of these HA trimer interface (TI)-targeted antibodies is particularly interesting in that, similar to the receptor-binding site and the stem region of HA, the trimer interface also possesses patches of highly conserved surfaces (Yusuf et al., 2013); however, these potentially vulnerable sites have not been investigated for therapeutic or vaccine development. The findings presented here could lead to more comprehensive and detailed assessment on the accessibility of the HA trimer interface and potential therapeutics or vaccines that target this hidden and conserved surface.

Example 4—Vaccine Development eHead-A20. The inventors are developing immunogens presenting the head domain of influenza hemagglutinin (HA). The original purpose was to design immunogens to elicit broadly neutralizing responses to the receptor binding site (RBS). For that purpose, they designed a minimized variant of the HA head domain referred to as "eHead" and they developed self-assembling nanoparticles displaying multiple copies of glycan-masked eHead domains.

Recently, the inventors discovered and characterized a new protective epitope on the HA head domain targeted by the FluA20 antibody. In particular, structural characterizations of FluA-20 bound to H1 and H3 head domains revealed a novel epitope at the HA head trimer interface, primarily at the 220-loop and with some important contributions from the 90-loop. Based on those data, they developed new variants of the eHead monomer and nanoparticles to focus responses to the FluA20 epitope rather than or in addition to the RBS epitope. Such antigens could be used in a vaccine setting to elicit FluA20-like responses or in a diagnostic setting to detect the presence of FluA-20 like antibodies.

The model antigen is a small, monomeric protein presenting one copy of the epitope. The primary objective is to develop a vaccine that induces protective antibody responses against influenza viruses via the FluA-20 binding site on the hemagglutinin head domain. The proposed vaccine possesses three key design elements: (i) Minimized and stabilized HA head domains for immuno-focusing to the FluA-20 epitope; (ii) Glycan masking of the minimal head domains to dampen responses outside the epitope and to ensure minimal cross-reactivity to wild-type HA; (iii) Nanoparticles presenting the engineered head domains for increased immunogenicity.

Developing a stable mini-domain antigenically focused to the A20 epitope. In order to focus antibody responses to the A20 epitope as opposed to other antigenic regions of the head domain, the inventors started with the wild-type head domains from H1 and H3, which can be expressed as monomeric proteins without loss of structure or antigenic profile (Table E). The sequences for the WT H1 domain, termed eHead_H1Solomon, and the sequence for the WT H3 domain, termed eHead-H3HK68_v1, were taken from the structures provided by Ian Wilson's Lab. Both monomers bind to FluA20 with high affinity ($K_D$<10 nM) and to FluA20_UCA with moderate affinity ($K_D$~500 nM).

TABLE E

| SPR data for the two base head monomers | | | | | |
| --- | --- | --- | --- | --- | --- |
| Antigen | FluA20 | FluA20_UCA | C05 | F045 | CH65 |
| eHead_H1Solomon | 7.9 nM | 500 nM | 86 nM | 210 nM | 340 nM |
| eHead-H3HK68_v1 | 1.1 nM | 530 nM | 170 nM | 40 nM | NA |

The inventors employed structure-guided, computational design methods to engineer HA1 domains (eHead_H1) that present the A20 epitope but limit the number of other epitopes exposed. They modeled glycans using ROSETTA at various positions distal to the A20 epitope with the goal to maximally cover the HA head surface area while not interfering with A20 binding. These eHead_H1 glycans could help eliminate most antigenic cross-reactivity to wild-type HA, which would facilitate diagnostic detection of A20-like responses and might also facilitate specific vaccine induction of A20-like responses. The inventors developed many variants that have different numbers of glycans and still maintain good antigenicity. For example, eHead_H1_g1.14 has 6 engineered glycans, eHead_H1_g2.8 has 11 glycans and eHead_H1_g2.10 has 13 glycans, they all maintain good FluA20 binding (FIG. 8). These various glycans can be used in different combinations. Sequences for 22 such glycan variants are listed at the end of the file (eHead_H1_g1.0_mC to eHead_H1_g2.10_mC).

To optimize thermal and conformational stability, especially to counter the potential loss of stability due to the addition of glycans, the inventors used computational design to develop variants with improved stability while maintaining good antigenicity. In some designs, the inventors also incorporated some resurfacing mutations (G189E and A193R) to eliminate reactivity to RBS-directed antibodies, and they also incorporated a mutation (Y95F, from eHead_H1 numbering) to eliminate sialic acid binding. eHead_H1_rsf4_mC is one such design with good antigenic profile (FIG. 8) and improved stability, as shown in the DSC traces in FIG. 9. The melting temperature TM improved from 59° C. (for WT) to 75° C. (for eHead_H1_rsf4), and the width of the melting transition narrowed substantially as well, reflecting improved uniformity. The sequence of eHead_H1_rsf4_mC is:

1. eHead_H1_rsf4_mC
EPLQLGNCSVAGWILGNPECEBLESRESWSSIIEKPNPENGTCFPGHFAD

YEELREQLSSVSSFERFEIFPKESSWPNHTTTGVSASCSHNGESSFYKNL

LWLTGKNGKYPNLSKSYTNNKEKEVLVLWGVHHPPDIEDQRRLYHTENAY

VSVRSSHYSRKFTPEIAKRPKVRDQEGRINYYWTLLEPGDTITFEANGNL

IAPRYAFALSRG

To develop a maximally glycan masked and stable molecule, the inventors then combined the glycan masking from eHead_H1_g2.10_mC with the stabilization mutations from eHead_H1_rsf4 to make a new molecules: eHead_H1_v3.0. To further knock out the RBS, one more RBS KO mutation D190R was introduced to eHead_H1_v3.0 to form eHead_H1_v3.1. A cartoon representation of eHead_H1_v3.1 is shown in FIG. 11. These two molecules (v3.0 and v3.1) differ in the RBS resurfacing, but both have 17 glycans, 13 of which the inventors engineered and 4 of which are from native HA. The amino acid sequences for these two molecules are:

2. eHead_H1_v3.0_mC
EPLQLGNCSVAGWILGNPECEHLNSSESWSSIIEKPNPENGTCFPGHFA

DYENLTENLSSVSSFERFEIFPKNSTWPNHTTNGTSASCSHNGSSSFYK

NLLWLTGKNGTYPNLSKNYTNNKNKTVLVLWGVHHPPDIEDQRRLYHTE

NAYVSVNSSHYNRTFTPEIAKRPKVRDQEGRINYYWTLLEPNDTITFEA

NGNLIAPRYAFALNRS 3. eHead_H1_v3.1_mC
EPLQLGNCSVAGWILGNPECEHLNSSESWSSIIEKPNPENGTCFPGHFA

DYENLTENLSSVSSFERFEIFPKNSTWPNHTTNGTSASCSHNGSSSFYK

NLLWLTGKNGTYPNLSKNYTNNKNKTVLVLWGVHHPPDIERQRRLYHTE

NAYVSVNSSHYNRTFTPEIAKRPKVRDQEGRINYYWTLLEPNDTITFEA

NGNLIAPRYAFALNRS

The alignment of the eHead_H1_v3.0 and eHead_H1_v3.1 sequences to the wt (eHead_H1Solomon) sequence shows that eHead_H1_v3.0 has 30 mutations and eHead_H1_v3.1 has 31 mutations in total (FIG. 10).

Figure 12:
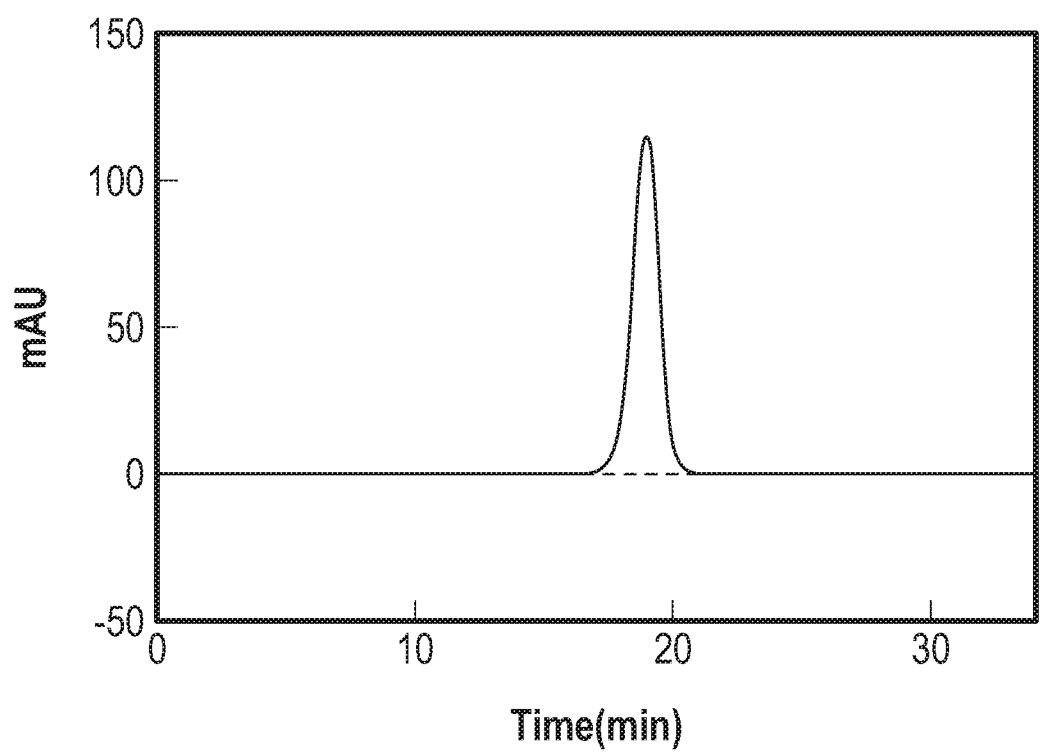

Biophysical characterization of eHead immunogen. To assess the purity of the eHead monomer, eHead_H1_v3.0 and eHead_H1_v3.1 were expressed in mammalian cells (293F) and purified by Nickle affinity column followed by size-exclusion chromatography. The purified proteins are both clean monomers as shown in the SECMALS (FIG. 12).

Figure 13:
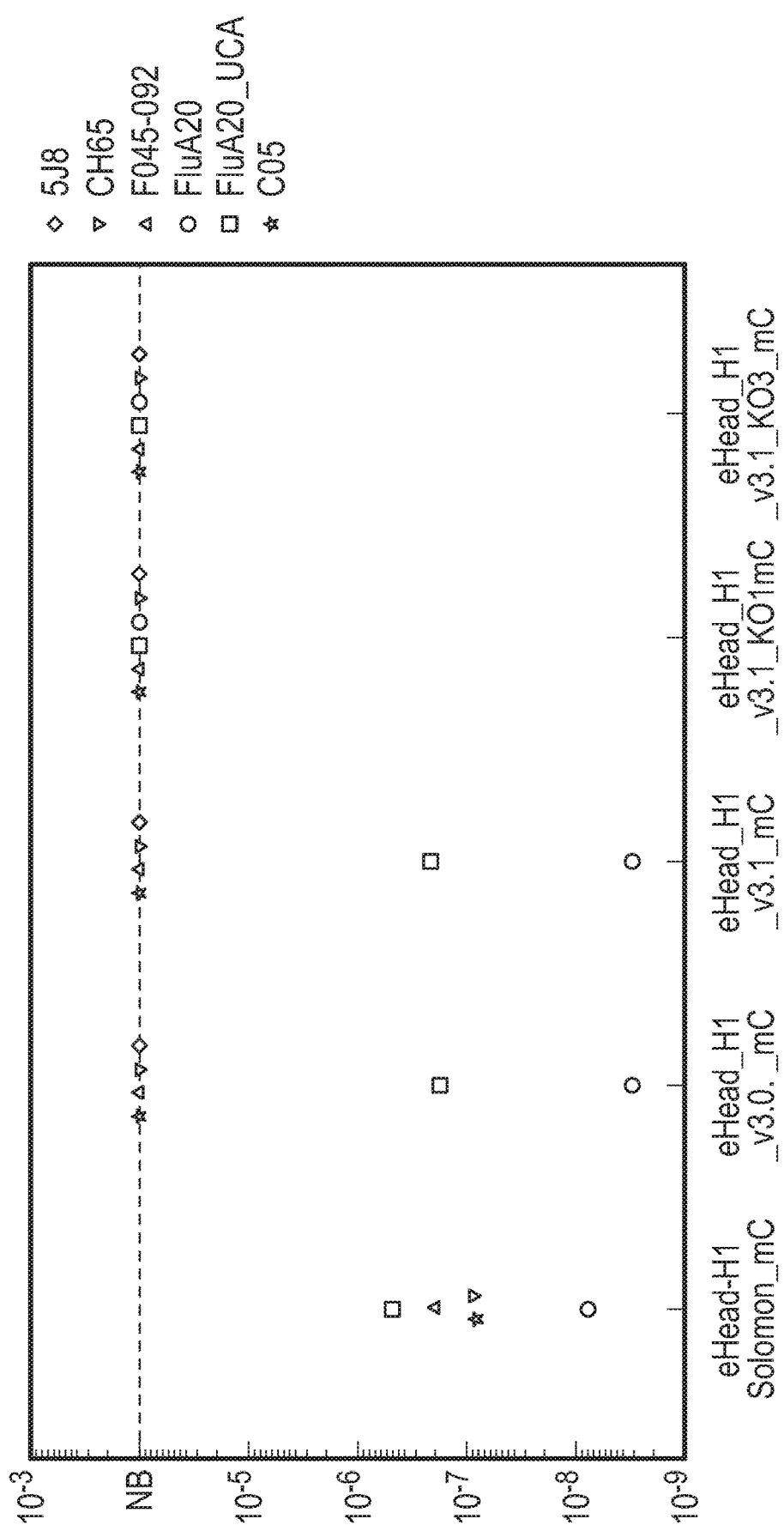
Figure 15B:
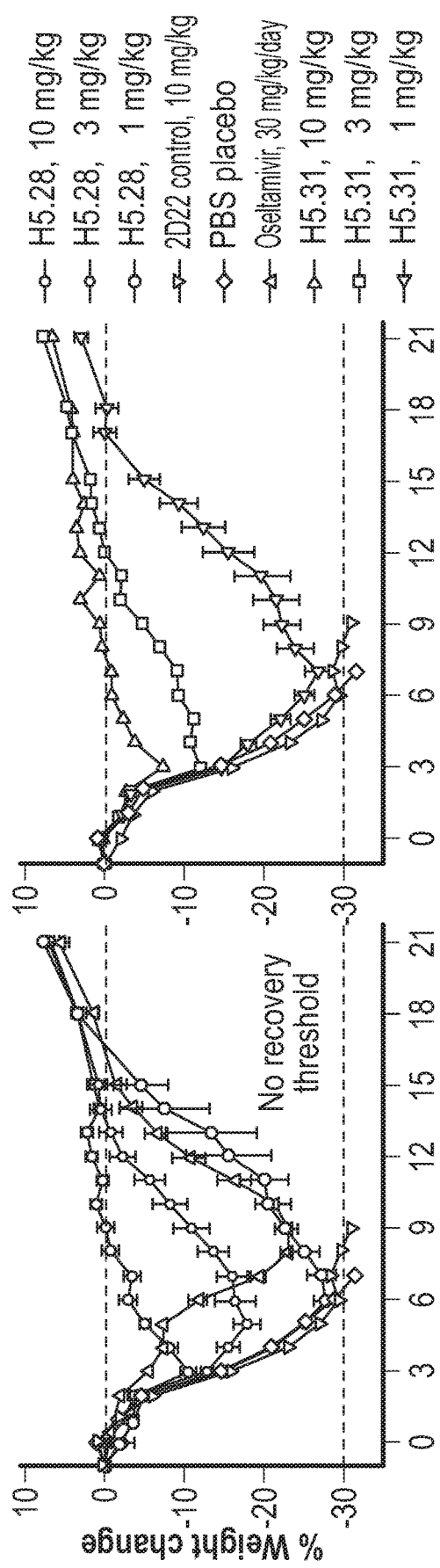
Figure 15C:
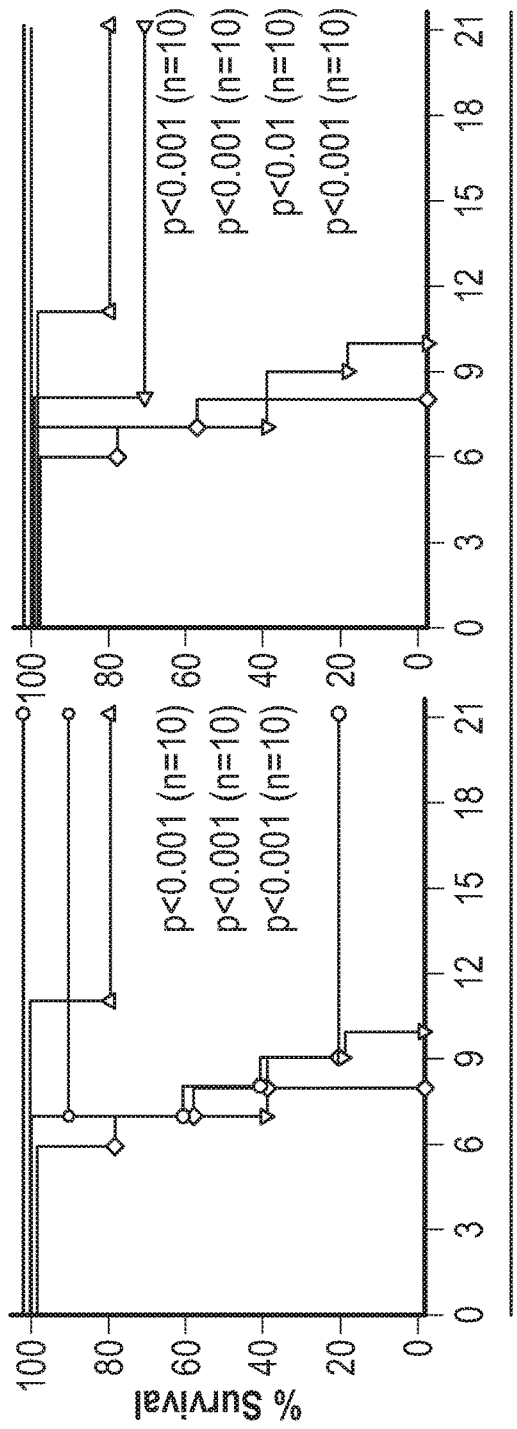

To evaluate the antigenic profile of the eHead monomer, the inventors performed surface plasmon resonance (SPR) experiments (FIG. 13). The dissociation constants of the eHead_H1_v3.1 monomer for FluA20 and FluA20_UCA are 2.8 nM and 220 nM respectively. Meanwhile, eHead_H1_v3.1 exhibits no detectable binding to RBS-directed antibodies (5J8, CH65, F045-092, C05) suggesting that this eHead immunogen is very specific to FluA20. To further confirm specificity, the inventors designed epitope knock-out point mutants eHead_H1_v3.1_KO1 and eHead_H1_v3.1_KO3, both of which abolish the binding to FluA20. These results demonstrate that the engineered eHead molecule is monomeric, pure and very specific for FluA20 binding with high affinity. The sequences of the two knockout mutants, with the knockout mutations underlined, are:

4. eHead_H1_v3.1_KO1_mC
EPLQLGNCSVAGWILGNPECEHLNSSESWSSIIEKPNPENGTCFPGHFAD

YENLTENLSSVSSFERFEIFPKNSTWPNHTTNGTSASCSHNGSSSFYKNL

LWLTGKNGTYPNLSKNYTNNKNKTVLVLWGVHHPPDIERQRRLYHTENAY

VSVNSSHYNRTFTPEIAKRPKVRDQEG_A_INYYWTLLEPNDTITFEANGNL

IAPRYAFALNRS 5. eHead_H1_v3.1_KO3_mC
EPLQLGNCSVAGWILGNPECEHLNSSESWSSIIEKPNPENGTCF_W_GHFAD

YENLTENLSSVSSFERFEIFPKNSTWPNHTTNGTSASCSHNGSSSFYKNL

LWLTGKNGTYPNLSKNYTNNKNKTVLVLWGVHHPPDIERQRRLYHTENAY

VSVNSSHYNRTFTPEIAKRPKVRDQEGRINYYWTLLEPNDTITFEANGNL

IAPRYAFALNRS eHead nanoparticles. To create nanoparticles for eHead_H1_v3.0 and eHead_H1_v3.1, the inventors tested expression and purification of self-assembling particles made from fusions of eHead_H1_v3.1 monomer fused to the N-terminus of Lumazine Synthase (LS) from Aquafex Aeolicus. This design should result in nanoparticles with 60 copies of an eHead monomer arrayed on the exterior of the core LS nanoparticle. Negative stain EM analyses demonstrate formation of nanoparticles (shown in FIG. 14). SEC-MALS analyses indicates that the nanoparticles have the expected molecular weight for a 60-mer, confirming that these nanoparticles present 60 copies of the eHead mini-domain. The sequence of the nanoparticle is shown below, with lower case letters showing DNA and uppercase letters showing amino acids. The specific DNA codon optimization shown for the LS component of the eHead_H1_v3.0_d41m3_Ct_60mer and eHead_H1_v3.1_d41m3_Ct_60mer is required to form nanoparticles.

6. eHead_H1_v3.0_d41m3_Ct_60mer
atgcagatctacgaaggaaaactgaccgctgagggactgaggttcggaa ttgtcgcaagccgcgcgaatcacgcactggtggataggctggtggaagg cgctatcgacgcaattgtccggcacggcgggagagaggaagacatcaca ctggtgagagtctgcggcagctgggagattcccgtggcagctggagaac tggctcgaaaggaggacatcgatgccgtgatcgctattggggtcctgtg ccgaggagcaactcccagcttcgactacatcgcctcagaagtgagcaag gggctggctgatctgtcccatggagctgaggaaacctatcacttttggc gtgattactgccgacaccctggaacaggcaatcgaggcggccggcacct gccatggaaacaaaggctgggaagcagccctgtgcgctattgagatggc aaatctgttcaaatctctgcgaggaggctccggaggatctggagggagt ggaggctcaggaggaggcEPLQLGNCSVAGWILGNPECEHLNSSESWSS

IIEKPNPPENGTCFPGHFADYENLTENLSSVSSFERFEIFPKNSTPWNH

TTNGTSASCSHNGSSSFYKNLLWLTGKNGTYPNLSKNYTNNKNKTVLVL

WGVHHPPDIEDQRRLYHTENAYVSVNSSHYNRTFTPEIAKRPKVRDQEG

RINYYWTLLEPNDTITFEANGNLIAPRYAFALNRS**

The corresponding translated amino acid sequence
of the eHead_H1_v3.0_d41m3_Ct_60mer is:

7. eHead_H1_v3.0_d41m3_Ct_60mer
MQIYEGKLTAEGLRFGIVASRANHALVDRLVEGAIDAIVRHGGREEDIT

LVRVCGSWEIPVAAGELARKEDIDAVIAIGVLCRGATPSFDYIASEVSK

GLADLSLELRKPITFGVITADTLEQAIEAAGTCHGNKGWEAALCAIEMA

NLFKSLRGGSGGSGGSGGSGGGEPLQLGNCSVAGWILGNPECEHLNSSE

SWSSIIEKPNPENGTCFPGHFADYENLTENLSSVSSFERFEIFPKNSTW

PNHTTNGTSASCSHNGSSSFYKNLLWLTGKNGTYPNLSKNYTNNKNKTV

LVLWGVHHPPDIEDQRRLYHTENAYVSVNSSHYNRTFTPEIAKRPKVRD

QEGRINYYWTLLEPNDTITFEANGNLIAPRYAFALNRS 8. eHead_H1_v3.1_d41m3_Ct_60mer
atgcagatctacgaaggaaaactgaccgctgagggactgaggttcggaa ttgtcgcaagccgcgcgaatcacgcactggtggataggctggtggaagg cgctatcgacgcaattgtccggcacggcgggagagaggaagacatcaca ctggtgagagtctgcggcagctgggagattcccgtggcagctggagaac tggctcgaaaggaggacatcgatgccgtgatcgctattggggtcctgtg ccgaggagcaactcccagcttcgactacatcgcctcagaagtgagcaag gggctggctgatctgtccctggagctgaggaaacctatcacttttggcg tgattactgccgacaccctggaacaggcaatcgaggcggccggcacctg ccatggaaacaaaggctgggaagcagccctgtgcgctattgagatggca aatctgttcaaatctctgcgaggaggctccggaggatctggagggagtg gaggctcaggaggaggcEPLQLGNCSVAGWILGNPECEHLNSSESWSSI

IEKPNPENGTCFPGHFADYENLTENLSSVSSFERFEIFPKNSTWPNHTT

NGTSASCSHNGSSSFYKNLLWLTGKNGTYPNLSKNYTNNKNKTVLVLWG

VHHPPDIERQRRLYHTENAYVSVNSSHYNRTFTPEIAKRPKVRDQEGRI

NYYWTLLEPNDTITFEANGNLIAPRYAFALNRS**

The corresponding translated amino acid sequence of the eHead_H1_v3.1_d41m3_Ct_60mer is:

9. eHead_H1_v3.1_d41m3_Ct_60mer
MQIYEGKLTAEGLRFGIVASRANHALVDRLVEGAIDAIVRHGGREEDITL

VRVCGSWEIPVAAGELARKEDIDAVIAIGVLCRGATPSFDYIASEVSKGL

ADLSLELRKPITFGVITADTLEQAIEAAGTCHGNKGWEAALCAIEMANLF

KSLRGGSGGSGGSGGSGGGEPLQLGNCSVAGWILGNPECEHLNSSESWSS

IIEKPNPENGTCFPGHFADYENLTENLSSVSSFERFEIFPKNSTWPNHTT

NGTSASCSHNGSSSFYKNLLWLTGKNGTYPNLSKNYTNNKNKTVLVLWGV

HHPPDIERQRRLYHTENAYVSVNSSHYNRTFTPEIAKRPKVRDQEGRINY

YWTLLEPNDTITFEANGNLIAPRYAFALNRS**

Expanded specificity. Although the above molecules are highly specific for FluA20 by design, the inventors can also revert selected design mutations in order to broaden the antigenic specificity to other antibodies. For instance, by reverting some of the resurfacing mutations in the RBS epitope and some of the glycan masking, they can make a version eHead_H1_v3.2_mC that regains binding to RBS antibodies and binds to both the FluA20 and the RBS Abs.

10. eHead_H1_v3.2_mC
EPLQLGNCSVAGWILGNPECEHLNSSESWSSIIEKPNPENGTCFPGH

FADYENLTENLSSVSSFERFEIFPKNSTWPNHTTTGVSASCSHNGES

SFYKNLLWLTGKNGTYPNLSKNYTNNKNKTVLVLWGVHHPPNIGDQR

ALYHTENAYVSVNSSHYNRTFTPEIAKRPKVRDQEGRINYYWTLLEP

NDTITFEANGNLIAPRYAFALNRS

-continued

Sequences for the different glycan designs
(not including sequences already listed above):

11. eHead_H1_g1.0_mC
ADPGYLLEAPLQLGNCSVAGWILGNPECELLISRESWSYIVEKPNPE

NGTCYPGHFADYEELREQLSSVSSFERFEIFPKESSWPNHTTTGVSA

SCSHNGESSFYKNLLWLTGKNGLYPNLSKSYNKEKEVLVLWGVH

HPPNIGDQRALYHTENAYVSVVSSHYSRKFTPEIAKRPKVRDQEGRI

NYYWTLLEPGDTIIFEANGNLIAPRYAFALSRG

75
12. eHead_H1_g1.1_mC
ADPGYLLEAPLQLGNCSVAGWILGNPECELLSESWSYIVEKPNP

ENGTCYPGHFADYEELREQLSSVSSFERFEIFPKESSWPNHTTTGVS

ASCSHNGESSFYKNLLWLTGKNGLYPNLSKSYANNKEKEVLVLWGVH

HPPNIGDQRALYHTENAYVSVVSSHYSRKFTPEIAKRPKVRDQEGRI

NYYWTLLEPGDTIIFEANGNLIAPRYAFALSRG

173
13. eHead_H1_g1.2_mC
ADPGYLLEAPLQLGNCSVAGWILGNPECELLISRESWSYIVEKPNPE

NGTCYPGHFADYEELREQLSSVSSFERFEIFPKESSWPNHTTTGVSA

SCSHNGESSFYKNLLWLTGKNGLYPNLSKSYANNKKVLVLWGVH

HPPNIGDQRALYHTENAYVSVVSSHYSRKFTPEIAKRPKVRDQEGRI

NYYWTLLEPGDTIIFEANGNLIAPRYAFALSRG

167
14. eHead_H1_g1.3_mC
ADPGYLLEAPLQLGNCSVAGWILGNPECELLISRESWSYIVEKPNPE

NGTCYPGHFADYEELREQLSSVSSFERFEIFPKESSWPNHTTTGVSA

SCSHNGESSFYKNLLWLTGKNGLYPNLSKYNNKEKEVLVLWGVH

HPPNIGDQRALYHTENAYVSVVSSHYSRKFTPEIAKRPKVRDQEGRI

NYYWTLLEPGDTIIFEANGNLIAPRYAFALSRG

210
15. eHead_H1_g1.4_mC
ADPGYLLEAPLQLGNCSVAGWILGNPECELLISRESWSYIVEKPNPE

NGTCYPGHFADYEELREQLSSVSSFERFEIFPKESSWPNHTTTGVSA

SCSHNGESSFYKNLLWLTGKNGLYPNLSKSYANNKEKEVLVLWGVHH

PPNIGDQRALYHTENAYVSVVSSHYRFTPEIAKRPKVRDQEGRI

NYYWTLLEPGDTIIFEANGNLIAPRYAFALSRG

261
16. eHead_H1_g1.5_mC
ADPGYLLEAPLQLGNCSVAGWILGNPECELLISRESWSYIVEKPNPE

NGTCYPGHFADYEELREQLSSVSSFERFEIFPKESSWPNHTTTGVSA

SCSHNGESSFYKNLLWLTGKNGLYPNLSKSYANNKEKEVLVLWGVHH

PPNIGDQRALYHTENAYVSVVSSHYSRKFTPEIAKRPKVRDQEGRIN

YYWTLLEPGDTIIFEANGNLIAPRYAFALR

158
17. eHead_H1_g1.6_mC
ADPGYLLEAPLQLGNCSVAGWILGNPECELLISRESWSYIVEKPNPE

NGTCYPGHFADYEELREQLSSVSSFERFEIFPKESSWPNHTTTGVSA

SCSHNGESSFYKNLLWLTGKNGYPNLSKSYANNKEKEVLVLWGVH

HPPNIGDQRALYHTENAYVSVVSSHYSRKFTPEIAKRPKVRDQEGRI

NYYWTLLEPGDTIIFEANGNLIAPRYAFALSRG

133
18. eHead_H1_g1.7_mC
ADPGYLLEAPLQLGNCSVAGWILGNPECELLISRESWSYIVEKPNPE

NGTCYPGHFADYEELREQLSSVSSFERFEIFPKESSWPNHTTGS

ASCSHNGESSFYKNLLWLTGKNGLYPNLSKSYANNKEKEVLVLWGVH

HPPNIGDQRALYHTENAYVSVVSSHYSRKFTPEIAKRPKVRDQEGRI

NYYWTLLEPGDTIIFEANGNLIAPRYAFALSRG

124
19. eHead_H1_g1.8_mC
ADPGYLLEAPLQLGNCSVAGWILGNPECELLISRESWSYIVEKPNPE

NGTCYPGHFADYEELREQLSSVSSFERFEIFPKSWPNHTTTGVS

ASCSHNGESSFYKNLLWLTGKNGLYPNLSKSYANNKEKEVLVLWGVH

HPPNIGDQRALYHTENAYVSVVSSHYSRKFTPEIAKRPKVRDQEGRI

NYYWTLLEPGDTIIFEANGNLIAPRYAFALSRG

205
20. eHead_H1_g1.10_mG
ADPGYLLEAPLQLGNCSVAGWILGNPECELLISRESWSYIVEKPNPE

NGTCYPGHFADYEELREQLSSVSSFERFEIFPKESSWPNHTTTGVSA

SCSHNGESSFYKNLLWLTGKNGLYPNLSKSYANNKEKEVLVLWGVHH

PPNIGDQRALYHTENAYVSVSSHYSRKFTPEIAKRPKVRDQEGRI

NYYWTLLEPGDTIIFEANGNLIAPRYAFALSRG g1.6 + g1.7 + g1.10
21. eHead_H1_g1.12_mC
ADPGYLLEAPLQLGNCSVAGWILGNPECELLISRESWSYIVEKPNPE

NGTCYPGHFADYEELREQLSSVSSFERFEIFPKESSWPNHTTGS

ASCSHNGESSFYKNLLWLTGKNGYPNLSKSYANNKEKEVLVLWGV

HHPPNIGDQRALYHTENAYVSVSSHYSRKFTPEIAKRPKVRDQEG

RINYYWTLLEPGDTIIFEANGNLIAPRYAFALSRG g1.1 + g1.2 + g1.3 + g1.4
22. eHead_H1_g1.13_mC
ADPGYLLEAPLQLGNCSVAGWILGNPECELLSESWSYIVEKPNP

ENGTCYPGHFADYEELREQLSSVSSFERFEIFPKESSWPNHTTTGVS

ASCSHNGESSFYKNLLWLTGKNGLYPNLSKYNNKKVLVLWGV

HHPPNIGDQRALYHTENAYVSVVSSHYRFTPEIAKRPKVRDQEG

RINYYWTLLEPGDTIIFEANGNLIAPRYAFALSRG g1.1 + g1.2 + g1.3 + g1.4 + g1.5 + g1.7
23. eHead_H1_g1.14_mC
ADPGYLLEAPLQLGNCSVAGWILGNPECELLSSESWSYIVEKPNP

ENGTCYPGHFADYEELREQLSSVSSFERFEIFPKESSWPNHTTG

SASCSHNGESSFYKNLLWLTGKNGLYPNLSKYNNKKVLVLWG

VHHPPNIGDQRALYHTENAYVSVVSSHYRFTPEIAKRPKVRDQE

GRINYYWTLLEPGDTIIFEANGNLIAPRYAFALR

24. eHead_H1_g2.0_mC

-continued
ADPGYLLEAPLQLGNCSVAGWILGNPECELLISRESWSYIVEKPNPE

NGTCYPGHFADYEELREQLSSVSSFERFEIFPKESSWPNHTTTGVSA

SCSHNGSSFYKNLLWLTGKNGLYPNLSKSYANNKEKEVLVLWGVH

HPPNIGDQRALYHTENAYVSVVSSHYSRKFTPEIAKRPKVRDQEGRI

NYYWTLLEPGDTIIFEANGNLIAPRYAFALSRG g1.14 + g1.12, 8 glycans
25. eHead_H1_g2.1_mC
ADPGYLLEAPLQLGNCSVAGWILGNPECELLSESWSYIVEKPNP

ENGTCYPGHFADYEELREQLSSVSSFERFEIFPKESSWPNHTTG

SASCSHNGESSFYKNLLWLTGKNGYPNLSKYNNKKVLVLW

GVHHPPNIGDQRALYHTENAYVSVSSHYNRFTPEIAKRPKVRDQ

EGRINYYWTLLEPGDTIIFEANGNLIAPRYAFALR g1.14 + g1.6
26. eHead_H1_g2.2_mC
ADPGYLLEAPLQLGNCSVAGWILGNPECELLSESWSYIVEKPNPE

NGTCYPGHFADYEELREQLSSVSSFERFEIFPKESSWPNHTTGSA

SCSHNGESSFYKNLLWLTGKNGYPNLSKYNNKKVLVLWGVH

HPPNIGDQRALYHTENAYVSVVSSHYRFTPEIAKRPKVRDQEGRI

NYYWTLLEPGDTIIFEANGNLIAPRYAFALR g2.2 + g1.8 + g1.10
27. eHead_H1_g2.3_mC
ADPGYLLEAPLQLGNCSVAGWILGNPECELLSESWSYIVEKPNPE

NGTCYPGHFADYEELREQLSSVSSFERFEIFPKSWPNHTTGS

ASCSHNGESSFYKNLLWLTGKNGYPNLSKYNNKKVLVLWG

VHHPPNIGDQRALYHTENAYVSVSSHYNRFTPEIAKRPKVRDQEG

RINYYWTLLEPGDTIIFEANGNLIAPRYAFALR g2.3 + g2.0
28. eHead_H1_g2.4_mC
ADPGYLLEAPLQLGNCSVAGWILGNPECELLSESWSYIVEKPNPE

NGTCYPGHFADYEELREQLSSVSSFERFEIFPKSWPNHTTGS

ASCSHNGSSFYKNLLWLTGKNGYPNLSKYNNKKVLVLW

GVHHPPNIGDQRALYHTENAYVSSSHYNRFTPEIAKRPKVRDQEG

RINYYWTLLEPGDTIIFEANGNLIAPRYAFALR

104
29. eHead_H1_g2.5_mC
ADPGYLLEAPLQLGNCSVAGWILGNPECELLISRESWSYIVEKPNPENG

TCYPGHFADYENLEQLSSVSSFERFEIFPKESSWPNHTTTGVSASCSH

NGESSFYKNLLWLTGKNGLYPNLSKSYANNKEKEVLVLWGVHHPPNIGD

QRALYHTENAYVSVVSSHYSRKFTPEIAKRPKVRDQEGRINYYWTLLEP

GDTIIFEANGNLIAPRYAFALSRG

108
30. eHead_H1_g2.7_mC
ADPGYLLEAPLQLGNCSVAGWILGNPECELLISRESWSYIVEKPNPENG

TCYPGHFADYEELRILSSVSSFERFEIFPKESSWPNHTTTGVSASCSH

NGESSFYKNLLWLTGKNGLYPNLSKSYANNKEKEVLVLWGVHHPPNIGD

QRALYHTENAYVSVVSSHYSRKFTPEIAKRPKVRDQEGRINYYWTLLEP

GDTIIFEANGNLIAPRYAFALSRG g2.4 + g2.7
31. eHead_H1_g2.8_mC
ADPGYLLEAPLQLGNCSVAGWILGNPECELLNSESWSYIVEKPNPEN

GTCYPGHFADYEELRINLSSVSSFERFEIFPKSWPNHTTGSA

SCSHNGSSFYKNLLWLTGKNGYPNLSKYNNKKVLVLWGV

HHPPNIGDQRALYHTENAYVSVSSHYNRFTPEIAKRPKVRDQEGR

INYYWTLLEPGDTIIFEANGNLIAPRYAFALR

32. eHead_H1_g2.10_mG
ADPGYLLEAPLQLGNCSVAGWILGNPECELLSESWSYIVEKPNPENG

TCYPGHFADYENLINLSSVSSFERFEIFPKSWPNHTTGSAS

CSHNGSSFYKNLLWLTGKNGYPNLSKYNNKKVLVLWGVHHP

PNIGDQRALYHTENAYVSVSSHYNRFTPEIAKRPKVRDQEGRINYY

WTLLEPNDTIIFEANGNLIAPRYAFALR

Example 5—Materials an Methods or (Examples 6-7)

Expression of soluble HA proteins for binding studies. Sequences encoding the HA genes of interest were optimized for mammalian cell expression, and cDNAs were synthesized (Genscript) as soluble trimeric constructs as described previously (Bangaru et al., 2016). A monomeric HA head domain construct was synthesized with an HA-derived signal peptide sequence, an N-terminal 6-His tag, an AviTag site-specific biotinylation sequence, a thrombin cleavage site, and residues 52-263 of the A/California/07/2009 H1 HA head domain. HA proteins were expressed by transient transfection of 293F or Expi293F cells and grown in expression medium (Invitrogen). Cell supernatants were harvested after 7 days, sterilized by filtration with a 0.4 μm filter and recombinant proteins were purified with HisTrap TALON FF crude or HisTrap Excel columns (GE Healthcare Life Sciences).

PBMC and plasmablast isolation and repertoire sequencing. Studies were approved by the Vanderbilt University Medical Center Institutional Review Board. Peripheral blood was collected from a healthy donor with prior history of many seasonal influenza vaccinations, H5N1 vaccination, and H7N9 vaccination after written informed consent. For longitudinal repertoire sequencing, PBMCs from the donor were isolated by density gradient separation on Ficoll, cryopreserved and stored in liquid nitrogen storage until use. Total RNA was extracted from 10 million PBMCs. In some instances, a one-step RT-PCR was performed for 25 cycles using heavy-chain BIOMED-2 variable antibody gene-specific primers as previously described (Bangaru et al., 2016; Thornburg et al., 2016; van Dongen et al., 2003) and the OneStep SuperScript III with Platinum® Taq High Fidelity kit (Invitrogen, 11304011). The Illumina-specific adapters were added using the Illumina TruSeq Library Preparation Kit (Illumina, FC-121-3001) according to the manufacturer's recommendations. The final amplicon libraries were sequenced on an Illumina MiSeq instrument using the MiSeq PE-300 v3 reagent kit (Illumina, MS-102-3001). Sequence analysis was performed using IG-BLAST v1.4, and results were parsed to MongoDB for further study. In other instances, the inventors followed a previously described 5' RACE approach incorporating unique molecular identifiers (UMIs) for bulk unpaired B cell repertoire sequencing (Turchaninova et al., 2016). Final libraries generated using this approach were sequenced in a symmetric (r1:300 cycles and r2: 300 cycles) or asymmetric (r1:30 cycles and r2: 270 cycles) fashion using the MiSeq PE-300 v3 reagent kit (Illumina, MS-102-3001) or NovaSeq 6000 S1 reagent kit (Illumina, 20012863), respectively. For sequencing the plasmablast response to H3N2 infection, PBMCs were isolated upon natural H3N2 infection on day 7 from symptom onset. Cells were stained with anti-CD19-FITC, anti-CD27-APC, and anti-CD38-PE antibodies (BD Biosciences) and resuspended in sc-$V_H$:$V_L$Seq sequencing buffer (D-PBS supplemented with 0.04% non-acetylated BSA) containing propidium iodide as a viability dye. Approximately 28,000 viable $CD19^{Low}$ $CD27^{high}$ $CD38^{high}$ cells were sorted into sc-$V_H$:$V_L$Seq sequencing buffer. ~20,000 plasmablasts were carried through single-cell RNA sequencing using the 10× Genomics Chromium platform with enrichment using the 5' VDJ amplification kit (10× Genomics) according to manufacturer instructions. Amplicons were sequenced on an Illumina Novaseq 6000, and data were processed using the CellRanger software (10× Genomics). cDNA encoding heavy and light chains of interest were synthesized and cloned into IgG1 and IgK/IgL expression vectors, respectively (Twist Bioscience). Heavy and light chain plasmids were transfected into 96-well ExpiCHO cultures for microscale expression. After 7 days, mAbs were purified using protein G sepharose resin (GE Life Sciences) and buffer-exchanged into D-PBS using Zeba 96-well desalting plates (Thermo-Fisher Scientific).

Generation of H5.28 and H5.31 hybridomas and purification of IgG. PBMCs were isolated from a donor who had received experimental H5N1 vaccines, as previously described (Thornburg et al., 2013). Briefly, human B cells in the PBMC suspension were immortalized by transformation with EBV in the presence of CpG10103, cyclosporin A, and a Chk2 inhibitor and plated in 384-well culture plates. On day 8, the supernatants from transformed B cells were used to screen for binding to recombinant H5 HA (A/Vietnam/1204/2005). The selected cloned cell lines secreting mAb H5.28 or H5.31 were grown initially in hybridoma growth medium (ClonaCell-HY medium E from STEMCELL Technologies). Prior to antibody expression and purification, these cell lines were switched to serum-free medium (GIBCO Hybridoma-SFM, Invitrogen). IgG from the hybridoma cell line supernatants was purified by affinity chromatography using protein G columns (GE Life Sciences). Purified H5.28 and H5.31 IgG generated from hybridomas was used for $EC_{50}$ binding measurements, competition-binding assays, and animal studies.

Identification of FluA-151 siblings and phylogenetic analysis. Using a database of curated antibody sequences from the FluA-151 donor, the inventors searched CDR amino acid sequences in sequences encoded by both of the inferred germline genes for FluA-151 (IGHV3-30 and IGHJ4 for the heavy chain; IGKV1-39 and IGKJ1 for the light chain). From this pool of sequences, they selected heavy and light chains with a CDR3 length between 19 and 13 amino acids for the heavy chain and 10 and 8 amino acids for the light chain. The inventors then ran blastp with these CDR3s, the CDR3s of FluA-151, and the seven FluA-151-related sequences identified in the single-cell RNA sequencing to obtain values for percent coverage and percent identity. They averaged the percent coverage and percent identity values to score these sequences and designated sequences with scores >85% against FluA-151 or any of the other seven plasmablast-derived sequences as FluA-151 siblings. For these siblings, the inventors extracted the full-length nucleotide sequences and aligned those sequences to the corresponding germline gene (IGHV3-30*18 or IGKV1-39*01) as well as FluA-151 and FluA-151 sibling sequences using Clustal Omega. They used the PHYLIP phylogenetic software package to generate a maximum-likelihood tree from the aligned sequences using the DNAML program, using the sequence of the germline IGHV or IGKV gene as an outgroup. The resulting phylogenetic trees were visualized using the FigTree phylogenetic tree viewer (FigTree v1.4.4) to color branches corresponding to sequencing timepoints, and the heavy and light chain sequences of the FluA-151 inferred common ancestor (UCA) were extracted from the PHYLIP-generated tree.

Sequencing of antibody genes from hybridomas. Antibody heavy and light-chain variable region genes were sequenced from antigen-specific hybridoma lines that had been cloned biologically from flow cytometry. Total RNA was extracted using the RNeasy Mini kit (Qiagen). The inventors modified a previously described 5'RACE approach for target enrichment and sequencing (Turchaninova et al., 2016). Briefly, 5 µl total RNA was mixed with cDNA synthesis primer mix (10 µM each) and incubated for 2 min at 70° C. and then decrease the incubation temperature to 42° C. to anneal the synthesis primers (1-3 min). After incubation, a mix containing 5× first-strand buffer (Clontech), DTT (20 mM), 5' template switch oligo (10 µM), dNTP solution (10 mM each) and 10× SMARTScribe Reverse Transcriptase (Clontech) was added to the primer-annealed total RNA reaction and incubated for 60 min at 42° C. The first-strand synthesis reaction was purified using the Ampure Size Select Magnetic Bead Kit at a ratio of 0.6× (Beckman Coulter). Following, a single PCR amplification reaction containing 5 µl first-strand cDNA, 2×Q5 High Fidelity Mastermix (NEB), dNTP (10 mM each), forward universal primer (10 µM) and reverse primer mix (0.2 µM each in heavy-chain mix, 0.2 µM each in light-chain mix) were subjected to thermal cycling with the following conditions: initial denaturation for 1 min 30 s followed by 30 cycles of denaturation at 98° C. for 10 s, annealing at 60° C. for 20 s, and extension at 72° C. for 40 s, followed by a final extension step at 72° C. for 4 min. The first PCR reaction was purified using the Ampure Size Select Magnetic Bead Kit at a ratio of 0.6× (Beckman Coulter). Amplicon libraries were then prepared according to the Pacific Biosciences Multiplex SMRT Sequencing protocol and sequenced on a Pacific Biosciences Sequel platform (Pacific Biosciences, Menlo Park, CA). Raw sequencing data was demultiplexed and circular consensus sequences (CCS) were determined using the Pacific Biosciences SMRT Analysis tool suite. The identities of gene segments and mutations from germlines were determined by alignment using ImMunoGeneTics database (Brochet et al., 2008; Giudicelli et al., 2011).

Determination of half maximal effective concentration ($EC_{50}$) for binding. To determine $EC_{50}$ concentrations for binding, the inventors performed ELISAs using 384-well plates that were coated overnight at 2 µg/mL with the recombinant HA protein of interest. The plates then were blocked with 50 µL of 5% non-fat dry milk and 0.1% Tween-20 in D-PBS (ELISA buffer) for 1 hr at RT. The plates were washed and three-fold dilutions of the mAb in ELISA buffer at a starting concentration of 10 µg/mL were added to the wells and incubated for an hour. The plates were washed and 25 µL of ELISA buffer containing a 1:4,000 dilution of anti-human IgG alkaline phosphatase conjugate (Meridian Life Science, W99008A) was added. After a final wash, 25 µL of phosphatase substrate solution (1 mg/mL p-nitrophenol phosphate in 1 M Tris aminomethane) was added to the plates, incubated for 1 hr and the optical density values were measured at 405 nm wavelength on a BioTek plate reader. The plates were washed 3 times between each step with PBS containing 0.05% Tween-20. Each dilution was performed in quadruplicate, and the $EC_{50}$ values were calculated in Prism software (GraphPad) using non-linear regression analysis. Each experiment was conducted twice independently.

In vivo protection study. To assess protective efficacy of mAbs, female 18-20 g BALB/c mice (Charles River Laboratories, Wilmington, MA) were inoculated by the intraperitoneal (i.p.) route with a 1, 3, or 10 mg/kg dose of individual mAbs. Human anti-dengue virus mAb DENV 2D22 served as a mock control treatment at dose 10 mg/kg. Oseltamivir phosphate (hereafter referred to as oseltamivir) (Roche, Palo Alto, CA) diluted in sterile PBS was inoculated i.p. at 30 mg/kg/day and served as a positive control. In ABSL-2 facilities, ketamine-xylazine anesthetized mice were inoculated by the intranasal (i.n.) route at 24 hours after the mAb treatment with 2,200 50% cell culture infectious doses ($CCID_{50}$) mouse adapted influenza A/California/04/2009 (H1N1pdm) in 90 μL of sterile PBS. Oseltamivir treatments were given i.p. twice daily for 5 days, starting at 1 h post-infection. Mice were weighed and monitored daily for body weight change and signs of disease for 21 days, and those losing over 30% of initial body weight were humanely euthanized as per IACUC requirements. This study was conducted in the AAALAC-accredited laboratory animal research center of Utah State University in accordance with the approval of the institutional animal care and use committee of Utah State University.

Competition-binding assays. Biolayer interferometry on an Octet Red instrument (FortéBio) was used to perform competition-binding assays. Briefly, antigen and antibodies were diluted in D-PBS with 1% BSA and 0.05% Tween20. The inventors first loaded either trimeric recombinant HA from H1 A/California/04/2009 or monomeric HA head domain from H1 A/California/07/2009 onto Ni-NTA tips at a concentration of 20 μg/mL. They then tested binding of two successively applied mAbs at 50 μg/mL. Competition was analyzed using the Octet analysis software (Data Analysis 9, FortéBio). Binding values were normalized to the binding signal measured in the absence of the first antibodies, and self-self competition values were subtracted. Antibodies were defined as competing antibodies if the first antibody reduced binding of the second antibody by more than 70 percent. Antibodies were defined as non-competing antibodies if the first antibody reduced binding of the second antibody by less than 40 percent. Antibodies were defined as partially competing antibodies if the first antibody reduced binding of the second antibody between 40 and 70 percent.

Recombinant protein expression and purification for crystallography. A cDNA encoding the head domain of VN/04 HA (residues 58-268) was codon optimized, synthesized, and cloned into pcDNA3.1 (+) downstream of the signal peptide from pHLsec vector (Genscript). To facilitate protein purification, a linker sequence (AA) and a 6-his tag were added to the C-terminus of the construct. Synthetic cDNAs encoding the heavy chains and light chains of H5.31 and H5.28 Fabs were synthesized and cloned into pcDNA3.1 (+) downstream of the CD5 signal peptide (Genscript). Expi293F cells were transfected transiently with pcDNA3.1 (+) plasmids encoding the HA head domain, and culture supernatants were harvested after 6 to 7 days. The head domain was purified from the supernatants by nickel affinity chromatography with HisTrap Excel columns (GE Healthcare Life Sciences), and H5.31 and H5.28 Fabs were purified with CaptureSelect IgG-CH1 (Thermo Fisher Scientific). To obtain complexes of Fabs and HA head domain, purified recombinant Fabs were mixed with excess HA head domain in a molar ratio of 1:2. The mixture was incubated for ~10 minutes, and the complexes were purified from the mixture using a HiLoad® 16/600 Superdex® 200 size-exclusion column (GE Healthcare Life Sciences).

Crystallization, data collection, and structure determination. The complexes were concentrated to ~10 mg/mL in a buffer of 20 mM Tris-HCl pH 7.5, 50 mM NaCl, and then the concentrated samples were used for crystallization screen and optimization. Crystals of the complexes (H5.28-HA and H5.31-HA) were grown by the vapor diffusion method. Extensive initial crystallization screening was carried out with a TTP Labtech Mosquito robot (TTP Labtech), and subsequent crystallization optimization was performed manually using hanging-drop vapor diffusion method with 15-well screw-cap crystallization plates (Qiagen). The H5.28-HA head complex was crystallized in 7-9% PEG 8000, 0.3-0.7 M calcium acetate, 0.1 M imizadole pH 8.0, and the H5.31-HA head domain in 0.8 M potassium phosphate dibasic, 0.6 M sodium phosphate monobasic. The crystals were flash frozen in liquid nitrogen with 30% glycerol as the cryoprotectant. Diffraction data were collected at the Advanced Photon Source LS-CAT beamline 21-ID-G. The data were processed and integrated with XDS data processing software (Kabsch, 2010), and scaled with the software SCALA (Winn et al., 2011). The crystal structures of the both complexes were solved by molecular replacement using the crystal structure of VN/04 HA head domain (PDBID: 4XNQ) and the crystal structure of human anti-Marburg Fab MR78 (PDB ID: 5JRP) as the searching models with the program Phaser (McCoy et al., 2007). The structures were refined and manually rebuilt with Phenix (Adams et al., 2010) and Coot (Emsley and Cowtan, 2004). The data collection and refinement statistics are shown in supplementary Table S5. Structure figures were generated by MacPyMol (DeLano Scientific LLC).

Peptide fragmentation and deuterium exchange mass spectrometry. To maximize peptide probe coverage, the optimized quench condition was determined prior to deuteration studies (Hsu et al., 2009; Whittle et al., 2011). In short, the HA head domain was diluted with buffer of 8.3 mM Tris, 150 mM NaCl, in $H_2O$, pH 7.15) at 0° C. and then quenched with 0.8% formic acid (v/v) containing various concentration of GuHCl (0.8-6.4 M) and Tris(2-carboxyethyl)phosphine (TCEP) (0.1 or 1.0 M). After incubating on ice for 5 min, the quenched samples were diluted 4-fold with 0.8% formic acid (v/v) containing 16.6% (v/v) glycerol and then were frozen at −80° C. until they were transferred to the cryogenic autosampler. Using the quench buffer of 1.4 M GuHCl, 100 mM TCEP in 0.8% formic acid gave an optimal peptide coverage map. The samples later were thawed automatically on ice and then immediately passed over an AL-20-pepsin column (16 μL bed volume, 30 mg/mL porcine pepsin (Sigma)). The resulting peptides were collected on a C18 trap and separated using a C18 reversed phase column (Vydac) running a linear gradient of 0.046% (v/v) trifluoroacetic acid, 6.4% (v/v) acetonitrile to 0.03% (v/v) trifluoroacetic acid, 38.4% (v/v) acetonitrile over 30 min with column effluent directed into an Orbitrap Elite mass spectrometer (Thermo-Fisher Scientific). Data were acquired in both data-dependent MS:MS mode and MS1 profile mode. Proteome Discoverer software (Thermo Finnigan Inc.) was used to identify the sequence of the peptide ions. DXMS Explorer (Sierra Analytics Inc., Modesto, CA) was used for the analysis of the mass spectra as described previously (Hamuro et al., 2004). Fab bound HAs were prepared by mixing H5.28 Fab with monomeric H5 head domain at a 1:1.3 (HA:F5.28Fab) and 1.2:1 (HA:H5.28Fab) stoichiometric ratio. The mixtures were incubated at 25° C. for 30 min. All functionally deuterated samples, with the exception of the equilibrium-deuterated control, and buffers were pre-chilled on ice and prepared in the cold room. Functional deuterium-hydrogen exchange reaction was initiated by diluting free HA or antibody-bound HA stock solution with $D_2O$ buffer (8.3 mM Tris, 150 mM NaCl, in $D_2O$, pDREAD 7.15) at a 1:2 vol/vol ratio. At 10 sec, 100 sec and 1,000 sec, the quench solution was added to the respective samples, and then incubated on for 5 minutes before frozen at −80° C. In addition, nondeuterated samples, equilibrium-deuterated back-exchange control samples were prepared as previously described (Hsu et al., 2009; Whittle et al., 2011; Lu et al., 2012). The centroids of the isotopic envelopes of nondeuterated, functionally deuterated, and fully deuterated peptides were measured using DXMS Explorer, and then converted to corresponding deuteration levels with corrections for back-exchange (Zhang and Smith, 1993).

Influenza viruses. The virus stocks used for neutralization assays were made from the supernatant of virus-infected MDCK cell culture monolayers in plain Dulbecco's Modified Eagle Medium supplemented with 2 µg/mL of TPCK-trypsin. The virus used for murine experiments, a mouse adapted A/California/04/2009 H1N1 strain, was propagated in embryonated chicken eggs.

Microneutralization assays. Neutralization potential of H5.28 and H5.31 were determined by microneutralization and HAI assays, as previously described (Bangaru et al., 2016). Briefly, 2-fold serial dilutions of each antibody in viral growth medium (plain DMEM supplemented with 2 μg/ml of TPCK-trypsin and 50 μg/ml gentamicin). were mixed with an equivalent volume of viral growth medium containing 100 $TCID_{50}$ of virus. Antibodies and virus were incubated for 1 hr at RT The MDCK cell monolayer cultures were washed twice with 100 μl PBS containing 0.1% Tween-20, and the virus-antibody mixture then was added to cells and incubated for 32 hours at 37° C. After incubation, cells were washed and fixed with 100 μl of 80% methanol/20% PBS. The presence of influenza nucleoprotein in the fixed cells was determined by ELISA using a 1:8,000 dilution of mouse anti-NP antibody (BEI Resources) as the primary antibody and a 1:4,000 dilution of goat anti-mouse alkaline phosphate conjugate as the secondary antibody (ThermoFisher Scientific). Each dilution was tested in triplicate and neutralization curves were graphed using GraphPad Prism.

Flow cytometric analysis of antibody binding to cell-surface expressed HA. HEK293F cells grown in expression medium were transfected transiently with cDNA encoding H3 A/Hong Kong/1/1968 HA protein and incubated at 37° C. for 36 h. Untransfected (UT) or transfected cells were washed and incubated with either DMEM containing TPCK trypsin (2 μg/mL) or plain DMEM for 15 min at 37° C. After incubation cells were washed with PBS containing 2% of heat-inactivated FBS and 2 mM EDTA (FACS buffer) Cells were then stained with mAbs H5.28, H5.31, or FI6v3 (10 μg/mL) for 30 min at RT and for 5 min at 37° C. The cells were washed with FACS buffer and incubated with secondary goat anti-human IgG PE antibody (Southern Biotech) for 1 hour at 4° C., fixed with 4% formaldehyde in PBS, and analyzed by flow cytometry using an LSR-2 cytometer (BD Biosciences). Data for a total of up to 20,000 cell events were acquired and flow cytometry data were analyzed with FlowJo software (Tree Star).

Negative stain electron microscopy. H5.38 or H5.31 Fabs were incubated with uncleaved H1 HA trimer for 20 seconds at 5 times molar excess of Fab. The complex was added to carbon-coated 400 mesh cooper grids and stained with 2% uranyl formate. Micrographs were collected on a 120kv Tecnai Spirit microscope with a 4k×4k TemCam F416 camera using Leginon (Potter et al., 1999). Images then were processed with Appion (Lander et al., 2009). Particles were selected with DoGpicker (Voss et al., 2009), and 2D classes were generated with MSA/MRA (Ogura et al., 200359). Particles were false colored in Photoshop.

Example 6—Results

Identification of broadly reactive human TI mAbs in a panel of H5 HA-specific mAbs. The inventors previously reported isolation of H5 HA-specific human antibodies from otherwise healthy subjects who had received an A/Vietnam/1203/2004 H5N1 (designated hereafter VN/04) subunit vaccine (Thornburg et al., 2013). Here they examined the reactivity of some of the H5-reactive mAbs to determine if any exhibited heterosubtypic breadth of recognition for diverse HA subtypes. To investigate the breadth, the inventors tested purified IgGs for each for binding activity to HA from different IAV subtypes; all HA proteins used were recombinant trimers. MAbs designated H5.28 and H5.31 exhibited breadth of binding to recombinant HAs belonging to group 1 (H1, H2, H5, H6, H8, H9, H11 and H12) and group 2 (H3, H4, H7, H10, H14 and H15) viruses (FIG. 15A). DNA copies of the wild-type H5.28 and H5.31 variable regions were synthesized and recombinant forms of IgG proteins were expressed; hybridoma-generated antibody (designated H5.28 or H5.31) was used for the assays unless the recombinant form is specified (designated as rH5.28 or rH5.31). As expected, the rH5.28 and rH5.31 IgGs showed a similar binding pattern to the corresponding hybridoma-produced IgG proteins. Neither H5.28 nor H5.31 had hemagglutinin-inhibiting or neutralizing activity for rgA/Vietnam/1203/2004 PR8 H5N1, when tested in concentrations as high as 10 μg/mL as the original hybridoma derived IgG nor as recombinant purified IgG molecules made in 293F or Chinese hamster ovary (CHO) cells (FIG. S9). Despite the fact that these antibodies did not neutralize virus in vitro, they protected against weight loss and death in mice following a stringent lethal challenge with the virus. To examine if the mAbs could mediate protective activity in vivo, the inventors chose a mouse-adapted A/California/04/2009 (H1N1pdm) virus strain for prophylactic studies. BALB/c mice (n=10 per group) were administered 1, 3 or 10 mg/kg of H5.28 or H5.31 IgG or a similarly prepared control antibody by the intraperitoneal route, and then challenged by the intranasal route 24 hours later with a lethal dose of virus. H5.28 or H5.31 mediated complete protection against mortality and protection against severe weight loss at all three tested doses. Protection with low dose mAb treatment was comparable to that of high-dose oseltamivir given at a high daily dose of 30 mg/kg/day on days 1 to 5 after virus inoculation. Mice treated with H5.28 (FIG. 15B), or H5.31 (FIG. 15C) (n=10 for each group) showed protection from weight loss after virus challenge in a dose-dependent manner whereas mice treated with PBS or the 2D22 control antibody died. These results indicate the ability of mAb H5.28 or H5.31 to protect in vivo against lethal virus challenge against a virulent influenza A virus strain.

To identify the specific epitope recognized by these mAbs, the inventors performed hydrogen deuterium exchange mass spectrometry (HDX-MS) experiments. They used a monomeric head domain of H5 (based on strain VN/04) to identify peptides on the surface of HA that are occluded following binding of H5.28. H5 HA head domain. They found that H5.28 Fab reduced deuterium labeling of peptides comprising residues 96-105, 136-147, and 217-233 (H3 structure numbering, FIG. 16A and FIGS. S10A-B). From the HDX-MS studies, the inventors anticipated that H5.28 or H5.31 binding to the HA trimer destabilizes the trimeric interface of native HA. To directly examine the effect of these Fabs on the HA trimer, they performed negative-stain electron microscopy (nsEM) of HA (uncleaved H1 A/California/04/2009 [H1 HA0]) in complex with either H5.28 or H5.31 Fab incubated for different lengths of time. Native H1 HA0 trimer remained in its trimeric conformation during nsEM sample preparation (FIG. 16B). In contrast, the inventors observed that upon exposure to H5.28 or H5.31 even for 20 seconds (the shortest time point that could be tested), the HA0 trimers quickly degraded into Fab-bound monomeric HA, with only a small fraction of Fab-free HA remaining in a trimeric conformation (FIG. 16B). Despite extensive trials, the intermediate stage of this structural change could not be obtained, apparently due to the rapid transformation of the HA0 from trimeric to monomeric states induced by antibody binding. These results demonstrate that H5.28 and H5.31 bind the uncleaved HA0 trimer, and then dissociate the trimer in vitro (FIG. 16B). The ability to selectively disrupt HA0 trimers on the surface of infected cells and consequently inhibit cell-cell spread is consistent with this in vitro phenomenon. Both mAbs H5.28 and H5.31 bound preferentially to uncleaved HA (with reduced binding to cleaved HA) on the surface of HA-transfected cells, while a recombinant form of a representative stem domain antibody bound to both forms well (FIG. 16C).

To determine the molecular details of the interaction of H5.28 and H5.31 with the TI site, crystal structures of the H5.31 or H5.28 Fabs and their complexes with the HA head domain from VN/04 were determined at 3.00 Å or 4.00 Å resolution, respectively (Table S5). The complex structures revealed that H5.28 and H5.31 recognize an epitope in the TI region very similar to that of the previously reported FluA-20 and S5V2-29 mAbs (FIGS. 16D-F). Antibodies H5.31 and H5.28 are clonally related siblings from one human subject with identical HCDR3 sequences and only several amino acid variations in their light and heavy chains. The overlay of the two crystal structures showed that H5.28 binds to the HA head domain in the same general manner as H5.31, although some regions of H5.31, such as the heavy chain DE loop, HCDR1, and HCDR2 deviate from that of H5.28 (FIG. 16F). The superposition of the variable domain and HA head domain of H5.31-HA onto those of H5.28-HA results in a Cα RMSD of only 0.71 Å. The epitope recognized by H5.31/H5.28 on VN/04 maps onto one HA1 protomer of the H5N1 HA trimer (PDB ID: 4BGW) (FIG. 16G). This epitope can be divided into two regions: the 220-loop of the receptor-binding domain (residues 217-224, and residue 229, H3 structure numbering) and a second region at the 90-loop (FIG. 16G). The sequences of the 220-loop of influenza A HA are relatively conserved, thus recognition of this region by H5.31/H5.28 partly explains the binding breadth of the two mAbs. In addition, the epitope recognized by H5.31 and H5.28 is inaccessible for mAbs to bind in the closed HA trimeric form (FIG. 16G). If the inventors superimpose the head domain of H5.31/H5-HA complex onto H5N1 HA trimer (PDB ID: 4BGW), the H5.31 heavy chain variable domain would occupy the space of the head domain of another adjacent HA protomer, e.g., in the closed trimer the head domain of an adjacent HA1 protomer clashes with the variable domain of H5.31 when bound. Therefore, the HA trimer must make large structural rearrangements from its classic static conformation to expose the TI epitope in order for H5.31 to bind the trimer. This finding suggests the HA trimer has large conformational fluctuations in its quaternary structure, at least for HA1 including the head domains, even at neutral pH.

In the H5.31/H5-HA structure, mAb H5.31 interacts with the HA 220-loop using HCDR3 and LDCR2 residues (FIG. 16H). There are 6 hydrogen bonds (H-bond) or salt bridges between the 220-loop and the HCDRs. The highly conserved HA 220-loop residue R229 forms a salt bridge with the mAb H5.31 HCDR3 residue E98, and the salt bridge is mostly buried, emphasizing its importance in contributing to the binding free energy. Notably, LDCR2 residue Y49 forms an H-bond with the sidechain of HCDR3 residue E98, assisting E98 to be well-positioned to interact with the 220-loop residue R229. All of those H-bonds are formed between the 220-loop mainchain oxygen or nitrogen atoms and side chains of the mAb, and consequently this mode of H-bond formation may contribute to the great breadth of the mAb. A hydrophobic interaction between mAb H5.31 residue L100 and the 220-loop residue V223, and cation-π interaction between 220-loop R220 and HCDR3 F96, also may contribute to the tight binding of H5.31. In addition, the tip of the elongated HCDR3 makes more contact with the 90-loop epitope, in which residue L100a (Kabat numbering) seems to play the major role (FIG. 16I). The L100a sidechain is surrounded by a hydrophobic pocket formed by HA residues L96, F102, and Y105, and its mainchain nitrogen forms a H-bond with the HA G100 mainchain oxygen. Peripheral to these L100a-Ag interactions, there are several polar interactions, such as a polar interaction between the HA D95 residue sidechain and the HCDR3 G100c mainchain nitrogen and salt bridge between D101 (HA) and R99 (HCDR3). In summary, H5.31 recognizes the HA head domain mainly by interacting with the HA 220-loop, including one salt bridge with a conserved arginine residue and 5 H-bonds with mainchain atoms of the 220-loop, and the tip of the elongated HCDR3 provides additional interaction with the 90-loop and its C-terminal R strand.

Comparison of the crystal structures of 4 mAb complexes with the TI site revealed conserved features. First, a negatively charged residue (D or E) is always present in the HCDR3, forming strong salt bridges with the highly conserved arginine residues in the 220-loop (R229 in H3 structure numbering), and residue Y49 from the LDCR2s positions the negatively-charged residue via a H-bond for the formation of the salt bridge. Second, two residues from LDCR2 (N53 and Q55) form H-bonds with mainchain atoms of 220-loop. Lastly, the tips of the HCDR3s make additional contacts with the 90-loop and adjacent structural elements.

Interestingly, heavy chain DE loop in the framework region 3 (FR3) of H5.31 has a potential glycosylation site at residue N74 (Kabat numbering, sequence motif: $N^{74}ASN^{77}$), and two NAG residues can be fit into electron density around residue N74. The apparent molecular weight of H5.31 (but not H5.28) in SDS-PAGE gels shifted to a lower value with PNGase or Endo H enzymatic digestion, but the binding pattern of the glycosylated and de-glycosylated forms of H5.31 could not be distinguished in binding to HA (data not shown). Therefore, H5.31 is glycosylated in FR3, but without apparent functional alternation due to this modification.

Since the H5.28, H5.31, Flu-A20, and S5V2-29 mAbs are encoded by light chains with common features, the inventors tested the hypothesis that a sequence signature associated with use of this gene could be used to identify new TI-specific antibodies in the antibody variable gene repertoires of a subject during acute natural infection. They studied the response of an otherwise healthy subject with exposure to diverse influenza vaccines who presented with acute laboratory-confirmed H3N2 virus respiratory infection in August 2017. For comparative purposes, the inventors used deep sequencing to profile the B cell repertoire of this individual at various time points before or after natural infection. Sequencing timepoints included both healthy state baselines as well as responses to influenza vaccination (FIG. 17A). At a timepoint approximately one week into the natural H3N2 infection, the inventors obtained PBMCs, isolated plasmablasts, and performed single-cell sequencing of expressed paired heavy and light chain mRNA (sc-$V_H$:$V_L$Seq) on ~20,000 plasmablasts. They synthesized cDNA from a subset of recovered pairs of antibody genes and expressed the heavy-light chain pairs individually in small-scale CHO cell culture and then purified IgG from cell supernatants with Protein G affinity resin. Purified recombinant antibodies were tested by ELISA for binding to diverse HAs (Group 1: H1, H5; Group 2: H3, H7), and by neutralization of a representative H3N2 wild-type virus corresponding to a recent H3N2 vaccine strain (A/Texas/50/2012). 16 of the antibodies exhibited heterosubtypic reactivity (binding to more than one HA subtype) and HA protein specificity. These heterosubtypic antibodies included siblings of FluA-20. However, the inventors also identified other heterosubtypic mAbs that used the IGKV1-39 light chain characteristic of FluA-20, H5.28, and H5.31. Sequence alignment for one of these new mAbs, designated FluA-151, showed that 7 additional members of the clonal lineage for that antibody (which were designated Sibs 1-7) were also were present in the collection of over 4,000 plasmablast paired heavy-light chain sequences (indicated as Sibs in FIG. 17B). They searched for FluA-151-like sequences in the collection of all antibody repertoire sequences for that donor obtained over the four-year period 2014-18 and found 178 additional somatic variants of the heavy chain and 99 additional variants of the light chain (FIG. 17B). The inventors constructed lineages of the clonotype, showing all corresponding heavy and light chain sequences, indicating the year and day after vaccination for the sample from which the variant was obtained (FIG. 17B). The lineage was complex and diversified and appeared to evolve over time. They expressed FluA-151, its inferred UCA (FluA-151 UCA), and the Sib 1 variant (FluA-151_Sib1) and tested the heterosubtypic breadth of these related antibodies. The UCA had a relatively broad pattern of binding, recognizing HAs from Group 1 (H1, H2, H8, H12), and Group 2 (H3, H4, and H7) (FIG. 17C). The intermediate FluA-151 Sib1 acquired recognition of a 2019 H3N2 strain and improved the $EC_{50}$ value of binding for most Group 2 strains. The fully mature FluA-151 mAb was even broader, acquiring binding capacity for H5 and H6. These data show that the founder clone of the lineage was influenza HA-reactive and had substantial heterosubtypic breadth, and somatic mutations that occurred during elaboration of the lineage further enhanced heterosubtypic breadth.

To understand if there were common structural determinants of the molecular recognition of the TI site by the H5.31, FluA-20, and S5V2-29 antibodies, the inventors overlaid the crystal structures of the three antigen-antibody complexes. The complexes were remarkably similar on a global basis (FIG. 18A). The critical contact residues for each of the three Fabs (each derived from independent subjects) were identical. The Fabs shared a critical contact in the HCDR3 loop with an acidic (D or E) residue at Chothia position 98 contacting the R229 residue on HA (FIG. 18B). The Fabs also shared three critical bonds on two residues made by the light chain, at HA residues 222 and 224 (FIG. 18C). The inventors aligned the antibody variable region sequences of FluA-20 (1), FluA-151, H5.28, H5.31 and the SVV2-29, S5V2-52, S1V2-37 and S1V2-58 antibodies (2) (FIG. 18D) and observed a canonical sequence pattern, with a motif comprising: 1) Use of the IGKV1-39 light chain gene, 2) conservation of germline-encoded Y49 and Q55 residues in the light chain, 3) introduction of an S53N somatic mutation in the light chain CDR2, and 4) inclusion of an acidic (D or E) residue in the HCDR3 at Chothia position 98 (which is encoded by non-templated nucleotides in the N1 region of the $V_H$-$D_H$ gene junction added during recombination).

The inventors also considered that previous investigators had reported some human HA-specific antibodies identified by proteomic sequence analysis of serum antibodies that also displaced HA protomers during binding (Lee et al., 2016), a phenotype They have suggested is typical of TI-specific antibodies. The inventors aligned the amino acid sequences of those three antibodies (D1 H1-3/H3-3, D1 H1-17/H3-14, and D2 H1-1/H3-1) and found that those sequences perfectly fulfilled the TI sequence motif described above. These antibodies had been assigned putatively as binding to an epitope on the outer (surface-exposed) face of the HA head domain based on a low-resolution EM structure and interference with binding of a trimer-specific antibody (30) (FIGS. 29A-C). However, recombinant forms of the D1 H1-3/H3-3, D1 H1-17/H3-14, and D2 H1-1/H3-1 antibodies competed for binding to trimeric HA with TI-specific antibodies but not with the receptor binding domain specific antibody 5J8 (FIG. 18E). These mAbs also competed with TI mAbs for binding to a monomeric HA head domain (FIGS. 29A-C). Together these data suggest D1 H1-3/H3-3, D1 H1-17/H3-14, and D2 H1-1/H3-1 also are in fact TI-specific antibodies.

TABLE S5

Data collection and refinement statistics for the crystals of H5.31/H5-HA and H5.28/H5-HA complexes

| Data collection | | |
|---|---|---|
| Crystal | H5.31/H5-HA | H5.28/H5-HA |
| PDB ID | 6P3R | 6P3S |
| Wave Length (Å) | 0.97856 | 0.97856 |
| Space group | F222 | $P22_12_1$ |
| Unit cell dimensions | | |
| a, b, c (Å) | 185.1, 234.5, 284.8 | 135.5, 187.2, 342.4 |
| α, β, γ | 90, 90, 90 | 90.0, 90.0, 90.0 |
| Resolution (Å) | 49.52 – 3.00 | 49.46 – 4.00 |
| Unique reflections | 61716 (8933) | 74362 (10717) |
| Redundancy | 5.9 (6.0) | 7.0 (7.7) |
| Completeness (%) | 100.0 (100.0) | 99.9 (100.3) |
| $R_{merge}$ (%) | 7.1 (50.8) | 21.0 (62.5) |
| I/σ(I) | 16.0 (3.5) | 8.2 (3.4) |

TABLE S5-continued

Data collection and refinement statistics for the
crystals of H5.31/H5-HA and H5.28/H5-HA complexes

| Refinement statitics | | |
|---|---|---|
| $R_{factor}$ (%) | 19.2 | 28.1 |
| $R_{free}$ (%) | 22.7 | 32.4 |
| R.m.s.d. (bond) (Å) | 0.0024 | 0.0016 |
| R.m.s.d. (angle) (deg) | 0.721 | 0.545 |
| Ramachandran plot | | |
| Favored (%) | 95.29 | 91.95 |
| Allowed (%) | 4.47 | 7.11 |
| Outliers (%) | 0.24 | 0.94 |

$R_{merge} = \Sigma \Sigma |I_{hkl} - I_{hkl(j)}|/\Sigma I_{hkl}$, where $I_{hkl(j)}$ is the observed intensity and $I_{hkl}$ is the final average intensity. $R_{work} = \Sigma ||Fobs| - |Fcalc||/\Sigma |Fobs|$ and $R_{free} = \Sigma | |Fobs| - |Fcalc||/\Sigma |Fobs|$, where $R_{free}$ and $R_{work}$ are calculated using a randomly selected test set of 5% of the data and all reflections excluding the 5% test set, respectively. Numbers in parentheses are for the highest resolution shell.

Example 7—Discussion

Isolation and fine characterization of diverse naturally occurring broad human mAbs to the TI region of the HA head domain revealed canonical features of common human antibodies that bind a highly conserved site of vulnerability on the IAV HA molecule. Remarkably, the inventors show that even though the first TI domain-specific antibodies were first reported only this year, TI antibodies are common in human B cell repertoires, and they exhibit stereotypical features. Indeed, they show that a simple sequence search of human antibody variable gene sequences using a sparse set of genetic features identifies many TI antibodies. Crystal structures of diverse TI mAbs with common light chain features reveal why the public clonotype the inventors describe is inherently fit to interact with the highly conserved TI region. They note that previous investigators have determined the structure of H2214, a TI mAb that contacts many of the same HA residues but does not possess the canonical features the inventors describe here (Watanabe et al., 2019). Thus, they conclude that in addition to the common recognition motif the inventors identify, there may be additional modes of TI epitope recognition that have yet to be defined. When administered prophylactically or therapeutically, TI antibodies protect mice against challenge with diverse IAV strains (Bangaru et al., 2019). Therefore, one or more TI mAbs could be considered as candidates for development as broad-spectrum antiviral biologic drugs against IAV infections, especially if configured with a variant Fc region containing YTE (M252Y/S254T/T256E) or LS M428L/N434S) mutations located at the CH2-CH3 interface in the Fc domain that have been shown to increase confer a long half-life of IgG in humans (Dall'Acqua et al., 2006; Kuo and Aveson, 2011; Organesyan et al., 2014; Wang et al., 2018).

It is intriguing to think about why these common and important heterosubtypic antibodies have only come to light in 2019, despite decades of research on the human antibody response to influenza HA. First, many antibody-discovery campaigns in the past have not examined the breadth of heterosubtypic binding of mAbs isolated. Second, many mAb discovery efforts use binding as a first screening assay but then down-select antibody panels for further characterization based on in vitro virus neutralization potency. TI antibodies do not possess neutralizing activity in conventional in vitro assays, so typically such mAbs have been ignored in previous antibody discovery efforts.

It is also remarkable that the class of common TI antibodies the inventors describe here was not previously recognized by antibody gene sequencing efforts, since they exhibit such a clear and simple motif for binding to the TI epitope (a kappa light chain encoded by IGKV1-39 with an S53N somatic mutation and a HCDR3 presenting an acidic residue at Chothia position 98). This motif was not easily recognized by conventional searches because most antibody variable gene sequencing work focuses on examination of the heavy chain, especially on the HCDR3 region, which dominates most antigen-antibody interactions. Members of the dominant functional class of TI antibodies that the inventors describe here are encoded by diverse $V_H$ genes and have differing HCDR3 lengths. Instead of the typical heavy-chain-driven interaction, the mode of molecular recognition for this class of antibodies may be determined instead mostly by canonical features of the light chain interaction, which is less commonly examined in immune repertoire sequencing efforts. In most antigen-antibody interactions with viruses, the energy of binding of the antibody is driven principally by the heavy chain (especially the HCDR3), and light chain pairing with those heavy chains can be quite promiscuous. In fact, the most common class of human antibodies to the IAV HA stem region (encoded by the IGHV1-69 gene) exhibits this behavior (Avnir et al., 2014). Light chains do however modulate some antibody interactions with microbial pathogens. For instance, the VRC01 class of HIV-specific antibodies often have a motif that includes a 5-residue LCDR3 and a short and flexible LCDR1 (Huang et al., 2016; Sahadi et al., 2018; Wu et al., 2010; 2015).

In summary, the inventors identified the genetic and structural basis for recognition of the influenza virus HA head domain trimer interface by human antibodies that are easily elicited in diverse individuals. The sequence studies reveal a canonical motif comprising residues in the heavy and light chain from which they can infer TI-specificity. This TI class of antibodies exhibits broad heterosubtypic binding, and lineages of TI antibodies can acquire even broader or near universal recognition of influenza type A viruses. The antibodies disrupt HA trimers, and they protect against influenza replication and disease in vivo. The breadth and protective capacity of the antibodies are remarkable, since very few somatic mutations are required to achieve broad recognition of influenza A strains. Furthermore, the common appearance of this functional class of antibody in diverse individuals suggests that the TI antigenic site could be a promising target for structure-based rational epitope vaccine design.

TABLE A

NUCLEOTIDE SEQUENCES FOR ANTIBODY VARIABLE REGIONS

| Clone | Variable Sequence Region | SEQ ID NO: |
|---|---|---|
| FluA-20 heavy | CAGGTGCAGCTGCAGGAGTCGGGCCCAGGACTGGTG AAGCCTTCGGAGACCCTGTCCCTCACCTGCTCTGTC TCTGGTGTCTCCGTCACCAGTGATATTTACTACTGG ACCTGGATCCGGCAGCCCCCAGGGAAGGGACTGGAG TGGATTGGGTATATCTTTTATAATGGGGACACCAAC TACAACCCCTCCCTCAAGAGTCGAGTCACCATGTCA ATCGACACGTCCAAGAACGAGTTCTCCCTGAGGCTG ACGTCTGTGACCGCTGCGGACACGGCCGTGTATTTC TGTGCCAGAGGGACAGAAGATCTAGGATATTGTAGT AGTGGTAGCTGCCCGAATCACTGGGGCCAGGGAACC CTGGTCACCGTCTCCTCA | 35 |

TABLE A-continued

NUCLEOTIDE SEQUENCES FOR ANTIBODY VARIABLE REGIONS

| Clone | Variable Sequence Region | SEQ ID NO: |
|---|---|---|
| FluA-20 light | GACATCCAGATGACCCAGTCTCCATCCTCCCTGTCT GCATCTATAGGAGACAGAGTCACCATCACTTGCCGG CCAAGTCAGAACATTCGGAGTTTTTTGAATTGGTTT CAGCACAAACCAGGGAAAGCCCCAAAACTCCTGATC TATGCTGCATCCAATTTGCAGAGTGGGGTCCCATCA AGGTTCAGTGGCAGTGGATCTGGGACAGAATTCACT CTCACCATCAGGAGTCTGCAACCTGAAGATTTTGCA ACTTACTACTGTCAACAGAGTTACAATACCCCTCCG ACGTTCGGCCAAGGGACCAAGGTGGAAATCAAA | 36 |

TABLE B

PROTEIN SEQUENCES FOR ANTIBODY VARIABLE REGIONS

| Clone | Variable Sequence Region | SEQ ID NO. |
|---|---|---|
| FluA-20 heavy | QVQLQESGPGLVKPSETLSLTCSVSGVSVTSDIYY WTWIRQPPGKGLEWIGYIFYNGDTNYNPSLKSRVT MSIDTSKNEFSLRLTSVTAADTAVYFCARGTEDLG YCSSGSCPNHWGQGTLVTVSS | 37 |
| FluA-20 light | DIQMTQSPSSLSASIGDRVTITCRPSQNIRSFLNW FQHKPGKAPKLLIYAASNLQSGVPSRFSGSGSGTE FTLTIRSLQPEDFATYYCQQSYNTPPTFGQGTKVE IK | 38 |

TABLE C

CDR HEAVY CHAIN SEQUENCES

| Antibody | CDRH1 (SEQ ID NO) | CDRH2 (SEQID NO) | CDRH3 (SEQ ID NO) |
|---|---|---|---|
| FluA-20 | GVSVTSDIYY (39) | IFYNGDT (40) | ARGTEDLGYCSSGSCPNH (41) |

TABLE D

CDR LIGHT CHAIN SEQUENCES

| Anitobdy | CDRH1 (SEQ ID NO) | CDRH2 (SEQ ID NO) | CDRH3 (SEQ ID NO) |
|---|---|---|---|
| FluA-20 | QNIRSF (42) | AAS (43) | QQSYNTPPT (44) |

All of the compositions and methods disclosed and claimed herein can be made and executed without undue experimentation in light of the present disclosure. While the compositions and methods of this disclosure have been described in terms of preferred embodiments, it will be apparent to those of skill in the art that variations may be applied to the compositions and methods and in the steps or in the sequence of steps of the method described herein without departing from the concept, spirit and scope of the disclosure. More specifically, it will be apparent that certain agents which are both chemically and physiologically related may be substituted for the agents described herein while the same or similar results would be achieved. All such similar substitutes and modifications apparent to those skilled in the art are deemed to be within the spirit, scope and concept of the disclosure as defined by the appended claims.

VII. REFERENCES

The following references, to the extent that they provide exemplary procedural or other details supplementary to those set forth herein, are specifically incorporated herein by reference.

U.S. Pat. No. 3,817,837
U.S. Pat. No. 3,850,752
U.S. Pat. No. 3,939,350
U.S. Pat. No. 3,996,345
U.S. Pat. No. 4,196,265
U.S. Pat. No. 4,275,149
U.S. Pat. No. 4,277,437
U.S. Pat. No. 4,366,241
U.S. Pat. No. 4,472,509
U.S. Pat. No. 4,554,101
U.S. Pat. No. 4,680,338
U.S. Pat. No. 4,816,567
U.S. Pat. No. 4,867,973
U.S. Pat. No. 4,938,948
U.S. Pat. No. 5,021,236
U.S. Pat. No. 5,141,648
U.S. Pat. No. 5,196,066
U.S. Pat. No. 5,563,250
U.S. Pat. No. 5,565,332
U.S. Pat. No. 5,856,456
U.S. Pat. No. 5,880,270
U.S. Pat. No. 6,485,982
"Antibodies: A Laboratory Manual," Cold Spring Harbor Press, Cold Spring Harbor, NY, 1988.
Abbondanzo et al., *Am. J. Pediatr. Hematol. Oncol.*, 12(4), 480-489, 1990.
Allred et al., *Arch. Surg.*, 125(1), 107-113, 1990.
Atherton et al., *Biol. of Reproduction*, 32, 155-171, 1985.
Barzon et al., *Euro Surveill.* 2016 Aug. 11; 21(32).
Beltramello et al., *Cell Host Microbe* 8, 271-283, 2010.
Brown et al., *J. Immunol. Meth.*, 12; 130(1), :111-121, 1990.
Campbell, In: *Monoclonal Antibody Technology, Laboratory Techniques in Biochemistry and Molecular Biology*, Vol. 13, Burden and Von Knippenberg, Eds. pp. 75-83, Amsterdam, Elsevier, 1984.
Capaldi et al., *Biochem. Biophys. Res. Comm.*, 74(2):425-433, 1977.
De Jager et al., *Semin. Nucl. Med.* 23(2), 165-179, 1993.
Dholakia et al., *J. Biol. Chem.*, 264, 20638-20642, 1989.
Diamond et al., *J Virol* 77, 2578-2586, 2003.
Doolittle and Ben-Zeev, *Methods Mol. Biol.*, 109, :215-237, 1999.
Duffy et al., *N. Engl. J. Med.* 360, 2536-2543, 2009.
Elder et al. Infections, infertility and assisted reproduction. Part II: Infections in reproductive medicine & Part III: Infections and the assisted reproductive laboratory. Cambridge UK: Cambridge University Press; 2005.
Gefter et al., *Somatic Cell Genet.*, 3:231-236, 1977.
Gornet et al., *Semin Reprod Med.* 2016 September; 34(5): 285-292. Epub 2016 Sep. 14.
Gulbis and Galand, *Hum. Pathol.* 24(12), 1271-1285, 1993.
Halfon et al., *PLoS ONE* 2010; 5 (5) e10569
Hessell et al., *Nature* 449, 101-4, 2007.
Khatoon et al., *Ann. of Neurology*, 26, 210-219, 1989.
King et al., *J. Biol. Chem.*, 269, 10210-10218, 1989.
Kohler and Milstein, *Eur. J. Immunol.*, 6, 511-519, 1976.
Kohler and Milstein, *Nature*, 256, 495-497, 1975.
Kyte and Doolittle, *J. Mol. Biol.*, 157(1):105-132, 1982.
Mansuy et al., *Lancet Infect Dis.* 2016 October; 16(10): 1106-7.

Nakamura et al., In: *Enzyme Immunoassays: Heterogeneous and Homogeneous Systems*, Chapter 27, 1987.

O'Shannessy et al., *J. Immun. Meth.,* 99, 153-161, 1987.

Persic et al., *Gene* 187:1, 1997

Potter and Haley, *Meth. Enzymol.,* 91, 613-633, 1983.

Purpura et al., *Lancet Infect Dis.* 2016 October; 16(10): 1107-8. Epub 2016 Sep. 19.

Remington's Pharmaceutical Sciences, 15th Ed., 3:624-652, 1990.

Tang et al., *J. Biol. Chem.,* 271:28324-28330, 1996.

Wawrzynczak & Thorpe, In: *Immunoconjugates, Antibody Conjugates In Radioimaging And Therapy Of Cancer*, Vogel (Ed.), NY, Oxford University Press, 28, 1987.

Yu et al., *J Immunol Methods* 336, 142-151, doi:10.1016/j.jim.2008.04.008, 2008.

Adams, P. D., Afonine, P. V., Bunkoczi, G., Chen, V. B., Davis, I. W., Echols, N., Headd, J. J., Hung, L. W., Kapral, G. J., Grosse-Kunstleve, R. W., et al. (2010). PHENIX: a comprehensive Python-based system for macromolecular structure solution. Acta Crystallogr. D Biol. Crystallogr. 66, 213-221.

Aiyegbo, M. S., Eli, I. M., Spiller, B. W., Williams, D. R., Kim, R., Lee, D. E., Liu, T., Li, S., Stewart, P. L., and Crowe, J. E., Jr. (2014). Differential accessibility of a rotavirus VP6 epitope in trimers comprising type I, II, or III channels as revealed by binding of a human rotavirus VP6-specific antibody. J. Virol. 88, 469-476.

Al-Hubeshy, Z. B., Coleman, A., Nelson, M., and Goodier, M. R. (2011). A rapid method for assessment of natural killer cell function after multiple receptor crosslinking. J. Immunol. Methods 366, 52-59.

Alter, G., Malenfant, J. M., and Altfeld, M. (2004). CD107a as a functional marker for the identification of natural killer cell activity. J. Immunol. Methods 294, 15-22.

Altman, M. O., Bennink, J. R., Yewdell, J. W., and Herrin, B. R. (2015). Lamprey VLRB response to influenza virus supports universal rules of immunogenicity and antigenicity. eLife 4, 07467.

Angeletti, D., Gibbs, J. S., Angel, M., Kosik, I., Hickman, H. D., Frank, G. M., Das, S. R., Wheatley, A. K., Prabhakaran, M., Leggat, D. J., et al. (2017). Defining B cell immunodominance to viruses. Nat. Immunol. 18, 456-463.

Arduin, E., Arora, S., Bamert, P. R., Kuiper, T., Popp, S., Geisse, S., Grau, R., Calzascia, T., Zenke, G., and Kovarik, J. (2015). Highly reduced binding to high and low affinity mouse Fc gamma receptors by L234A/L235A and N297A Fc mutations engineered into mouse IgG2a. Mol. Immunol. 63, 456-463.

Ashkenazy, H., Abadi, S., Martz, E., Chay, O., Mayrose, I., Pupko, T., and Ben-Tal, N. (2016). ConSurf 2016: an improved methodology to estimate and visualize evolutionary conservation in macromolecules. Nucleic Acids Res. 44, W344-350.

Bangaru, S., Nieusma, T., Kose, N., Thornburg, N. J., Finn, J. A., Kaplan, B. S., King, H. G., Singh, V., Lampley, R. M., Sapparapu, G., et al. (2016). Recognition of influenza H3N2 variant virus by human neutralizing antibodies. JCI Insight 1, e86673.

Bangaru, S., Zhang, H., Gilchuk, I. M., Voss, T. G., Irving, R. P., Gilchuk, P., Matta, P., Zhu, X., Lang, S., Nieusma, T., et al. (2018). A multifunctional human monoclonal neutralizing antibody that targets a unique conserved epitope on influenza HA. Nat. Commun. 9, 2669.

Bao, Y. M., Bolotov, P., Dernovoy, D., Kiryutin, B., Zaslavsky, L., Tatusova, T., Ostell, J., and Lipman, D. (2008). The influenza virus resource at the national center for biotechnology information. J. Virol. 82, 596-601.

Bridges, C. B., Thompson, W. W., Meltzer, M. I., Reeve, G. R., Talamonti, W. J., Cox, N. J., Lilac, H. A., Hall, H., Klimov, A., and Fukuda, K. (2000). Effectiveness and cost-benefit of influenza vaccination of healthy working adults—A randomized controlled trial. JAMA 284, 1655-1663.

Brochet, X., Lefranc, M. P., and Giudicelli, V. (2008). IMGT/V-QUEST: the highly customized and integrated system for IG and TR standardized V-J and V-D-J sequence analysis. Nucleic Acids Res. 36, W503-508.

Carr, C. M., and Kim, P. S. (1993). A spring-loaded mechanism for the conformational change of influenza hemagglutinin. Cell 73, 823-832.

Carrat, F., and Flahault, A. (2007). Influenza vaccine: the challenge of antigenic drift. Vaccine 25, 6852-6862.

Caton, A. J., Brownlee, G. G., Yewdell, J. W., and Gerhard, W. (1982). The antigenic structure of the influenza virus A/PR/8/34 hemagglutinin (H1 subtype). Cell 31, 417-427.

Celniker, G., Nimrod, G., Ashkenazy, H., Glaser, F., Martz, E., Mayrose, I., Pupko, T., and Ben-Tal, N. (2013). ConSurf: using evolutionary data to raise testable hypotheses about protein function. Isr. J. Chem. 53, 199-206.

Chao, D. T., Ma, X., Li, O., Park, H., and Law, D. (2009). Functional characterization of N297A, a murine surrogate for low-Fc binding anti-human CD3 antibodies. Immunol. Invest. 38, 76-92.

Chen, J., Lee, K. H., Steinhauer, D. A., Stevens, D. J., Skehel, J. J., and Wiley, D. C. (1998). Structure of the hemagglutinin precursor cleavage site, a determinant of influenza pathogenicity and the origin of the labile conformation. Cell 95, 409-417.

Chen, V. B., Arendall, W. B., 3rd, Headd, J. J., Keedy, D. A., Immormino, R. M., Kapral, G. J., Murray, L. W., Richardson, J. S., and Richardson, D. C. (2010). MolProbity: all-atom structure validation for macromolecular crystallography. Acta Crystallogr. D Biol. Crystallogr. 66, 12-21.

Copeland, C. S., Doms, R. W., Bolzau, E. M., Webster, R. G., and Helenius, A. (1986). Assembly of influenza hemagglutinin trimers and its role in intracellular transport. J. Cell Biol. 103, 1179-1191.

Copeland, C. S., Zimmer, K. P., Wagner, K. R., Healey, G. A., Mellman, I., and Helenius, A. (1988). Folding, trimerization, and transport are sequential events in the biogenesis of influenza virus hemagglutinin. Cell 53, 197-209.

Corti, D., Suguitan, A. L., Jr., Pinna, D., Silacci, C., Fernandez-Rodriguez, B. M., Vanzetta, F., Santos, C., Luke, C. J., Torres-Velez, F. J., Temperton, N. J., et al. (2010). Heterosubtypic neutralizing antibodies are produced by individuals immunized with a seasonal influenza vaccine. J. Clin. Invest. 120, 1663-1673.

Corti, D., Voss, J., Gamblin, S. J., Codoni, G., Macagno, A., Jarrossay, D., Vachieri, S. G., Pinna, D., Minola, A., Vanzetta, F., et al. (2011). A neutralizing antibody selected from plasma cells that binds to group 1 and group 2 influenza A hemagglutinins. Science 333, 850-856.

Das, S. R., Hensley, S. E., Ince, W. L., Brooke, C. B., Subba, A., Delboy, M. G., Russ, G., Gibbs, J. S., Bennink, J. R., and Yewdell, J. W. (2013). Defining influenza A virus hemagglutinin antigenic drift by sequential monoclonal antibody selection. Cell Host Microbe 13, 314-323.

Dawood, F. S., Iuliano, A. D., Reed, C., Meltzer, M. I., Shay, D. K., Cheng, P. Y., Bandaranayake, D., Breiman, R. F., Brooks, W. A., Buchy, P., et al. (2012). Estimated global mortality associated with the first 12 months of 2009 pandemic influenza A H1N1 virus circulation: a modelling study. Lancet Infect. Dis. 12, 687-695.

DiLillo, D. J., Palese, P., Wilson, P. C., and Ravetch, J. V. (2016). Broadly neutralizing anti-influenza antibodies require Fc receptor engagement for in vivo protection. J. Clin. Invest. 126, 605-610.

DiLillo, D. J., Tan, G. S., Palese, P., and Ravetch, J. V. (2014). Broadly neutralizing hemagglutinin stalk-specific antibodies require FcγR interactions for protection against influenza virus in vivo. Nat. Med. 20, 143-151.

Dowd, K. A., Jost, C. A., Durbin, A. P., Whitehead, S. S., and Pierson, T. C. (2011). A dynamic landscape for antibody binding modulates antibody-mediated neutralization of West Nile virus. PLoS Pathog. 7, e1002111.

Dowd, K. A., and Pierson, T. C. (2018). The many faces of a dynamic virion: Implications of viral breathing on flavivirus biology and immunogenicity. Annu. Rev. Virol. 5, 185-207.

Dreyfus, C., Ekiert, D. C., and Wilson, I. A. (2013). Structure of a classical broadly neutralizing stem antibody in complex with a pandemic H2 influenza virus hemagglutinin. J. Virol. 87, 7149-7154.

Dreyfus, C., Laursen, N. S., Kwaks, T., Zuijdgeest, D., Khayat, R., Ekiert, D. C., Lee, J. H., Metlagel, Z., Bujny, M. V., Jongeneelen, M., et al. (2012). Highly conserved protective epitopes on influenza B viruses. Science 337, 1343-1348.

Edgar, R. C. (2004). MUSCLE: multiple sequence alignment with high accuracy and high throughput. Nucleic Acids Res. 32, 1792-1797.

Ekiert, D. C., Bhabha, G., Elsliger, M. A., Friesen, R. H., Jongeneelen, M., Throsby, M., Goudsmit, J., and Wilson, I. A. (2009). Antibody recognition of a highly conserved influenza virus epitope. Science 324, 246-251.

Ekiert, D. C., Friesen, R. H., Bhabha, G., Kwaks, T., Jongeneelen, M., Yu, W., Ophorst, C., Cox, F., Korse, H. J., Brandenburg, B., et al. (2011). A highly conserved neutralizing epitope on group 2 influenza A viruses. Science 333, 843-850.

Ekiert, D. C., Kashyap, A. K., Steel, J., Rubrum, A., Bhabha, G., Khayat, R., Lee, J. H., Dillon, M. A., O'Neil, R. E., Faynboym, A. M., et al. (2012). Cross-neutralization of influenza A viruses mediated by a single antibody loop. Nature 489, 526-532.

Emsley, P., and Cowtan, K. (2004). Coot: model-building tools for molecular graphics. Acta Crystallogr. D Biol. Crystallogr. 60, 2126-2132.

Freidl, G. S., Meijer, A., de Bruin, E., de Nardi, M., Munoz, O., Capua, I., Breed, A. C., Harris, K., Hill, A., Kosmider, R., et al. (2014). Influenza at the animal-human interface: a review of the literature for virological evidence of human infection with swine or avian influenza viruses other than A(H5N1). Euro Surveill. 19, 20793.

Friesen, R. H., Lee, P. S., Stoop, E. J., Hoffman, R. M., Ekiert, D. C., Bhabha, G., Yu, W., Juraszek, J., Koudstaal, W., Jongeneelen, M., et al. (2014). A common solution to group 2 influenza virus neutralization. Proc. Natl. Acad. Sci. U.S.A. 111, 445-450.

Garces, F., Lee, J. H., de Val, N., de la Pena, A. T., Kong, L., Puchades, C., Hua, Y., Stanfield, R. L., Burton, D. R., Moore, J. P., et al. (2015). Affinity maturation of a potent family of HIV antibodies is primarily focused on accommodating or avoiding glycans. Immunity 43, 1053-1063.

Garcia, N. K., Guttman, M., Ebner, J. L., and Lee, K. K. (2015). Dynamic changes during acid-induced activation of influenza hemagglutinin. Structure 23, 665-676.

Gerhard, W., Yewdell, J., Frankel, M. E., and Webster, R. (1981). Antigenic structure of influenza virus haemagglutinin defined by hybridoma antibodies. Nature 290, 713-717.

Gething, M. J., McCammon, K., and Sambrook, J. (1986). Expression of wild-type and mutant forms of influenza hemagglutinin: the role of folding in intracellular transport. Cell 46, 939-950.

Giudicelli, V., and Lefranc, M. P. (2011). IMGT/junctionanalysis: IMGT standardized analysis of the V-J and V-D-J junctions of the rearranged immunoglobulins (IG) and T cell receptors (TR). Cold Spring Harb. Protoc. 2011, 716-725.

Hamuro, Y., Anand, G. S., Kim, J. S., Juliano, C., Stranz, D. D., Taylor, S. S., and Woods, V. L., Jr. (2004). Mapping intersubunit interactions of the regulatory subunit (RIalpha) in the type I holoenzyme of protein kinase A by amide hydrogen/deuterium exchange mass spectrometry (DXMS). J. Mol. Biol. 340, 1185-1196.

He, W., Mullarkey, C. E., Duty, J. A., Moran, T. M., Palese, P., and Miller, M. S. (2015). Broadly neutralizing anti-influenza virus antibodies: enhancement of neutralizing potency in polyclonal mixtures and IgA backbones. J. Virol. 89, 3610-3618.

Hezareh, M., Hessell, A. J., Jensen, R. C., van de Winkel, J. G., and Parren, P. W. (2001). Effector function activities of a panel of mutants of a broadly neutralizing antibody against human immunodeficiency virus type 1. J. Virol. 75, 12161-12168.

Hong, M., Lee, P. S., Hoffman, R. M., Zhu, X., Krause, J. C., Laursen, N. S., Yoon, S. I., Song, L., Tussey, L., Crowe, J. E., Jr., et al. (2013). Antibody recognition of the pandemic H1N1 influenza virus hemagglutinin receptor binding site. J. Virol. 87, 12471-12480.

Hsu, S., Kim, Y., Li, S., Durrant, E. S., Pace, R. M., Woods, V. L., Jr., and Gentry, M. S. (2009). Structural insights into glucan phosphatase dynamics using amide hydrogen-deuterium exchange mass spectrometry. Biochemistry 48, 9891-9902.

Impagliazzo, A., Milder, F., Kuipers, H., Wagner, M. V., Zhu, X., Hoffman, R. M., van Meersbergen, R., Huizingh, J., Wanningen, P., Verspuij, J., et al. (2015). A stable trimeric influenza hemagglutinin stem as a broadly protective immunogen. Science 349, 1301-1306.

Irimia, A., Sarkar, A., Stanfield, R. L., and Wilson, I. A. (2016). Crystallographic identification of lipid as an integral component of the epitope of HIV broadly neutralizing antibody 4E10. Immunity 44, 21-31.

Jegaskanda, S., Job, E. R., Kramski, M., Laurie, K., Isitman, G., de Rose, R., Winnall, W. R., Stratov, I., Brooks, A. G., Reading, P. C., and Kent, S. J. (2013). Cross-reactive influenza-specific antibody-dependent cellular cytotoxicity antibodies in the absence of neutralizing antibodies. J. Immunol. 190, 1837-1848.

Joyce, M. G., Wheatley, A. K., Thomas, P. V., Chuang, G. Y., Soto, C., Bailer, R. T., Druz, A., Georgiev, I. S., Gillespie, R. A., Kanekiyo, M., et al. (2016). Vaccine-induced antibodies that neutralize group 1 and group 2 influenza A viruses. Cell 166, 609-623.

Julien, J. P., Lee, P. S., and Wilson, I. A. (2012). Structural insights into key sites of vulnerability on HIV-1 Env and influenza HA. Immunol. Rev. 250, 180-198.

Kallewaard, N. L., Corti, D., Collins, P. J., Neu, U., McAuliffe, J. M., Benjamin, E., Wachter-Rosati, L., Palmer-Hill, F. J., Yuan, A. Q., Walker, P. A., et al. (2016). Structure and function analysis of an antibody recognizing all influenza A subtypes. Cell 166, 596-608.

Kashyap, A. K., Steel, J., Oner, A. F., Dillon, M. A., Swale, R. E., Wall, K. M., Perry, K. J., Faynboym, A., Ilhan, M., Horowitz, M., et al. (2008). Combinatorial antibody libraries from survivors of the Turkish H5N1 avian influenza outbreak reveal virus neutralization strategies. Proc. Natl. Acad. Sci. 105, 5986-5991.

Kashyap, A. K., Steel, J., Rubrum, A., Estelles, A., Briante, R., Ilyushina, N. A., Xu, L., Swale, R. E., Faynboym, A. M., Foreman, P. K., et al. (2010). Protection from the 2009 H1N1 pandemic influenza by an antibody from combinatorial survivor-based libraries. PLoS Pathog. 6, e1000990.

Klenk, H. D., and Garten, W. (1994). Host cell proteases controlling virus pathogenicity. Trends Microbiol. 2, 39-43.

Klenk, H. D., and Rott, R. (1988). The molecular biology of influenza virus pathogenicity. Adv. Virus Res. 34, 247-281.

Kristensen, A. B., Lay, W. N., Ana-Sosa-Batiz, F., Vanderven, H. A., Madhavi, V., Laurie, K. L., Carolan, L., Wines, B. D., Hogarth, M., Wheatley, A. K., and Kent, S. J. (2016). Antibody responses with Fc-mediated functions after vaccination of HIV-infected subjects with trivalent influenza vaccine. J. Virol. 90, 5724-5734.

Lander, G. C., Stagg, S. M., Voss, N. R., Cheng, A., Fellmann, D., Pulokas, J., Yoshioka, C., Irving, C., Mulder, A., Lau, P. W., et al. (2009). Appion: an integrated, database-driven pipeline to facilitate EM image processing. J. Struct. Biol. 166, 95-102.

Lang, S., Xie, J., Zhu, X., Wu, N. C., Lerner, R. A., and Wilson, I. A. (2017). Antibody 27F3 broadly targets influenza A group 1 and 2 hemagglutinins through a further variation in VH1-69 antibody orientation on the HA stem. Cell Rep 20, 2935-2943.

Laursen, N. S., and Wilson, I. A. (2013). Broadly neutralizing antibodies against influenza viruses. Antiviral Res. 98, 476-483.

Lee, J., Boutz, D. R., Chromikova, V., Joyce, M. G., Vollmers, C., Leung, K., Horton, A. P., DeKosky, B. J., Lee, C. H., Lavinder, J. J., et al. (2016). Molecular-level analysis of the serum antibody repertoire in young adults before and after seasonal influenza vaccination. Nat. Med. 22, 1456-1464.

Lee, P. S., Ohshima, N., Stanfield, R. L., Yu, W., Iba, Y., Okuno, Y., Kurosawa, Y., and Wilson, I. A. (2014). Receptor mimicry by antibody F045-092 facilitates universal binding to the H3 subtype of influenza virus. Nat. Commun. 5, 3614.

Lee, P. S., Yoshida, R., Ekiert, D. C., Sakai, N., Suzuki, Y., Takada, A., and Wilson, I. A. (2012). Heterosubtypic antibody recognition of the influenza virus hemagglutinin receptor binding site enhanced by avidity. Proc. Natl. Acad. Sci. 109, 17040-17045.

Li, S., Tsalkova, T., White, M. A., Mei, F. C., Liu, T., Wang, D., Woods, V. L., Jr., and Cheng, X. (2011). Mechanism of intracellular cAMP sensor Epac2 activation: cAMP-induced conformational changes identified by amide hydrogen/deuterium exchange mass spectrometry (DXMS). J. Biol. Chem. 286, 17889-17897.

Lu, W. D., Liu, T., Li, S., Woods, V. L., Jr., and Hook, V. (2012). The prohormone proenkephalin possesses differential conformational features of subdomains revealed by rapid H-D exchange mass spectrometry. Protein Sci. 21, 178-187.

Marsh, J. J., Guan, H. S., Li, S., Chiles, P. G., Tran, D., and Morris, T. A. (2013). Structural insights into fibrinogen dynamics using amide hydrogen/deuterium exchange mass spectrometry. Biochemistry 52, 5491-5502.

McCoy, A. J., Grosse-Kunstleve, R. W., Adams, P. D., Winn, M. D., Storoni, L. C., and Read, R. J. (2007). Phaser crystallographic software. J. Appl. Crystallogr. 40, 658-674.

Morgan, A., Jones, N. D., Nesbitt, A. M., Chaplin, L., Bodmer, M. W., and Emtage, J. S. (1995). The N-terminal end of the CH2 domain of chimeric human IgG1 anti-HLA-DR is necessary for C1q, Fc gamma RI and Fc gamma RIII binding. Immunology 86, 319-324.

Munro, J. B., Gorman, J., Ma, X., Zhou, Z., Arthos, J., Burton, D. R., Koff, W. C., Courter, J. R., Smith, A. B., 3rd, Kwong, P. D., et al. (2014). Conformational dynamics of single HIV-1 envelope trimers on the surface of native virions. Science 346, 759-763.

Munro, J. B., and Mothes, W. (2015). Structure and dynamics of the native HIV-1 env trimer. J. Virol. 89, 5752-5755.

Nachbagauer, R., Kinzler, D., Choi, A., Hirsh, A., Beaulieu, E., Lecrenier, N., Innis, B. L., Palese, P., Mallett, C. P., and Krammer, F. (2016). A chimeric haemagglutinin-based influenza split virion vaccine adjuvanted with AS03 induces protective stalk-reactive antibodies in mice. NPJ Vaccines 1, 16015.

Neumann, G., and Kawaoka, Y. (2015). Transmission of influenza A viruses. Virology 479-480, 234-246.

Nobusawa, E., Aoyama, T., Kato, H., Suzuki, Y., Tateno, Y., and Nakajima, K. (1991). Comparison of complete amino acid sequences and receptor-binding properties among 13 serotypes of hemagglutinins of influenza A viruses. Virology 182, 475-485.

Nordin, J., Mullooly, J., Poblete, S., Strikas, R., Petrucci, R., Wei, F., Rush, B., Safirstein, B., Wheeler, D., and Nichol, K. L. (2001). Influenza vaccine effectiveness in preventing hospitalizations and deaths in persons 65 years or older in Minnesota, New York, and Oregon: data from 3 health plans. J. Infect. Dis. 184, 665-670.

Ogura, T., Iwasaki, K., and Sato, C. (2003). Topology representing network enables highly accurate classification of protein images taken by cryo electron-microscope without masking. J. Struct. Biol. 143, 185-200.

Okuno, Y., Isegawa, Y., Sasao, F., and Ueda, S. (1993). A common neutralizing epitope conserved between the hemagglutinins of influenza-A virus H1 and H2 strains. J. Virol. 67, 2552-2558.

Potter, C. S., Chu, H., Frey, B., Green, C., Kisseberth, N., Madden, T. J., Miller, K. L., Nahrstedt, K., Pulokas, J., Reilein, A., et al. (1999). Leginon: a system for fully automated acquisition of 1000 electron micrographs a day. Ultramicroscopy 77, 153-161.

Rey, F. A., and Lok, S. M. (2018). Common features of enveloped viruses and implications for immunogen design for next-generation vaccines. Cell 172, 1319-1334.

Rey, F. A., Stiasny, K., Vaney, M. C., Dellarole, M., and Heinz, F. X. (2018). The bright and the dark side of human antibody responses to flaviviruses: lessons for vaccine design. EMBO Rep. 19, 206-224.

Rice, P., Longden, I., and Bleasby, A. (2000). EMBOSS: the european molecular biology open software suite. Trends Genet. 16, 276-277.

Russell, R. J., Gamblin, S. J., Haire, L. F., Stevens, D. J., Xiao, B., Ha, Y., and Skehel, J. J. (2004). H1 and H7 influenza haemagglutinin structures extend a structural classification of haemagglutinin subtypes. Virology 325, 287-296.

Schmidt, A. G., Therkelsen, M. D., Stewart, S., Kepler, T. B., Liao, H. X., Moody, M. A., Haynes, B. F., and Harrison, S. C. (2015). Viral receptor-binding site antibodies with diverse germline origins. Cell 161, 1026-1034.

Shrestha, S. S., Swerdlow, D. L., Borse, R. H., Prabhu, V. S., Finelli, L., Atkins, C. Y., Owusu-Edusei, K., Bell, B., Mead, P. S., Biggerstaff, M., et al. (2011). Estimating the burden of 2009 pandemic influenza A (H1N1) in the United States (April 2009-April 2010). Clin. Infect. Dis. 52 Suppl 1, S75-82.

Skubak, P., Murshudov, G. N., and Pannu, N. S. (2004). Direct incorporation of experimental phase information in model refinement. Acta Crystallogr. D Biol. Crystallogr. 60, 2196-2201.

Smirnov, Y. A., Lipatov, A. S., Gitelman, A. K., Okuno, Y., Van Beek, R., Osterhaus, A. D., and Claas, E. C. (1999). An epitope shared by the hemagglutinins of H1, H2, H5, and H6 subtypes of influenza A virus. Acta Virol. 43, 237-244.

Smith, S. A., Zhou, Y., Olivarez, N. P., Broadwater, A. H., de Silva, A. M., and Crowe, J. E., Jr. (2012). Persistence of circulating memory B cell clones with potential for dengue virus disease enhancement for decades following infection. J. Virol. 86, 2665-2675.

Steinhauer, D. A. (1999). Role of hemagglutinin cleavage for the pathogenicity of influenza virus. Virology 258, 1-20.

Thornburg, N. J., Zhang, H., Bangaru, S., Sapparapu, G., Kose, N., Lampley, R. M., Bombardi, R. G., Yu, Y. C., Graham, S., Branchizio, A., et al. (2016). H7N9 influenza virus neutralizing antibodies that possess few somatic mutations. J. Clin. Invest. 126, 1482-1494.

Tong, S., Zhu, X., Li, Y., Shi, M., Zhang, J., Bourgeois, M., Yang, H., Chen, X., Recuenco, S., Gomez, J., et al. (2013). New world bats harbor diverse influenza A viruses. PLoS Pathog. 9, e1003657.

Valkenburg, S. A., Mallajosyula, V. V., Li, O. T., Chin, A. W., Carnell, G., Temperton, N., Varadarajan, R., and Poon, L. L. (2016). Stalking influenza by vaccination with pre-fusion headless HA mini-stem. Sci. Rep. 6, 22666.

Van Dongen, J. J., Langerak, A. W., Bruggemann, M., Evans, P. A., Hummel, M., Lavender, F. L., Delabesse, E., Davi, F., Schuuring, E., Garcia-Sanz, R., et al. (2003). Design and standardization of PCR primers and protocols for detection of clonal immunoglobulin and T-cell receptor gene recombinations in suspect lymphoproliferations: report of the BIOMED-2 Concerted Action BMH4-CT98-3936. Leukemia 17, 2257-2317.

Voss, N. R., Yoshioka, C. K., Radermacher, M., Potter, C. S., and Carragher, B. (2009). DoG Picker and TiltPicker: software tools to facilitate particle selection in single particle electron microscopy. J. Struct. Biol. 166, 205-213.

Webster, R. G., and Rott, R. (1987). Influenza virus A pathogenicity: the pivotal role of hemagglutinin. Cell 50, 665-666.

Weis, W., Brown, J. H., Cusack, S., Paulson, J. C., Skehel, J. J., and Wiley, D. C. (1988). Structure of the influenza virus haemagglutinin complexed with its receptor, sialic acid. Nature 333, 426-431.

Weiss, M. S., and Hilgenfeld, R. (1997). On the use of the merging R factor as a quality indicator for X-ray data. J. Appl. Crystallogr. 30, 203-205.

Whittle, J. R. R., Zhang, R. J., Khurana, S., King, L. R., Manischewitz, J., Golding, H., Dormitzer, P. R., Haynes, B. F., Walter, E. B., Moody, M. A., et al. (2011). Broadly neutralizing human antibody that recognizes the receptor-binding pocket of influenza virus hemagglutinin. Proc. Natl. Acad. Sci. 108, 14216-14221.

Wilson, I. A., Skehel, J. J., and Wiley, D. C. (1981). Structure of the haemagglutinin membrane glycoprotein of influenza virus at 3 Å resolution. Nature 289, 366-373.

Wines, B. D., Vanderven, H. A., Esparon, S. E., Kristensen, A. B., Kent, S. J., and Hogarth, P. M. (2016). Dimeric FcγR ectodomains as probes of the Fc receptor function of anti-influenza virus IgG. J. Immunol. 197, 1507-1516.

Wu, N. C., and Wilson, I. A. (2017). A perspective on the structural and functional constraints for immune evasion: insights from influenza virus. J. Mol. Biol. 429, 2694-2709.

Xu, R., Krause, J. C., McBride, R., Paulson, J. C., Crowe, J. E., Jr., and Wilson, I. A. (2013). A recurring motif for antibody recognition of the receptor-binding site of influenza hemagglutinin. Nat. Struct. Mol. Biol. 20, 363-370.

Yassine, H. M., Boyington, J. C., McTamney, P. M., Wei, C. J., Kanekiyo, M., Kong, W. P., Gallagher, J. R., Wang, L., Zhang, Y., Joyce, M. G., et al. (2015). Hemagglutinin-stem nanoparticles generate heterosubtypic influenza protection. Nat. Med. 21, 1065-1070.

Yewdell, J. W., Taylor, A., Yellen, A., Caton, A., Gerhard, W., and Bachi, T. (1993). Mutations in or near the fusion peptide of the influenza virus hemagglutinin affect an antigenic site in the globular region. J. Virol. 67, 933-942.

Yoon, S. W., Chen, N., Ducatez, M. F., McBride, R., Barman, S., Fabrizio, T. P., Webster, R. G., Haliloglu, T., Paulson, J. C., Russell, C. J., et al. (2015). Changes to the dynamic nature of hemagglutinin and the emergence of the 2009 pandemic H1N1 influenza virus. Sci. Rep. 5, 12828.

Yoshida, R., Igarashi, M., Ozaki, H., Kishida, N., Tomabechi, D., Kida, H., Ito, K., and Takada, A. (2009). Cross-protective potential of a novel monoclonal antibody directed against antigenic site B of the hemagglutinin of influenza A viruses. PLoS Pathog. 5, e1000350.

Yusuf, M., Konc, J., Sy Bing, C., Trykowska Konc, J., Ahmad Khairudin, N. B., Janezic, D., and Wahab, H. A. (2013). Structurally conserved binding sites of hemagglutinin as targets for influenza drug and vaccine development. J. Chem. Inf. Model 53, 2423-2436.

Zhang, Z., and Smith, D. L. (1993). Determination of amide hydrogen exchange by mass spectrometry: a new tool for protein structure elucidation. Protein Sci. 2, 522-531.

Zhu, X., Guo, Y. H., Jiang, T., Wang, Y. D., Chan, K. H., Li, X. F., Yu, W., McBride, R., Paulson, J. C., Yuen, K. Y., et al. (2013). A unique and conserved neutralization epitope in H5N1 influenza viruses identified by an antibody against the A/Goose/Guangdong/1/96 hemagglutinin. J. Virol. 87, 12619-12635.

S. Bangaru et al., A site of vulnerability on the influenza virus hemagglutinin head domain trimer interface. *Cell* 177, 1136-1152 e1118 (2019).

A. Watanabe et al., Antibodies to a conserved influenza head interface epitope protect by an IgG subtype-dependent mechanism. *Cell* 177, 1124-1135 e1116 (2019).

N. J. Thornburg et al., Human antibodies that neutralize respiratory droplet transmissible H5N1 influenza viruses. *J Clin Invest* 123, 4405-4409 (2013).

J. Lee et al., Molecular-level analysis of the serum antibody repertoire in young adults before and after seasonal influenza vaccination. *Nat Med* 22, 1456-1464 (2016).

W. F. Dall'Acqua, P. A. Kiener, H. Wu, Properties of human IgG1s engineered for enhanced binding to the neonatal Fc receptor (FcRn). *J Biol Chem* 281, 23514-23524 (2006).

T. T. Kuo, V. G. Aveson, Neonatal Fc receptor and IgG-based therapeutics. *MAbs* 3, 422-430 (2011).

V. Oganesyan et al., Structural insights into neonatal Fc receptor-based recycling mechanisms. *J Biol Chem* 289, 7812-7824 (2014).

X. Wang, M. Mathieu, R. J. Brezski, IgG Fc engineering to modulate antibody effector functions. *Protein Cell* 9, 63-73 (2018).

Y. Avnir et al., Molecular signatures of hemagglutinin stem-directed heterosubtypic human neutralizing antibodies against influenza A viruses. *PLoS Pathog* 10, e1004103 (2014).

J. Huang et al., Identification of a CD4-Binding-Site Antibody to HIV that Evolved Near-Pan Neutralization Breadth. *Immunity* 45, 1108-1121 (2016).

M. M. Sajadi et al., Identification of Near-Pan-neutralizing antibodies against HIV-1 by deconvolution of plasma humoral responses. *Cell* 173, 1783-1795 e1714 (2018).

X. Wu et al., Rational design of envelope identifies broadly neutralizing human monoclonal antibodies to HIV-1. *Science* 329, 856-861 (2010).

T. Zhou et al., Structural repertoire of HIV-1-neutralizing antibodies targeting the CD4 supersite in 14 donors. *Cell* 161, 1280-1292 (2015).

S. Bangaru et al., Recognition of influenza H3N2 variant virus by human neutralizing antibodies. *JCI Insight* 1, pii: e86673 (2016).

N. J. Thornburg et al., H7N9 influenza virus neutralizing antibodies that possess few somatic mutations. *J Clin Invest* 126, 1482-1494 (2016).

J. J. van Dongen et al., Design and standardization of PCR primers and protocols for detection of clonal immunoglobulin and T-cell receptor gene recombinations in suspect lymphoproliferations: report of the BIOMED-2 Concerted Action BMH4-CT98-3936. *Leukemia* 17, 2257-2317 (2003).

M. A. Turchaninova et al., High-quality full-length immunoglobulin profiling with unique molecular barcoding. *Nat Protoc* 11, 1599-1616 (2016).

X. Brochet, M. P. Lefranc, V. Giudicelli, IMGT/V-QUEST: The highly customized and integrated system for IG and TR standardized V-J and V-D-J sequence analysis. *Nucleic Acids Res* 36, W503-508 (2008).

V. Giudicelli, M. P. Lefranc, IMGT/junctionanalysis: IMGT standardized analysis of the V-J and V-D-J junctions of the rearranged immunoglobulins (IG) and T cell receptors (TR). *Cold Spring Harb Protoc* 2011, 716-725 (2011).

W. Kabsch, Xds. *Acta Crystallogr D Biol Crystallogr* 66, 125-132 (2010).

M. D. Winn et al., Overview of the CCP4 suite and current developments. *Acta Crystallogr D Biol Crystallogr* 67, 235-242 (2011).

A. J. McCoy et al., Phaser crystallographic software. *J Appl Crystallogr* 40, 658-674 (2007).

P. D. Adams et al., PHENIX: a comprehensive Python-based system for macromolecular structure solution. *Acta Crystallogr D Biol Crystallogr* 66, 213-221 (2010).

P. Emsley, K. Cowtan, Coot: model-building tools for molecular graphics. *Acta Crystallogr D Biol Crystallogr* 60, 2126-2132 (2004).

S. Hsu et al., Structural insights into glucan phosphatase dynamics using amide hydrogen-deuterium exchange mass spectrometry. *Biochemistry* 48, 9891-9902 (2009).

J. R. R. Whittle et al., Broadly neutralizing human antibody that recognizes the receptor-binding pocket of influenza virus hemagglutinin. *Proc Natl Acad Sci USA* 108, 14216-14221 (2011).

Y. Hamuro et al., Mapping intersubunit interactions of the regulatory subunit (RIalpha) in the type I holoenzyme of protein kinase A by amide hydrogen/deuterium exchange mass spectrometry (DXMS). *J Mol Biol* 340, 1185-1196 (2004).

W. D. Lu, T. Liu, S. Li, V. L. Woods, Jr., V. Hook, The prohormone proenkephalin possesses differential conformational features of subdomains revealed by rapid H-D exchange mass spectrometry. *Protein Sci* 21, 178-187 (2012).

Z. Zhang, D. L. Smith, Determination of amide hydrogen exchange by mass spectrometry: a new tool for protein structure elucidation. *Protein Sci* 2, 522-531 (1993).

C. S. Potter et al., Leginon: a system for fully automated acquisition of 1000 electron micrographs a day. *Ultramicroscopy* 77, 153-161 (1999).

G. C. Lander et al., Appion: an integrated, database-driven pipeline to facilitate EM image processing. *J Struct Biol* 166, 95-102 (2009).

N. R. Voss, C. K. Yoshioka, M. Radermacher, C. S. Potter, B. Carragher, DoG Picker and TiltPicker: software tools to facilitate particle selection in single particle electron microscopy. *J Struct Biol* 166, 205-213 (2009).

T. Ogura, K. Iwasaki, C. Sato, Topology representing network enables highly accurate classification of protein images taken by cryo electron-microscope without masking. *J Struct Biol* 143, 185-200 (2003).

---

SEQUENCE LISTING

```
<160> NUMBER OF SEQ ID NOS: 66

<210> SEQ ID NO 1
<211> LENGTH: 212
<212> TYPE: PRT
<213> ORGANISM: Artificial sequence
<220> FEATURE:
<223> OTHER INFORMATION: Synthetic polypeptide

<400> SEQUENCE: 1

Glu Pro Leu Gln Leu Gly Asn Cys Ser Val Ala Gly Trp Ile Leu Gly
1               5                   10                  15

Asn Pro Glu Cys Glu His Leu Glu Ser Arg Glu Ser Trp Ser Ser Ile
            20                  25                  30

Ile Glu Lys Pro Asn Pro Glu Asn Gly Thr Cys Phe Pro Gly His Phe
        35                  40                  45
```

```
Ala Asp Tyr Glu Glu Leu Arg Glu Gln Leu Ser Ser Val Ser Ser Phe
 50                  55                  60

Glu Arg Phe Glu Ile Phe Pro Lys Glu Ser Ser Trp Pro Asn His Thr
 65                  70                  75                  80

Thr Thr Gly Val Ser Ala Ser Cys Ser His Asn Gly Glu Ser Ser Phe
                 85                  90                  95

Tyr Lys Asn Leu Leu Trp Leu Thr Gly Lys Asn Gly Lys Tyr Pro Asn
            100                 105                 110

Leu Ser Lys Ser Tyr Thr Asn Asn Lys Glu Lys Glu Val Leu Val Leu
        115                 120                 125

Trp Gly Val His His Pro Pro Asp Ile Glu Asp Gln Arg Arg Leu Tyr
130                 135                 140

His Thr Glu Asn Ala Tyr Val Ser Val Lys Ser Ser His Tyr Ser Arg
145                 150                 155                 160

Lys Phe Thr Pro Glu Ile Ala Lys Arg Pro Lys Val Arg Asp Gln Glu
                165                 170                 175

Gly Arg Ile Asn Tyr Tyr Trp Thr Leu Leu Glu Pro Gly Asp Thr Ile
            180                 185                 190

Thr Phe Glu Ala Asn Gly Asn Leu Ile Ala Pro Arg Tyr Ala Phe Ala
        195                 200                 205

Leu Ser Arg Gly
210

<210> SEQ ID NO 2
<211> LENGTH: 212
<212> TYPE: PRT
<213> ORGANISM: Artificial sequence
<220> FEATURE:
<223> OTHER INFORMATION: Synthetic polypeptide

<400> SEQUENCE: 2

Glu Pro Leu Gln Leu Gly Asn Cys Ser Val Ala Gly Trp Ile Leu Gly
1               5                   10                  15

Asn Pro Glu Cys Glu His Leu Asn Ser Ser Glu Ser Trp Ser Ser Ile
            20                  25                  30

Ile Glu Lys Pro Asn Pro Glu Asn Gly Thr Cys Phe Pro Gly His Phe
        35                  40                  45

Ala Asp Tyr Glu Asn Leu Thr Glu Asn Leu Ser Ser Val Ser Ser Phe
 50                  55                  60

Glu Arg Phe Glu Ile Phe Pro Lys Asn Ser Thr Trp Pro Asn His Thr
 65                  70                  75                  80

Thr Asn Gly Thr Ser Ala Ser Cys Ser His Asn Gly Ser Ser Ser Phe
                 85                  90                  95

Tyr Lys Asn Leu Leu Trp Leu Thr Gly Lys Asn Gly Thr Tyr Pro Asn
            100                 105                 110

Leu Ser Lys Asn Tyr Thr Asn Asn Lys Asn Lys Thr Val Leu Val Leu
        115                 120                 125

Trp Gly Val His His Pro Pro Asp Ile Glu Asp Gln Arg Arg Leu Tyr
130                 135                 140

His Thr Glu Asn Ala Tyr Val Ser Val Asn Ser Ser His Tyr Asn Arg
145                 150                 155                 160

Thr Phe Thr Pro Glu Ile Ala Lys Arg Pro Lys Val Arg Asp Gln Glu
                165                 170                 175

Gly Arg Ile Asn Tyr Tyr Trp Thr Leu Leu Glu Pro Asn Asp Thr Ile
            180                 185                 190
```

```
Thr Phe Glu Ala Asn Gly Asn Leu Ile Ala Pro Arg Tyr Ala Phe Ala
            195                 200                 205

Leu Asn Arg Ser
    210

<210> SEQ ID NO 3
<211> LENGTH: 212
<212> TYPE: PRT
<213> ORGANISM: Artificial sequence
<220> FEATURE:
<223> OTHER INFORMATION: Synthetic polypeptide

<400> SEQUENCE: 3

Glu Pro Leu Gln Leu Gly Asn Cys Ser Val Ala Gly Trp Ile Leu Gly
1               5                   10                  15

Asn Pro Glu Cys Glu His Leu Asn Ser Ser Glu Ser Trp Ser Ser Ile
            20                  25                  30

Ile Glu Lys Pro Asn Pro Glu Asn Gly Thr Cys Phe Pro Gly His Phe
        35                  40                  45

Ala Asp Tyr Glu Asn Leu Thr Glu Asn Leu Ser Ser Val Ser Ser Phe
    50                  55                  60

Glu Arg Phe Glu Ile Phe Pro Lys Asn Ser Thr Trp Pro Asn His Thr
65                  70                  75                  80

Thr Asn Gly Thr Ser Ala Ser Cys Ser His Asn Gly Ser Ser Ser Phe
                85                  90                  95

Tyr Lys Asn Leu Leu Trp Leu Thr Gly Lys Asn Gly Thr Tyr Pro Asn
            100                 105                 110

Leu Ser Lys Asn Tyr Thr Asn Asn Lys Asn Lys Thr Val Leu Val Leu
        115                 120                 125

Trp Gly Val His His Pro Pro Asp Ile Glu Arg Gln Arg Arg Leu Tyr
    130                 135                 140

His Thr Glu Asn Ala Tyr Val Ser Val Asn Ser Ser His Tyr Asn Arg
145                 150                 155                 160

Thr Phe Thr Pro Glu Ile Ala Lys Arg Pro Lys Val Arg Asp Gln Glu
                165                 170                 175

Gly Arg Ile Asn Tyr Tyr Trp Thr Leu Leu Glu Pro Asn Asp Thr Ile
            180                 185                 190

Thr Phe Glu Ala Asn Gly Asn Leu Ile Ala Pro Arg Tyr Ala Phe Ala
        195                 200                 205

Leu Asn Arg Ser
    210

<210> SEQ ID NO 4
<211> LENGTH: 212
<212> TYPE: PRT
<213> ORGANISM: Artificial sequence
<220> FEATURE:
<223> OTHER INFORMATION: Synthetic polypeptide

<400> SEQUENCE: 4

Glu Pro Leu Gln Leu Gly Asn Cys Ser Val Ala Gly Trp Ile Leu Gly
1               5                   10                  15

Asn Pro Glu Cys Glu His Leu Asn Ser Ser Glu Ser Trp Ser Ser Ile
            20                  25                  30

Ile Glu Lys Pro Asn Pro Glu Asn Gly Thr Cys Phe Pro Gly His Phe
        35                  40                  45

Ala Asp Tyr Glu Asn Leu Thr Glu Asn Leu Ser Ser Val Ser Ser Phe
    50                  55                  60
```

```
Glu Arg Phe Glu Ile Phe Pro Lys Asn Ser Thr Trp Pro Asn His Thr
 65                  70                  75                  80

Thr Asn Gly Thr Ser Ala Ser Cys Ser His Asn Gly Ser Ser Ser Phe
                 85                  90                  95

Tyr Lys Asn Leu Leu Trp Leu Thr Gly Lys Asn Gly Thr Tyr Pro Asn
            100                 105                 110

Leu Ser Lys Asn Tyr Thr Asn Asn Lys Asn Lys Thr Val Leu Val Leu
        115                 120                 125

Trp Gly Val His His Pro Pro Asp Ile Glu Arg Gln Arg Arg Leu Tyr
130                 135                 140

His Thr Glu Asn Ala Tyr Val Ser Val Asn Ser Ser His Tyr Asn Arg
145                 150                 155                 160

Thr Phe Thr Pro Glu Ile Ala Lys Arg Pro Lys Val Arg Asp Gln Glu
                165                 170                 175

Gly Ala Ile Asn Tyr Tyr Trp Thr Leu Leu Glu Pro Asn Asp Thr Ile
            180                 185                 190

Thr Phe Glu Ala Asn Gly Asn Leu Ile Ala Pro Arg Tyr Ala Phe Ala
        195                 200                 205

Leu Asn Arg Ser
        210

<210> SEQ ID NO 5
<211> LENGTH: 212
<212> TYPE: PRT
<213> ORGANISM: Artificial sequence
<220> FEATURE:
<223> OTHER INFORMATION: Synthetic polypeptide

<400> SEQUENCE: 5

Glu Pro Leu Gln Leu Gly Asn Cys Ser Val Ala Gly Trp Ile Leu Gly
 1               5                  10                  15

Asn Pro Glu Cys Glu His Leu Asn Ser Ser Glu Ser Trp Ser Ser Ile
             20                  25                  30

Ile Glu Lys Pro Asn Pro Glu Asn Gly Thr Cys Phe Trp Gly His Phe
         35                  40                  45

Ala Asp Tyr Glu Asn Leu Thr Glu Asn Leu Ser Ser Val Ser Ser Phe
 50                  55                  60

Glu Arg Phe Glu Ile Phe Pro Lys Asn Ser Thr Trp Pro Asn His Thr
 65                  70                  75                  80

Thr Asn Gly Thr Ser Ala Ser Cys Ser His Asn Gly Ser Ser Ser Phe
                 85                  90                  95

Tyr Lys Asn Leu Leu Trp Leu Thr Gly Lys Asn Gly Thr Tyr Pro Asn
            100                 105                 110

Leu Ser Lys Asn Tyr Thr Asn Asn Lys Asn Lys Thr Val Leu Val Leu
        115                 120                 125

Trp Gly Val His His Pro Pro Asp Ile Glu Arg Gln Arg Arg Leu Tyr
130                 135                 140

His Thr Glu Asn Ala Tyr Val Ser Val Asn Ser Ser His Tyr Asn Arg
145                 150                 155                 160

Thr Phe Thr Pro Glu Ile Ala Lys Arg Pro Lys Val Arg Asp Gln Glu
                165                 170                 175

Gly Arg Ile Asn Tyr Tyr Trp Thr Leu Leu Glu Pro Asn Asp Thr Ile
            180                 185                 190

Thr Phe Glu Ala Asn Gly Asn Leu Ile Ala Pro Arg Tyr Ala Phe Ala
        195                 200                 205
```

```
Leu Asn Arg Ser
    210

<210> SEQ ID NO 6
<211> LENGTH: 212
<212> TYPE: PRT
<213> ORGANISM: Artificial sequence
<220> FEATURE:
<223> OTHER INFORMATION: Synthetic polypeptide

<400> SEQUENCE: 6

Glu Pro Leu Gln Leu Gly Asn Cys Ser Val Ala Gly Trp Ile Leu Gly
1               5                   10                  15

Asn Pro Glu Cys Glu His Leu Asn Ser Ser Glu Ser Trp Ser Ser Ile
            20                  25                  30

Ile Glu Lys Pro Asn Pro Glu Asn Gly Thr Cys Phe Pro Gly His Phe
        35                  40                  45

Ala Asp Tyr Glu Asn Leu Thr Glu Asn Leu Ser Ser Val Ser Ser Phe
    50                  55                  60

Glu Arg Phe Glu Ile Phe Pro Lys Asn Ser Thr Trp Pro Asn His Thr
65                  70                  75                  80

Thr Asn Gly Thr Ser Ala Ser Cys Ser His Asn Gly Ser Ser Ser Phe
                85                  90                  95

Tyr Lys Asn Leu Leu Trp Leu Thr Gly Lys Asn Gly Thr Tyr Pro Asn
            100                 105                 110

Leu Ser Lys Asn Tyr Thr Asn Asn Lys Asn Lys Thr Val Leu Val Leu
        115                 120                 125

Trp Gly Val His His Pro Pro Asp Ile Glu Asp Gln Arg Arg Leu Tyr
    130                 135                 140

His Thr Glu Asn Ala Tyr Val Ser Val Asn Ser Ser His Tyr Asn Arg
145                 150                 155                 160

Thr Phe Thr Pro Glu Ile Ala Lys Arg Pro Lys Val Arg Asp Gln Glu
                165                 170                 175

Gly Arg Ile Asn Tyr Tyr Trp Thr Leu Leu Glu Pro Asn Asp Thr Ile
            180                 185                 190

Thr Phe Glu Ala Asn Gly Asn Leu Ile Ala Pro Arg Tyr Ala Phe Ala
        195                 200                 205

Leu Asn Arg Ser
    210

<210> SEQ ID NO 7
<211> LENGTH: 381
<212> TYPE: PRT
<213> ORGANISM: Artificial sequence
<220> FEATURE:
<223> OTHER INFORMATION: Synthetic polypeptide

<400> SEQUENCE: 7

Met Gln Ile Tyr Glu Gly Lys Leu Thr Ala Glu Gly Leu Arg Phe Gly
1               5                   10                  15

Ile Val Ala Ser Arg Ala Asn His Ala Leu Val Asp Arg Leu Val Glu
            20                  25                  30

Gly Ala Ile Asp Ala Ile Val Arg His Gly Gly Arg Glu Glu Asp Ile
        35                  40                  45

Thr Leu Val Arg Val Cys Gly Ser Trp Glu Ile Pro Val Ala Ala Gly
    50                  55                  60

Glu Leu Ala Arg Lys Glu Asp Ile Asp Ala Val Ile Ala Ile Gly Val
```

```
                65                  70                  75                  80
Leu Cys Arg Gly Ala Thr Pro Ser Phe Asp Tyr Ile Ala Ser Glu Val
                    85                  90                  95

Ser Lys Gly Leu Ala Asp Leu Ser Leu Glu Leu Arg Lys Pro Ile Thr
            100                 105                 110

Phe Gly Val Ile Thr Ala Asp Thr Leu Glu Gln Ala Ile Glu Ala Ala
        115                 120                 125

Gly Thr Cys His Gly Asn Lys Gly Trp Glu Ala Ala Leu Cys Ala Ile
    130                 135                 140

Glu Met Ala Asn Leu Phe Lys Ser Leu Arg Gly Gly Ser Gly Gly Ser
145                 150                 155                 160

Gly Gly Ser Gly Gly Ser Gly Gly Glu Pro Leu Gln Leu Gly Asn
                165                 170                 175

Cys Ser Val Ala Gly Trp Ile Leu Gly Asn Pro Glu Cys Glu His Leu
                180                 185                 190

Asn Ser Ser Glu Ser Trp Ser Ser Ile Ile Glu Lys Pro Asn Pro Glu
            195                 200                 205

Asn Gly Thr Cys Phe Pro Gly His Phe Ala Asp Tyr Glu Asn Leu Thr
        210                 215                 220

Glu Asn Leu Ser Ser Val Ser Ser Phe Glu Arg Phe Glu Ile Phe Pro
225                 230                 235                 240

Lys Asn Ser Thr Trp Pro Asn His Thr Thr Asn Gly Thr Ser Ala Ser
                245                 250                 255

Cys Ser His Asn Gly Ser Ser Phe Tyr Lys Asn Leu Leu Trp Leu
            260                 265                 270

Thr Gly Lys Asn Gly Thr Tyr Pro Asn Leu Ser Lys Asn Tyr Thr Asn
        275                 280                 285

Asn Lys Asn Lys Thr Val Leu Val Leu Trp Gly Val His His Pro Pro
290                 295                 300

Asp Ile Glu Asp Gln Arg Arg Leu Tyr His Thr Glu Asn Ala Tyr Val
305                 310                 315                 320

Ser Val Asn Ser Ser His Tyr Asn Arg Thr Phe Thr Pro Glu Ile Ala
                325                 330                 335

Lys Arg Pro Lys Val Arg Asp Gln Glu Gly Arg Ile Asn Tyr Tyr Trp
            340                 345                 350

Thr Leu Leu Glu Pro Asn Asp Thr Ile Thr Phe Glu Ala Asn Gly Asn
        355                 360                 365

Leu Ile Ala Pro Arg Tyr Ala Phe Ala Leu Asn Arg Ser
    370                 375                 380

<210> SEQ ID NO 8
<211> LENGTH: 212
<212> TYPE: PRT
<213> ORGANISM: Artificial sequence
<220> FEATURE:
<223> OTHER INFORMATION: Synthetic polypeptide

<400> SEQUENCE: 8

Glu Pro Leu Gln Leu Gly Asn Cys Ser Val Ala Gly Trp Ile Leu Gly
1               5                   10                  15

Asn Pro Glu Cys Glu His Leu Asn Ser Ser Glu Ser Trp Ser Ser Ile
                20                  25                  30

Ile Glu Lys Pro Asn Pro Glu Asn Gly Thr Cys Phe Pro Gly His Phe
            35                  40                  45

Ala Asp Tyr Glu Asn Leu Thr Glu Asn Leu Ser Ser Val Ser Ser Phe
```

```
                    50                  55                  60
Glu Arg Phe Glu Ile Phe Pro Lys Asn Ser Thr Trp Pro Asn His Thr
 65                  70                  75                  80

Thr Asn Gly Thr Ser Ala Ser Cys Ser His Asn Gly Ser Ser Ser Phe
                 85                  90                  95

Tyr Lys Asn Leu Leu Trp Leu Thr Gly Lys Asn Gly Thr Tyr Pro Asn
            100                 105                 110

Leu Ser Lys Asn Tyr Thr Asn Asn Lys Asn Lys Thr Val Leu Val Leu
            115                 120                 125

Trp Gly Val His His Pro Pro Asp Ile Glu Arg Gln Arg Arg Leu Tyr
        130                 135                 140

His Thr Glu Asn Ala Tyr Val Ser Val Asn Ser Ser His Tyr Asn Arg
145                 150                 155                 160

Thr Phe Thr Pro Glu Ile Ala Lys Arg Pro Lys Val Arg Asp Gln Glu
                165                 170                 175

Gly Arg Ile Asn Tyr Tyr Trp Thr Leu Leu Glu Pro Asn Asp Thr Ile
            180                 185                 190

Thr Phe Glu Ala Asn Gly Asn Leu Ile Ala Pro Arg Tyr Ala Phe Ala
        195                 200                 205

Leu Asn Arg Ser
    210

<210> SEQ ID NO 9
<211> LENGTH: 381
<212> TYPE: PRT
<213> ORGANISM: Artificial sequence
<220> FEATURE:
<223> OTHER INFORMATION: Synthetic polypeptide

<400> SEQUENCE: 9

Met Gln Ile Tyr Glu Gly Lys Leu Thr Ala Glu Gly Leu Arg Phe Gly
  1               5                  10                  15

Ile Val Ala Ser Arg Ala Asn His Ala Leu Val Asp Arg Leu Val Glu
                 20                  25                  30

Gly Ala Ile Asp Ala Ile Val Arg His Gly Gly Arg Glu Glu Asp Ile
             35                  40                  45

Thr Leu Val Arg Val Cys Gly Ser Trp Glu Ile Pro Val Ala Ala Gly
 50                  55                  60

Glu Leu Ala Arg Lys Glu Asp Ile Asp Ala Val Ile Ala Ile Gly Val
 65                  70                  75                  80

Leu Cys Arg Gly Ala Thr Pro Ser Phe Asp Tyr Ile Ala Ser Glu Val
                 85                  90                  95

Ser Lys Gly Leu Ala Asp Leu Ser Leu Glu Leu Arg Lys Pro Ile Thr
            100                 105                 110

Phe Gly Val Ile Thr Ala Asp Thr Leu Glu Gln Ala Ile Glu Ala Ala
        115                 120                 125

Gly Thr Cys His Gly Asn Lys Gly Trp Glu Ala Ala Leu Cys Ala Ile
    130                 135                 140

Glu Met Ala Asn Leu Phe Lys Ser Leu Arg Gly Ser Gly Gly Ser
145                 150                 155                 160

Gly Gly Ser Gly Gly Ser Gly Gly Glu Pro Leu Gln Leu Gly Asn
                165                 170                 175

Cys Ser Val Ala Gly Trp Ile Leu Gly Asn Pro Glu Cys Glu His Leu
            180                 185                 190

Asn Ser Ser Glu Ser Trp Ser Ser Ile Ile Glu Lys Pro Asn Pro Glu
```

```
                195                 200                 205
Asn Gly Thr Cys Phe Pro Gly His Phe Ala Asp Tyr Glu Asn Leu Thr
    210                 215                 220
Glu Asn Leu Ser Ser Val Ser Ser Phe Glu Arg Phe Glu Ile Phe Pro
225                 230                 235                 240
Lys Asn Ser Thr Trp Pro Asn His Thr Thr Asn Gly Thr Ser Ala Ser
                245                 250                 255
Cys Ser His Asn Gly Ser Ser Ser Phe Tyr Lys Asn Leu Leu Trp Leu
            260                 265                 270
Thr Gly Lys Asn Gly Thr Tyr Pro Asn Leu Ser Lys Asn Tyr Thr Asn
        275                 280                 285
Asn Lys Asn Lys Thr Val Leu Val Leu Trp Gly Val His His Pro Pro
    290                 295                 300
Asp Ile Glu Arg Gln Arg Arg Leu Tyr His Thr Glu Asn Ala Tyr Val
305                 310                 315                 320
Ser Val Asn Ser Ser His Tyr Asn Arg Thr Phe Thr Pro Glu Ile Ala
                325                 330                 335
Lys Arg Pro Lys Val Arg Asp Gln Glu Gly Arg Ile Asn Tyr Tyr Trp
            340                 345                 350
Thr Leu Leu Glu Pro Asn Asp Thr Ile Thr Phe Glu Ala Asn Gly Asn
        355                 360                 365
Leu Ile Ala Pro Arg Tyr Ala Phe Ala Leu Asn Arg Ser
    370                 375                 380

<210> SEQ ID NO 10
<211> LENGTH: 212
<212> TYPE: PRT
<213> ORGANISM: Artificial sequence
<220> FEATURE:
<223> OTHER INFORMATION: Synthetic polypeptide

<400> SEQUENCE: 10

Glu Pro Leu Gln Leu Gly Asn Cys Ser Val Ala Gly Trp Ile Leu Gly
1               5                   10                  15
Asn Pro Glu Cys Glu His Leu Asn Ser Ser Glu Ser Trp Ser Ser Ile
            20                  25                  30
Ile Glu Lys Pro Asn Pro Glu Asn Gly Thr Cys Phe Pro Gly His Phe
        35                  40                  45
Ala Asp Tyr Glu Asn Leu Thr Glu Asn Leu Ser Ser Val Ser Ser Phe
    50                  55                  60
Glu Arg Phe Glu Ile Phe Pro Lys Asn Ser Thr Trp Pro Asn His Thr
65                  70                  75                  80
Thr Thr Gly Val Ser Ala Ser Cys Ser His Asn Gly Glu Ser Ser Phe
                85                  90                  95
Tyr Lys Asn Leu Leu Trp Leu Thr Gly Lys Asn Gly Thr Tyr Pro Asn
            100                 105                 110
Leu Ser Lys Asn Tyr Thr Asn Asn Lys Asn Lys Thr Val Leu Val Leu
        115                 120                 125
Trp Gly Val His His Pro Pro Asn Ile Gly Asp Gln Arg Ala Leu Tyr
    130                 135                 140
His Thr Glu Asn Ala Tyr Val Ser Val Asn Ser Ser His Tyr Asn Arg
145                 150                 155                 160
Thr Phe Thr Pro Glu Ile Ala Lys Arg Pro Lys Val Arg Asp Gln Glu
                165                 170                 175
Gly Arg Ile Asn Tyr Tyr Trp Thr Leu Leu Glu Pro Asn Asp Thr Ile
```

```
                    180                 185                 190
Thr Phe Glu Ala Asn Gly Asn Leu Ile Ala Pro Arg Tyr Ala Phe Ala
            195                 200                 205

Leu Asn Arg Ser
        210

<210> SEQ ID NO 11
<211> LENGTH: 220
<212> TYPE: PRT
<213> ORGANISM: Artificial sequence
<220> FEATURE:
<223> OTHER INFORMATION: Synthetic polypeptide

<400> SEQUENCE: 11

Ala Asp Pro Gly Tyr Leu Leu Glu Ala Pro Leu Gln Leu Gly Asn Cys
1               5                   10                  15

Ser Val Ala Gly Trp Ile Leu Gly Asn Pro Glu Cys Glu Leu Leu Ile
            20                  25                  30

Ser Arg Glu Ser Trp Ser Tyr Ile Val Glu Lys Pro Asn Pro Glu Asn
        35                  40                  45

Gly Thr Cys Tyr Pro Gly His Phe Ala Asp Tyr Glu Glu Leu Arg Glu
    50                  55                  60

Gln Leu Ser Ser Val Ser Ser Phe Glu Arg Phe Glu Ile Phe Pro Lys
65                  70                  75                  80

Glu Ser Ser Trp Pro Asn His Thr Thr Thr Gly Val Ser Ala Ser Cys
                85                  90                  95

Ser His Asn Gly Glu Ser Ser Phe Tyr Lys Asn Leu Leu Trp Leu Thr
            100                 105                 110

Gly Lys Asn Gly Leu Tyr Pro Asn Leu Ser Lys Ser Tyr Asn Asn Thr
        115                 120                 125

Lys Glu Lys Glu Val Leu Val Leu Trp Gly Val His His Pro Pro Asn
130                 135                 140

Ile Gly Asp Gln Arg Ala Leu Tyr His Thr Glu Asn Ala Tyr Val Ser
145                 150                 155                 160

Val Val Ser Ser His Tyr Ser Arg Lys Phe Thr Pro Glu Ile Ala Lys
                165                 170                 175

Arg Pro Lys Val Arg Asp Gln Glu Gly Arg Ile Asn Tyr Tyr Trp Thr
            180                 185                 190

Leu Leu Glu Pro Gly Asp Thr Ile Ile Phe Glu Ala Asn Gly Asn Leu
        195                 200                 205

Ile Ala Pro Arg Tyr Ala Phe Ala Leu Ser Arg Gly
    210                 215                 220

<210> SEQ ID NO 12
<211> LENGTH: 220
<212> TYPE: PRT
<213> ORGANISM: Artificial sequence
<220> FEATURE:
<223> OTHER INFORMATION: Synthetic polypeptide

<400> SEQUENCE: 12

Ala Asp Pro Gly Tyr Leu Leu Glu Ala Pro Leu Gln Leu Gly Asn Cys
1               5                   10                  15

Ser Val Ala Gly Trp Ile Leu Gly Asn Pro Glu Cys Glu Leu Leu Asn
            20                  25                  30

Ser Ser Glu Ser Trp Ser Tyr Ile Val Glu Lys Pro Asn Pro Glu Asn
        35                  40                  45
```

```
Gly Thr Cys Tyr Pro Gly His Phe Ala Asp Tyr Glu Glu Leu Arg Glu
 50                  55                  60

Gln Leu Ser Ser Val Ser Ser Phe Glu Arg Phe Glu Ile Phe Pro Lys
 65                  70                  75                  80

Glu Ser Ser Trp Pro Asn His Thr Thr Thr Gly Val Ser Ala Ser Cys
                 85                  90                  95

Ser His Asn Gly Glu Ser Ser Phe Tyr Lys Asn Leu Leu Trp Leu Thr
                100                 105                 110

Gly Lys Asn Gly Leu Tyr Pro Asn Leu Ser Lys Ser Tyr Ala Asn Asn
            115                 120                 125

Lys Glu Lys Glu Val Leu Val Leu Trp Gly Val His His Pro Pro Asn
130                 135                 140

Ile Gly Asp Gln Arg Ala Leu Tyr His Thr Glu Asn Ala Tyr Val Ser
145                 150                 155                 160

Val Val Ser Ser His Tyr Ser Arg Lys Phe Thr Pro Glu Ile Ala Lys
                165                 170                 175

Arg Pro Lys Val Arg Asp Gln Glu Gly Arg Ile Asn Tyr Tyr Trp Thr
            180                 185                 190

Leu Leu Glu Pro Gly Asp Thr Ile Ile Phe Glu Ala Asn Gly Asn Leu
            195                 200                 205

Ile Ala Pro Arg Tyr Ala Phe Ala Leu Ser Arg Gly
210                 215                 220

<210> SEQ ID NO 13
<211> LENGTH: 220
<212> TYPE: PRT
<213> ORGANISM: Artificial sequence
<220> FEATURE:
<223> OTHER INFORMATION: Synthetic polypeptide

<400> SEQUENCE: 13

Ala Asp Pro Gly Tyr Leu Leu Glu Ala Pro Leu Gln Leu Gly Asn Cys
1                5                  10                  15

Ser Val Ala Gly Trp Ile Leu Gly Asn Pro Glu Cys Glu Leu Leu Ile
                20                  25                  30

Ser Arg Glu Ser Trp Ser Tyr Ile Val Glu Lys Pro Asn Pro Glu Asn
            35                  40                  45

Gly Thr Cys Tyr Pro Gly His Phe Ala Asp Tyr Glu Glu Leu Arg Glu
 50                  55                  60

Gln Leu Ser Ser Val Ser Ser Phe Glu Arg Phe Glu Ile Phe Pro Lys
 65                  70                  75                  80

Glu Ser Ser Trp Pro Asn His Thr Thr Thr Gly Val Ser Ala Ser Cys
                 85                  90                  95

Ser His Asn Gly Glu Ser Ser Phe Tyr Lys Asn Leu Leu Trp Leu Thr
                100                 105                 110

Gly Lys Asn Gly Leu Tyr Pro Asn Leu Ser Lys Ser Tyr Ala Asn Asn
            115                 120                 125

Lys Asn Lys Thr Val Leu Val Leu Trp Gly Val His His Pro Pro Asn
130                 135                 140

Ile Gly Asp Gln Arg Ala Leu Tyr His Thr Glu Asn Ala Tyr Val Ser
145                 150                 155                 160

Val Val Ser Ser His Tyr Ser Arg Lys Phe Thr Pro Glu Ile Ala Lys
                165                 170                 175

Arg Pro Lys Val Arg Asp Gln Glu Gly Arg Ile Asn Tyr Tyr Trp Thr
            180                 185                 190
```

```
Leu Leu Glu Pro Gly Asp Thr Ile Ile Phe Glu Ala Asn Gly Asn Leu
            195                 200                 205

Ile Ala Pro Arg Tyr Ala Phe Ala Leu Ser Arg Gly
        210                 215                 220

<210> SEQ ID NO 14
<211> LENGTH: 220
<212> TYPE: PRT
<213> ORGANISM: Artificial sequence
<220> FEATURE:
<223> OTHER INFORMATION: Synthetic polypeptide

<400> SEQUENCE: 14

Ala Asp Pro Gly Tyr Leu Leu Glu Ala Pro Leu Gln Leu Gly Asn Cys
1               5                   10                  15

Ser Val Ala Gly Trp Ile Leu Gly Asn Pro Glu Cys Glu Leu Leu Ile
            20                  25                  30

Ser Arg Glu Ser Trp Ser Tyr Ile Val Glu Lys Pro Asn Pro Glu Asn
        35                  40                  45

Gly Thr Cys Tyr Pro Gly His Phe Ala Asp Tyr Glu Glu Leu Arg Glu
    50                  55                  60

Gln Leu Ser Ser Val Ser Ser Phe Glu Arg Phe Glu Ile Phe Pro Lys
65                  70                  75                  80

Glu Ser Ser Trp Pro Asn His Thr Thr Thr Gly Val Ser Ala Ser Cys
                85                  90                  95

Ser His Asn Gly Glu Ser Ser Phe Tyr Lys Asn Leu Leu Trp Leu Thr
            100                 105                 110

Gly Lys Asn Gly Leu Tyr Pro Asn Leu Ser Lys Asn Tyr Thr Asn Asn
        115                 120                 125

Lys Glu Lys Glu Val Leu Val Leu Trp Gly Val His His Pro Pro Asn
130                 135                 140

Ile Gly Asp Gln Arg Ala Leu Tyr His Thr Glu Asn Ala Tyr Val Ser
145                 150                 155                 160

Val Val Ser Ser His Tyr Ser Arg Lys Phe Thr Pro Glu Ile Ala Lys
                165                 170                 175

Arg Pro Lys Val Arg Asp Gln Glu Gly Arg Ile Asn Tyr Tyr Trp Thr
            180                 185                 190

Leu Leu Glu Pro Gly Asp Thr Ile Ile Phe Glu Ala Asn Gly Asn Leu
        195                 200                 205

Ile Ala Pro Arg Tyr Ala Phe Ala Leu Ser Arg Gly
    210                 215                 220

<210> SEQ ID NO 15
<211> LENGTH: 220
<212> TYPE: PRT
<213> ORGANISM: Artificial sequence
<220> FEATURE:
<223> OTHER INFORMATION: Synthetic polypeptide

<400> SEQUENCE: 15

Ala Asp Pro Gly Tyr Leu Leu Glu Ala Pro Leu Gln Leu Gly Asn Cys
1               5                   10                  15

Ser Val Ala Gly Trp Ile Leu Gly Asn Pro Glu Cys Glu Leu Leu Ile
            20                  25                  30

Ser Arg Glu Ser Trp Ser Tyr Ile Val Glu Lys Pro Asn Pro Glu Asn
        35                  40                  45

Gly Thr Cys Tyr Pro Gly His Phe Ala Asp Tyr Glu Glu Leu Arg Glu
    50                  55                  60
```

```
Gln Leu Ser Ser Val Ser Ser Phe Glu Arg Phe Glu Ile Phe Pro Lys
 65                  70                  75                  80

Glu Ser Ser Trp Pro Asn His Thr Thr Thr Gly Val Ser Ala Ser Cys
                 85                  90                  95

Ser His Asn Gly Glu Ser Ser Phe Tyr Lys Asn Leu Leu Trp Leu Thr
            100                 105                 110

Gly Lys Asn Gly Leu Tyr Pro Asn Leu Ser Lys Ser Tyr Ala Asn Asn
            115                 120                 125

Lys Glu Lys Glu Val Leu Val Leu Trp Gly Val His His Pro Pro Asn
130                 135                 140

Ile Gly Asp Gln Arg Ala Leu Tyr His Thr Glu Asn Ala Tyr Val Ser
145                 150                 155                 160

Val Val Ser Ser His Tyr Asn Arg Thr Phe Thr Pro Glu Ile Ala Lys
                165                 170                 175

Arg Pro Lys Val Arg Asp Gln Glu Gly Arg Ile Asn Tyr Tyr Trp Thr
                180                 185                 190

Leu Leu Glu Pro Gly Asp Thr Ile Ile Phe Glu Ala Asn Gly Asn Leu
                195                 200                 205

Ile Ala Pro Arg Tyr Ala Phe Ala Leu Ser Arg Gly
                210                 215                 220

<210> SEQ ID NO 16
<211> LENGTH: 220
<212> TYPE: PRT
<213> ORGANISM: Artificial sequence
<220> FEATURE:
<223> OTHER INFORMATION: Synthetic polypeptide

<400> SEQUENCE: 16

Ala Asp Pro Gly Tyr Leu Leu Glu Ala Pro Leu Gln Leu Gly Asn Cys
 1               5                  10                  15

Ser Val Ala Gly Trp Ile Leu Gly Asn Pro Glu Cys Glu Leu Leu Ile
                 20                  25                  30

Ser Arg Glu Ser Trp Ser Tyr Ile Val Glu Lys Pro Asn Pro Glu Asn
             35                  40                  45

Gly Thr Cys Tyr Pro Gly His Phe Ala Asp Tyr Glu Glu Leu Arg Glu
 50                  55                  60

Gln Leu Ser Ser Val Ser Ser Phe Glu Arg Phe Glu Ile Phe Pro Lys
 65                  70                  75                  80

Glu Ser Ser Trp Pro Asn His Thr Thr Thr Gly Val Ser Ala Ser Cys
                 85                  90                  95

Ser His Asn Gly Glu Ser Ser Phe Tyr Lys Asn Leu Leu Trp Leu Thr
            100                 105                 110

Gly Lys Asn Gly Leu Tyr Pro Asn Leu Ser Lys Ser Tyr Ala Asn Asn
            115                 120                 125

Lys Glu Lys Glu Val Leu Val Leu Trp Gly Val His His Pro Pro Asn
130                 135                 140

Ile Gly Asp Gln Arg Ala Leu Tyr His Thr Glu Asn Ala Tyr Val Ser
145                 150                 155                 160

Val Val Ser Ser His Tyr Ser Arg Lys Phe Thr Pro Glu Ile Ala Lys
                165                 170                 175

Arg Pro Lys Val Arg Asp Gln Glu Gly Arg Ile Asn Tyr Tyr Trp Thr
                180                 185                 190

Leu Leu Glu Pro Gly Asp Thr Ile Ile Phe Glu Ala Asn Gly Asn Leu
                195                 200                 205
```

```
Ile Ala Pro Arg Tyr Ala Phe Ala Leu Asn Arg Ser
    210                 215                 220

<210> SEQ ID NO 17
<211> LENGTH: 220
<212> TYPE: PRT
<213> ORGANISM: Artificial sequence
<220> FEATURE:
<223> OTHER INFORMATION: Synthetic polypeptide

<400> SEQUENCE: 17

Ala Asp Pro Gly Tyr Leu Leu Glu Ala Pro Leu Gln Leu Gly Asn Cys
1               5                   10                  15

Ser Val Ala Gly Trp Ile Leu Gly Asn Pro Glu Cys Glu Leu Leu Ile
            20                  25                  30

Ser Arg Glu Ser Trp Ser Tyr Ile Val Glu Lys Pro Asn Pro Glu Asn
        35                  40                  45

Gly Thr Cys Tyr Pro Gly His Phe Ala Asp Tyr Glu Glu Leu Arg Glu
    50                  55                  60

Gln Leu Ser Ser Val Ser Ser Phe Glu Arg Phe Glu Ile Phe Pro Lys
65                  70                  75                  80

Glu Ser Ser Trp Pro Asn His Thr Thr Thr Gly Val Ser Ala Ser Cys
                85                  90                  95

Ser His Asn Gly Glu Ser Ser Phe Tyr Lys Asn Leu Leu Trp Leu Thr
            100                 105                 110

Gly Lys Asn Gly Thr Tyr Pro Asn Leu Ser Lys Ser Tyr Ala Asn Asn
        115                 120                 125

Lys Glu Lys Glu Val Leu Val Leu Trp Gly Val His His Pro Pro Asn
    130                 135                 140

Ile Gly Asp Gln Arg Ala Leu Tyr His Thr Glu Asn Ala Tyr Val Ser
145                 150                 155                 160

Val Val Ser Ser His Tyr Ser Arg Lys Phe Thr Pro Glu Ile Ala Lys
                165                 170                 175

Arg Pro Lys Val Arg Asp Gln Glu Gly Arg Ile Asn Tyr Tyr Trp Thr
            180                 185                 190

Leu Leu Glu Pro Gly Asp Thr Ile Ile Phe Glu Ala Asn Gly Asn Leu
        195                 200                 205

Ile Ala Pro Arg Tyr Ala Phe Ala Leu Ser Arg Gly
    210                 215                 220

<210> SEQ ID NO 18
<211> LENGTH: 220
<212> TYPE: PRT
<213> ORGANISM: Artificial sequence
<220> FEATURE:
<223> OTHER INFORMATION: Synthetic polypeptide

<400> SEQUENCE: 18

Ala Asp Pro Gly Tyr Leu Leu Glu Ala Pro Leu Gln Leu Gly Asn Cys
1               5                   10                  15

Ser Val Ala Gly Trp Ile Leu Gly Asn Pro Glu Cys Glu Leu Leu Ile
            20                  25                  30

Ser Arg Glu Ser Trp Ser Tyr Ile Val Glu Lys Pro Asn Pro Glu Asn
        35                  40                  45

Gly Thr Cys Tyr Pro Gly His Phe Ala Asp Tyr Glu Glu Leu Arg Glu
    50                  55                  60

Gln Leu Ser Ser Val Ser Ser Phe Glu Arg Phe Glu Ile Phe Pro Lys
```

```
            65                  70                  75                  80
Glu Ser Ser Trp Pro Asn His Thr Thr Asn Gly Thr Ser Ala Ser Cys
                85                  90                  95

Ser His Asn Gly Glu Ser Ser Phe Tyr Lys Asn Leu Leu Trp Leu Thr
            100                 105                 110

Gly Lys Asn Gly Leu Tyr Pro Asn Leu Ser Lys Ser Tyr Ala Asn Asn
        115                 120                 125

Lys Glu Lys Glu Val Leu Val Leu Trp Gly Val His His Pro Pro Asn
    130                 135                 140

Ile Gly Asp Gln Arg Ala Leu Tyr His Thr Glu Asn Ala Tyr Val Ser
145                 150                 155                 160

Val Val Ser Ser His Tyr Ser Arg Lys Phe Thr Pro Glu Ile Ala Lys
                165                 170                 175

Arg Pro Lys Val Arg Asp Gln Glu Gly Arg Ile Asn Tyr Tyr Trp Thr
            180                 185                 190

Leu Leu Glu Pro Gly Asp Thr Ile Ile Phe Glu Ala Asn Gly Asn Leu
        195                 200                 205

Ile Ala Pro Arg Tyr Ala Phe Ala Leu Ser Arg Gly
    210                 215                 220

<210> SEQ ID NO 19
<211> LENGTH: 220
<212> TYPE: PRT
<213> ORGANISM: Artificial sequence
<220> FEATURE:
<223> OTHER INFORMATION: Synthetic polypeptide

<400> SEQUENCE: 19

Ala Asp Pro Gly Tyr Leu Leu Glu Ala Pro Leu Gln Leu Gly Asn Cys
1               5                   10                  15

Ser Val Ala Gly Trp Ile Leu Gly Asn Pro Glu Cys Glu Leu Leu Ile
            20                  25                  30

Ser Arg Glu Ser Trp Ser Tyr Ile Val Glu Lys Pro Asn Pro Glu Asn
        35                  40                  45

Gly Thr Cys Tyr Pro Gly His Phe Ala Asp Tyr Glu Glu Leu Arg Glu
    50                  55                  60

Gln Leu Ser Ser Val Ser Ser Phe Glu Arg Phe Glu Ile Phe Pro Lys
65                  70                  75                  80

Asn Ser Thr Trp Pro Asn His Thr Thr Thr Gly Val Ser Ala Ser Cys
                85                  90                  95

Ser His Asn Gly Glu Ser Ser Phe Tyr Lys Asn Leu Leu Trp Leu Thr
            100                 105                 110

Gly Lys Asn Gly Leu Tyr Pro Asn Leu Ser Lys Ser Tyr Ala Asn Asn
        115                 120                 125

Lys Glu Lys Glu Val Leu Val Leu Trp Gly Val His His Pro Pro Asn
    130                 135                 140

Ile Gly Asp Gln Arg Ala Leu Tyr His Thr Glu Asn Ala Tyr Val Ser
145                 150                 155                 160

Val Val Ser Ser His Tyr Ser Arg Lys Phe Thr Pro Glu Ile Ala Lys
                165                 170                 175

Arg Pro Lys Val Arg Asp Gln Glu Gly Arg Ile Asn Tyr Tyr Trp Thr
            180                 185                 190

Leu Leu Glu Pro Gly Asp Thr Ile Ile Phe Glu Ala Asn Gly Asn Leu
        195                 200                 205

Ile Ala Pro Arg Tyr Ala Phe Ala Leu Ser Arg Gly
```

210                 215                 220

<210> SEQ ID NO 20
<211> LENGTH: 220
<212> TYPE: PRT
<213> ORGANISM: Artificial sequence
<220> FEATURE:
<223> OTHER INFORMATION: Synthetic polypeptide

<400> SEQUENCE: 20

Ala Asp Pro Gly Tyr Leu Leu Glu Ala Pro Leu Gln Leu Gly Asn Cys
1               5                   10                  15

Ser Val Ala Gly Trp Ile Leu Gly Asn Pro Glu Cys Glu Leu Leu Ile
            20                  25                  30

Ser Arg Glu Ser Trp Ser Tyr Ile Val Glu Lys Pro Asn Pro Glu Asn
        35                  40                  45

Gly Thr Cys Tyr Pro Gly His Phe Ala Asp Tyr Glu Glu Leu Arg Glu
    50                  55                  60

Gln Leu Ser Ser Val Ser Ser Phe Glu Arg Phe Glu Ile Phe Pro Lys
65                  70                  75                  80

Glu Ser Ser Trp Pro Asn His Thr Thr Thr Gly Val Ser Ala Ser Cys
                85                  90                  95

Ser His Asn Gly Glu Ser Ser Phe Tyr Lys Asn Leu Leu Trp Leu Thr
            100                 105                 110

Gly Lys Asn Gly Leu Tyr Pro Asn Leu Ser Lys Ser Tyr Ala Asn Asn
        115                 120                 125

Lys Glu Lys Glu Val Leu Val Leu Trp Gly Val His His Pro Pro Asn
130                 135                 140

Ile Gly Asp Gln Arg Ala Leu Tyr His Thr Glu Asn Ala Tyr Val Ser
145                 150                 155                 160

Val Asn Ser Ser His Tyr Ser Arg Lys Phe Thr Pro Glu Ile Ala Lys
                165                 170                 175

Arg Pro Lys Val Arg Asp Gln Glu Gly Arg Ile Asn Tyr Tyr Trp Thr
            180                 185                 190

Leu Leu Glu Pro Gly Asp Thr Ile Ile Phe Glu Ala Asn Gly Asn Leu
        195                 200                 205

Ile Ala Pro Arg Tyr Ala Phe Ala Leu Ser Arg Gly
    210                 215                 220

<210> SEQ ID NO 21
<211> LENGTH: 220
<212> TYPE: PRT
<213> ORGANISM: Artificial sequence
<220> FEATURE:
<223> OTHER INFORMATION: Synthetic polypeptide

<400> SEQUENCE: 21

Ala Asp Pro Gly Tyr Leu Leu Glu Ala Pro Leu Gln Leu Gly Asn Cys
1               5                   10                  15

Ser Val Ala Gly Trp Ile Leu Gly Asn Pro Glu Cys Glu Leu Leu Ile
            20                  25                  30

Ser Arg Glu Ser Trp Ser Tyr Ile Val Glu Lys Pro Asn Pro Glu Asn
        35                  40                  45

Gly Thr Cys Tyr Pro Gly His Phe Ala Asp Tyr Glu Glu Leu Arg Glu
    50                  55                  60

Gln Leu Ser Ser Val Ser Ser Phe Glu Arg Phe Glu Ile Phe Pro Lys
65                  70                  75                  80

```
Glu Ser Ser Trp Pro Asn His Thr Thr Asn Gly Thr Ser Ala Ser Cys
                85                  90                  95

Ser His Asn Gly Glu Ser Ser Phe Tyr Lys Asn Leu Leu Trp Leu Thr
            100                 105                 110

Gly Lys Asn Gly Thr Tyr Pro Asn Leu Ser Lys Ser Tyr Ala Asn Asn
            115                 120                 125

Lys Glu Lys Glu Val Leu Val Leu Trp Gly Val His Pro Pro Asn
130                 135                 140

Ile Gly Asp Gln Arg Ala Leu Tyr His Thr Glu Asn Ala Tyr Val Ser
145                 150                 155                 160

Val Asn Ser Ser His Tyr Ser Arg Lys Phe Thr Pro Glu Ile Ala Lys
                165                 170                 175

Arg Pro Lys Val Arg Asp Gln Glu Gly Arg Ile Asn Tyr Tyr Trp Thr
            180                 185                 190

Leu Leu Glu Pro Gly Asp Thr Ile Ile Phe Glu Ala Asn Gly Asn Leu
            195                 200                 205

Ile Ala Pro Arg Tyr Ala Phe Ala Leu Ser Arg Gly
            210                 215                 220

<210> SEQ ID NO 22
<211> LENGTH: 220
<212> TYPE: PRT
<213> ORGANISM: Artificial sequence
<220> FEATURE:
<223> OTHER INFORMATION: Synthetic polypeptide

<400> SEQUENCE: 22

Ala Asp Pro Gly Tyr Leu Leu Glu Ala Pro Leu Gln Leu Gly Asn Cys
1               5                   10                  15

Ser Val Ala Gly Trp Ile Leu Gly Asn Pro Glu Cys Glu Leu Leu Asn
            20                  25                  30

Ser Ser Glu Ser Trp Ser Tyr Ile Val Glu Lys Pro Asn Pro Glu Asn
            35                  40                  45

Gly Thr Cys Tyr Pro Gly His Phe Ala Asp Tyr Glu Glu Leu Arg Glu
        50                  55                  60

Gln Leu Ser Ser Val Ser Ser Phe Glu Arg Phe Glu Ile Phe Pro Lys
65                  70                  75                  80

Glu Ser Ser Trp Pro Asn His Thr Thr Thr Gly Val Ser Ala Ser Cys
                85                  90                  95

Ser His Asn Gly Glu Ser Ser Phe Tyr Lys Asn Leu Leu Trp Leu Thr
            100                 105                 110

Gly Lys Asn Gly Leu Tyr Pro Asn Leu Ser Lys Asn Tyr Thr Asn Asn
            115                 120                 125

Lys Asn Lys Thr Val Leu Val Leu Trp Gly Val His Pro Pro Asn
130                 135                 140

Ile Gly Asp Gln Arg Ala Leu Tyr His Thr Glu Asn Ala Tyr Val Ser
145                 150                 155                 160

Val Val Ser Ser His Tyr Asn Arg Thr Phe Thr Pro Glu Ile Ala Lys
                165                 170                 175

Arg Pro Lys Val Arg Asp Gln Glu Gly Arg Ile Asn Tyr Tyr Trp Thr
            180                 185                 190

Leu Leu Glu Pro Gly Asp Thr Ile Ile Phe Glu Ala Asn Gly Asn Leu
            195                 200                 205

Ile Ala Pro Arg Tyr Ala Phe Ala Leu Ser Arg Gly
            210                 215                 220
```

```
<210> SEQ ID NO 23
<211> LENGTH: 220
<212> TYPE: PRT
<213> ORGANISM: Artificial sequence
<220> FEATURE:
<223> OTHER INFORMATION: Synthetic polypeptide

<400> SEQUENCE: 23

Ala Asp Pro Gly Tyr Leu Leu Glu Ala Pro Leu Gln Leu Gly Asn Cys
1               5                   10                  15

Ser Val Ala Gly Trp Ile Leu Gly Asn Pro Glu Cys Glu Leu Leu Asn
            20                  25                  30

Ser Ser Glu Ser Trp Ser Tyr Ile Val Glu Lys Pro Asn Pro Glu Asn
        35                  40                  45

Gly Thr Cys Tyr Pro Gly His Phe Ala Asp Tyr Glu Glu Leu Arg Glu
    50                  55                  60

Gln Leu Ser Ser Val Ser Ser Phe Glu Arg Phe Glu Ile Phe Pro Lys
65                  70                  75                  80

Glu Ser Ser Trp Pro Asn His Thr Thr Asn Gly Thr Ser Ala Ser Cys
                85                  90                  95

Ser His Asn Gly Glu Ser Ser Phe Tyr Lys Asn Leu Leu Trp Leu Thr
            100                 105                 110

Gly Lys Asn Gly Leu Tyr Pro Asn Leu Ser Lys Asn Tyr Thr Asn Asn
        115                 120                 125

Lys Asn Lys Thr Val Leu Val Leu Trp Gly Val His His Pro Pro Asn
130                 135                 140

Ile Gly Asp Gln Arg Ala Leu Tyr His Thr Glu Asn Ala Tyr Val Ser
145                 150                 155                 160

Val Val Ser Ser His Tyr Asn Arg Thr Phe Thr Pro Glu Ile Ala Lys
                165                 170                 175

Arg Pro Lys Val Arg Asp Gln Glu Gly Arg Ile Asn Tyr Tyr Trp Thr
            180                 185                 190

Leu Leu Glu Pro Gly Asp Thr Ile Ile Phe Glu Ala Asn Gly Asn Leu
        195                 200                 205

Ile Ala Pro Arg Tyr Ala Phe Ala Leu Asn Arg Ser
    210                 215                 220

<210> SEQ ID NO 24
<211> LENGTH: 220
<212> TYPE: PRT
<213> ORGANISM: Artificial sequence
<220> FEATURE:
<223> OTHER INFORMATION: Synthetic polypeptide

<400> SEQUENCE: 24

Ala Asp Pro Gly Tyr Leu Leu Glu Ala Pro Leu Gln Leu Gly Asn Cys
1               5                   10                  15

Ser Val Ala Gly Trp Ile Leu Gly Asn Pro Glu Cys Glu Leu Leu Ile
            20                  25                  30

Ser Arg Glu Ser Trp Ser Tyr Ile Val Glu Lys Pro Asn Pro Glu Asn
        35                  40                  45

Gly Thr Cys Tyr Pro Gly His Phe Ala Asp Tyr Glu Glu Leu Arg Glu
    50                  55                  60

Gln Leu Ser Ser Val Ser Ser Phe Glu Arg Phe Glu Ile Phe Pro Lys
65                  70                  75                  80

Glu Ser Ser Trp Pro Asn His Thr Thr Thr Gly Val Ser Ala Ser Cys
                85                  90                  95
```

```
Ser His Asn Gly Ser Ser Ser Phe Tyr Lys Asn Leu Leu Trp Leu Thr
            100                 105                 110

Gly Lys Asn Gly Leu Tyr Pro Asn Leu Ser Lys Ser Tyr Ala Asn Asn
            115                 120                 125

Lys Glu Lys Glu Val Leu Val Leu Trp Gly Val His His Pro Pro Asn
130                 135                 140

Ile Gly Asp Gln Arg Ala Leu Tyr His Thr Glu Asn Ala Tyr Val Ser
145                 150                 155                 160

Val Val Ser Ser His Tyr Ser Arg Lys Phe Thr Pro Glu Ile Ala Lys
                165                 170                 175

Arg Pro Lys Val Arg Asp Gln Glu Gly Arg Ile Asn Tyr Tyr Trp Thr
            180                 185                 190

Leu Leu Glu Pro Gly Asp Thr Ile Ile Phe Glu Ala Asn Gly Asn Leu
            195                 200                 205

Ile Ala Pro Arg Tyr Ala Phe Ala Leu Ser Arg Gly
            210                 215                 220

<210> SEQ ID NO 25
<211> LENGTH: 220
<212> TYPE: PRT
<213> ORGANISM: Artificial sequence
<220> FEATURE:
<223> OTHER INFORMATION: Synthetic polypeptide

<400> SEQUENCE: 25

Ala Asp Pro Gly Tyr Leu Leu Glu Ala Pro Leu Gln Leu Gly Asn Cys
1               5                   10                  15

Ser Val Ala Gly Trp Ile Leu Gly Asn Pro Glu Cys Glu Leu Leu Asn
            20                  25                  30

Ser Ser Glu Ser Trp Ser Tyr Ile Val Glu Lys Pro Asn Pro Glu Asn
        35                  40                  45

Gly Thr Cys Tyr Pro Gly His Phe Ala Asp Tyr Glu Glu Leu Arg Glu
    50                  55                  60

Gln Leu Ser Ser Val Ser Ser Phe Glu Arg Phe Glu Ile Phe Pro Lys
65                  70                  75                  80

Glu Ser Ser Trp Pro Asn His Thr Thr Asn Gly Thr Ser Ala Ser Cys
                85                  90                  95

Ser His Asn Gly Glu Ser Ser Phe Tyr Lys Asn Leu Leu Trp Leu Thr
            100                 105                 110

Gly Lys Asn Gly Thr Tyr Pro Asn Leu Ser Lys Asn Tyr Thr Asn Asn
            115                 120                 125

Lys Asn Lys Thr Val Leu Val Leu Trp Gly Val His His Pro Pro Asn
130                 135                 140

Ile Gly Asp Gln Arg Ala Leu Tyr His Thr Glu Asn Ala Tyr Val Ser
145                 150                 155                 160

Val Asn Ser Ser His Tyr Asn Arg Thr Phe Thr Pro Glu Ile Ala Lys
                165                 170                 175

Arg Pro Lys Val Arg Asp Gln Glu Gly Arg Ile Asn Tyr Tyr Trp Thr
            180                 185                 190

Leu Leu Glu Pro Gly Asp Thr Ile Ile Phe Glu Ala Asn Gly Asn Leu
            195                 200                 205

Ile Ala Pro Arg Tyr Ala Phe Ala Leu Asn Arg Ser
            210                 215                 220

<210> SEQ ID NO 26
```

```
<211> LENGTH: 220
<212> TYPE: PRT
<213> ORGANISM: Artificial sequence
<220> FEATURE:
<223> OTHER INFORMATION: Synthetic polypeptide

<400> SEQUENCE: 26

Ala Asp Pro Gly Tyr Leu Leu Glu Ala Pro Leu Gln Leu Gly Asn Cys
1               5                   10                  15

Ser Val Ala Gly Trp Ile Leu Gly Asn Pro Glu Cys Glu Leu Leu Asn
            20                  25                  30

Ser Ser Glu Ser Trp Ser Tyr Ile Val Glu Lys Pro Asn Pro Glu Asn
        35                  40                  45

Gly Thr Cys Tyr Pro Gly His Phe Ala Asp Tyr Glu Glu Leu Arg Glu
    50                  55                  60

Gln Leu Ser Ser Val Ser Ser Phe Glu Arg Phe Glu Ile Phe Pro Lys
65                  70                  75                  80

Glu Ser Ser Trp Pro Asn His Thr Thr Asn Gly Thr Ser Ala Ser Cys
                85                  90                  95

Ser His Asn Gly Glu Ser Ser Phe Tyr Lys Asn Leu Leu Trp Leu Thr
            100                 105                 110

Gly Lys Asn Gly Thr Tyr Pro Asn Leu Ser Lys Asn Tyr Thr Asn Asn
        115                 120                 125

Lys Asn Lys Thr Val Leu Val Leu Trp Gly Val His His Pro Pro Asn
130                 135                 140

Ile Gly Asp Gln Arg Ala Leu Tyr His Thr Glu Asn Ala Tyr Val Ser
145                 150                 155                 160

Val Val Ser Ser His Tyr Asn Arg Thr Phe Thr Pro Glu Ile Ala Lys
                165                 170                 175

Arg Pro Lys Val Arg Asp Gln Glu Gly Arg Ile Asn Tyr Tyr Trp Thr
            180                 185                 190

Leu Leu Glu Pro Gly Asp Thr Ile Ile Phe Glu Ala Asn Gly Asn Leu
        195                 200                 205

Ile Ala Pro Arg Tyr Ala Phe Ala Leu Asn Arg Ser
    210                 215                 220

<210> SEQ ID NO 27
<211> LENGTH: 220
<212> TYPE: PRT
<213> ORGANISM: Artificial sequence
<220> FEATURE:
<223> OTHER INFORMATION: Synthetic polypeptide

<400> SEQUENCE: 27

Ala Asp Pro Gly Tyr Leu Leu Glu Ala Pro Leu Gln Leu Gly Asn Cys
1               5                   10                  15

Ser Val Ala Gly Trp Ile Leu Gly Asn Pro Glu Cys Glu Leu Leu Asn
            20                  25                  30

Ser Ser Glu Ser Trp Ser Tyr Ile Val Glu Lys Pro Asn Pro Glu Asn
        35                  40                  45

Gly Thr Cys Tyr Pro Gly His Phe Ala Asp Tyr Glu Glu Leu Arg Glu
    50                  55                  60

Gln Leu Ser Ser Val Ser Ser Phe Glu Arg Phe Glu Ile Phe Pro Lys
65                  70                  75                  80

Asn Ser Thr Trp Pro Asn His Thr Thr Asn Gly Thr Ser Ala Ser Cys
                85                  90                  95

Ser His Asn Gly Glu Ser Ser Phe Tyr Lys Asn Leu Leu Trp Leu Thr
```

```
                    100                 105                 110
Gly Lys Asn Gly Thr Tyr Pro Asn Leu Ser Lys Asn Tyr Thr Asn Asn
                115                 120                 125

Lys Asn Lys Thr Val Leu Val Leu Trp Gly Val His His Pro Pro Asn
130                 135                 140

Ile Gly Asp Gln Arg Ala Leu Tyr His Thr Glu Asn Ala Tyr Val Ser
145                 150                 155                 160

Val Asn Ser Ser His Tyr Asn Arg Thr Phe Thr Pro Glu Ile Ala Lys
                165                 170                 175

Arg Pro Lys Val Arg Asp Gln Glu Gly Arg Ile Asn Tyr Tyr Trp Thr
                180                 185                 190

Leu Leu Glu Pro Gly Asp Thr Ile Ile Phe Glu Ala Asn Gly Asn Leu
                195                 200                 205

Ile Ala Pro Arg Tyr Ala Phe Ala Leu Asn Arg Ser
                210                 215                 220

<210> SEQ ID NO 28
<211> LENGTH: 220
<212> TYPE: PRT
<213> ORGANISM: Artificial sequence
<220> FEATURE:
<223> OTHER INFORMATION: Synthetic polypeptide

<400> SEQUENCE: 28

Ala Asp Pro Gly Tyr Leu Leu Glu Ala Pro Leu Gln Leu Gly Asn Cys
1               5                   10                  15

Ser Val Ala Gly Trp Ile Leu Gly Asn Pro Glu Cys Glu Leu Leu Asn
                20                  25                  30

Ser Ser Glu Ser Trp Ser Tyr Ile Val Glu Lys Pro Asn Pro Glu Asn
            35                  40                  45

Gly Thr Cys Tyr Pro Gly His Phe Ala Asp Tyr Glu Glu Leu Arg Glu
        50                  55                  60

Gln Leu Ser Ser Val Ser Ser Phe Glu Arg Phe Glu Ile Phe Pro Lys
65                  70                  75                  80

Asn Ser Thr Trp Pro Asn His Thr Thr Asn Gly Thr Ser Ala Ser Cys
                85                  90                  95

Ser His Asn Gly Ser Ser Phe Tyr Lys Asn Leu Leu Trp Leu Thr
                100                 105                 110

Gly Lys Asn Gly Thr Tyr Pro Asn Leu Ser Lys Asn Tyr Thr Asn Asn
                115                 120                 125

Lys Asn Lys Thr Val Leu Val Leu Trp Gly Val His His Pro Pro Asn
130                 135                 140

Ile Gly Asp Gln Arg Ala Leu Tyr His Thr Glu Asn Ala Tyr Val Ser
145                 150                 155                 160

Val Asn Ser Ser His Tyr Asn Arg Thr Phe Thr Pro Glu Ile Ala Lys
                165                 170                 175

Arg Pro Lys Val Arg Asp Gln Glu Gly Arg Ile Asn Tyr Tyr Trp Thr
                180                 185                 190

Leu Leu Glu Pro Gly Asp Thr Ile Ile Phe Glu Ala Asn Gly Asn Leu
                195                 200                 205

Ile Ala Pro Arg Tyr Ala Phe Ala Leu Asn Arg Ser
                210                 215                 220

<210> SEQ ID NO 29
<211> LENGTH: 220
<212> TYPE: PRT
```

<213> ORGANISM: Artificial sequence
<220> FEATURE:
<223> OTHER INFORMATION: Synthetic polypeptide

<400> SEQUENCE: 29

```
Ala Asp Pro Gly Tyr Leu Leu Glu Ala Pro Leu Gln Leu Gly Asn Cys
1               5                   10                  15

Ser Val Ala Gly Trp Ile Leu Gly Asn Pro Glu Cys Glu Leu Leu Ile
            20                  25                  30

Ser Arg Glu Ser Trp Ser Tyr Ile Val Glu Lys Pro Asn Pro Glu Asn
        35                  40                  45

Gly Thr Cys Tyr Pro Gly His Phe Ala Asp Tyr Glu Asn Leu Thr Glu
    50                  55                  60

Gln Leu Ser Ser Val Ser Ser Phe Glu Arg Phe Glu Ile Phe Pro Lys
65                  70                  75                  80

Glu Ser Ser Trp Pro Asn His Thr Thr Thr Gly Val Ser Ala Ser Cys
                85                  90                  95

Ser His Asn Gly Glu Ser Ser Phe Tyr Lys Asn Leu Leu Trp Leu Thr
            100                 105                 110

Gly Lys Asn Gly Leu Tyr Pro Asn Leu Ser Lys Ser Tyr Ala Asn Asn
        115                 120                 125

Lys Glu Lys Glu Val Leu Val Leu Trp Gly Val His His Pro Pro Asn
130                 135                 140

Ile Gly Asp Gln Arg Ala Leu Tyr His Thr Glu Asn Ala Tyr Val Ser
145                 150                 155                 160

Val Val Ser Ser His Tyr Ser Arg Lys Phe Thr Pro Glu Ile Ala Lys
                165                 170                 175

Arg Pro Lys Val Arg Asp Gln Glu Gly Arg Ile Asn Tyr Tyr Trp Thr
            180                 185                 190

Leu Leu Glu Pro Gly Asp Thr Ile Ile Phe Glu Ala Asn Gly Asn Leu
        195                 200                 205

Ile Ala Pro Arg Tyr Ala Phe Ala Leu Ser Arg Gly
    210                 215                 220
```

<210> SEQ ID NO 30
<211> LENGTH: 220
<212> TYPE: PRT
<213> ORGANISM: Artificial sequence
<220> FEATURE:
<223> OTHER INFORMATION: Synthetic polypeptide

<400> SEQUENCE: 30

```
Ala Asp Pro Gly Tyr Leu Leu Glu Ala Pro Leu Gln Leu Gly Asn Cys
1               5                   10                  15

Ser Val Ala Gly Trp Ile Leu Gly Asn Pro Glu Cys Glu Leu Leu Ile
            20                  25                  30

Ser Arg Glu Ser Trp Ser Tyr Ile Val Glu Lys Pro Asn Pro Glu Asn
        35                  40                  45

Gly Thr Cys Tyr Pro Gly His Phe Ala Asp Tyr Glu Glu Leu Arg Glu
    50                  55                  60

Asn Leu Ser Ser Val Ser Ser Phe Glu Arg Phe Glu Ile Phe Pro Lys
65                  70                  75                  80

Glu Ser Ser Trp Pro Asn His Thr Thr Thr Gly Val Ser Ala Ser Cys
                85                  90                  95

Ser His Asn Gly Glu Ser Ser Phe Tyr Lys Asn Leu Leu Trp Leu Thr
            100                 105                 110
```

```
Gly Lys Asn Gly Leu Tyr Pro Asn Leu Ser Lys Ser Tyr Ala Asn Asn
            115                 120                 125

Lys Glu Lys Glu Val Leu Val Leu Trp Gly Val His His Pro Pro Asn
130                 135                 140

Ile Gly Asp Gln Arg Ala Leu Tyr His Thr Glu Asn Ala Tyr Val Ser
145                 150                 155                 160

Val Val Ser Ser His Tyr Ser Arg Lys Phe Thr Pro Glu Ile Ala Lys
                165                 170                 175

Arg Pro Lys Val Arg Asp Gln Glu Gly Arg Ile Asn Tyr Tyr Trp Thr
            180                 185                 190

Leu Leu Glu Pro Gly Asp Thr Ile Ile Phe Glu Ala Asn Gly Asn Leu
        195                 200                 205

Ile Ala Pro Arg Tyr Ala Phe Ala Leu Ser Arg Gly
    210                 215                 220

<210> SEQ ID NO 31
<211> LENGTH: 220
<212> TYPE: PRT
<213> ORGANISM: Artificial sequence
<220> FEATURE:
<223> OTHER INFORMATION: Synthetic polypeptide

<400> SEQUENCE: 31

Ala Asp Pro Gly Tyr Leu Leu Glu Ala Pro Leu Gln Leu Gly Asn Cys
1               5                   10                  15

Ser Val Ala Gly Trp Ile Leu Gly Asn Pro Glu Cys Glu Leu Leu Asn
            20                  25                  30

Ser Ser Glu Ser Trp Ser Tyr Ile Val Glu Lys Pro Asn Pro Glu Asn
        35                  40                  45

Gly Thr Cys Tyr Pro Gly His Phe Ala Asp Tyr Glu Glu Leu Arg Glu
    50                  55                  60

Asn Leu Ser Ser Val Ser Ser Phe Glu Arg Phe Glu Ile Phe Pro Lys
65                  70                  75                  80

Asn Ser Thr Trp Pro Asn His Thr Thr Asn Gly Thr Ser Ala Ser Cys
                85                  90                  95

Ser His Asn Gly Ser Ser Phe Tyr Lys Asn Leu Leu Trp Leu Thr
            100                 105                 110

Gly Lys Asn Gly Thr Tyr Pro Asn Leu Ser Lys Asn Tyr Thr Asn Asn
            115                 120                 125

Lys Asn Lys Thr Val Leu Val Leu Trp Gly Val His His Pro Pro Asn
130                 135                 140

Ile Gly Asp Gln Arg Ala Leu Tyr His Thr Glu Asn Ala Tyr Val Ser
145                 150                 155                 160

Val Asn Ser Ser His Tyr Asn Arg Thr Phe Thr Pro Glu Ile Ala Lys
                165                 170                 175

Arg Pro Lys Val Arg Asp Gln Glu Gly Arg Ile Asn Tyr Tyr Trp Thr
            180                 185                 190

Leu Leu Glu Pro Gly Asp Thr Ile Ile Phe Glu Ala Asn Gly Asn Leu
        195                 200                 205

Ile Ala Pro Arg Tyr Ala Phe Ala Leu Asn Arg Ser
    210                 215                 220

<210> SEQ ID NO 32
<211> LENGTH: 220
<212> TYPE: PRT
<213> ORGANISM: Artificial sequence
<220> FEATURE:
```

<223> OTHER INFORMATION: Synthetic polypeptide

<400> SEQUENCE: 32

```
Ala Asp Pro Gly Tyr Leu Leu Glu Ala Pro Leu Gln Leu Gly Asn Cys
1               5                   10                  15
Ser Val Ala Gly Trp Ile Leu Gly Asn Pro Glu Cys Glu Leu Leu Asn
            20                  25                  30
Ser Ser Glu Ser Trp Ser Tyr Ile Val Glu Lys Pro Asn Pro Glu Asn
        35                  40                  45
Gly Thr Cys Tyr Pro Gly His Phe Ala Asp Tyr Glu Asn Leu Thr Glu
    50                  55                  60
Asn Leu Ser Ser Val Ser Ser Phe Glu Arg Phe Glu Ile Phe Pro Lys
65                  70                  75                  80
Asn Ser Thr Trp Pro Asn His Thr Thr Asn Gly Thr Ser Ala Ser Cys
                85                  90                  95
Ser His Asn Gly Ser Ser Ser Phe Tyr Lys Asn Leu Leu Trp Leu Thr
            100                 105                 110
Gly Lys Asn Gly Thr Tyr Pro Asn Leu Ser Lys Asn Tyr Thr Asn Asn
        115                 120                 125
Lys Asn Lys Thr Val Leu Val Leu Trp Gly Val His His Pro Pro Asn
130                 135                 140
Ile Gly Asp Gln Arg Ala Leu Tyr His Thr Glu Asn Ala Tyr Val Ser
145                 150                 155                 160
Val Asn Ser Ser His Tyr Asn Arg Thr Phe Thr Pro Glu Ile Ala Lys
                165                 170                 175
Arg Pro Lys Val Arg Asp Gln Glu Gly Arg Ile Asn Tyr Tyr Trp Thr
            180                 185                 190
Leu Leu Glu Pro Asn Asp Thr Ile Ile Phe Glu Ala Asn Gly Asn Leu
        195                 200                 205
Ile Ala Pro Arg Tyr Ala Phe Ala Leu Asn Arg Ser
    210                 215                 220
```

<210> SEQ ID NO 33
<211> LENGTH: 507
<212> TYPE: DNA
<213> ORGANISM: Artificial sequence
<220> FEATURE:
<223> OTHER INFORMATION: Synthetic oligonucleotide

<400> SEQUENCE: 33

| | | | | | |
|---|---|---|---|---|---|
| atgcagatct | acgaaggaaa | actgaccgct | gagggactga | ggttcggaat | tgtcgcaagc | 60 |
| cgcgcgaatc | acgcactggt | ggataggctg | gtggaaggcg | ctatcgacgc | aattgtccgg | 120 |
| cacggcggga | gagaggaaga | catcacactg | gtgagagtct | gcggcagctg | ggagattccc | 180 |
| gtggcagctg | gagaactggc | tcgaaaggag | gacatcgatg | ccgtgatcgc | tattggggtc | 240 |
| ctgtgccgag | gagcaactcc | cagcttcgac | tacatcgcct | cagaagtgag | caaggggctg | 300 |
| gctgatctgt | ccctggagct | gaggaaacct | atcacttttg | gcgtgattac | tgccgacacc | 360 |
| ctggaacagg | caatcgaggc | ggccggcacc | tgccatggaa | acaaaggctg | gaagcagcc | 420 |
| ctgtgcgcta | ttgagatggc | aaatctgttc | aaatctctgc | gaggaggctc | cggaggatct | 480 |
| ggagggagtg | gaggctcagg | aggaggc | | | | 507 |

<210> SEQ ID NO 34
<211> LENGTH: 507
<212> TYPE: DNA
<213> ORGANISM: Artificial sequence
<220> FEATURE:
<223> OTHER INFORMATION: Synthetic oligonucleotide

<400> SEQUENCE: 34

```
atgcagatct acgaaggaaa actgaccgct gagggactga ggttcggaat tgtcgcaagc    60
cgcgcgaatc acgcactggt ggataggctg gtggaaggcg ctatcgacgc aattgtccgg   120
cacggcggga gagaggaaga catcacactg gtgagagtct gcggcagctg ggagattccc   180
gtggcagctg gagaactggc tcgaaaggag gacatcgatg ccgtgatcgc tattggggtc   240
ctgtgccgag gagcaactcc cagcttcgac tacatcgcct cagaagtgag caaggggctg   300
gctgatctgt ccctggagct gaggaaacct atcacttttg gcgtgattac tgccgacacc   360
ctggaacagg caatcgaggc ggccggcacc tgccatggaa acaaaggctg gaagcagcc   420
ctgtgcgcta ttgagatggc aaatctgttc aaatctctgc gaggaggctc cggaggatct   480
ggagggagtg gaggctcagg aggaggc                                       507
```

<210> SEQ ID NO 35
<211> LENGTH: 378
<212> TYPE: DNA
<213> ORGANISM: Artificial sequence
<220> FEATURE:
<223> OTHER INFORMATION: Synthetic oligonucleotide

<400> SEQUENCE: 35

```
caggtgcagc tgcaggagtc gggcccagga ctggtgaagc cttcggagac cctgtccctc    60
acctgctctg tctctggtgt ctccgtcacc agtgatattt actactggac ctggatccgg   120
cagcccccag ggaagggact ggagtggatt gggtatatct tttataatgg ggacaccaac   180
tacaaccct ccctcaagag tcgagtcacc atgtcaatcg acacgtccaa gaacgagttc   240
tccctgaggc tgacgtctgt gaccgctgcg gacacggccg tgtatttctg tgccagaggg   300
acagaagatc taggatattg tagtagtggt agctgcccga tcactgggg ccagggaacc   360
ctggtcaccg tctcctca                                                 378
```

<210> SEQ ID NO 36
<211> LENGTH: 321
<212> TYPE: DNA
<213> ORGANISM: Artificial sequence
<220> FEATURE:
<223> OTHER INFORMATION: Synthetic oligonucleotide

<400> SEQUENCE: 36

```
gacatccaga tgacccagtc tccatcctcc ctgtctgcat ctataggaga cagagtcacc    60
atcacttgcc ggccaagtca gaacattcgg agttttttga attggtttca gcacaaacca   120
gggaaagccc caaaactcct gatctatgct gcatccaatt tgcagagtgg ggtcccatca   180
aggttcagtg gcagtggatc tgggacagaa ttcactctca ccatcaggag tctgcaacct   240
gaagattttg caacttacta ctgtcaacag agttacaata cccctccgac gttcggccaa   300
gggaccaagg tggaaatcaa a                                             321
```

<210> SEQ ID NO 37
<211> LENGTH: 126
<212> TYPE: PRT
<213> ORGANISM: Artificial sequence
<220> FEATURE:
<223> OTHER INFORMATION: Synthetic polypeptide

<400> SEQUENCE: 37

Gln Val Gln Leu Gln Glu Ser Gly Pro Gly Leu Val Lys Pro Ser Glu
1               5                   10                  15

Thr Leu Ser Leu Thr Cys Ser Val Ser Gly Val Ser Val Thr Ser Asp
            20                  25                  30

Ile Tyr Tyr Trp Thr Trp Ile Arg Gln Pro Pro Gly Lys Gly Leu Glu
        35                  40                  45

Trp Ile Gly Tyr Ile Phe Tyr Asn Gly Asp Thr Asn Tyr Asn Pro Ser
    50                  55                  60

Leu Lys Ser Arg Val Thr Met Ser Ile Asp Thr Ser Lys Asn Glu Phe
65                  70                  75                  80

Ser Leu Arg Leu Thr Ser Val Thr Ala Ala Asp Thr Ala Val Tyr Phe
            85                  90                  95

Cys Ala Arg Gly Thr Glu Asp Leu Gly Tyr Cys Ser Ser Gly Ser Cys
            100                 105                 110

Pro Asn His Trp Gly Gln Gly Thr Leu Val Thr Val Ser Ser
            115                 120                 125

<210> SEQ ID NO 38
<211> LENGTH: 107
<212> TYPE: PRT
<213> ORGANISM: Artificial sequence
<220> FEATURE:
<223> OTHER INFORMATION: Synthetic polypeptide

<400> SEQUENCE: 38

Asp Ile Gln Met Thr Gln Ser Pro Ser Ser Leu Ser Ala Ser Ile Gly
1               5                   10                  15

Asp Arg Val Thr Ile Thr Cys Arg Pro Ser Gln Asn Ile Arg Ser Phe
            20                  25                  30

Leu Asn Trp Phe Gln His Lys Pro Gly Lys Ala Pro Lys Leu Leu Ile
        35                  40                  45

Tyr Ala Ala Ser Asn Leu Gln Ser Gly Val Pro Ser Arg Phe Ser Gly
    50                  55                  60

Ser Gly Ser Gly Thr Glu Phe Thr Leu Thr Ile Arg Ser Leu Gln Pro
65                  70                  75                  80

Glu Asp Phe Ala Thr Tyr Tyr Cys Gln Gln Ser Tyr Asn Thr Pro Pro
            85                  90                  95

Thr Phe Gly Gln Gly Thr Lys Val Glu Ile Lys
            100                 105

<210> SEQ ID NO 39
<211> LENGTH: 10
<212> TYPE: PRT
<213> ORGANISM: Artificial sequence
<220> FEATURE:
<223> OTHER INFORMATION: Synthetic peptide

<400> SEQUENCE: 39

Gly Val Ser Val Thr Ser Asp Ile Tyr Tyr
1               5                   10

<210> SEQ ID NO 40
<211> LENGTH: 7
<212> TYPE: PRT
<213> ORGANISM: Artificial sequence
<220> FEATURE:
<223> OTHER INFORMATION: Synthetic peptide

<400> SEQUENCE: 40

Ile Phe Tyr Asn Gly Asp Thr

<210> SEQ ID NO 41
<211> LENGTH: 18
<212> TYPE: PRT
<213> ORGANISM: Artificial sequence
<220> FEATURE:
<223> OTHER INFORMATION: Synthetic peptide

<400> SEQUENCE: 41

```
Ala Arg Gly Thr Glu Asp Leu Gly Tyr Cys Ser Ser Gly Ser Cys Pro
1               5                   10                  15

Asn His
```

<210> SEQ ID NO 42
<211> LENGTH: 6
<212> TYPE: PRT
<213> ORGANISM: Artificial sequence
<220> FEATURE:
<223> OTHER INFORMATION: Synthetic peptide

<400> SEQUENCE: 42

```
Gln Asn Ile Arg Ser Phe
1               5
```

<210> SEQ ID NO 43
<211> LENGTH: 3
<212> TYPE: PRT
<213> ORGANISM: Artificial sequence
<220> FEATURE:
<223> OTHER INFORMATION: Synthetic peptide

<400> SEQUENCE: 43

```
Ala Ala Ser
1
```

<210> SEQ ID NO 44
<211> LENGTH: 9
<212> TYPE: PRT
<213> ORGANISM: Artificial sequence
<220> FEATURE:
<223> OTHER INFORMATION: Synthetic peptide

<400> SEQUENCE: 44

```
Gln Gln Ser Tyr Asn Thr Pro Pro Thr
1               5
```

<210> SEQ ID NO 45
<211> LENGTH: 212
<212> TYPE: PRT
<213> ORGANISM: Artificial sequence
<220> FEATURE:
<223> OTHER INFORMATION: Synthetic antibody

<400> SEQUENCE: 45

```
Ala Pro Leu Gln Leu Gly Asn Cys Ser Val Ala Gly Trp Ile Leu Gly
1               5                   10                  15

Asn Pro Glu Cys Glu Leu Leu Asn Ser Ser Glu Ser Trp Ser Tyr Ile
                20                  25                  30

Val Glu Lys Pro Asn Pro Glu Asn Gly Thr Cys Tyr Pro Gly His Phe
            35                  40                  45

Ala Asp Tyr Glu Glu Leu Arg Glu Gln Leu Ser Ser Val Ser Ser Phe
        50                  55                  60

Glu Arg Phe Glu Ile Phe Pro Lys Glu Ser Ser Trp Pro Asn His Thr
```

```
                    65                  70                  75                  80
            Thr Thr Gly Val Ser Ala Ser Cys Ser His Asn Gly Glu Ser Ser Phe
                            85                  90                  95

Tyr Lys Asn Leu Leu Trp Leu Thr Gly Lys Asn Gly Leu Tyr Pro Asn
                            100                 105                 110

Leu Ser Lys Ser Tyr Ala Asn Lys Glu Lys Glu Val Leu Val Leu
                            115                 120                 125

Trp Gly Val His His Pro Pro Asn Ile Gly Asp Gln Arg Ala Leu Tyr
                            130                 135                 140

His Thr Glu Asn Ala Tyr Val Ser Val Val Ser Ser His Tyr Ser Arg
            145                 150                 155                 160

Lys Phe Thr Pro Glu Ile Ala Lys Arg Pro Lys Val Arg Asp Gln Glu
                            165                 170                 175

Gly Arg Ile Asn Tyr Tyr Trp Thr Leu Leu Glu Pro Gly Asp Thr Ile
                            180                 185                 190

Ile Phe Glu Ala Asn Gly Asn Leu Ile Ala Pro Arg Tyr Ala Phe Ala
                            195                 200                 205

Leu Ser Arg Gly
                            210

<210> SEQ ID NO 46
<211> LENGTH: 209
<212> TYPE: PRT
<213> ORGANISM: Artificial sequence
<220> FEATURE:
<223> OTHER INFORMATION: Synthetic antibody

<400> SEQUENCE: 46

Pro Leu Ile Leu Arg Asp Cys Ser Val Ala Gly Trp Leu Leu Gly Asn
            1               5                   10                  15

Pro Met Cys Asp Glu Phe Ile Asn Val Pro Glu Trp Ser Tyr Ile Val
                            20                  25                  30

Glu Lys Ala Asn Pro Val Asn Asp Leu Cys Tyr Pro Gly Asp Phe Asn
                            35                  40                  45

Asp Tyr Glu Glu Leu Lys His Leu Leu Ser Arg Ile Asn Lys Phe Glu
            50                  55                  60

Lys Ile Gln Ile Ile Pro Lys Ser Ser Trp Ser Ser His Glu Ala Ser
            65                  70                  75                  80

Leu Gly Val Ser Ser Ala Cys Pro Tyr Gln Gly Lys Ser Ser Phe Phe
                            85                  90                  95

Arg Asn Val Val Trp Leu Ile Lys Lys Asn Ser Thr Tyr Pro Thr Ile
                            100                 105                 110

Lys Arg Ser Tyr Asn Asn Thr Asn Gln Glu Asp Leu Val Leu Trp Gly
                            115                 120                 125

Ile His His Pro Asn Asp Ala Ala Glu Gln Thr Lys Leu Tyr Gln Asn
                            130                 135                 140

Pro Thr Thr Tyr Ile Ser Val Gly Thr Ser Thr Leu Asn Gln Arg Leu
            145                 150                 155                 160

Val Pro Arg Ile Ala Thr Arg Ser Lys Val Asn Gly Gln Ser Gly Arg
                            165                 170                 175

Met His Phe Pro Trp Thr Ile Leu Lys Pro Asn Ala Ile Asn Phe Glu
                            180                 185                 190

Ser Asn Gly Asn Phe Ile Ala Pro Glu Tyr Ala Tyr Lys Ile Val Lys
                            195                 200                 205

Lys
```

<210> SEQ ID NO 47
<211> LENGTH: 16
<212> TYPE: PRT
<213> ORGANISM: Artificial sequence
<220> FEATURE:
<223> OTHER INFORMATION: Synthetic antibody

<400> SEQUENCE: 47

Ala Lys Phe Ile Pro Asp Pro Asn Tyr Gly Glu Phe Tyr Phe His His
1               5                   10                  15

<210> SEQ ID NO 48
<211> LENGTH: 22
<212> TYPE: PRT
<213> ORGANISM: Artificial sequence
<220> FEATURE:
<223> OTHER INFORMATION: Synthetic antibody

<400> SEQUENCE: 48

Ala Arg Gly Phe Leu Glu Arg Leu Leu Leu Gly Arg Gln Gly Ala Tyr
1               5                   10                  15

Tyr Tyr Gly Met Asp Val
            20

<210> SEQ ID NO 49
<211> LENGTH: 22
<212> TYPE: PRT
<213> ORGANISM: Artificial sequence
<220> FEATURE:
<223> OTHER INFORMATION: Synthetic antibody

<400> SEQUENCE: 49

Ala Arg Gly Gly Val Glu Asn Leu Met Leu Val Ala Val Ile Gln Glu
1               5                   10                  15

Met Trp Tyr Phe Asp Leu
            20

<210> SEQ ID NO 50
<211> LENGTH: 22
<212> TYPE: PRT
<213> ORGANISM: Artificial sequence
<220> FEATURE:
<223> OTHER INFORMATION: Synthetic antibody

<400> SEQUENCE: 50

Ala Arg Gly Gly Ile Glu Asp Leu Phe Leu Gly Thr Ser Asn Gln Arg
1               5                   10                  15

Ile Trp Tyr Phe Asp Val
            20

<210> SEQ ID NO 51
<211> LENGTH: 21
<212> TYPE: PRT
<213> ORGANISM: Artificial sequence
<220> FEATURE:
<223> OTHER INFORMATION: Synthetic antibody

<400> SEQUENCE: 51

Ala Arg Gly Val Leu Glu Gln Leu Ala Pro Asp Phe Asp Ser Tyr Tyr
1               5                   10                  15

Tyr Gly Met Asn Val
            20

```
<210> SEQ ID NO 52
<211> LENGTH: 21
<212> TYPE: PRT
<213> ORGANISM: Artificial sequence
<220> FEATURE:
<223> OTHER INFORMATION: Synthetic antibody

<400> SEQUENCE: 52

Ala Arg Gly Val Leu Glu Gln Phe Ala Pro Asp Phe Asp Ser Tyr Tyr
1               5                   10                  15

Tyr Ala Met Gly Val
            20

<210> SEQ ID NO 53
<211> LENGTH: 18
<212> TYPE: PRT
<213> ORGANISM: Artificial sequence
<220> FEATURE:
<223> OTHER INFORMATION: Synthetic antibody

<400> SEQUENCE: 53

Ala Arg Asp Phe Phe Glu Lys Leu Thr Gly Glu Asp Leu Asn Ala Phe
1               5                   10                  15

Asp Val

<210> SEQ ID NO 54
<211> LENGTH: 18
<212> TYPE: PRT
<213> ORGANISM: Artificial sequence
<220> FEATURE:
<223> OTHER INFORMATION: Synthetic antibody

<400> SEQUENCE: 54

Ala Arg Asp Phe Phe Glu Lys Leu Ile Ala Asp Asp Leu Asn Ala Phe
1               5                   10                  15

Asp Ile

<210> SEQ ID NO 55
<211> LENGTH: 20
<212> TYPE: PRT
<213> ORGANISM: Artificial sequence
<220> FEATURE:
<223> OTHER INFORMATION: Synthetic antibody

<400> SEQUENCE: 55

Ala Arg Arg Phe Val Glu Leu Leu Gly Gly Arg Ser Lys Pro Tyr Asp
1               5                   10                  15

Ala Leu Asp Val
            20

<210> SEQ ID NO 56
<211> LENGTH: 7
<212> TYPE: PRT
<213> ORGANISM: Artificial sequence
<220> FEATURE:
<223> OTHER INFORMATION: Synthetic antibody

<400> SEQUENCE: 56

Tyr Ala Ala Ser Asn Leu Gln
1               5

<210> SEQ ID NO 57
<211> LENGTH: 7
<212> TYPE: PRT
<213> ORGANISM: Artificial sequence
```

```
<220> FEATURE:
<223> OTHER INFORMATION: Synthetic antibody

<400> SEQUENCE: 57

Tyr Ala Ala Asp Asn Leu Gln
1               5

<210> SEQ ID NO 58
<211> LENGTH: 7
<212> TYPE: PRT
<213> ORGANISM: Artificial sequence
<220> FEATURE:
<223> OTHER INFORMATION: Synthetic antibody

<400> SEQUENCE: 58

Tyr Ala Ala Ser Asn Leu Gln
1               5

<210> SEQ ID NO 59
<211> LENGTH: 7
<212> TYPE: PRT
<213> ORGANISM: Artificial sequence
<220> FEATURE:
<223> OTHER INFORMATION: Synthetic antibody

<400> SEQUENCE: 59

Tyr Ala Val Ser Asn Leu Gln
1               5

<210> SEQ ID NO 60
<211> LENGTH: 7
<212> TYPE: PRT
<213> ORGANISM: Artificial sequence
<220> FEATURE:
<223> OTHER INFORMATION: Synthetic antibody

<400> SEQUENCE: 60

Tyr Val Ala Ser Asn Leu Gln
1               5

<210> SEQ ID NO 61
<211> LENGTH: 124
<212> TYPE: PRT
<213> ORGANISM: Artificial sequence
<220> FEATURE:
<223> OTHER INFORMATION: Synthetic antibody

<400> SEQUENCE: 61

Gln Val Gln Leu Gln Glu Ser Gly Pro Gly Leu Val Lys Pro Ser Glu
1               5                   10                  15

Thr Leu Ser Leu Thr Cys Ser Val Ser Gly Val Ser Val Thr Ser Asp
            20                  25                  30

Ile Tyr Tyr Trp Thr Trp Ile Arg Gln Pro Pro Gly Lys Gly Leu Glu
        35                  40                  45

Trp Ile Gly Tyr Ile Phe Tyr Asn Gly Asp Thr Asn Tyr Asn Pro Ser
    50                  55                  60

Leu Lys Ser Arg Val Thr Met Ser Ile Asp Thr Ser Lys Asn Glu Phe
65                  70                  75                  80

Ser Leu Arg Leu Thr Ser Val Thr Ala Ala Asp Thr Ala Val Tyr Phe
                85                  90                  95

Cys Ala Arg Gly Thr Glu Asp Leu Gly Tyr Cys Ser Ser Gly Ser Cys
            100                 105                 110

Pro Asn His Trp Gly Gln Gly Thr Leu Val Thr Val
```

115                120

<210> SEQ ID NO 62
<211> LENGTH: 124
<212> TYPE: PRT
<213> ORGANISM: Artificial sequence
<220> FEATURE:
<223> OTHER INFORMATION: Synthetic antibody

<400> SEQUENCE: 62

Gln Val Gln Leu Gln Glu Ser Gly Pro Gly Leu Val Lys Pro Ser Glu
1               5                   10                  15

Thr Leu Ser Leu Thr Cys Thr Val Ser Gly Gly Ser Val Ser Ser Gly
            20                  25                  30

Ser Tyr Tyr Trp Ser Trp Ile Arg Gln Pro Pro Gly Lys Gly Leu Glu
        35                  40                  45

Trp Ile Gly Tyr Ile Tyr Tyr Ser Gly Ser Thr Asn Tyr Asn Pro Ser
    50                  55                  60

Leu Lys Ser Arg Val Thr Ile Ser Val Asp Thr Ser Lys Asn Gln Phe
65                  70                  75                  80

Ser Leu Lys Leu Ser Ser Val Thr Ala Ala Asp Thr Ala Val Tyr Tyr
                85                  90                  95

Cys Ala Arg Gly Thr Glu Asp Leu Gly Tyr Cys Ser Gly Gly Ser Cys
            100                 105                 110

Pro Asn His Trp Gly Gln Gly Thr Leu Val Thr Val
        115                 120

<210> SEQ ID NO 63
<211> LENGTH: 107
<212> TYPE: PRT
<213> ORGANISM: Artificial sequence
<220> FEATURE:
<223> OTHER INFORMATION: Synthetic antibody

<400> SEQUENCE: 63

Asp Ile Gln Met Thr Gln Ser Pro Ser Ser Leu Ser Ala Ser Val Gly
1               5                   10                  15

Asp Arg Val Thr Ile Thr Cys Arg Ala Ser Gln Ser Ile Ser Ser Tyr
            20                  25                  30

Leu Asn Trp Tyr Gln Gln Lys Pro Gly Lys Ala Pro Lys Leu Leu Ile
        35                  40                  45

Tyr Ala Ala Ser Ser Leu Gln Ser Gly Val Pro Ser Arg Phe Ser Gly
    50                  55                  60

Ser Gly Ser Gly Thr Asp Phe Thr Leu Thr Ile Ser Ser Leu Gln Pro
65                  70                  75                  80

Glu Asp Phe Ala Thr Tyr Tyr Cys Gln Gln Ser Tyr Ser Thr Pro Pro
                85                  90                  95

Thr Phe Gly Gln Gly Thr Lys Val Glu Ile Lys
            100                 105

<210> SEQ ID NO 64
<211> LENGTH: 233
<212> TYPE: PRT
<213> ORGANISM: Artificial sequence
<220> FEATURE:
<223> OTHER INFORMATION: Synthetic antibody

<400> SEQUENCE: 64

Met Gly Val Lys Leu Phe Ala Leu Ile Cys Ile Ala Val Ala Glu Lys
1               5                   10                  15

```
Pro Leu Ile Leu Arg Asp Cys Ser Val Ala Gly Trp Leu Leu Gly Asn
             20                  25                  30

Pro Met Cys Asp Glu Phe Ile Asn Val Pro Glu Trp Ser Tyr Ile Val
         35                  40                  45

Glu Lys Ala Asn Pro Val Asn Asp Leu Cys Tyr Pro Gly Asp Phe Asn
 50                  55                  60

Asp Tyr Glu Glu Leu Lys His Leu Leu Ser Arg Ile Asn His Phe Glu
 65                  70                  75                  80

Lys Ile Gln Ile Ile Pro Lys Ser Ser Trp Ser Ser His Glu Ala Ser
                 85                  90                  95

Leu Gly Val Ser Ser Ala Cys Pro Tyr Gln Gly Lys Ser Ser Phe Glu
            100                 105                 110

Arg Asn Val Val Trp Leu Ile Lys Lys Asn Ser Thr Tyr Pro Thr Ile
        115                 120                 125

Lys Arg Ser Tyr Asn Asn Thr Asn Gln Glu Asp Leu Leu Val Leu Trp
130                 135                 140

Gly Ile His His Pro Asn Asp Ala Ala Glu Gln Lys Leu Tyr Gln Asn
145                 150                 155                 160

Pro Thr Thr Tyr Ile Ser Val Gly Thr Ser Thr Leu Asn Gln Arg Leu
                165                 170                 175

Pro Arg Ile Ala Thr Arg Ser Lys Val Asn Gly Gln Ser Gly Arg Met
            180                 185                 190

Glu Phe Phe Trp Thr Ile Leu Lys Pro Asn Asp Ala Ile Asn Phe Glu
        195                 200                 205

Ser Asn Gly Asn Phe Ile Ala Pro Glu Tyr Ala Tyr Lys Ile Val Lys
210                 215                 220

Lys Ala Ala His His His His His His
225                 230

<210> SEQ ID NO 65
<211> LENGTH: 568
<212> TYPE: PRT
<213> ORGANISM: Artificial sequence
<220> FEATURE:
<223> OTHER INFORMATION: Synthetic antibody

<400> SEQUENCE: 65

Ser Lys Ser Arg Gly Tyr Lys Met Asn Thr Gln Ile Leu Val Phe Ala
 1               5                  10                  15

Leu Val Ala Ser Ile Pro Thr Asn Ala Asp Lys Ile Cys Leu Gly His
             20                  25                  30

His Ala Val Ser Asn Gly Thr Lys Val Asn Thr Leu Thr Glu Arg Gly
         35                  40                  45

Val Glu Val Val Asn Ala Thr Glu Thr Val Glu Arg Thr Asn Val Pro
 50                  55                  60

Arg Ile Cys Ser Lys Gly Lys Arg Thr Val Asp Leu Gly Gln Cys Gly
 65                  70                  75                  80

Leu Leu Gly Thr Ile Thr Gly Pro Pro Gln Cys Asp Gln Phe Leu Glu
                 85                  90                  95

Phe Ser Ala Asp Leu Ile Ile Glu Arg Arg Glu Gly Ser Asp Val Cys
            100                 105                 110

Pro Gly Lys Phe Val Asn Glu Glu Ala Leu Arg Gln Ile Leu Arg Glu
        115                 120                 125

Ser Gly Gly Ile Asp Lys Glu Thr Asn Gly Phe Thr Tyr Ser Gly Ile
130                 135                 140
```

```
Arg Thr Asn Gly Thr Thr Ser Ala Cys Arg Arg Ser Gly Ser Ser Phe
145                 150                 155                 160

Tyr Ala Glu Met Lys Trp Leu Leu Ser Asn Thr Asp Asn Ala Ala Phe
            165                 170                 175

Pro Gln Met Thr Lys Ser Tyr Lys Asn Thr Arg Lys Asp Pro Ala Leu
        180                 185                 190

Ile Ile Trp Gly Ile His His Ser Gly Ser Thr Glu Gln Thr Lys Leu
    195                 200                 205

Tyr Gly Ser Gly Asn Lys Leu Ile Thr Val Gly Ser Ser Asn Tyr Gln
210                 215                 220

Gln Ser Phe Val Pro Ser Pro Gly Ala Arg Pro Gln Val Asn Gly Gln
225                 230                 235                 240

Ser Gly Arg Ile Asp Phe His Trp Leu Ile Leu Asn Pro Asn Asp Thr
            245                 250                 255

Val Thr Phe Ser Phe Asn Gly Ala Gly Ile Ala Pro Asp Arg Ala Ser
        260                 265                 270

Phe Leu Arg Gly Lys Ser Met Gly Ile Gln Ser Glu Val Gln Val Asp
    275                 280                 285

Ala Asn Cys Glu Gly Asp Cys Tyr His Ser Gly Gly Thr Ile Ile Ser
290                 295                 300

Asn Leu Pro Gly Gln Asn Ile Asn Ser Arg Ala Val Gly Lys Cys Pro
305                 310                 315                 320

Arg Tyr Val Lys Gln Glu Ser Leu Leu Leu Ala Thr Gly Met Lys Asn
            325                 330                 335

Pro Glu Ile Pro Lys Arg Arg Gly Leu Phe Gly Ala Ile Ala Gly
        340                 345                 350

Phe Ile Glu Asn Gly Gln Glu Gly Leu Ile Asp Gly Trp Tyr Gly Arg
    355                 360                 365

Phe His Gln Asn Ala Gln Gly Glu Gly Thr Ala Ala Asp Tyr Lys Ser
370                 375                 380

Thr Gln Ser Ala Ile Asp Gln Ile Thr Gly Lys Leu Asn Arg Leu Ile
385                 390                 395                 400

Glu Lys Thr Asn Gln Gln Phe Glu Leu Ile Asp Asn Glu Phe Thr Glu
            405                 410                 415

Val Glu Arg Gln Ile Gly Asn Val Ile Asn Trp Thr Arg Asp Ser Met
        420                 425                 430

Thr Glu Val Trp Ser Tyr Asn Ala Glu Leu Leu Val Ala Met Glu Asn
    435                 440                 445

Gln His Thr Ile Asp Leu Ala Asp Ser Glu Met Asn Lys Leu Tyr Glu
450                 455                 460

Arg Val Lys Arg Gln Leu Arg Glu Asn Ala Glu Glu Asp Gly Thr Gly
465                 470                 475                 480

Cys Phe Glu Ile Phe His Lys Cys Asp Asp Cys Met Ala Ser Ile
            485                 490                 495

Arg Asn Asn Thr Tyr Asp His Ser Lys Tyr Arg Glu Glu Ala Ile Gln
        500                 505                 510

Asn Arg Ile Gln Ile Asp Pro Val Glu Asp Lys Ile Glu Glu Ile Leu
    515                 520                 525

Ser Lys Ile Tyr His Ile Glu Asn Glu Ile Ala Arg Ile Lys Lys Leu
530                 535                 540

Ile Gly Glu Ala Pro Gly Gly Ile Glu Gly Arg Glu Asn Leu Tyr Phe
545                 550                 555                 560
```

-continued

```
Gln Gly His His His His His
                565

<210> SEQ ID NO 66
<211> LENGTH: 240
<212> TYPE: PRT
<213> ORGANISM: Artificial sequence
<220> FEATURE:
<223> OTHER INFORMATION: Synthetic antibody

<400> SEQUENCE: 66

Glu Val Gln Leu Val Glu Ser Gly Gly Gly Leu Val Gln Pro Gly Gly
1               5                   10                  15

Ser Leu Arg Leu Ser Cys Ala Ala Ser Gly Phe Thr Ser Tyr Trp Met
            20                  25                  30

Thr Trp Val Arg Gln Ala Pro Gly Lys Gly Leu Glu Trp Val Ala Asn
        35                  40                  45

Ile Asn Gln Asp Gly Gly Glu Lys Tyr Phe Val Asp Ser Val Arg Gly
    50                  55                  60

Arg Phe Thr Ile Ser Arg Asp Asn Ala Lys Asn Ser Leu Phe Leu Gln
65                  70                  75                  80

Met Asn Thr Leu Arg Ala Glu Asp Thr Ala Val Tyr Tyr Cys Ala Arg
                85                  90                  95

Gly Leu Phe Glu Arg Leu Leu Leu Gly Arg Gln Gly Ala Tyr Tyr Tyr
            100                 105                 110

Gly Met Asp Val Trp Gly Gln Gly Thr Thr Val Thr Val Ser Ser Ala
        115                 120                 125

Ser Thr Lys Gly Asp Ile Gln Met Thr Gln Ser Pro Ser Ser Leu Ser
    130                 135                 140

Ala Ser Val Gly Arg Val Ser Met Thr Cys Arg Ala Ser Gln Ile Ile
145                 150                 155                 160

Ser Ser Ser Leu Asn Trp Tyr Gln Gln Lys Pro Gly Lys Ala Pro Lys
                165                 170                 175

Leu Leu Ile Tyr Ala Ala Ser Asn Leu Gln Ser Gly Val Pro Ser Arg
            180                 185                 190

Phe Ser Gly Ser Gly Ser Gly Thr Asp Phe Thr Leu Thr Ile Ser Ser
        195                 200                 205

Leu Gln Pro Glu Asp Phe Ala Thr Tyr Tyr Cys Gln Gln Ser Tyr Ser
    210                 215                 220

Thr Pro Pro Glu Leu Thr Phe Gly Gly Gly Thr Lys Val Glu Ile Lys
225                 230                 235                 240
```

What is claimed is:

1. A method of inducing an immune response in a subject infected with influenza A virus or at risk of contracting influenza A virus, comprising delivering to said subject one or more immunogen(s), or one or more RNA(s) or expression vector(s) encoding said immunogen(s), wherein said immunogen(s) is/are selected from peptide(s) SEQ ID NOS: 11-22, 24, 29, and/or 30, or are selected from peptide(s) comprising 95% identity to peptide(s) comprising SEQ ID NOS: 1-10, 23, 25-28, 31 and/or 32.

2. The method of claim 1, further comprising administering an adjuvant to said subject.

3. The method of claim 1, wherein said immunogen(s) is fused to a non-influenza amino acid sequence.

4. The method of claim 1, wherein said immunogen(s) is formulated in a pharmaceutically acceptable buffer, diluent or excipient, or is lyophilized.

5. The method of claim 1, wherein said subject is a human subject.

6. The method of claim 1, wherein said immune response is a protective immune response or a therapeutic immune response.

7. The method of claim 1, wherein said immunogen(s) comprises 2, 3, 4, 5, 6, 7, 8, 9, 10 or more different peptides selected from SEQ ID NOS: 1-32, or are selected from different peptides comprising 95% identity to peptides comprising SEQ ID NOS: 1-10, 23, 25-28, 31 and/or 32.

8. The method of claim 1, further comprising delivering said immunogen(s), RNA(s) or expression vector(s) to said subject at least a second time.

9. The method of claim 1, further comprising measuring an immune response in said subject after delivery.

10. The method of claim 1, wherein said immunogen(s) is/are peptide(s) selected from peptides comprising SEQ ID NOS: 1-32.

11. The method of claim 1, wherein said immunogen(s) have 95% identity to one or more peptides selected from peptides comprising SEQ ID NOS: 1-10, 23, 25-28, 31 and/or 32.

12. The method of claim 10, wherein said immunogen(s) is/are a multimer of said peptides.

13. The method of claim 11, wherein said immunogen(s) is/are a multimer of multiple sequences of said peptides.

14. The method of claim 1, wherein said immunogen(s) is/are delivered in a lipid and/or nanoparticulate formulation.

15. A vaccine formulation comprising one or more immunogen(s), or one or more RNA(s) or expression vector(s) encoding said peptide(s), wherein said immunogen(s) is/are selected from peptide(s) SEQ ID NOS: 11-22, 24, 29, and/or 30, or are selected from peptide(s) comprising 95% identity to peptide(s) comprising SEQ ID NOS: 1-10, 23, 25-28, 31 and/or 32.

16. The vaccine formulation of claim 15, further comprising an adjuvant.

17. The vaccine formulation of claim 15, wherein said immunogen(s) is/are fused to a non-influenza amino acid sequence.

18. The vaccine formulation of claim 15, wherein said immunogen(s) is formulated in a pharmaceutically acceptable buffer, diluent or excipient, or is lyophilized.

19. The vaccine formulation of claim 15, wherein said immunogen(s) comprises 2, 3, 4, 5, 6, 7, 8, 9, 10 or more different peptides selected from SEQ ID NOS: 1-32, or are selected from different peptides comprising 95% identity to peptides comprising SEQ ID NOS: 1-10, 23, 25-28, 31 and/or 32.

20. The vaccine formulation of claim 15, wherein said immunogen(s) is/are peptide(s) selected from peptides comprising SEQ ID NOS: 1-32.

21. The vaccine formulation of claim 15, wherein said immunogen(s) have 95% identity to one or more peptides selected from peptides comprising SEQ ID NOS: 1-10, 23, 25-28, 31 and/or 32.

22. The vaccine formulation of claim 20, wherein said immunogen(s) is/are a multimer of said peptides.

23. The vaccine formulation of claim 21, wherein said immunogen(s) is/are a multimer of said peptides.

24. The method of claim 2, wherein the adjuvant is selected from a water-in-oil or water-in-oil-in-water formulation, a cytokine, or an immune modulator.

25. The method of claim 5, wherein said human subject is a child from 6 mos age to 12 years of age.

26. The method of claim 5, wherein said human subject is an adult over the age of 60.

27. The method of claim 16, wherein the adjuvant is selected from a water-in-oil or water-in-oil-in-water formulation, a cytokine, or an immune modulator.

* * * * *